United States Patent
Shaheen et al.

(10) Patent No.: US 10,485,000 B2
(45) Date of Patent: Nov. 19, 2019

(54) USER EQUIPMENT, BASE STATIONS AND METHODS

(71) Applicants: Sharp Kabushiki Kaisha, Sakai-ku, Sakai, Osaka (JP); FG Innovation Company Limited, New Territories, Hong Kong (CN)

(72) Inventors: Kamel M. Shaheen, Camas, WA (US); Toshizo Nogami, Vancouver, WA (US); Atsushi Ishii, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 15/717,585

(22) Filed: Sep. 27, 2017

(65) Prior Publication Data
US 2018/0092085 A1    Mar. 29, 2018

Related U.S. Application Data

(63) Continuation of application No. PCT/US2017/053529, filed on Sep. 26, 2017.
(Continued)

(51) Int. Cl.
| | |
|---|---|
| *H04W 72/04* | (2009.01) |
| *H04W 36/00* | (2009.01) |
| *H04W 76/16* | (2018.01) |
| *H04W 28/08* | (2009.01) |
| *H04W 36/14* | (2009.01) |

(Continued)

(52) U.S. Cl.
CPC ......... *H04W 72/048* (2013.01); *H04W 28/08* (2013.01); *H04W 36/0022* (2013.01); *H04W 36/0094* (2013.01); *H04W 36/14* (2013.01); *H04W 76/16* (2018.02); *H04W 36/22* (2013.01); *H04W 76/27* (2018.02); *H04W 76/30* (2018.02); *H04W 88/06* (2013.01)

(58) Field of Classification Search
None
See application file for complete search history.

(56) References Cited

U.S. PATENT DOCUMENTS

2015/0215965 A1    7/2015  Yamada
2015/0373607 A1    12/2015 Zhu
(Continued)

OTHER PUBLICATIONS

ZTE, "Discussion on control plane for the DC based LTE/NR tight interworking", 3GPP TSG RAN WG2 Meeting #94, Nanjing, China, R2-163741, May 27, 2016.
(Continued)

*Primary Examiner* — Saumit Shah
(74) *Attorney, Agent, or Firm* — Austin Rapp

(57) ABSTRACT

A multi-mode capable LTE-5G new radio (NR) user equipment (UE) for receiving LTE radio resource connection (RRC) messages is described. The UE receives an LTE RRC message from an evolved node B (eNB). The UE also determines which data radio bearer (DRB) to offload to a particular 5G NR system. The UE establishes an RRC with the 5G NR system. The UE steers a particular DRB or DRBs to the 5G NR system. The UE acknowledges receiving the LTE RRC message using LTE or NR connections. The UE updates an LTE system with a status of connections to the 5G NR system.

5 Claims, 56 Drawing Sheets

Related U.S. Application Data

(60) Provisional application No. 62/401,066, filed on Sep. 28, 2016.

(51) Int. Cl.

| | |
|---|---|
| *H04W 36/22* | (2009.01) |
| *H04W 88/06* | (2009.01) |
| *H04W 76/30* | (2018.01) |
| *H04W 76/27* | (2018.01) |

(56) References Cited

U.S. PATENT DOCUMENTS

2017/0208488 A1* 7/2017 Hwang ............... H04W 76/34
2017/0311290 A1* 10/2017 Adjakple ............ H04W 76/18
2018/0041925 A1* 2/2018 Yilmaz ............. H04W 36/0033

OTHER PUBLICATIONS

InterDigital Communications, "Control Plane Aspects for Interworking between NR and LTE", 3GPP TSG-RAN WG2 #94, Nanjing, China, R2-164091, May 27, 2016.
Invitation to Pay Additional Fees issued for International Application No. PCT/US2017/053529 on Dec. 15, 2017.
International Search Report and Written Opinion issued for PCT Application No. PCT/US2017/053529 dated Feb. 6, 2018.
CATT, "Discussion on RRC Diversity for LTE-NR Tight Interworking," 3GPP TSG RAN WG2 Meeting #95, Goteborg, Sweden, R2-164710, Apr. 26, 2016.
CATT, "Discussion on RRC Architecture for LTE-NR Tight Interworking," 3GPP TSG RAN WG2 Meeting #95, Goteborg, Sweden, R2-164711, Aug. 26, 2016.
CATT, "CP procedures for LTE and NR interworking," 3GPP TSG RAN WG2 Meeting #95, Goteborg, Sweden, R2-164712, Aug. 26, 2016.
Nokia, Alcatel-Lucent Shanghai Bell, "General considerations for LTE-NR tight interworking," 3GPP TSG RAN WG2 Meeting #95, Goteborg, Sweden, R2-164752, Aug. 26, 2016.
CATT, "Open issues of LTE-NR Tight Interworking," 3GPP TSG RAN WG2 Meeting #95, Goteborg, Sweden, R2-164799, Aug. 26, 2016.
NTT DOCOMO, Inc., "System Information handling for LTE-NR tight interworking," 3GPP TSG RAN WG2 Meeting #95, Goteborg, Sweden, R2-164950, Aug. 26, 2016.
Nokia, Alcatel-Lucent Shanghai Bell, "Tight interworking of evolved LTE and NR," 3GPP TSG RAN WG2 Meeting #95, Goteborg, Sweden, R2-164957, Aug. 26, 2016.
Intel Corporation, "UE capability coordination in LTE-NR interworking," 3GPP TSG-RAN WG2 Meeting #95, Gothenburg, Sweden, R2-165009, Aug. 26, 2016.
Intel Corporation, "WLAN/NR interworking," 3GPP TSG-RAN WG2 Meeting #95, Gothenburg, Sweden, R2-165010, Aug. 26, 2016.
Intel Corporation (Rapporteur), "Report of email discussion: [94#39][NR] C plane aspects for tight interworking," 3GPP TSG-RAN WG2 Meeting #95, Gothenburg, Sweden, R2-165012, Aug. 26, 2016.
Sony, "Inter-RAT Inter-MeNB handover in LTE-NR tight interworking," 3GPP TSG RAN WG2 Meeting #95, Goteborg, Sweden, R2-165034, Aug. 26, 2016.
InterDigital Communications, "Control Plane Functions and transport mechanism for Interworking between NR and LTE," 3GPP TSG-RAN WG2 Meeting #95, Gothenburg, Sweden, R2-165054, Aug. 26, 2016.
CATT, "Inactive State and Support of inter-RAT Interworking," 3GPP TSG-RAN WG2 Meeting #95, Gothenburg, Sweden, R2-165104, Aug. 26, 2016.
ZTE Corporation, ZTE Microelectronics, "Clarification on the scenarios of LTE/NR tight interworking," 3GPP TSG-RAN WG2 Meeting #95, Gothenburg, Sweden, R2-165114, Aug. 26, 2016.
ZTE Corporation, ZTE Microelectronics, "Consideration on the performance requirement for LTE/NR tight interworking," 3GPP TSG-RAN WG2 Meeting #95, Gothenburg, Sweden, R2-165115, Aug. 26, 2016.
ZTE Corporation, ZTE Microelectronics, "Consideration on the capability coordination in LTE/NR tight interworking," 3GPP TSG-RAN WG2 Meeting #95, Gothenburg, Sweden, R2-165116, Aug. 26, 2016.
ZTE Corporation, ZTE Microelectronics, "Consideration on the control plane for the LTE NR tight interworking," 3GPP TSG-RAN WG2 Meeting #95, Gothenburg, Sweden, R2-165117, Aug. 26, 2016.
ITRI, "RRC message generation and transmission for LTE-NR tight interworking," 3GPP TSG-RAN WG2 Meeting #95, Gothenburg, Sweden, Tdoc R2-165144, Aug. 26, 2016.
KT Corp., "Control plane issues for tight interworking between NR and LTE," 3GPP TSG RAN WG2 Meeting #95, Goteborg, Sweden, R2-165196, Aug. 26, 2016.
InterDigital Communications, "Control Plane Aspects for Interworking between NR and LTE," 3GPP TSG-RAN WG2 Meeting #95, Gothenburg, Sweden, R2-165468, Aug. 26, 2016.
Huawei, HiSilicon, "Comparison on LTE-NR tight interworking user plane options," 3GPP TSG-RAN WG2 Meeting #95, Gothenburg, Sweden, R2-165486, Aug. 26, 2016.
Huawei, HiSilicon, "Functionality and procedure for LTE-NR tight interworking," 3GPP TSG-RAN WG2 Meeting #95, Gothenburg, Sweden, R2-165488, Aug. 26, 2016.
Huawei, HiSilicon, "LTE-NR tight interworking user plane detail design," 3GPP TSG-RAN WG2 Meeting #95, Gothenburg, Sweden, R2-165489, Aug. 26, 2016.
Huawei, HiSilicon, "RRC aspects in LTE-NR tight interworking," 3GPP TSG-RAN WG2 Meeting #95, Gothenburg, Sweden, R2-165492, Aug. 26, 2016.
Ericsson, "CP aspects of NR-LTE interworking," 3GPP TSG-RAN WG2 Meeting #95, Gothenburg, Sweden, Tdoc R2-165547, Aug. 26, 2016.
Convida Wireless, "Control Plane Latency for Tight Interworking," 3GPP TSG-RAN WG2 Meeting #95, Gothenburg, Sweden, R2-165591, Aug. 26, 2016.
LG Electronics Inc., "Partial UE-centric Mobility in NR-LTE interworking scenario," 3GPP TSG-RAN WG2 Meeting #95, Gothenburg, Sweden, R2-165607, Aug. 26, 2016.
3GPP TS 36.331, V13.2.0, Evolved Universal Terrestrial Radio Access (E-UTRA); Radio Resource Control (RRC); Protocol specification (Release 13) Jun. 2016.
3GPP TS 36.300 V13.4.0, Evolved Universal Terrestrial Radio Access (E-UTRA) and Evolved Universal Terrestrial Radio Access Network (E-UTRAN); Overall description; Stage 2, (Release 13) Jun. 2016.

* cited by examiner

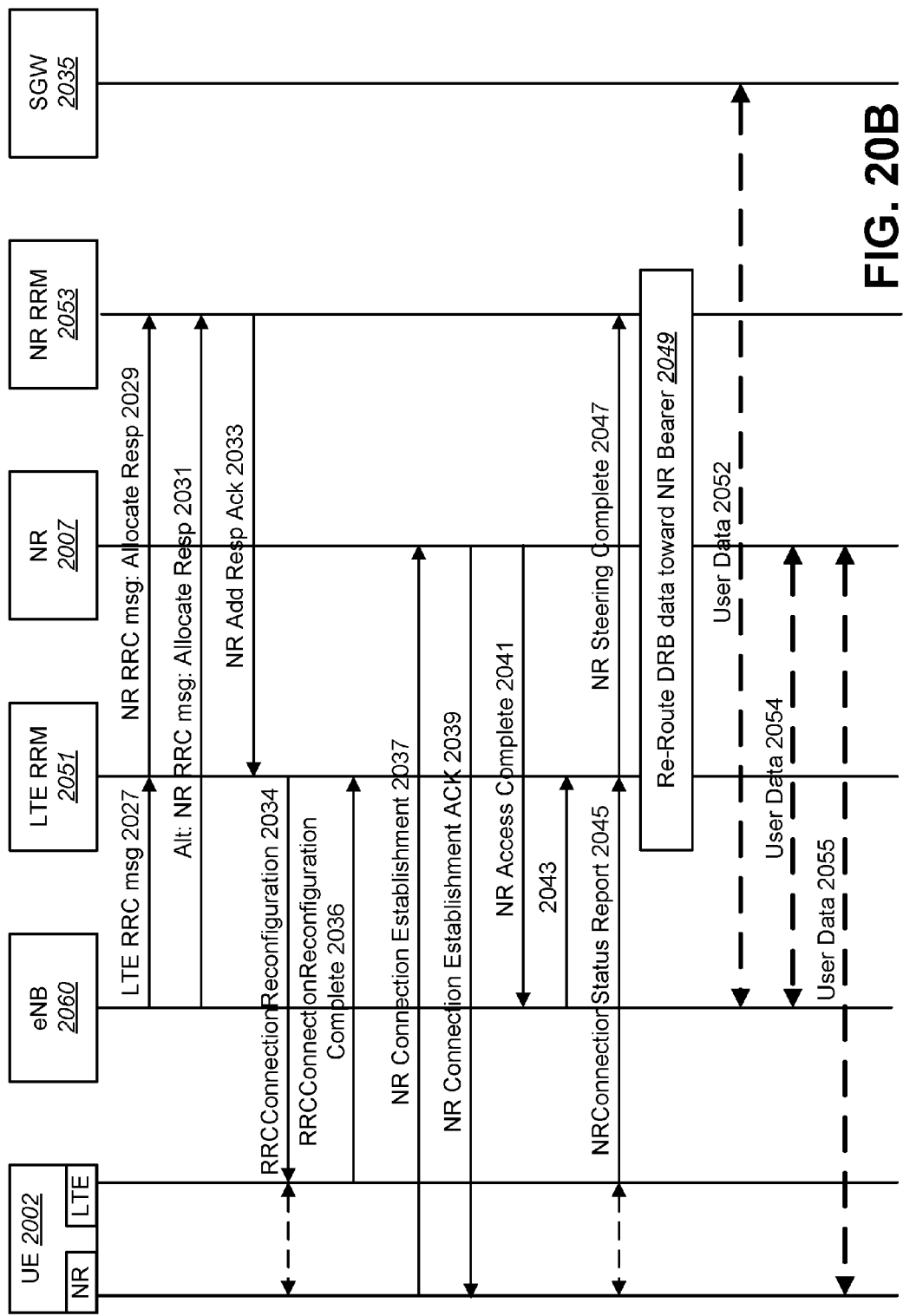

USER EQUIPMENT, BASE STATIONS AND METHODS

RELATED APPLICATIONS

This application is related to and claims priority from U.S. Provisional Patent Application No. 62/401,066, entitled "USER EQUIPMENTS, BASE STATIONS AND METHODS," filed on Sep. 28, 2016, which is hereby incorporated by reference herein, in its entirety.

TECHNICAL FIELD

The present disclosure relates generally to communication systems. More specifically, the present disclosure relates to user equipment, base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIGS. 20A and 20B are a sequence diagram illustrating another NR addition procedure;

DETAILED DESCRIPTION

Figure 1:
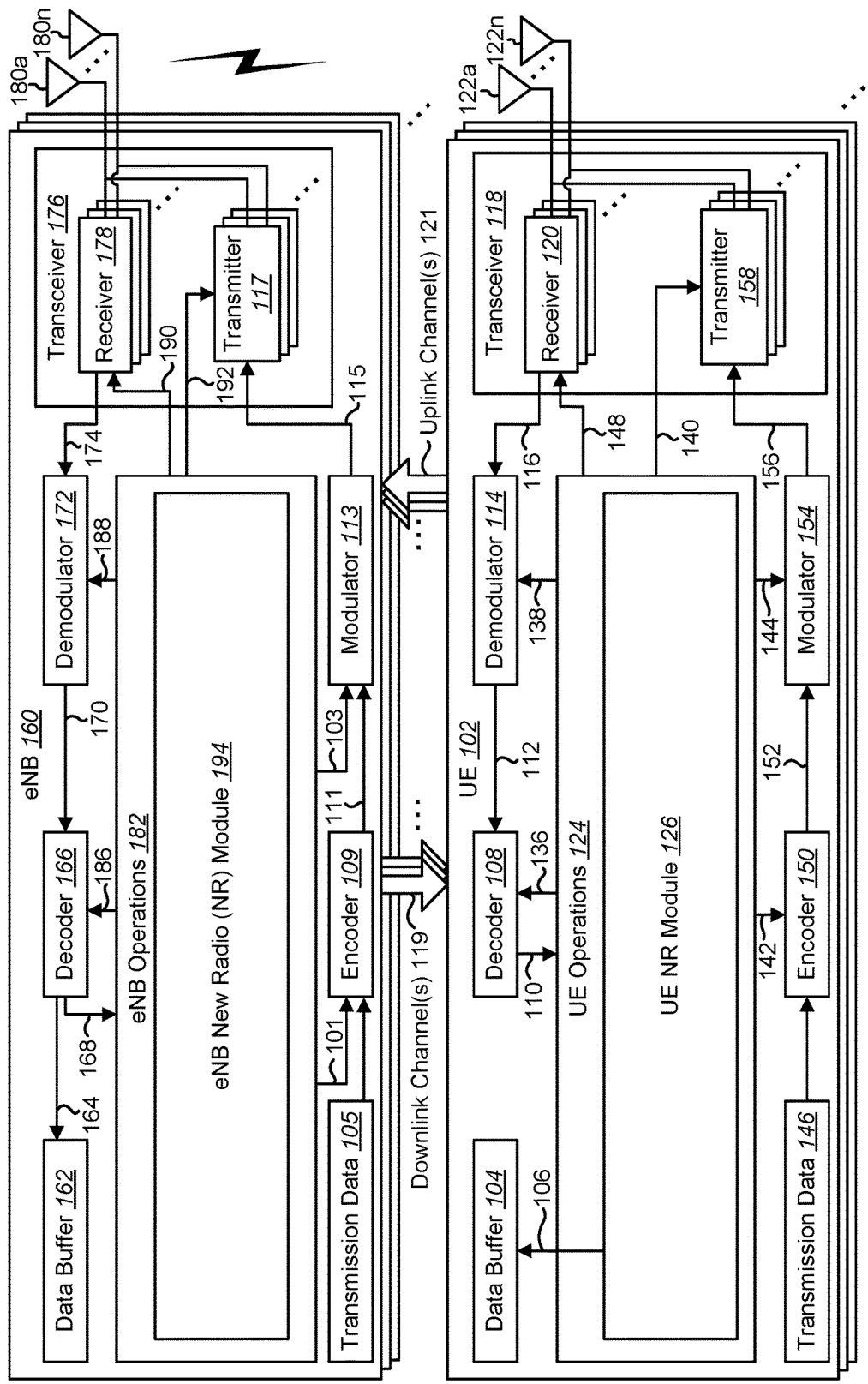
FIG. 1 is a block diagram illustrating one implementation of one or more evolved NodeBs (eNBs) and one or more user equipments (UEs) in which systems and methods for new radio (NR) operations may be implemented.

A multi-mode capable LTE-5G new radio (NR) user equipment (UE) for receiving LTE radio resource connection (RRC) messages is described. The UE includes a processor and memory in electronic communication with the processor. Instructions stored in the memory are executable to receive an LTE RRC message from an evolved node B (eNB). The instructions are also executable to determine which data radio bearer (DRB) to offload to a particular 5G NR system. The instructions are further executable to establish an RRC with the 5G NR system. The instructions are additionally executable to steer a particular DRB or DRBs to the 5G NR system. The instructions are also executable to acknowledge receiving the LTE RRC message using LTE or NR connections. The instructions are further executable to update an LTE system with a status of connections to the 5G NR system.

The LTE RRC message from the eNB may be an RRC-ConnectionReconfiguration message, handover to/from E-UTRA, or any other RRC connection control procedures listed in Table 24.

The NR traffic steering command may be received in an NRCLNI-Configuration. The RRCConnectionReconfiguration message may also trigger release/modify/add new NR connections using NRA-MobilityConfiguration IE. The NRA-MobilityConfiguration may be composed of one or more NRToReleaseList, NRToReleaseList, and/or NRToAddList. The NRA-MobilityConfig determines whether an Acknowledgment is required.

The UE may be configured with NR-OffloadConfigCommon or NR-OffloadConfigDedicated received in NR-OffloadInfo transmitted in SystemInformationBlockTypeXX.

The SystemInformationBlockTypeXX may include one or more of NR-OffloadInfoPerPLMN-List, and/or NR-Identifiers (System ID, Routing Area ID, Node ID).

The NR-OffloadInfo may contain sets of network selection rules and traffic steering rules. The NR-OffloadInfo may include a set of RSRP thresholds (low and high) that determines the conditions of NR RF transmission. The NR-OffloadInfo may include a set of allowable bandwidth (low and high).

The Acknowledge LTE RRC message may be a RRCConnectionReconfigurationComplete message.

The NRConnectionStatusReport message may indicate success or failure of connecting to 5G NR.

The RRC message may include 5G NR UE capability related restraints such as a minimum number of neighbor cells that a UE shall be able to store within a measObject5G_NR.

The RRC message may include 5G NR UE capability information, UE Capability RAT Container list, and NR-RadioResourceConfigDedicated-Containerlist.

The RRC message may include 5G NR UE attributes including a Maximum number of NR identifiers (maxNR-Id), a maximum number of NR bands (maxNR-Bands), a maximum number of NR Channels used in NR-CarrierInfo (maxNR-Channels), a maximum number of NR Carrier Information (maxNR-CarrierInfo), NR-IW-RAN-Rules, NRA-SplitBearer, and/or NRA-BufferSize. The UE may update the LTE and 5G NR RRM with its 5G NR attributes in UE-EUTRA-Capability IE among which interRAT-ParametersNR, LAA-Parameters, NRA-Parameters, NR-IW-Parameters, supportedBandListNR, maxNR-Bands, NR-BandIndicator, IRAT-Parameters5G NR-FDD, and/or IRAT-Parameters5G NR-TDDxxx.

The 5G NR UE may be capable of storing and processing 5G NR related variables sent by an LTE RRM and/or 5G NR RRM includes NR-Carrierinfo, NR-Identifiers, NR-Id-List, NR-Status. The 5G NR UE variables may include those IEs including information for the measurements for which the triggering conditions have been met stored in a VarMeasReportList, for information about NR for access selection and mobility such as NR-MobilitySet in VarNR-MobilityConfig, or information about the status of NR connection for NR aggregation stored in (VarNR-Status). Status may indicate the connection status to NR and causes for connection failures.

The 5G NR UE may be capable of storing and processing information related to whether the UE supports RAN-based NR interworking based on access network selection and traffic steering rules (NR-IW-RAN-Rules), and/or whether the UE supports RAN-based NR interworking based on ANDSF policies (NR-IW-ANDSF-Policies). The NR UE capabilities may be indicated to the LTE RRM and 5G NR RRM including whether the UE supports LTE-NR Aggregation (NRA), NRA-BufferSize which indicates whether the UE supports the layer 2 buffer sizes for "with support for split bearers", and/or NRA-SplitBearer indicates whether the UE supports the split NRA bearer. The 5G NR UE capabilities may be indicated to the LTE RRM and 5G NR RRM comprising whether the UE supports interRAT-ParametersNR, which indicates whether the UE supports NR measurements configured by MeasObjectNR with corresponding quantity and report configuration in the supported NR bands.

The 5G NR UE may be capable of storing and processing information related to whether the UE supports NRCLNI, reception of NRCLNI-Configuration. The 5G NR UE supporting NRCLNI may indicate support of interRAT-ParametersNR. The 5G NR UE supporting NRCLNI and NR-IW-RAN-Rules may apply NR identifiers received in NRCLNI-Configuration for the access network selection and traffic steering rules when in RRC_IDLE.

The RRC message may include 5G NR measurements information elements attributes (e.g., ReportConfigInterRAT information element) and trigger events for 5G NR (e.g., EventN1, EventN2, Event3 (Thresholds, NR-RSSI-Ranges), and ReportQuantityNR (e.g., bandRequestNR, carrierinfoRequestNR, avadableAdmissionCapacityRequestNR, backhaulDL-BandwidthRequestNR, backhaulUL-BandwidthRequestNR, channelUtilizationRequestNR, StationCountRequestNR)).

Another multi-mode capable LTE-5G NR UE for receiving and transmitting LTE RRC messages is described. The UE includes a processor and memory in electronic communication with the processor. Instructions stored in the memory are executable to receive an LTE RRC message from an eNB encapsulating 5G NR RRM control signaling messages intended to the 5G NR portion of the UE. The instructions are also executable to determine if the LTE RRC message contains a specific command for the LTE portion of the UE, if so the UE executes the commands accordingly. The instructions are further executable to extract the 5G NR RRM control signaling message and forward it to the 5G NR portion of the device. The instructions are additionally executable to compile an LTE RRC response message and encapsulate any response from the 5G NR portion if available. The instructions are also executable to send the response back to the LTE eNB. The instructions are also executable to forward, after encapsulating in an LTE message, any 5G NR signaling message to the LTE eNB.

The LTE RRC message from the eNB may be an RRC-ConnectionReconfiguration message, handover to/from E-UTRA, or any other RRC connection control procedures listed in Table 24. 5G NR control signaling may be NR-RadioResourceConfigDedicated-Containerlist.

Another multi-mode capable LTE-5G NR UE for receiving and transmitting LTE RRC messages is described. The UE includes a processor and memory in electronic communication with the processor. Instructions stored in the memory are executable to receive a 5G NR RRC message from an evolved node B (eNB) over an NR-SRB with 5G NR Radio Resource Management (RRM) control signaling messages intended to a 5G NR portion of the UE. The instructions are also executable to compile a 5G NR RRC response message and forward any response from the 5G NR portion if available. The instructions are further executable to forward the response back to an LTE RRC portion of the UE. The instructions are additionally executable to forward the 5G NR RRC message and any 5G NR signaling message to the UE over a dedicated NR-SRB.

Another multi-mode capable LTE-5G NR UE for receiving and transmitting LTE RRC messages is described. The UE includes a processor and memory in electronic communication with the processor. Instructions stored in the memory are executable to receive an 5G NR RRC message from an eNB over an NR-SRB with 5G NR RRM control signaling messages intended to a 5G NR portion of the UE. The instructions are also executable to compile an 5G NR RRC response message and forward any response from the 5G NR portion if available. The instructions are further executable to forward the response back to the LTE RRC portion of the UE. The instructions are additionally executable to forward the 5G NR message and any 5G NR signaling messages to the UE over a dedicated LTE SRB3.

Another multi-mode capable LTE-5G NR UE for receiving and transmitting LTE RRC messages is described. The UE includes a processor and memory in electronic communication with the processor. Instructions stored in the memory are executable to perform measurements by a 5G NR UE portion of the list of 5G NR cells provided by a system. The instructions are also executable to compile by the 5G NR UE portion a measurement report of 5G NR cells. The instructions are further executable to forward the measurement report to a LTE UE portion for processing. The instructions additionally executable to encapsulate or forward in a separate SRB, an LTE RRC signaling to an LTE evolved node B eNB for processing. The instructions are additionally executable to evaluate by an LTE eNB RRM the 5G NR measurements and make decisions based on preconfigured rules and conditions if these capabilities are supported in the LTE RRM. The instructions are also executable to forward by LTE eNB the encapsulated 5G NR measurement report to a 5G NR-based gNB RRM/scheduler for evaluations if these capabilities are not supported in LTE RRM. The 5G NR-based gNB RRM evaluates the measurement report provided by the 5G NR UE, and the 5G NR-based RRM returns decisions (e.g., HO, steer, split) based on its evaluation of the measurement reports, to the LTE eNB RRM.

A multi-mode capable LTE-5G NR Base Station (eNB) including a single RRM capable of controlling multiple radio technologies including LTE and 5G NR is also described. The eNB includes a processor and memory in electronic communication with the processor. Instructions stored in the memory are executable to send and receive an LTE RRC message to/from multi-mode capable UE. The instructions are also executable to determine which Data Radio Bearers (DRBs) to offload, add, release and/or modify to a particular 5G NR system. The instructions are further executable to establish a radio resource connection with the 5G NR system. The instructions are additionally executable to steer, establish, release and/or modify a particular DRB or DRBs in the 5G NR system. The instructions are also executable to receive acknowledgement of the LTE RRC message. The instructions are further executable to receive and update the system with a status of connections to 5G NR system.

A multi-mode capable LTE-5G NR UE including two independent Radio Resource Management (RRMs) is described. One RRM is an LTE RRM and a second RRM is a 5G NR RRM. The UE includes a processor and memory in electronic communication with the processor. Instructions stored in the memory are executable to send and receive 5G NR RRC message to/from a 5G NR RRM at a base station. The instructions are also executable to acknowledge reception of the 5G NR RRC messages. The instructions are further executable to perform traffic hand over (HO), offloading, steering, establishment, modifying and/or release to and from an LTE eNB based on a 5G NR RRC command. The instructions are additionally executable to update the 5G NR RRM at the base station with a radio status at 5G NR. 5G RRM control signaling is encapsulated in an LTE RRC message for transportation over an LTE air interface.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to send and receive 5G NR RRC messages to/from a 5G NR RRM at a base station. The instructions are also executable to acknowledge reception of the 5G NR RRC message. The instructions are further executable to perform traffic HO, offloading, steering, establishment, modifying and/or release to and from an LTE eNB based on a 5G NR RRC command. The instructions are additionally executable to update the 5G NR RRM at the base station with a radio status at 5G NR.

5G RRM control signaling is sent using 5G NR RRC message for transportation over a dedicated 5G NR-SRB over an LTE air interface.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to send and receive 5G NR RRC messages to/from a 5G NR RRM at a base station. The instructions are also executable to acknowledge reception of the 5G NR NR RRC messages. The instructions are also executable to perform traffic HO, offloading, steering, establishment, modifying and/or release to and from a wireless local area network (WLAN) based on a 5G NR RRC command. The instructions are also executable to update the 5G NR RRM at the base station with a radio status at 5G NR. 5G RRM control signaling is encapsulated in an LTE RRC message for transportation over an LTE air interface.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to send and receive 5G NR RRC messages to/from a 5G NR RRM at a base station. The instructions are also executable to acknowledge reception of the 5G NR RRC message. The instructions are further executable to perform traffic HO, offloading, steering, establishment, modifying and/or release to and from a WLAN based on a 5G NR RRC command. The instructions are additionally executable to update the 5G NR RRM at the base station with a radio status at 5G NR. 5G RRM control signaling is sent using a 5G NR RRC message for transportation over a dedicated 5G NR-SRB over an LTE air interface.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to send and receive 5G NR RRC messages to/from a 5G NR RRM at a base station. The instructions are also executable to acknowledge reception of the 5G NR RRC message. The instructions are further executable to perform traffic HO, offloading, steering, establishment, modifying and/or release to and from a WLAN based on a 5G NR RRC command. The instructions are additionally executable to update the 5G NR RRM at the base station with a radio status at 5G NR. The 5G RRM control signaling is sent using a 5G NR RRC message for transportation over dedicated 5G NR-SRB over an NR air interface.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to send and receive 5G NR RRC messages to/from a 5G NR RRM at a base station. The instructions are also executable to acknowledge reception of the 5G NR RRC messages. The instructions are further executable to establish a direct user plane data connection with a dual mode eNB. The instructions are additionally executable to update the 5G NR RRM at the base station with a radio status at 5G NR.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to send and receive 5G NR RRC messages to/from a 5G NR RRM at a base station. The instructions are also executable to acknowledge reception of the 5G NR RRC messages. The instructions are further executable to establish direct or indirect user plane connection between a WLAN and dual mode eNB. The instructions are additionally executable to perform traffic offloading to and from an LTE eNB based on a 5G NR RRC command. The instructions are also executable to update the 5G NR RRM at the base station with a radio status at the 5G NR.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to send and receive 5G NR RRC messages to/from a 5G NR RRM at a base station. The instructions are also executable to acknowledge reception of the 5G NR RRC messages. The instructions are further executable to perform releasing of resources based on a 5G NR RRC command. The instructions are additionally executable to update the 5G NR RRM at the base station with a radio status at 5G NR.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to send and receive 5G NR RRC messages to/from a 5G NR RRM at a base station (BS). The instructions are also executable to acknowledge reception of the 5G NR RRC messages. The instructions are further executable to provide the BS with UE 5G NR capabilities and/or radio measurements.

A multi-mode capable LTE-5G NR eNB including a single RRM capable of controlling multiple radio technologies including LTE and 5G NR is described. The eNB includes a processor and memory in electronic communication with the processor. Instructions stored in the memory are executable to send and receive LTE RRC messages to/from a UE. The instructions are also executable to determine a radio configuration associated with a 5G NR channel include one or more of random access technique, operational Transmission Time Interval (TTI) size, multiplexing technology, power control, multiple access technology, and/or operational bandwidth. The instructions are further executable to encapsulate the radio configuration information in an appropriate LTE RRC message and send it to the 5G NR UE.

A multi-mode capable LTE-5G NR eNB including a single RRM capable of controlling multiple radio technologies including LTE and 5G NR is described. The eNB includes a processor and memory in electronic communication with the processor. Instructions stored in the memory are executable to send and receive LTE RRC messages to/from a UE. The instructions are also executable to determine a radio configuration associated with a 5G NR channel including one or more of random access technique, operational TTI size, multiplexing technology, power control, multiple access technology and/or operational bandwidth. The instructions are further executable to forward the radio configuration information in an appropriate 5G NR RRC message and send it via a dedicated NR-SRB to the 5G NR UE over an LTE air interface.

A multi-mode capable LTE-5G NR eNB including a single RRM capable of controlling multiple radio technologies including LTE and 5G NR is described. The eNB includes a processor and memory in electronic communication with the processor. Instructions stored in the memory are executable to send and receive LTE RRC messages to/from a UE. The instructions are also executable to determine a radio configuration associated with a 5G NR channel including one or more of random access technique, operational Transmission Time Interval (TTI) size, multiplexing technology, power control, multiple access technology and/or operational bandwidth. The instructions are further executable to forward the radio configuration information in an appropriate 5G NR RRC message and send it via a dedicated NR-SRB to the 5G NR UE over a 5G NR air interface.

A multi-mode capable LTE-5G NR eNB including two independent RRMs is described. One RRM is an LTE RRM and a second RRM is a 5G NR RRM. The eNB includes a processor and memory in electronic communication with the processor. Instructions stored in the memory are executable to send and receive an LTE RRC message to/from an LTE multimode UE. The instructions are also executable to send and receive a 5G NR RRC message to/from a 5G NR multimode UE. The instructions are further executable to encapsulate a 5G NR RRC message into LTE RRC messages and forward them to the UE over the air. The instructions are additionally executable to decapsulate 5G NR RRC messages received from the UE on an uplink and forward them to the 5G NR RRM for processing.

A multi-mode capable LTE-5G NR eNB including two independent RRMs is described. One RRM is an LTE RRM and a second RRM is a 5G NR RRM. The eNB includes a processor and memory in electronic communication with the processor. Instructions stored in the memory are executable to send and receive an LTE RRC message to/from an LTE multimode UE. The instructions are also executable to send and receive a 5G NR RRC message to/from a 5G NR multimode UE. The instructions are further executable to forward via a dedicated NR-SRB a 5G NR RRC message over the air. The instructions are additionally executable to forward 5G NR RRC messages received from the UE on a dedicated NR-SRB to the 5G NR RRM for processing.

A multi-mode capable LTE-5G NR eNB including two independent RRMs is described. One RRM is an LTE RRM and a second RRM is a 5G NR RRM. The eNB includes a processor and memory in electronic communication with the processor. The LTE RRM triggers 5G NR to perform traffic steering, HO, addition, modification and/or release of traffic DRBs from/to an LTE eNB.

A multi-mode capable LTE-5G NR eNB including two independent RRMs is described. One RRM is an LTE RRM and a second RRM is a 5G NR RRM. The eNB includes a processor and memory in electronic communication with the processor. The 5G NR RRM triggers LTE to perform traffic steering, HO, addition, modification and/or release of traffic DRBs from/to a 5G NR gNB.

A multi-mode capable LTE-5G NR eNB including two independent RRMs is described. One RRM is an LTE RRM and a second RRM is a 5G NR RRM. The eNB includes a processor and memory in electronic communication with the processor. The LTE RRM triggers 5G NR to request a multi-mode 5G NR capable UE to report its capabilities and/or measurements of surrounding 5G NR gNBs and other radio access technologies (RATs).

A multi-mode capable LTE-5G NR eNB including two independent RRMs is described. One RRM is an LTE RRM and a second RRM is a 5G NR RRM. The eNB includes a processor and memory in electronic communication with the processor. The LTE RRM triggers an LTE UE which is capable of supporting 5G NR to perform traffic steering, HO, addition, modification and/or release of traffic DRBs from/to an LTE eNB.

A multi-mode capable LTE-5G NR eNB including two independent RRMs is described. One RRM is an LTE RRM and a second RRM is a 5G NR RRM. The eNB includes a processor and memory in electronic communication with the processor. The LTE RRM triggers a 5G NR UE directly or indirectly via tunneling to request a multi-mode 5G NR capable UE to report its capabilities and/or measurements of surrounding 5G NR gNBs and other RATs.

A multi-mode capable LTE-5G NR eNB including two independent RRMs is described. One RRM is an LTE RRM and a second RRM is a 5G NR RRM. The eNB includes a processor and memory in electronic communication with the processor. 5G NR RRM triggers HO, steer, offload, add, release and/or modify DRBs between different NR gNBs using direct S1-U bearers to a Serving-Gateway (S-GW). The instructions are also executable to establish a new S1-U bearer with the SGW and a target 5G NR gNB and instruct a 5G NR UE to switch DRB(s) from a source 5G NR gNB and/or source LTE eNB directly by direct RRC messaging with the 5G NR UE or indirectly by a tunneling RRC message through LTE signaling.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to receive 5G NR RRM RRC messages to trigger HO, steer, offload, add, release and/or modify DRBs between two or more NR gNBs directly by direct RRC messaging with the 5G NR gNB or indirectly by a tunneling RRC message through LTE signaling. The instructions are also executable to execute the command and send an acknowledgement back.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to receive 5G NR RRM RRC messages to trigger HO, steer, offload, add, release and/or modify DRBs between two or more NR gNBs and one or more wireless local area networks (WLANs) directly by direct RRC messaging with the 5G NR gNB or indirectly by a tunneling RRC message through LTE signaling. The instructions are also executable to execute the command and send an acknowledgement back.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to receive 5G NR RRM RRC messages directly over a dedicated 5G NR SRB to trigger HO, steer, offload, add, release and/or modify DRBs between two or more NR gNBs and one or more WLANs directly by direct RRC messaging with the 5G NR gNB or indirectly by a tunneling RRC message through LTE signaling. The instructions are also executable to execute the command and send an acknowledgement back.

A multi-mode capable LTE-5G NR UE including two or more independent RRMs, one being an LTE RRM and a plurality of 5G NR RRMs each corresponding to 5G NR multi-connectivity is described. The UE includes a processor and memory in electronic communication with the processor. Instructions stored in the memory are executable to receive 5G NR RRM RRC encapsulated messages, addressed to one or more 5G NR or a WLAN RRMs, each container with a unique ID representing a target RRM. The instructions are also executable to identify the target RRM (e.g., WLAN or 5G NR) according to a unique identifier in an encapsulated container header. The instructions are also executable to forward the 5G NR RRC message to an appropriate target RRM. The instructions are further executable to receive 5G NR RRM RRC messages to trigger HO, steer, offload, add, release and/or modify DRBs between two or more NR gNBs and one or more WLANs directly by direct RRC messaging with the 5G NR gNB or indirectly by tunneling RRC message through LTE signaling. The instructions are additionally executable to execute the command and send an acknowledgement back.

A multi-mode capable LTE-5G NR UE including two independent RRMs is described. One RRM is an LTE RRM and a second RRM is a 5G NR RRM. The UE includes a processor and memory in electronic communication with the processor. Instructions stored in the memory are executable to receive 5G NR RRM RRC messages to trigger HO, steer, offload, add, release and/or modify DRBs between LTE eNB, one or more NR gNBs, and one or more WLANs directly by 5G NR RRC messaging with the 5G NR gNB or indirectly by a tunneling RRC message through LTE signaling. The radio access belongs to a same or different SGWs. The instructions are also executable to establish a direct user bearers interface for the target 5G NR gNBs and/or WLAN with the SGW. The instructions are further executable to execute an HO, steer, add, modify and/or release command(s) and send an acknowledgement back.

A multi-mode capable LTE-5G NR UE for receiving LTE RRC messages is described. The UE includes a processor and memory in electronic communication with the processor. Instructions stored in the memory are executable to receive an LTE RRC message from an eNB including one or more of: a list of available 5G NR bands, a list of available 5G NR Carrier Aggregation Configurations, and/or a list of available Unlicensed Bands. The instructions are also executable to determine the operational configuration. The instructions are further executable to establish an RRC with the 5G NR system and/or wireless local area network (WLAN). The instructions are further executable to steer a particular DRB or DRBs to the 5G NR system and/or WLAN. The instructions are additionally executable to acknowledge receiving the LTE RRC message using an LTE RRC message. The instructions are also executable to update the LTE and 5G NR systems with the status of connections to the 5G NR system.

A multi-mode capable LTE-5G NR UE for receiving LTE RRC messages is described. The UE includes a processor and memory in electronic communication with the processor. Instructions stored in the memory are executable to receive an LTE System Information Message (SIB) message from an eNB including one or more of: a list of available 5G NR bands, a list of available 5G NR Carrier Aggregation Configurations, and/or a list of available Unlicensed Bands. The instructions are also executable to determine the operational configuration. The instructions are further executable to establish an RRC with the 5G NR system and or WLAN. The instructions are additionally executable to acknowledge receiving the LTE RRC message using an LTE RRC message. The instructions are also executable to update the LTE and 5G NR systems with the status of connections to the 5G NR system.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

It should be noted that the term "concurrent" and variations thereof as used herein may denote that two or more events may overlap each other in time and/or may occur near in time to each other, all within a given time interval. Additionally, "concurrent" and variations thereof may or may not mean that two or more events occur at precisely the same time.

Currently, 3GPP is developing the Next Generation wireless technology known as 5G, which includes the introduction of New Radio (NR) (also referred to as new radio access technology). Several architectures and possible deployment scenarios are proposed and agreed on how the NR will be integrated into existing Long Term Evolution (LTE) system.

Tight interworking is one of these scenarios where the NR will be integrated with LTE base station enabling the aggregations of data flows between the two systems via what is known as Dual Connectivity. Furthermore, the Radio Resource Management (RRM) for 5G NR system may be separate from that of LTE RRM. In 5G, LTE RRM in both the network (e.g., eNB) and the device (i.e., UE) may be independent. For example, NR RRM commands may not be understood by the LTE devices.

One issue here is that the control signaling for a NR base station (also referred to as gNB) may be carried out over an LTE eNB in the initial deployment phases. This would require that LTE control signaling (SRBs) messages be used to carry (e.g., encapsulate using separate NR-SRB or LTE-SRB) NR commands and deliver them to an NR UE/NR gNB for execution. Furthermore, the LTE commands have to be adjusted such that they carry new Information Elements (IE) and commands to be able to steer/aggregates certain data traffic flows (DRBs) toward NR system/devices.

For example, the 5G NR UE compiles its measurement report of 5G NR cells and forwards these measurements to LTE UE for transmission (after encapsulation in LTE Radio Resource Control (RRC) signaling) to an LTE eNB for processing (e.g., determination of target 5G NR cells). The LTE eNB may forward the encapsulated 5G NR measurement report to gNB RRM/scheduler for evaluations if these capabilities are not supported in LTE RRM. 5G NR based gNB (RRM) would return decisions based its evaluation of the measurement reports, to LTE eNB RRM in such case.

The systems and methods described herein define these IEs and commands for LTE systems and also define signaling flows to communicate between the two independent RRMs. Detailed definitions of the changes added to existing LTE messages are also outlined.

The systems and methods described herein provide mechanisms by which different wireless elements in LTE interworking with 5G NR are communicating to perform essential tasks. These mechanisms include network architecture and signaling flows of how the 5G NR interworks with existing LTE sub-systems. New signaling flows between 5G NR RRM and LTE RRM to steer DRBs between the two systems are described. New IEs to existing LTE messages to perform aggregation of flows, offloading flows between LTE and 5G NR, and aggregation/steering of flows between 5G NR and WLAN area also described.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for new radio (NR) operations may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more eNBs 160. The UE operations module 124 may include a UE new radio (NR) module 126.

Figure 2:
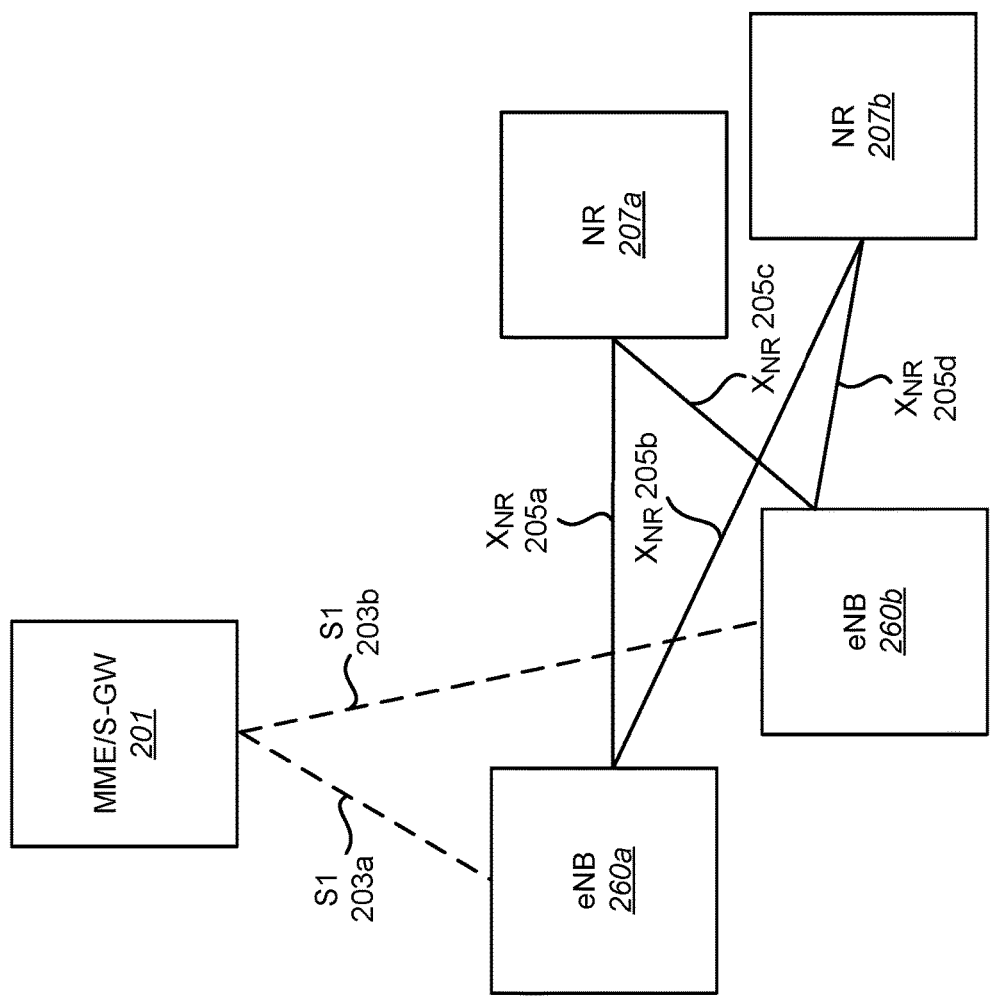
FIG. 2 is a block diagram illustrating non-collocated LTE-Next Generation Radio (NR) aggregation (LNRA) overall architecture.

E-UTRAN supports LTE-Next Generation Radio (NR) aggregation (LNRA) operation whereby a UE 102 in RRC-_CONNECTED is configured by the eNB 160 to utilize radio resources of LTE and NR. Two scenarios are supported depending on the backhaul connection between LTE and NR: (1) a non-collocated LNRA scenario for a non-ideal backhaul; and (2) a collocated LNRA scenario for an ideal/internal backhaul. The overall architecture for the non-collocated LNRA scenario is illustrated in FIG. 2 below where the NR terminates the $X_{NR}$ interface for NR.

Figure 3:
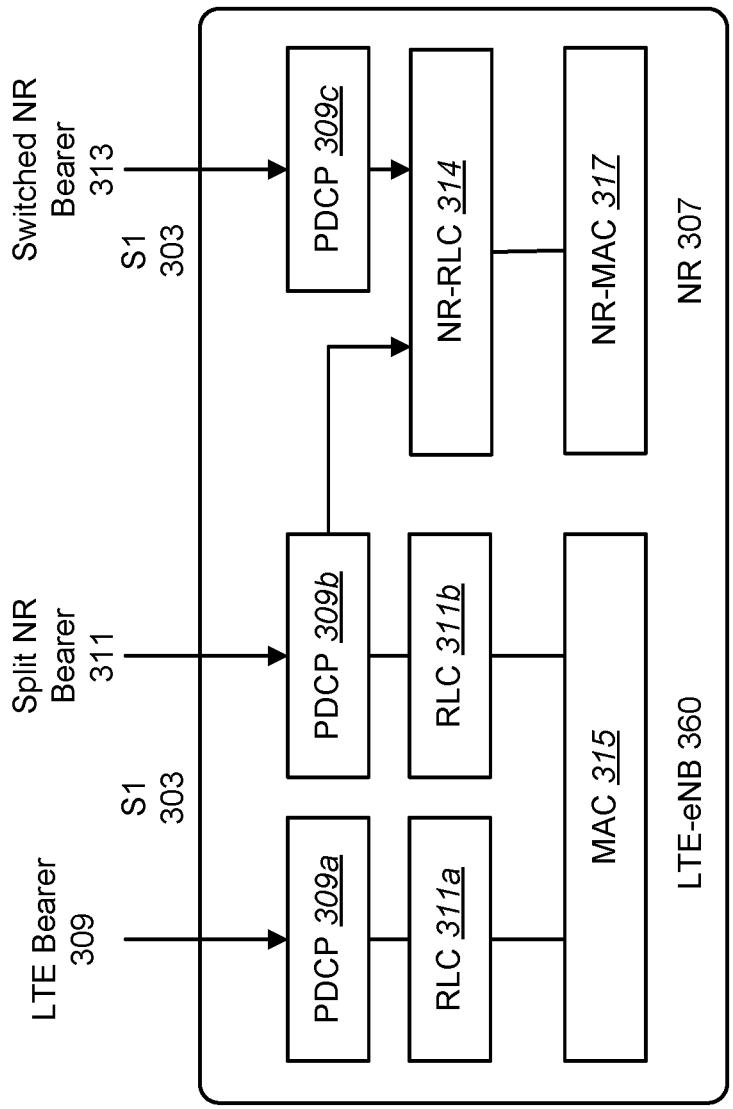
FIG. 3 is a block diagram illustrating LNRA radio protocol architecture for a collocated scenario.

Radio protocol architecture is described herein. In LNRA, the radio protocol architecture that a particular bearer uses depends on the NRA backhaul scenario and how the bearer is set up. Two bearer types exist for NRA: (1) split NRA bearer and (2) switched NRA bearer. Those two bearer types are depicted in FIG. 3 for the collocated scenario and in FIGS. 4-5 for the non-collocated scenario. FIG. 6 depicts an NRA tight interworking with WLAN for the non-collocated scenario.

Figure 7:
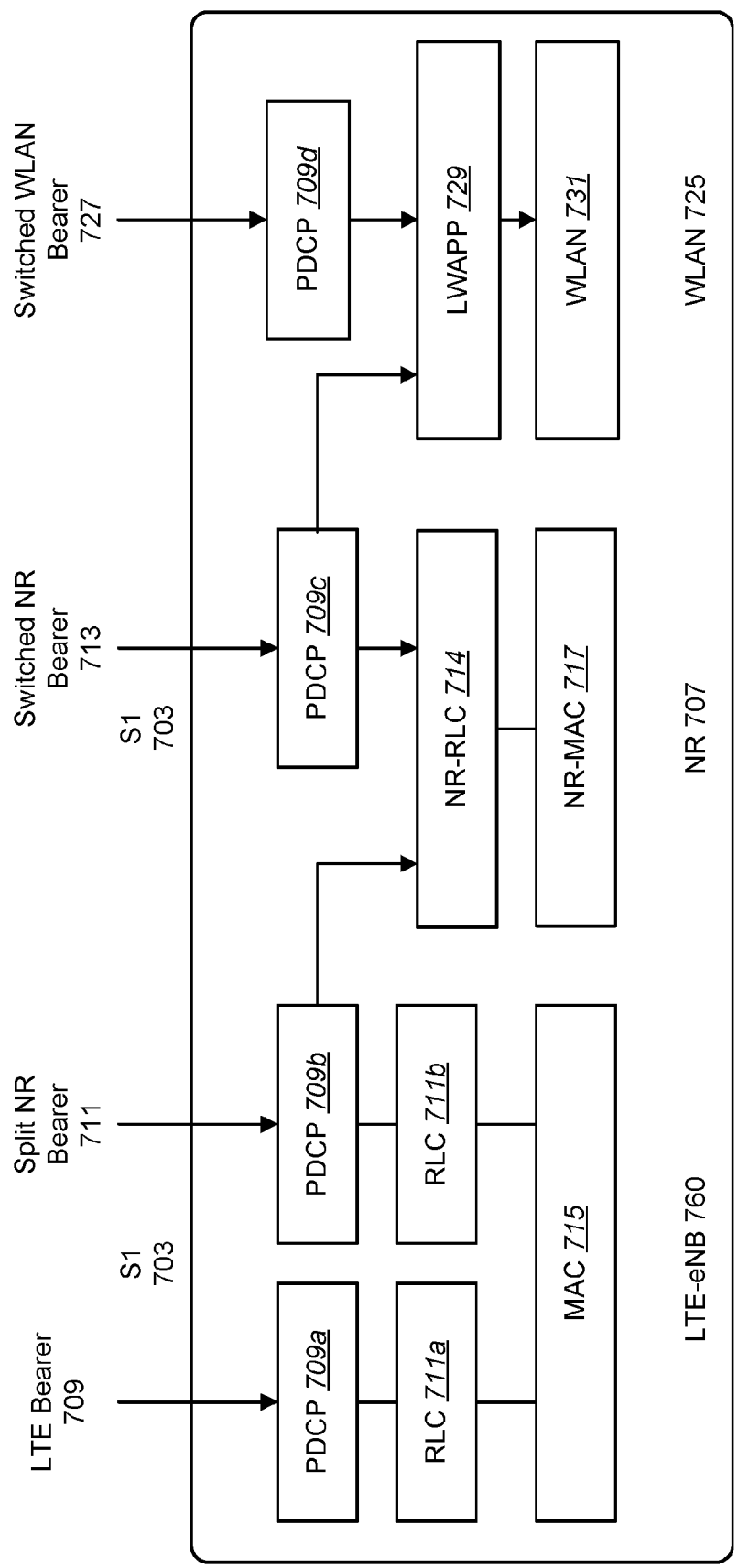
FIG. 7 is a block diagram illustrating LNRA radio protocol architecture for a collocated scenario.
Figure 8:
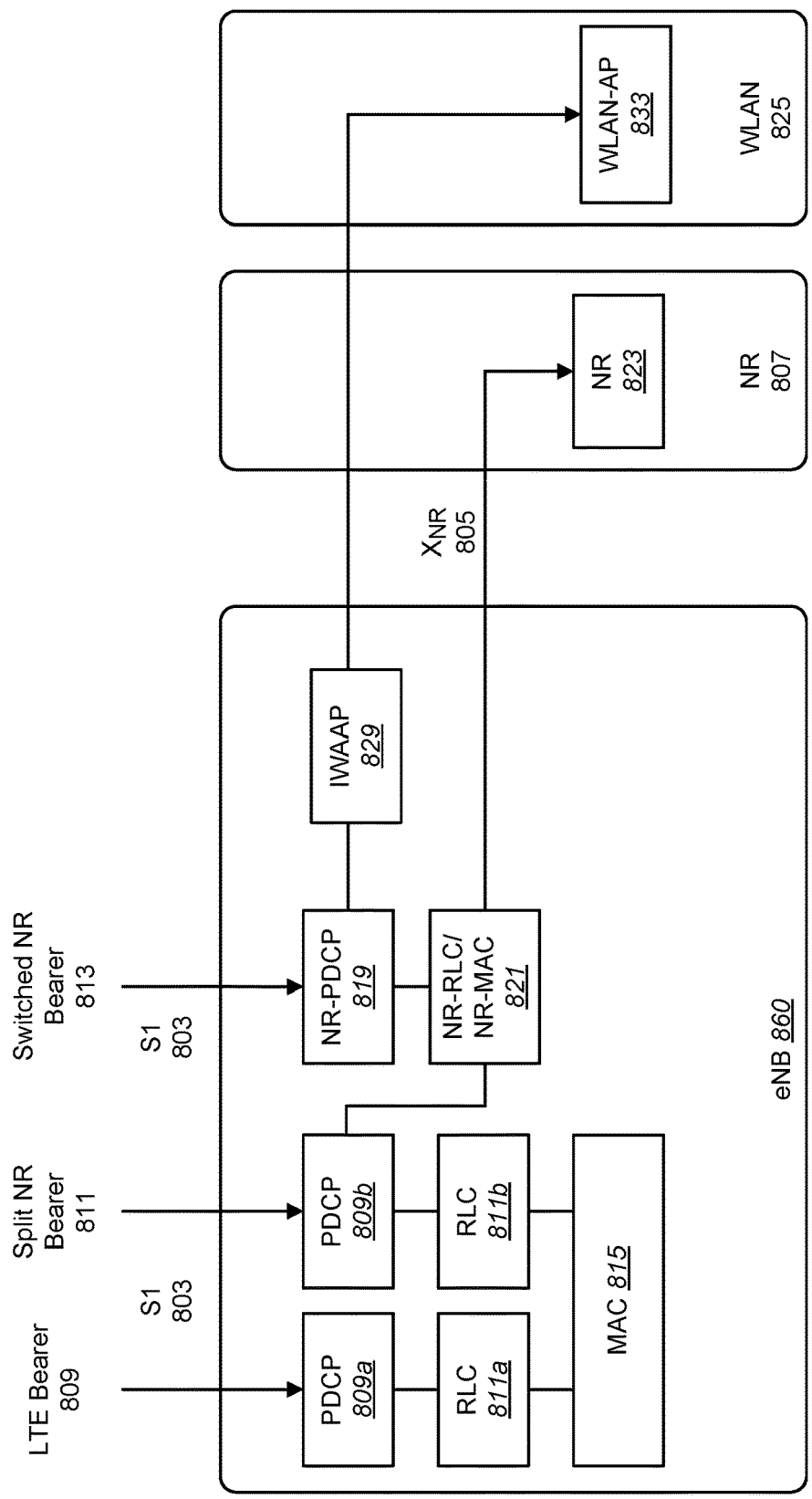
FIG. 8 is a block diagram illustrating NRA radio protocol architecture for a collocated or non-collocated split scenario.
Figure 9:
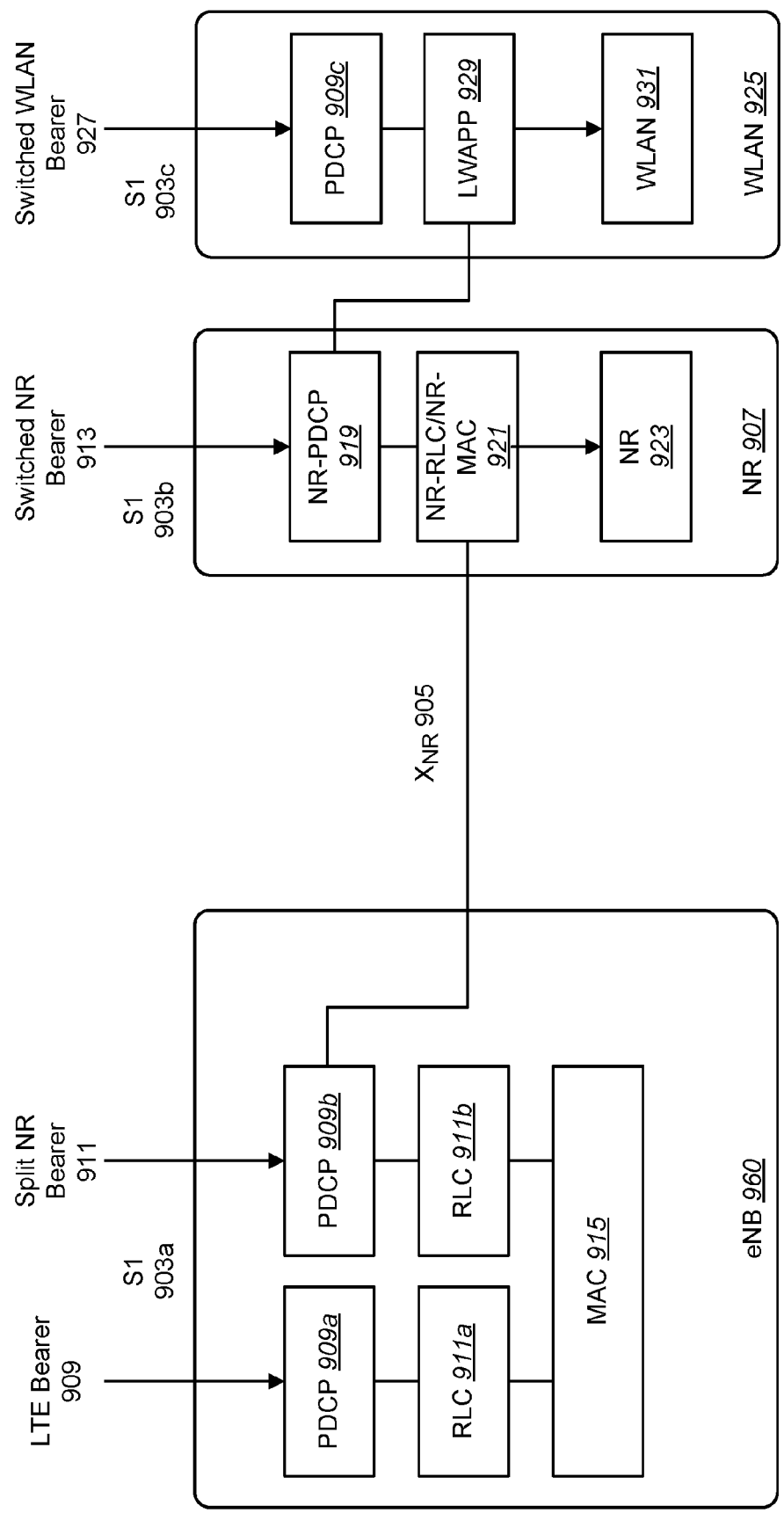
FIG. 9 is a block diagram illustrating NRA radio protocol architecture for a non-collocated scenario.

NR-WLAN radio protocol architecture is also described. FIG. 7 depicts LNRA radio protocol architecture for the collocated scenario. FIG. 8 depicts NRA radio protocol architecture for the collocated split scenario. FIG. 9 depicts NRA radio protocol architecture for the non-collocated scenario.

Figure 10:
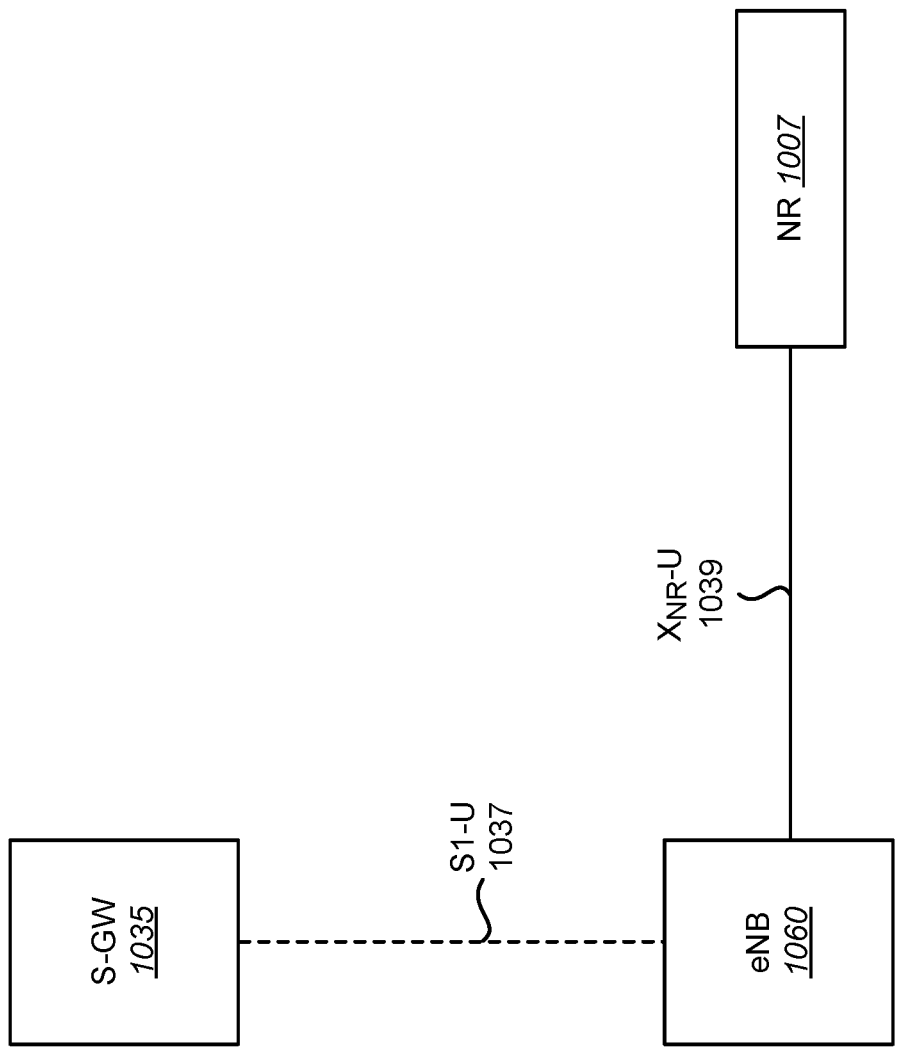
FIG. 10 is a block diagram illustrating user plane (U-Plane) connectivity of an eNB and an NR base station for NRA.
Figure 11:
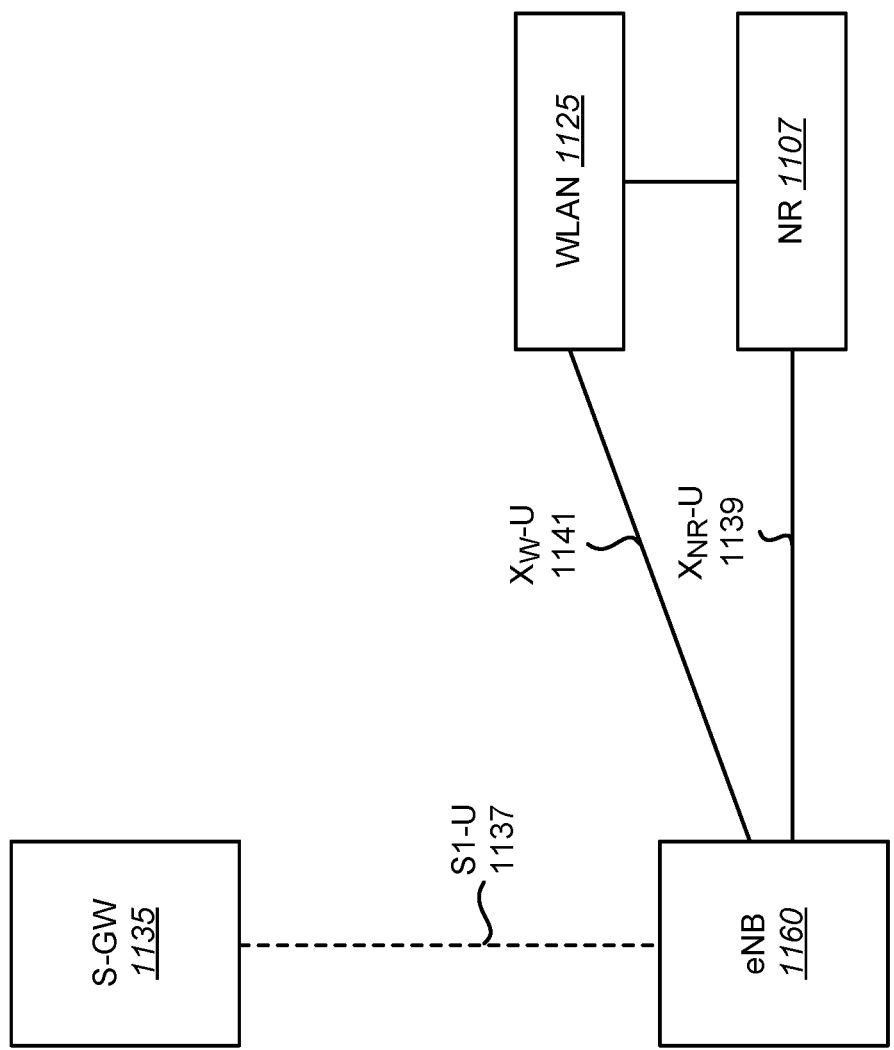
FIG. 11 is a block diagram illustrating U-Plane connectivity of an eNB, an NR base station and WLAN.
Figure 12:
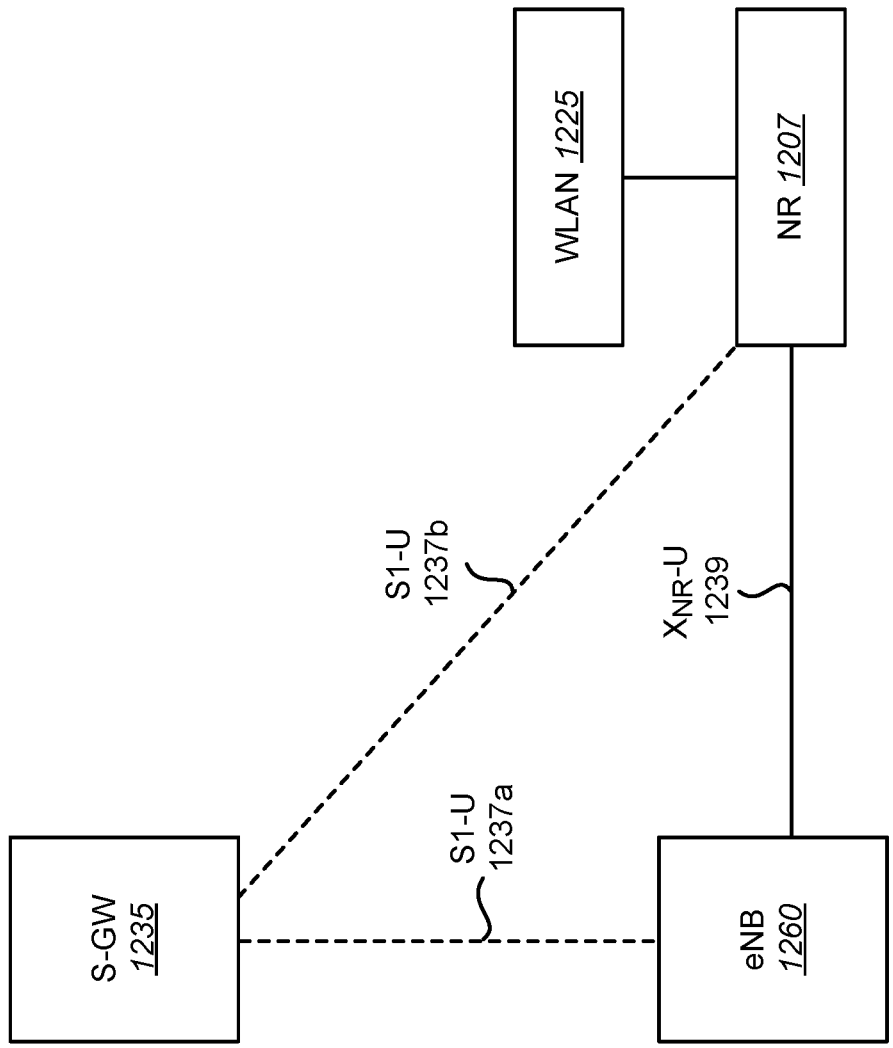
FIG. 12 is a block diagram illustrating one configuration of U-Plane direct connectivity of an eNB, an NR base station and WLAN.
Figure 13:
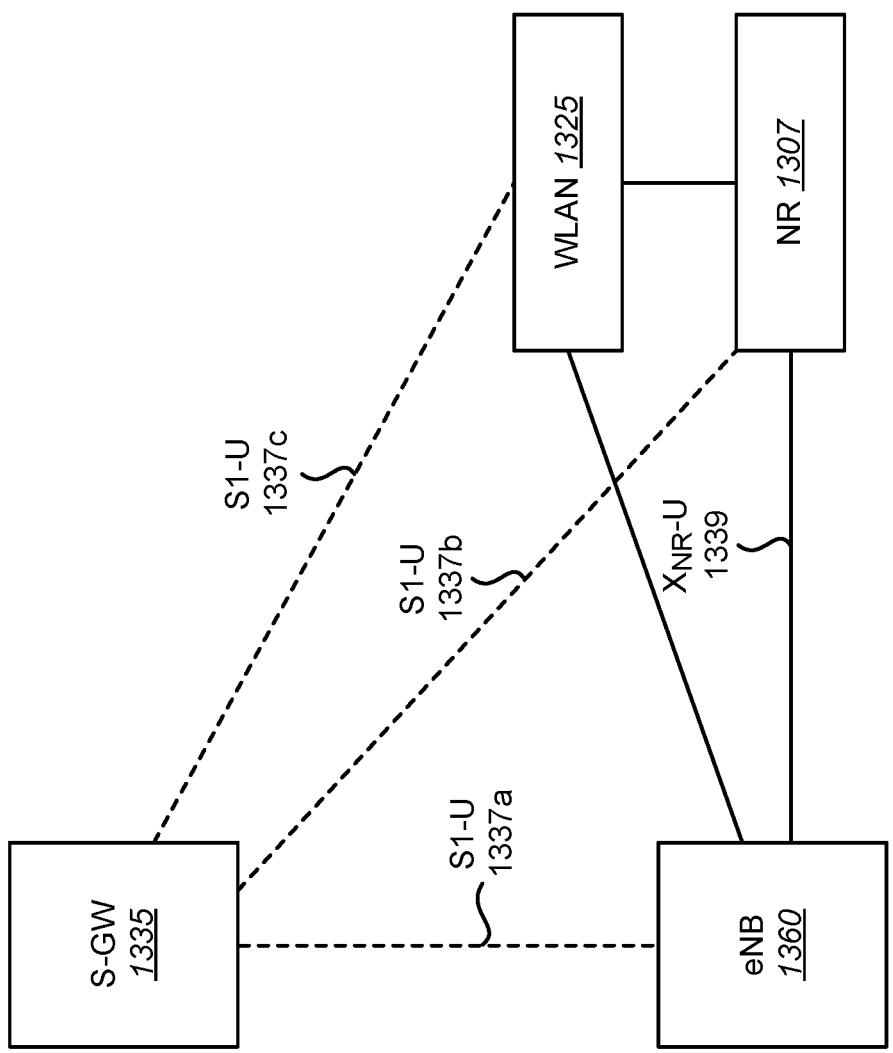
FIG. 13 is a block diagram illustrating another configuration of U-Plane direct connectivity of an eNB, an NR base station and WLAN.

An NR-LTE interworking scenario is also described. Regarding the user plane (U-Plane), FIG. 10 depicts U-Plane connectivity of the eNB 106 and NR for NRA. FIG. 11 depicts U-Plane connectivity of the eNB 160, NR, and WLAN. FIG. 12 depicts U-Plane Direct connectivity of eNB 160, NR, and WLAN. FIG. 13 depicts U-Plane direct connectivity of eNB 160, NR, and WLAN.

Figure 14:
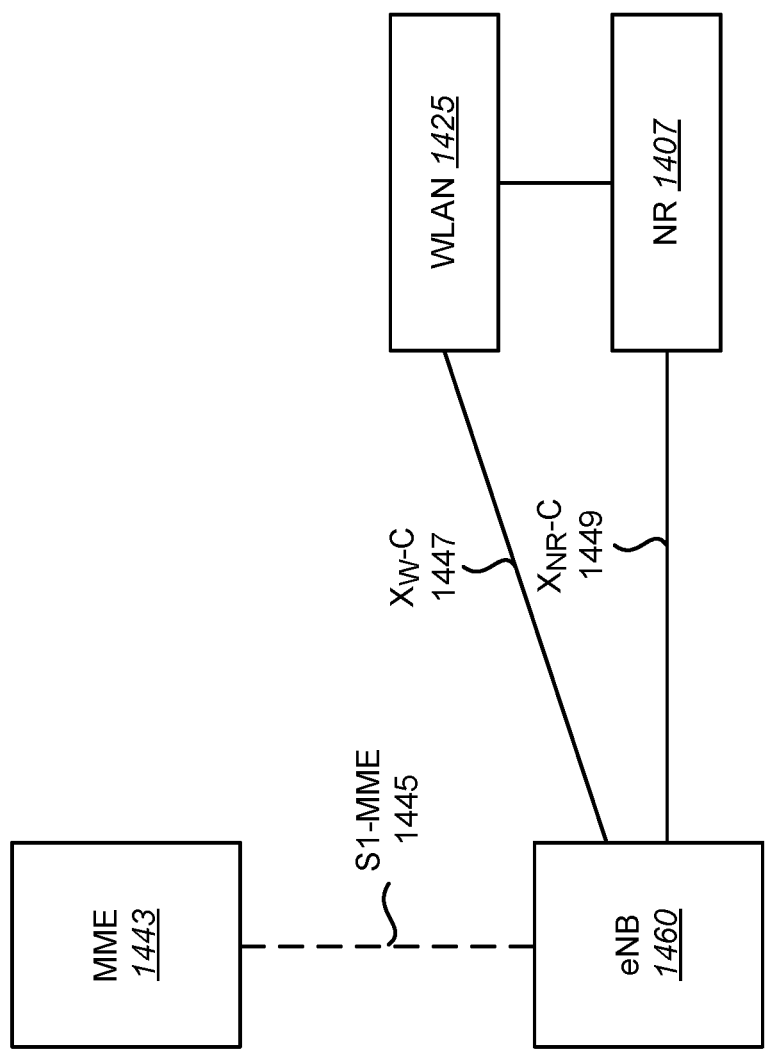
FIG. 14 is a block diagram illustrating control plane (C-Plane) connectivity of an eNB, an NR base station and WLAN for NRA.

Regarding the control plane (C-Plane) for an NR-LTE interworking scenario, FIG. 14 depicts C-Plane connectivity of eNB 160 and NR for NRA.

Figure 15:
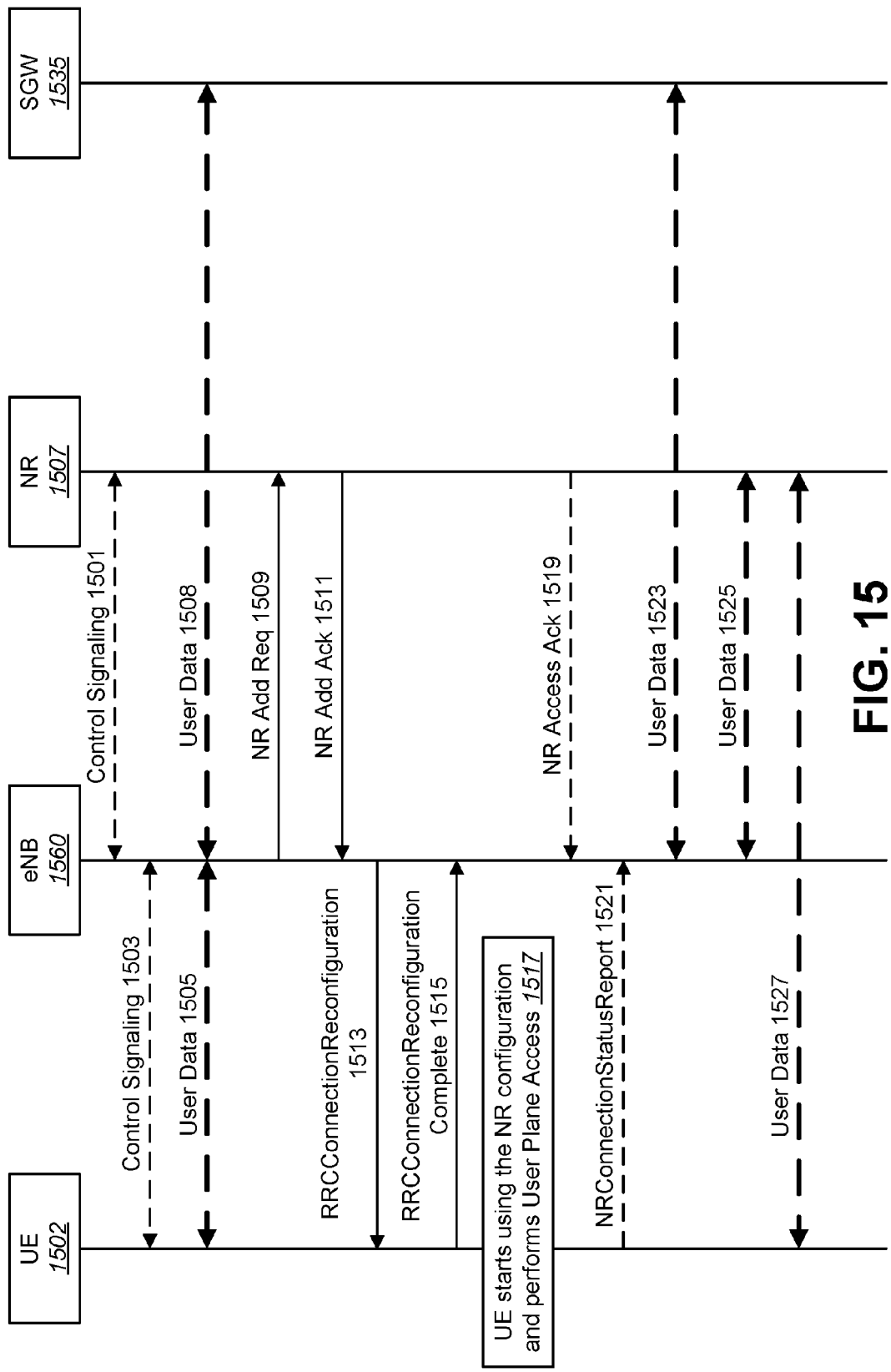
FIG. 15 is a sequence diagram illustrating an NR addition procedure.
Figure 16:
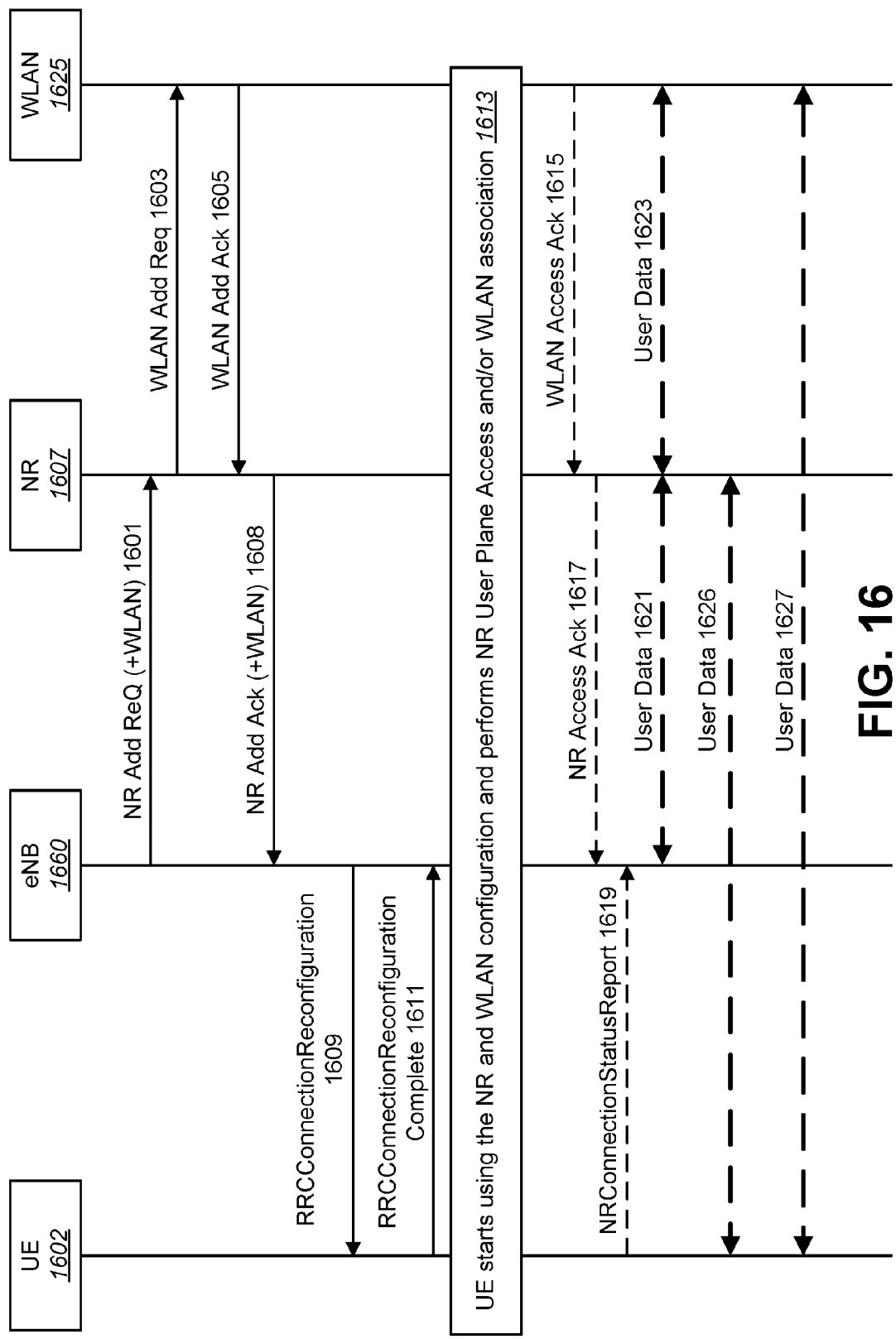
FIG. 16 is a sequence diagram illustrating an NR-WLAN addition procedure.
Figure 17:
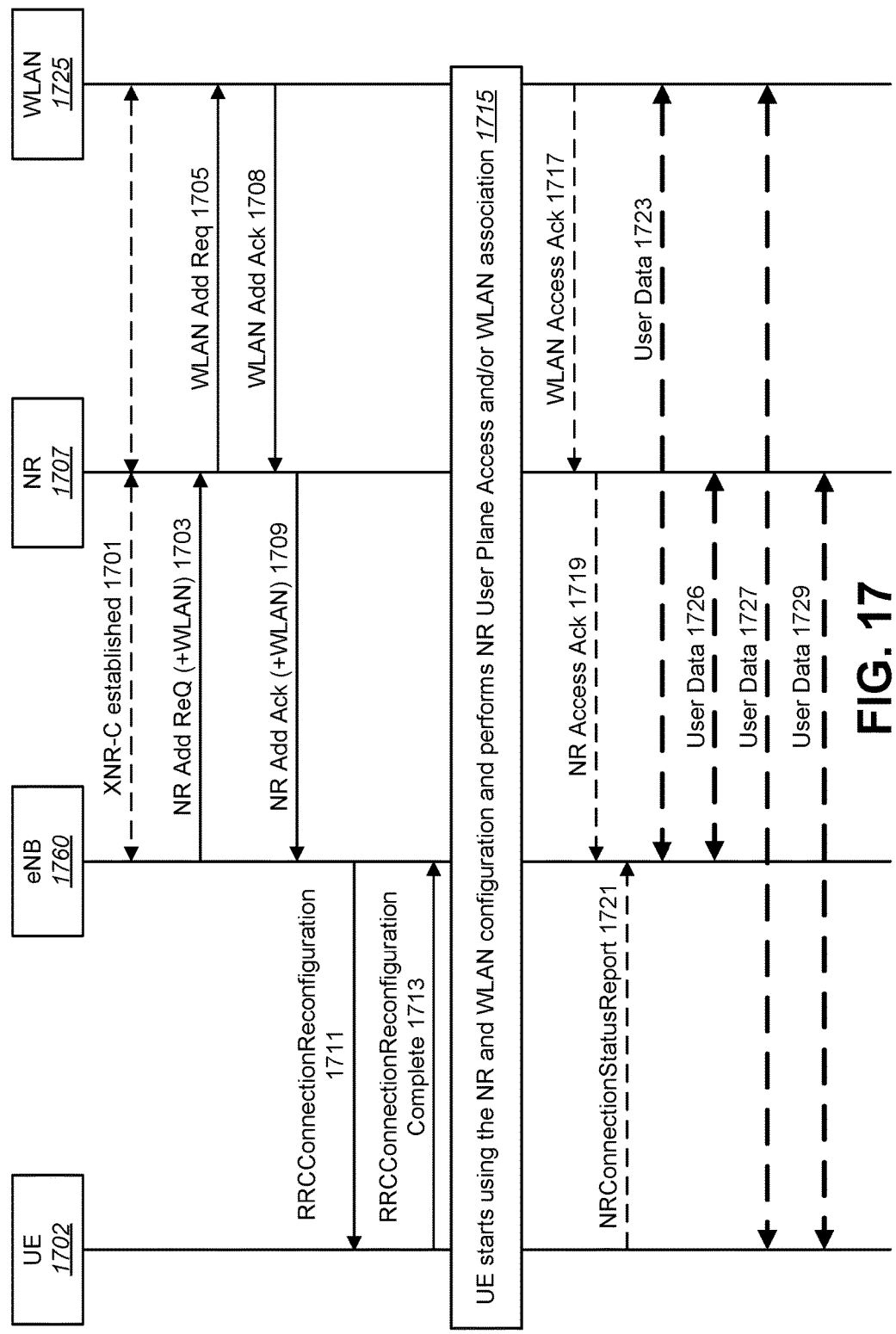
FIG. 17 is a sequence diagram illustrating another NR-WLAN addition procedure.
Figure 18:
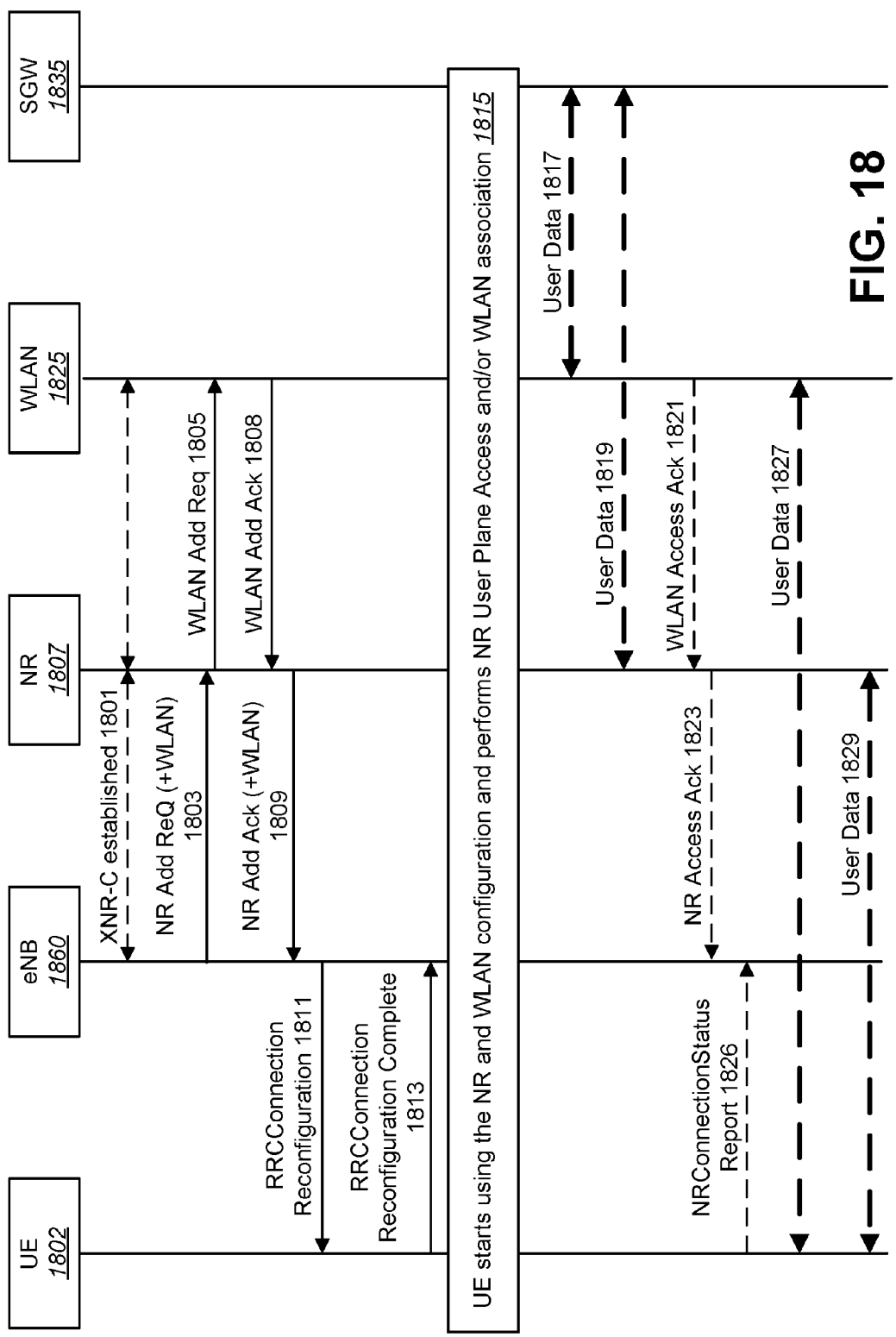
FIG. 18 is a sequence diagram illustrating another NR-WLAN addition procedure.
Figure 19:
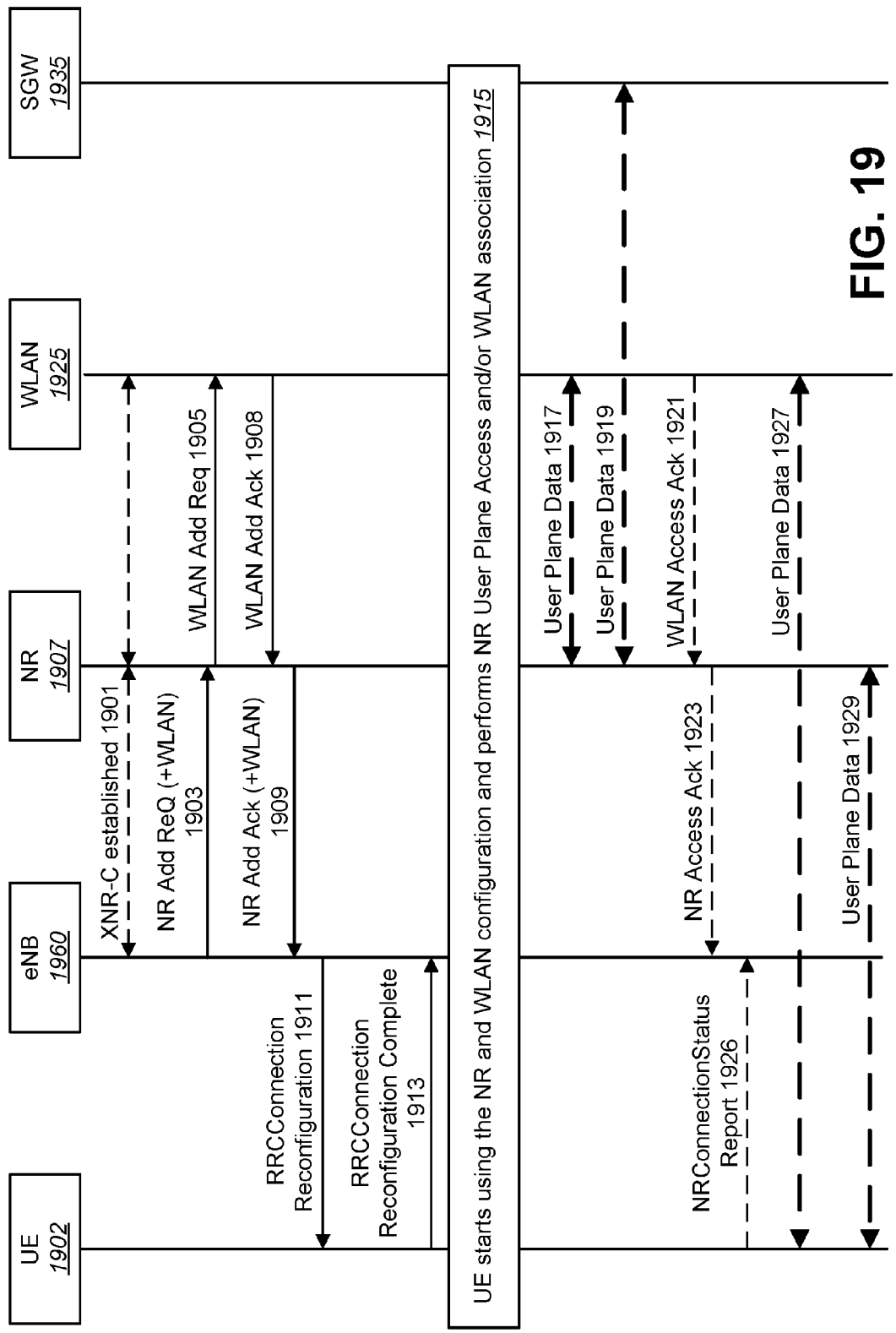
FIG. 19 is a sequence diagram illustrating another NR-WLAN addition procedure.

LTE-NR aggregation procedures are also described. An NR Addition (Single Integrated RRM, Independent RRMs) procedure may be initiated by the eNB 160 and is used to establish a UE 102 context at the NR in order to provide NR resources to the UE 102. FIG. 15 depicts an NR addition procedure (e.g., all traffic (control plane and user plane) via the eNB 160) for a single RRM located at the eNB 160. FIG. 16 depicts an NR-WLAN addition procedure (e.g., all traffic (control plane and user plane) via the eNB 160) for a single RRM located at the eNB 160. FIG. 17 depicts an NR-WLAN addition procedure (e.g., control plane via NR and eNB 160, direct WLAN user plane to eNB 160) for a single RRM located at the eNB 160. FIG. 18 depicts an NR-WLAN Addition procedure (e.g., control plane via NR and eNB 160, direct NR and WLAN user plane U to SGW) for a single RRM located at the eNB 160. FIG. 19 depicts an NR-WLAN addition procedure (e.g., control plane via NR and eNB 160, WLAN user plane via NR, direct NR user plane to SGW) for a single RRM located at the eNB 160.

An NR addition procedure (e.g., separate LTE and NR RRMs) is depicted in FIG. 20. FIG. 21 depicts an NR addition procedure (e.g., Direct Tunneling) for separate RRMs. The same procedures can be used to perform hand over (HO), modification and/or release of DRBs with the NR.

Figure 22:
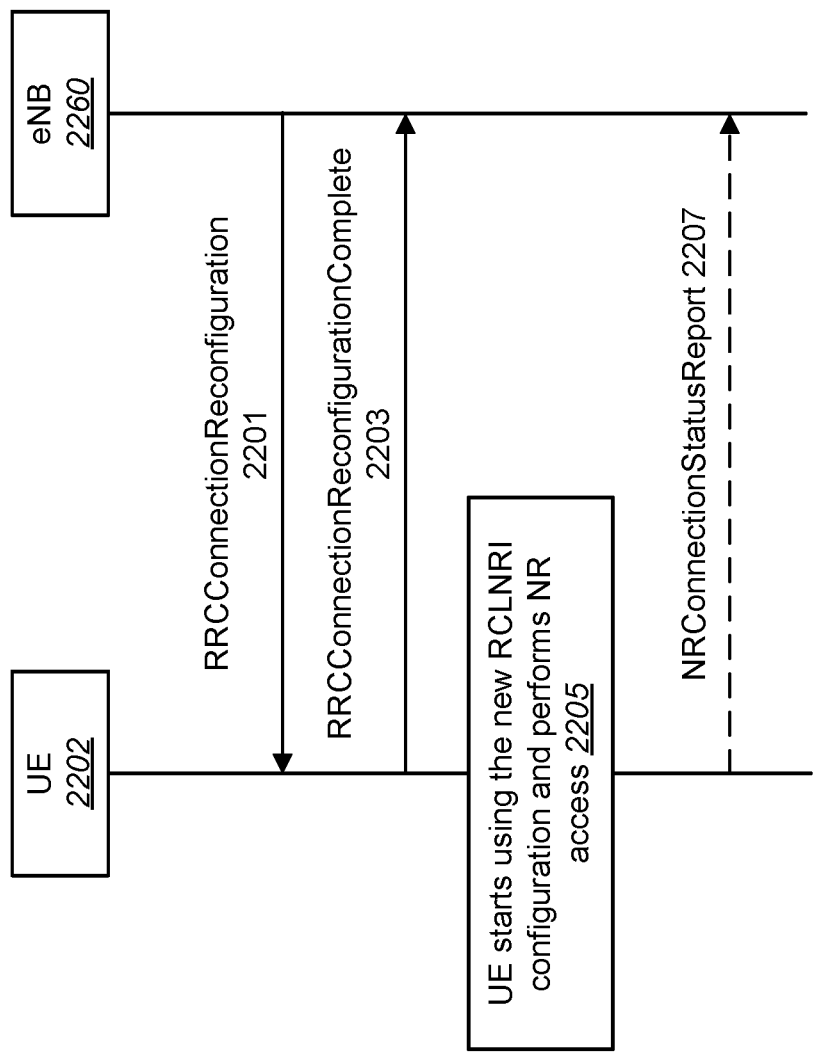
FIG. 22 is a sequence diagram illustrating a traffic steering from E-UTRAN to NR procedure.
Figure 23:
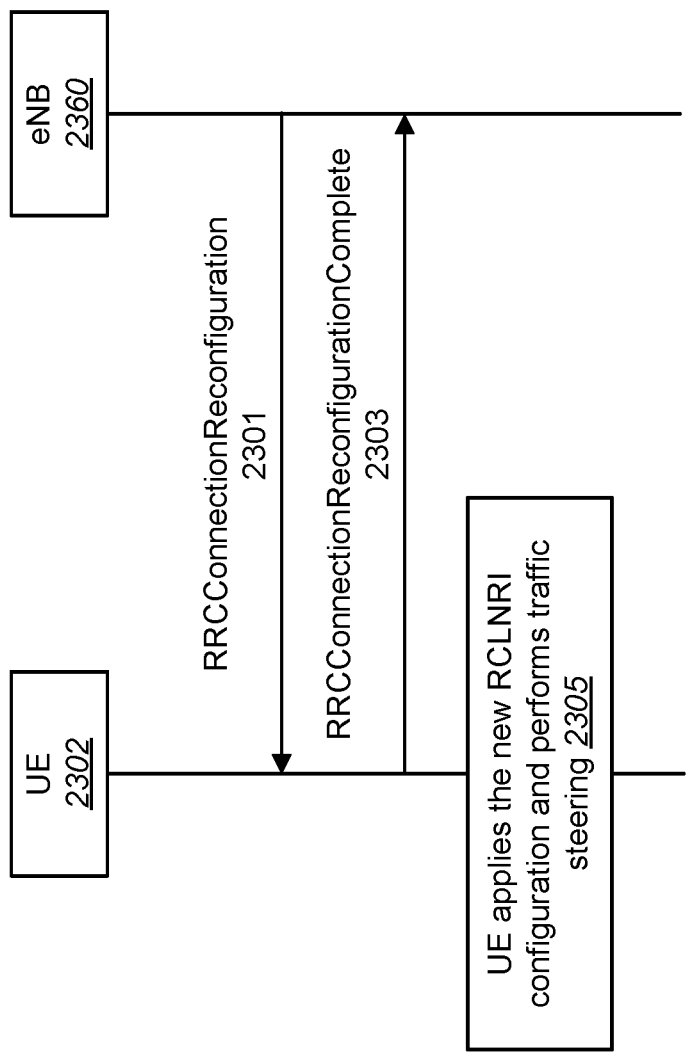
FIG. 23 is a sequence diagram illustrating a traffic steering from NR to E-UTRAN procedure.

Traffic steering procedures are also described. In particular, traffic steering from E-UTRAN to NR is described. The traffic steering from E-UTRAN to NR procedure may be initiated by the eNB 160. FIG. 22 depicts a traffic steering from E-UTRAN to NR procedure. FIG. 23 depicts a traffic steering from E-UTRAN to NR and WLAN procedure.

Figure 24:
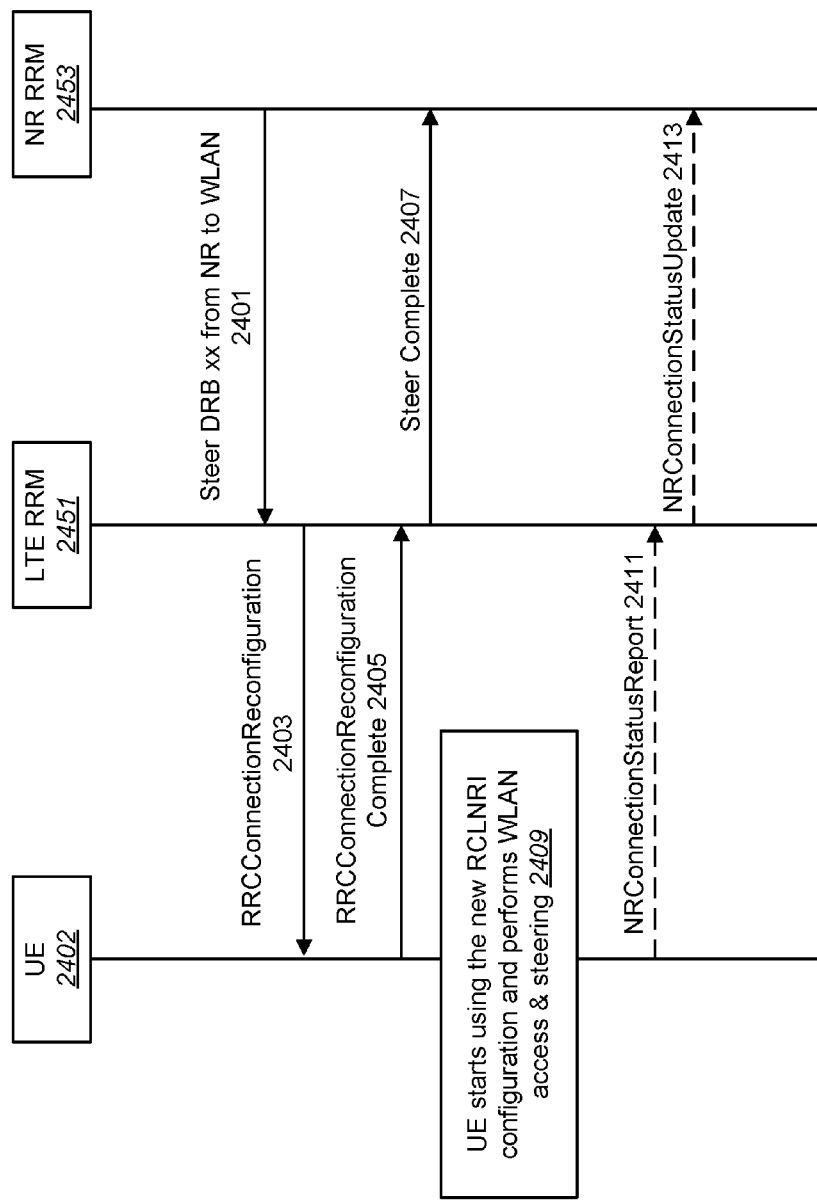
FIG. 24 is a sequence diagram illustrating a traffic steering from NR to WLAN procedure.
Figure 25:
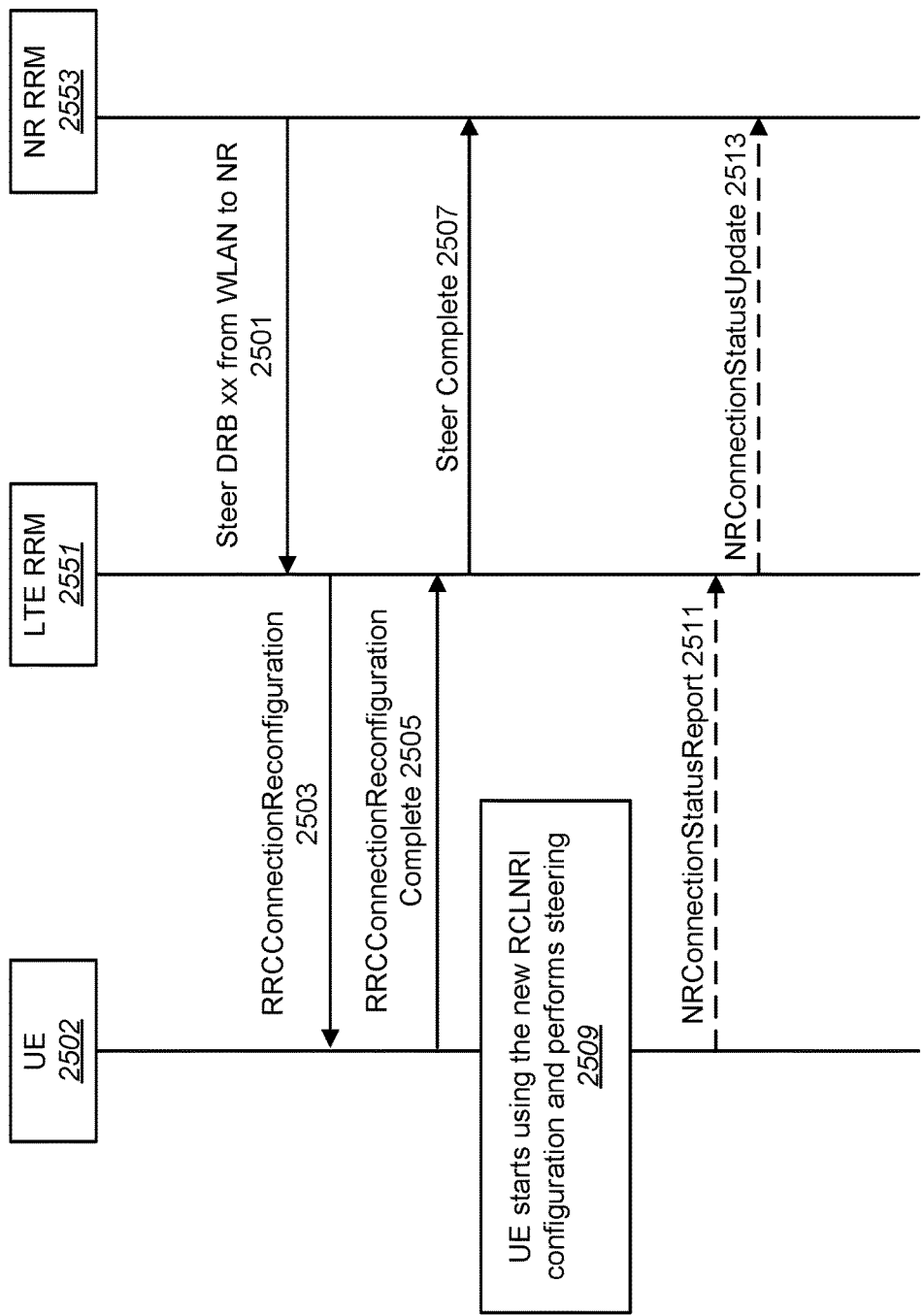
FIG. 25 is a sequence diagram illustrating a traffic steering from NR to WLAN procedure.

Traffic steering from NR to WLAN is also described. The traffic steering from WLAN to NR procedure may be initiated by the eNB 160. FIG. 24 depicts a traffic steering from NR to WLAN procedure. FIG. 25 depicts a traffic steering from WLAN to NR procedure.

NR connection management is also described. In particular, NR connection status reporting is described in connection with FIG. 26.

RRC messages for NRA are also described herein. Regarding the General message structure, EUTRA-RRC-Definitions are described. A UL-DCCH-Message class is the set of RRC messages that may be sent from the UE 102 to the E-UTRAN or from the NR to the E-UTRAN on the uplink dedicated control channel (DCCH) logical channel. An example of the UL-DCCH-Message is provided in Listing (1).

Listing (1)

```
-- ASN1START
UL-DCCH-Message ::= SEQUENCE {
    message         UL-DCCH-MessageType
}
UL-DCCH-MessageType ::= CHOICE {
    c1              CHOICE {
        csfbParametersRequestCDMA2000
        CSFBParametersRequestCDMA2000,
        measurementReport                 MeasurementReport,
        rrcConnectionReconfigurationComplete
        RRCConnectionReconfigurationComplete,
        rrcConnectionReestablishmentComplete
        RRCConnectionReestablishmentComplete,
        rrcConnectionSetupComplete
        RRCConnectionSetupComplete,
        securityModeComplete              SecurityModeComplete,
        securityModeFailure               SecurityModeFailure,
        ueCapabilityInformation
        UECapabilityInformation,
        ulHandoverPreparationTransfer
        ULHandoverPreparationTransfer,
        ulInformationTransfer
        ULInformationTransfer,
        counterCheckResponse              CounterCheckResponse,
        ueInformationResponse-r9
        UEInformationResponse-r9,
        proximityIndication-r9            ProximityIndication-r9,
        NRReconfigurationComplete-r10
        NRReconfigurationComplete-r10,
        mbmsCountingResponse-r10          MBMSCountingResponse-r10,
        interFreqRSTDMeasurementIndication-r10
        InterFreqRSTDMeasurementIndication-r10
    },
```

Listing (1)

```
messageClassExtension    CHOICE {
    c2    CHOICE {
        ueAssistanceInformation-
UEAssistanceInformation-,
        inDeviceCoexIndication-         InDeviceCoexIndication-,
        mbmsInterestIndication-         MBMSInterestIndication-,
        scgFailureInformation-          SCGFailureInformation-,
        sidelinkUEInformation-          SidelinkUEInformation-,
        NRConnectionStatusReport-       NRConnectionStatusReport-,
        rrcConnectionResumeComplete-
RRCConnectionResumeComplete-,
        spare9 NULL, spare8 NULL, spare7 NULL,
        spare6 NULL, spare5 NULL, spare4 NULL,
        spare3 NULL, spare2 NULL, spare1 NULL
    },
    messageClassExtensionFuture- SEQUENCE { }
    }
}
-- ASN1STOP
```

Message definitions may include a CounterCheck and InDeviceCoexIndication. The InDeviceCoexIndication message is used to inform E-UTRAN about IDC problems which cannot be solved by the UE itself, as well as to provide information that may assist E-UTRAN when resolving these problems. A signaling radio bearer may be NR-SRB, the RLC-SAP is AM; the logical channel is DCCH; the direction is UE to E-UTRAN. An example of the InDeviceCoexIndication message is provided in Listing (2).

Listing (2)

```
-- ASN1START
InDeviceCoexIndication- ::=        SEQUENCE {
    criticalExtensions             CHOICE {
        c1                         CHOICE {
            inDeviceCoexIndication-             InDeviceCoexIndication-
-IEs,
            spare3 NULL, spare2 NULL, spare1 NULL
        },
        criticalExtensionsFuture   SEQUENCE { }
    }
}
InDeviceCoexIndication--IEs ::= SEQUENCE {
    affectedCarrierFreqList-       AffectedCarrierFreqList-
    tdm-AssistanceInfo-            TDM-AssistanceInfo-
        OPTIONAL,
    lateNonCriticalExtension       OCTET STRING
        OPTIONAL,
    nonCriticalExtension           InDeviceCoexIndication-v11d0-
IEs        OPTIONAL
}
InDeviceCoexIndication-v11d0-IEs ::= SEQUENCE {
    ul-CA-AssistanceInfo-          SEQUENCE {
        affectedCarrierFreqCombList-       AffectedCarrierFreqCombList-
            OPTIONAL,
        victimSystemType-                  VictimSystemType-
    }    OPTIONAL,
    nonCriticalExtension           InDeviceCoexIndication-v1310-
IEs        OPTIONAL
}
InDeviceCoexIndication-v1310-IEs ::=  SEQUENCE {
    affectedCarrierFreqList-v1310 AffectedCarrierFreqList-v1310
        OPTIONAL,
    affectedCarrierFreqCombList-  AffectedCarrierFreqCombList-
        OPTIONAL,
    nonCriticalExtension           SEQUENCE { }         OPTIONAL
}
AffectedCarrierFreqList- ::= SEQUENCE (SIZE (1..maxFreqIDC-))
OF AffectedCarrierFreq-
AffectedCarrierFreqList-v1310 ::= SEQUENCE (SIZE
(1..maxFreqIDC-)) OF AffectedCarrierFreq-v1310
AffectedCarrierFreq- ::=           SEQUENCE {
    carrierFreq-                   MeasObjectId,
    interferenceDirection-         ENUMERATED {eutra, other, both,
spare}
}
AffectedCarrierFreq-v1310 ::=SEQUENCE {
    carrierFreq-v1310              MeasObjectId-v1310
        OPTIONAL
}
AffectedCarrierFreqCombList- ::=   SEQUENCE (SIZE
(1..maxCombIDC-)) OF AffectedCarrierFreqComb-
AffectedCarrierFreqCombList- ::= SEQUENCE (SIZE (1..maxCombIDC-
)) OF AffectedCarrierFreqComb-
AffectedCarrierFreqComb- ::= SEQUENCE (SIZE (2..maxServCell-
r10)) OF MeasObjectId
AffectedCarrierFreqComb- ::= SEQUENCE (SIZE (2..maxServCell-))
OF MeasObjectId-
TDM-AssistanceInfo- ::=CHOICE {
    drx-AssistanceInfo-            SEQUENCE {
        drx-CycleLength-           ENUMERATED {sf40, sf64,
sf80, sf128, sf160,
                                   sf256, spare2, spare1},
        drx-Offset-                INTEGER (0..255)
            OPTIONAL,
        drx-ActiveTime-            ENUMERATED {sf20, sf30,
sf40, sf60, sf80,
                                   sf100, spare2, spare1}
    },
    idc-SubframePatternList-       IDC-SubframePatternList-,
    . . .
}
IDC-SubframePatternList- ::= SEQUENCE (SIZE
(1..maxSubframePatternIDC-)) OF IDC-SubframePattern-
IDC-SubframePattern- ::= CHOICE {
    subframePatternFDD-            BIT STRING (SIZE (4)),
    subframePatternTDD-            CHOICE {
        subframeConfig0-           BIT STRING (SIZE (70)),
        subframeConfig1-5-         BIT STRING (SIZE (10)),
        subframeConfig6-           BIT STRING (SIZE (60))
    },
    . . .
}
VictimSystemType- ::= SEQUENCE {
    gps-           ENUMERATED {true}       OPTIONAL,
    glonass-       ENUMERATED {true}       OPTIONAL,
    bds-           ENUMERATED {true}       OPTIONAL,
    galileo-       ENUMERATED {true}       OPTIONAL,
    NR-            ENUMERATED {true}       OPTIONAL,
    bluetooth-     ENUMERATED {true}       OPTIONAL
}
-- ASN1STOP
```

TABLE 1

InDeviceCoexIndication field descriptions

AffectedCarrierFreq
If carrierFreq-v1310 is included, carrierFreq- is ignored by eNB.
affectedCarrierFreqCombList
Indicates a list of E-UTRA carrier frequencies that are affected by
IDC problems due to Inter-Modulation Distortion and harmonics
from E-UTRA when configured with UL carrier aggregation (CA).
affectedCarrierFreqCombList- is used when more than 5
serving cells are configured or affected combinations contain
MeasObjectId larger than 32. If affectedCarrierFreqCombList-
is included, affectedCarrierFreqCombList- shall
not be included.
affectedCarrierFreqList
List of E-UTRA carrier frequencies affected by IDC problems.
If E-UTRAN includes affectedCarrierFreqList-v1310 it
includes the same number of entries, and listed in the
same order, as in affectedCarrierFreqList-.
drx-ActiveTime
Indicates the desired active time that the E-UTRAN is
recommended to configure. Value in number of subframes.

TABLE 1-continued

InDeviceCoexIndication field descriptions

Value sf20 corresponds to 20 subframes, sf30 corresponds to 30 subframes and so on.
drx-CycleLength
Indicates the desired DRX cycle length that the E-UTRAN is recommended to configure. Value in number of subframes. Value sf40 corresponds to 40 subframes, sf64 corresponds to 64 subframes and so on.
drx-Offset
Indicates the desired DRX starting offset that the E-UTRAN is recommended to configure. The UE shall set the value of drx-Offset smaller than the value of drx-CycleLength. The starting frame and subframe satisfy the relation: [(SFN * 10) + subframe number] modulo (drx-CycleLength) = drx-Offset.
idc-SubframePatternList
A list of one or more subframe patterns indicating which hybrid automatic repeat request (HARQ) process E-UTRAN is requested to abstain from using. Value 0 indicates that E-UTRAN is requested to abstain from using the subframe. For Frequency Division Duplex (FDD), the radio frame in which the pattern starts (i.e. the radio frame in which the first/leftmost bit of the subframePatternFDD corresponds to subframe #0) occurs when SFN mod 2 = 0. For time division duplex (TDD), the first/leftmost bit corresponds to the subframe #0 of the radio frame satisfying SFN mod x = 0, where x is the size of the bit string divided by 10. The UE shall indicate a subframe pattern that follows HARQ time line, as specified in TS 36.213 [23], i.e., if a subframe is set to 1 in the subframe pattern, also the corresponding subframes carrying the potential UL grant [23, 8.0], the UL HARQ retransmission [23, 8.0] and the downlink (DL) and/or uplink (UL) HARQ feedback [23, 7.3, 8.3 and 9.1.2] shall be set to 1.
interferenceDirection
Indicates the direction of IDC interference. Value eutra indicates that only E-UTRA is victim of IDC interference, value other indicates that only another radio is victim of IDC interference and value both indicates that both E-UTRA and another radio are victims of IDC interference. The other radio refers to either the ISM radio or GNSS (see 3GPP TR 36.816 [63]).
victimSystem Type
Indicate the list of victim system types to which IDC interference is caused from E-UTRA when configured with UL CA.
Value gps, glonass, bds and galileo indicates the type of GNSS.
Value NR indicates NR and value bluetooth indicates Bluetooth.

RRC information elements are also described herein. One RRC information element is SystemInformationBlockType XX. The IE SystemInformationBlockTypxx7 contains information relevant for traffic steering between E-UTRAN and NR. An example of the SystemInformationBlockType XX information element is provided in Listing (3).

Listing (3)

```
-- ASN1START
SystemInformationBlockTypexx- ::=    SEQUENCE {
  NR-OffloadInfoPerPLMN-List-    SEQUENCE (SIZE
(1..maxPLMN-)) OF
                    NR-OffloadInfoPerPLMN-
    OPTIONAL, -- Need OR
  lateNonCriticalExtension    OCTET STRING
    OPTIONAL,
  ...
}
NR-OffloadInfoPerPLMN- ::=    SEQUENCE {
  NR-OffloadConfigCommon-NR-OffloadConfig-
    OPTIONAL,    -- Need OR
  NR-Id-List-        NR-Id-List-
    OPTIONAL,    -- Need OR
  ...
}
```

Listing (3)

```
NR-Id-List- ::=            SEQUENCE (SIZE (1..maxNR-Id-)) OF
  NR-Identifiers-
NR-Identifiers- ::=        SEQUENCE {
  GNB Node ID-        OCTET STRING (SIZE (1..32))
    OPTIONAL, -- Need OR
  GNBSys ID-            OCTET STRING (SIZE (6))
    OPTIONAL, -- Need OR
  GNBArea ID-        OCTET STRING (SIZE (6))
    OPTIONAL, -- Need OR
  ...
}
-- ASN1STOP
```

TABLE 2

SystemInformationBlockTypexx field descriptions gNBSys ID
New Radio System Identifier ( ).
gNB Area ID
New Radio Area Identifier ( ).
gNB Node ID
New Radio Node Identifier (gNB NODE ID).
NR-OffloadInfoPerPLMN-List
The NR offload configuration per Public Land Mobile Network (PLMN) includes the same number of entries, listed in the same order as the PLMN(s) in plmn-IdentityList in SystemInformationBlockType1.

Radio resource control information elements are also described herein. The IE AntennaInfoCommon and the AntennaInfoDedicated are used to specify the common and the UE specific antenna configuration respectively. The IE NRA-Configuration is used to setup/modify/release LTE-NR Aggregation. Listing (4) provides an example of the NRA-Configuration information element.

Listing (4)

```
-- ASN1START
NRA-Configuration- ::=            CHOICE {
  release                NULL,
  setup                SEQUENCE {
    NRA-Config-        NRA-Config-
  }
}
NRA-Config- ::=    SEQUENCE {
  NRA-MobilityConfig-        NR-MobilityConfig-
    OPTIONAL,    -- Need ON
  NRA-NR-Counter-        INTEGER (0..65535)
    OPTIONAL,    -- Need ON
  ...
}
-- ASN1STOP
```

TABLE 3

NRA-Configuration field descriptions

NRA-MobilityConfig
Indicates the parameters used for NR mobility.
NRA-NR-Counter
Indicates the parameter used by UE for NR authentication.

The IE LNRIP-Configuration is used to add, modify or release DRBs that are using an LNRIP Tunnel. Listing (5) provides an example of the LNRIP-Configuration information element.

Listing (5)

```
-- ASN1START
LNRIP-Configuration- ::=        CHOICE {
    release                         NULL,
    setup                           SEQUENCE {
        LNRIP-Config-                   LNRIP-Config-
    }
}
LNRIP-Config- ::= SEQUENCE {
    LNRIP-MobilityConfig-           NR-MobilityConfig-
        OPTIONAL,    -- Need ON
    tunnelConfigLNRIP-              TunnelConfigLNRIP-
        OPTIONAL,    -- Need ON
    ...
}
-- ASN1STOP
```

TABLE 4

LNRIP-Configuration field descriptions

| | |
|---|---|
| 5 | LNRIP-MobilityConfig |
| | Indicates the NR mobility set for LNRIP. |
| | tunnelConfigLNRIP |
| | Indicates the parameters used for establishing the LNRIP tunnel. |

The IE RadioResourceConfigDedicated is used to setup/modify/release RBs, to modify the Medium Access Control (MAC) main configuration, to modify the SPS configuration and to modify dedicated physical configuration. Listing (6) provides an example of the RadioResourceConfigDedicated information element.

Listing (6)

```
-- ASN1START
RadioResourceConfigDedicated ::=                SEQUENCE {
    NR-srb-ToAddModList                 NR-SRB-ToAddModList
        OPTIONAL,                       -- Cond HO-Conn
    drb-ToAddModList                    DRB-ToAddModList
        OPTIONAL,                       -- Cond HO-toEUTRA
    drb-ToReleaseList                   DRB-ToReleaseList
        OPTIONAL,                       -- Need ON
    mac-MainConfig                              CHOICE {
        explicitValue                       MAC-MainConfig,
        defaultValue                        NULL
    } OPTIONAL,                         -- Cond HO-toEUTRA2
    sps-Config                          SPS-Config
        OPTIONAL,                       -- Need ON
    physicalConfigDedicatedPhysicalConfigDedicated
        OPTIONAL,                       -- Need ON
    ...,
    [[ rlf-TimersAndConstants-r9        RLF-TimersAndConstants-r9
        OPTIONAL -- Need ON
    ]],
    [[ measSubframePatternPCell-r10     MeasSubframePatternPCell-r10
        OPTIONAL -- Need ON
    ]],
    [[ neighCellsCRS-Info-              NeighCellsCRS-Info-
        OPTIONAL -- Need ON
    ]],
    [[ naics-Info-                      NAICS-AssistanceInfo-
        OPTIONAL -- Need ON
    ]],
    [[ neighCellsCRS-Info-              NeighCellsCRS-Info-
        OPTIONAL,    -- Cond CRSIM
    rlf-TimersAndConstants-             RLF-TimersAndConstants-
        OPTIONAL -- Need ON
    ]]
}
RadioResourceConfigDedicatedPSCell- ::=    SEQUENCE {
    -- UE specific configuration extensions applicable for an PSCell
    physicalConfigDedicatedPSCell-      PhysicalConfigDedicated
        OPTIONAL,    -- Need ON
    sps-Config-                         SPS-Config
        OPTIONAL,    -- Need ON
    naics-Info-                         NAICS-AssistanceInfo-
        OPTIONAL,    -- Need ON
    ...,
    [[ neighCellsCRS-InfoPSCell-                NeighCellsCRS-Info-
        OPTIONAL -- Need ON
    ]]
}
RadioResourceConfigDedicatedSCG- ::=    SEQUENCE {
    drb-ToAddModListSCG-                DRB-ToAddModListSCG-
        OPTIONAL,    -- Need ON
    mac-MainConfigSCG-                  MAC-MainConfig
        OPTIONAL,    -- Need ON
    rlf-TimersAndConstantsSCG-          RLF-TimersAndConstantsSCG-
        OPTIONAL,    -- Need ON
    ...
}
```

Listing (6)

```
RadioResourceConfigDedicatedSCell-r10 ::=    SEQUENCE {
    -- UE specific configuration extensions applicable for an
SCell
    physicalConfigDedicatedSCell-r10
    PhysicalConfigDedicatedSCell-r10
        OPTIONAL,-- Need ON
    ...,
    [[ mac-MainConfigSCell-              MAC-MainConfigSCell-
        OPTIONAL -- Cond SCellAdd
    ]],
    [[ naics-Info-                       NAICS-AssistanceInfo-
        OPTIONAL -- Need ON
    ]],
    [[ neighCellsCRS-InfoSCell-          NeighCellsCRS-Info-
        OPTIONAL -- Need ON
    ]]
}
NR-SRB-ToAddModList ::=       SEQUENCE (SIZE (1..2)) OF SRB-
ToAddMod
NR-SRB-ToAddMod ::= SEQUENCE {
    NR-srb-Identity                  INTEGER (1..3),
    rlc-Config                       CHOICE {
        explicitValue                    RLC-Config,
        defaultValue                     NULL
    }    OPTIONAL,
    logicalChannelConfig             CHOICE {
        explicitValue                    LogicalChannelConfig,
        defaultValue                     NULL
    }    OPTIONAL,
    ...
}
DRB-ToAddModList ::=          SEQUENCE (SIZE (1..maxDRB)) OF
DRB-ToAddMod
DRB-ToAddModListSCG- ::=      SEQUENCE (SIZE (1..maxDRB)) OF
DRB-ToAddModSCG-
DRB-ToAddMod ::= SEQUENCE {
    eps-BearerIdentity                   INTEGER (0..15)
        OPTIONAL,                    -- Cond DRB-Setup
    drb-Identity                         DRB-Identity,
    pdcp-Config                          PDCP-Config
        OPTIONAL,                    -- Cond PDCP
    rlc-Config                           RLC-Config
        OPTIONAL,                    -- Cond SetupM
    logicalChannelIdentity               INTEGER (3..10)
        OPTIONAL,                    -- Cond DRB-SetupM
    logicalChannelConfig                 LogicalChannelConfig
        OPTIONAL,                    -- Cond SetupM
    ...,
    [[ drb-TypeChange-               ENUMERATED {toMCG}
        OPTIONAL,                    -- Need OP
    rlc-Config-v1250                 RLC-Config-v1250
        OPTIONAL     -- Need ON
    ]],
    [[ rlc-Config-v1310              RLC-Config-v1310
        OPTIONAL,                    -- Need ON
    drb-TypeNRA-                     BOOLEAN
        OPTIONAL,                    -- Need ON
    drb-TypeLNRIP-                   ENUMERATED {LNRIP, LNRIP-DL-only,
            LNRIP-UL-only, eutran}
        OPTIONAL                     -- Need ON
    ]]
}
DRB-ToAddModSCG- ::= SEQUENCE {
    drb-Identity-                    DRB-Identity,
    drb-Type-                        CHOICE {
        split-                           NULL,
        scg-                             SEQUENCE {
            eps-BearerIdentity-      INTEGER (0..15)
                OPTIONAL,            -- Cond DRB-Setup
            pdcp-Config-             PDCP-Config
                OPTIONAL -- Cond PDCP-S
        }
    }    OPTIONAL,     -- Cond SetupS2
    rlc-ConfigSCG-                   RLC-Config
        OPTIONAL,     -- Cond SetupS
```

Listing (6)

```
    rlc-Config-v1250             RLC-Config-v1250
        OPTIONAL,    -- Need ON
    logicalChannelIdentitySCG-   INTEGER (3..10)
        OPTIONAL,    -- Cond DRB-SetupS
    logicalChannelConfigSCG-     LogicalChannelConfig
        OPTIONAL,    -- Cond SetupS
    ...
}
DRB-ToReleaseList ::=            SEQUENCE (SIZE (1..maxDRB)) OF
DRB-Identity
MeasSubframePatternPCell-r10 ::=    CHOICE {
    release                         NULL,
    setup                           MeasSubframePattern-r10
}
NeighCellsCRS-Info- ::=          CHOICE {
    release                      NULL,
    setup                        CRS-AssistanceInfoList-
}
CRS-AssistanceInfoList- ::=         SEQUENCE  (SIZE (1..maxCellReport))
OF CRS-AssistanceInfo-
CRS-AssistanceInfo- ::=    SEQUENCE {
    physCellId-                      PhysCellId,
    antennaPortsCount-                 ENUMERATED {an1, an2, an4,
spare1},
    mbsfn-SubframeConfigList-          MBSFN-SubframeConfigList,
    ...
}
NeighCellsCRS-Info- ::=          CHOICE {
    release                      NULL,
    setup                        CRS-AssistanceInfoList-
}
CRS-AssistanceInfoList- ::=      SEQUENCE  (SIZE (1..maxCellReport))
OF CRS-AssistanceInfo-
CRS-AssistanceInfo- ::= SEQUENCE {
    physCellId-                  PhysCellId,
    antennaPortsCount-             ENUMERATED {an1, an2, an4,
spare1},
    mbsfn-SubframeConfigList-      MBSFN-SubframeConfigList
        OPTIONAL,    -- Need ON
    ...
}
NAICS-AssistanceInfo- ::=        CHOICE {
    release                      NULL,
    setup                        SEQUENCE {
        neighCellsToReleaseList-
NeighCellsToReleaseList-         OPTIONAL,    -- Need ON
        neighCellsToAddModList- NeighCellsToAddModList-
            OPTIONAL,    -- Need ON
        servCellp-a-             P-a
            OPTIONAL -- Need ON
    }
}
NeighCellsToReleaseList- ::=     SEQUENCE (SIZE (1..maxNeighCell-))
OF PhysCellId
NeighCellsToAddModList- ::=      SEQUENCE (SIZE (1..maxNeighCell-))
OF NeighCellsInfo-
NeighCellsInfo-          ::=        SEQUENCE {
    physCellId-                  PhysCellId,
    p-b-                            INTEGER (0..3),
    crs-PortsCount-                 ENUMERATED {n1, n2, n4, spare},
    mbsfn-SubframeConfig-           MBSFN-SubframeConfigList
        OPTIONAL,    -- Need ON
    p-aList-                     SEQUENCE (SIZE (1..maxP-a-
PerNeighCell-)) OF P-a,
    transmissionModeList-        BIT STRING (SIZE(8)),
    resAllocGranularity-         INTEGER (1..4),
    ...
}
P-a ::= ENUMERATED { dB-6, dB-4dot77, dB-3, dB-1dot77,
                              dB0, dB1, dB2, dB3}
-- ASN1STOP
```

TABLE 5

RadioResourceConfigDedicated field descriptions crs-PortsCount
Parameter represents the number of antenna ports for cell-specific reference signal used by the signaled neighboring cell where n1 corresponds to 1 antenna port, n2 to 2 antenna ports etc. see TS 36.211 [21, 6.10.1].
drb-Identity
In case of DC, the data radio bearer (DRB) identity is unique within the scope of the UE i.e. a secondary cell (SC) DRB cannot use the same value as used for a master cell group (MCG) or split DRB. For a split DRB the same identity is used for the MCG- and SC parts of the configuration.
drb-ToAddModListSCG
When an SC is configured, E-UTRAN configures at least one SC or split DRB.
drb-Type
This field indicates whether the DRB is split or SC DRB. E-UTRAN does not configure split and SC DRBs simultaneously for the UE.
drb-TypeChange
Indicates that a split/SC DRB is reconfigured to an MCG DRB (i.e. E-UTRAN only signals the field in case the DRB type changes).
drb-TypeNRA
Indicates whether a DRB is (re)configured as an NRA DRB or an NRA DRB is reconfigured not to use NR resources.
drb-TypeLNRIP
Indicates whether a DRB is (re)configured to use LNRIP Tunnel in UL and DL (value LNRIP), DL only (value LNRIP-DL-only), UL only (value LNRIP-UL-only) or not to use LNRIP Tunnel (value eutran).
logicalChannelConfig
For SRBs a choice is used to indicate whether the logical channel configuration is signaled explicitly or set to the default logical channel configuration for NR-SRB.
logicalChannelIdentity
The logical channel identity for both UL and DL.
mac-Main Config
Although the ASN.1 includes a choice that is used to indicate whether the mac-MainConfig is signaled explicitly or set to the default MAC main configuration as specified in 9.2.2, EUTRAN does not apply "defaultValue".
mbsfn-SubframeConfig
Defines the Multimedia Broadcast Single Frequency Network (MBSFN) subframe configuration used by the signaled neighboring cell. If absent, UE assumes no MBSFN configuration for the neighboring cell.
measSubframePatternPCell
Time domain measurement resource restriction pattern for the PCell measurements (Reference Signal Received Power (RSRP), Reference Signal Received Quality (RSRQ) and the radio link monitoring).
neighCellsCRS-Info, neighCellsCRS-InfoSCell, neighCellsCRS-InfoPSCell
This field contains assistance information used by the UE to mitigate interference from cell-specific reference signal (CRS) while performing Radio Resource Management (RRM)/Radio Link Monitoring (RLM)/Channel State Information (CSI) measurement or data demodulation or DL control channel demodulation. When the received CRS assistance information is for a cell with CRS non-colliding with that of the CRS of the cell to measure, the UE may use the CRS assistance information to mitigate CRS interference. When the received CRS assistance information is for a cell with CRS colliding with that of the CRS of the cell to measure, the UE may use the CRS assistance information to mitigate CRS interference RRM/RLM (as specified in TS 36.133 [16]) and for CSI (as specified in TS 36.101 [42]) on the subframes indicated by measSubframePatternPCell, measSubframePatternConfigNeigh, csi-MeasSubframeSet1 if configured, and the CSI subframe set 1 if csi-MeasSubframeSets- is configured. The UE may use CRS assistance information to mitigate CRS interference from the cells in the CRS-AssistanceInfoList for the demodulation purpose or DL control channel demodulation as specified in TS 36.101 [42]. EUTRAN does not configure neighCellsCRS-Info- or neighCellsCRS-Info- if eimta-MainConfigPCell- is configured.
neighCellsToAddModList
This field contains assistance information used by the UE to cancel and suppress interference of a neighboring cell. If this field is present for a neighboring cell, the UE assumes that the transmission parameters listed in the sub-fields are used by the neighboring cell. If this field is present for a neighboring cell, the UE assumes the neighbor cell is subframe and SFN synchronized to the serving cell, has the same system bandwidth, UL/DL and special subframe configuration, and cyclic prefix length as the serving cell.
p-aList
Indicates the restricted subset of power offset for quadrature phase-shift keying (QPSK), 16 QAM, and 64 QAM PDSCH transmissions for the neighboring cell by using the parameter $P_A$, see TS 36.213 [23, 5.2]. Value dB-6 corresponds to −6 dB, dB-4dot77 corresponds to −4.77 dB etc.
p-b
Parameter: $P_B$, indicates the cell-specific ratio used by the signaled neighboring cell, see TS 36.213 [23, Table 5.2-1].
physicalConfigDedicated
The default dedicated physical configuration is specified in 9.2.4.
resAllocGranularity
Indicates the resource allocation and precoding granularity in PRB pair level of the signaled neighboring cell, see TS 36.213 [23, 7.1.6].
rlc-Config
For NR-SRB a choice is used to indicate whether the Radio Link Control (RLC) configuration is signaled explicitly or set to the values defined in the default RLC configuration for SRB3. RLC AM is the only applicable RLC mode for SRB1, SRB2, and SRB3 (NR-SRB). E-UTRAN does not reconfigure the RLC mode of DRBs except when a full configuration option is used, and may reconfigure the RLC SN field size and the AM RLC LI field size only upon handover within E-UTRA or upon the first reconfiguration after RRC connection re-establishment or upon SC Change for SC and split DRBs.
servCellp-a
Indicates the power offset for QPSK C-NRTI based PDSCH transmissions used by the serving cell, see TS 36.213 [23, 5.2]. Value dB-6 corresponds to −6 dB, dB-4dot77 corresponds to −4.77 dB etc.
sps-Config
The default Semi-Persistent Scheduling (SPS) configuration is specified in 9.2.3. Except for handover or releasing SPS for MCG, E-UTRAN does not reconfigure sps-Config for MCG when there is a configured downlink assignment or a configured uplink grant for MCG (see TS 36.321 [6]). Except for SC change or releasing SPS for SC, E-UTRAN does not reconfigure sps-Config for SC when there is a configured downlink assignment or a configured uplink grant for SC (see TS 36.321 [6]).
srb-Identity Value 1 is applicable for SRB1 only.
Value 2 is applicable for SRB2 only.
Value 3 is applicable for SRB3 or NR-SRB only.
transmissionModeList
Indicates a subset of transmission mode 1, 2, 3, 4, 6, 8, 9, 10, for the signaled neighboring cell for which NeighCellsInfo applies. When TM10 is signaled, other signaled transmission parameters in NeighCellsInfo are not applicable to up to 8 layer transmission scheme of TM10. E-UTRAN may indicate TM9 when TM10 with Quasi-Co-Location (QCL) type A and DMRS scrambling with $n_{ID}^{(i)} = N_{ID}^{cell}$ in TS 36.211 [21, 6.10.3.1] is used in the signaled neighbor cell and TM9 or TM10 with QCL type A and DMRS scrambling with $n_{ID}^{(i)} = N_{ID}^{cell}$ in TS 36.211 [21, 6.10.3.1] is used in the serving cell. UE behavior with network-assisted interference cancellation and suppression (NAICS) when TM10 is used is only defined when QCL type A and DMRS scrambling with $n_{ID}^{(i)} = N_{ID}^{cell}$ in TS 36.211 [21, 6.10.3.1] is used for the serving cell and all signaled neighbor cells. The first/leftmost bit is for transmission mode 1, the second bit is for transmission mode 2, and so on.

TABLE 6

| Conditional presence | Explanation |
|---|---|
| CRSIM | The field is optionally present, need ON, if neighCellsCRS-Info- is not present; otherwise it is not present. |
| DRB-Setup | The field is mandatory present if the corresponding DRB is being set up; otherwise it is not present. |
| DRB-SetupM | The field is mandatory present upon setup of MCG or split DRB; The field is optionally present, Need ON, upon change from SC to MCG DRB; otherwise it is not present. |
| DRB-SetupS | The field is mandatory present upon setup of SC or split DRB, or upon change from MCG to split DRB; The field is optionally present, Need ON, upon change from MCG to SC DRB; otherwise it is not present. |
| HO-Conn | The field is mandatory present in case of handover to E-UTRA or when the fullConfig is included in the RRCConnectionReconfiguration message or in case of RRC connection establishment (excluding RRConnectionResume); otherwise the field is optionally present, need ON. Upon connection establishment/re-establishment only SRB1 is applicable (excluding RRConnectionResume). |
| HO-toEUTRA | The field is mandatory present in case of handover to E-UTRA or when the fullConfig is included in the RRCConnectionReconfiguration message; In case of RRC connection establishment (excluding RRConnectionResume); and RRC connection re-establishment the field is not present; otherwise the field is optionally present, need ON. |
| HO-toEUTRA2 | The field is mandatory present in case of handover to E-UTRA or when the fullConfig is included in the RRCConnectionReconfiguration message; otherwise the field is optionally present, need ON. |
| PDCP | The field is mandatory present if the corresponding DRB is being setup; the field is optionally present, need ON, upon reconfiguration of the corresponding split DRB, upon the corresponding DRB type change from split to MCG bearer, upon the corresponding DRB type change from MCG to split bearer, upon handover within E-UTRA and upon the first reconfiguration after re-establishment but in all these cases only when fullConfig is not included in the RRCConnectionReconfiguration message; otherwise it is not present. |
| PDCP-S | The field is mandatory present if the corresponding DRB is being setup; the field is optionally present, need ON, upon SC change; otherwise it is not present. |
| RLC-Setup | This field is optionally present if the corresponding DRB is being setup, need ON; otherwise it is not present. |
| SCellAdd | The field is optionally present, need ON, upon SCell addition; otherwise it is not present. |
| Setup | The field is mandatory present if the corresponding SRB/DRB is being setup; otherwise the field is optionally present, need ON. |
| SetupM | The field is mandatory present upon setup of an MCG or split DRB; otherwise the field is optionally present, need ON. |
| SetupS | The field is mandatory present upon setup of an SC or split DRB, as well as upon change from MCG to split DRB; otherwise the field is optionally present, need ON. |
| SetupS2 | The field is mandatory present upon setup of an SC or split DRB, as well as upon change from MCG to split or SC DRB. For an SC DRB the field is optionally present, need ON. Otherwise the field is not present. |

The IE NRCLNI-Configuration is used to add, modify or release the NRCLNI configuration. Listing (7) provides an example of the NRCLNI-Configuration information element.

Listing (7)

```
-- ASN1START
NRCLNI-Configuration- ::=     CHOICE {
    release                   NULL,
    setup                     SEQUENCE {
        NRCLNI-Config-        NRCLNI-Config-
    }
}
NRCLNI-Config- ::=            SEQUENCE {
    command                   CHOICE {
        steerToNR-            SEQUENCE {
            mobilityConfig-   NR-Id-List-
        },
        steerToLTE-           NULL
    },
    ...
}
-- ASN1STOP
```

The IE TunnelConfigLNRIP is used to setup/release LNRIP Tunnel. Listing (8) provides an example of the TunnelConfigLNRIP information element.

Listing (8)

```
-- ASN1START
TunnelConfigLNRIP- ::= SEQUENCE {
    ip-Address-       IP-Address-,
    ike-Identity-     IKE-Identity-,
    ...,
    [[ LNRIP-Counter- INTEGER (0..65535)
        OPTIONAL -- Cond LNRIP-Setup
    ]]
}
IKE-Identity- ::= SEQUENCE {
    idI-              OCTET STRING
}
IP-Address- ::= CHOICE {
    ipv4-             BIT STRING (SIZE (32)),
    ipv6-             BIT STRING (SIZE (128))
}
-- ASN1STOP
```

TABLE 7

TunnelConfigLNRIP field descriptions ip-Address
Parameter indicates the LNRIP-SeGW internet protocol (IP) Address to be used by the UE for initiating LNRIP Tunnel establishment.
ike-Identity
Parameter indicates the IKE Identity elements (IDi) to be used in IKE Authentication Procedures.
LNRIP-Counter
Indicates the parameter used by UE for computing the security keys used in LNRIP tunnel establishment.

TABLE 8

| Conditional presence | Explanation |
|---|---|
| LNRIP-Setup | The field is mandatory present upon setup of LNRIP tunnel. Otherwise the field is optional, Need ON. |

The IE NR-Id-List is used to list NR(s) for configuration of NR measurements and NR mobility set. Listing (9) provides an example of the NR-Id-List information element.

Listing (9)

```
-- ASN1START
NR-Id-List- ::=    SEQUENCE (SIZE (1..maxNR-Id-)) OF NR-
Identifiers-
-- ASN1STOP
```

The IE NR-MobilityConfig is used for configuration of NR mobility set and NR Status Reporting. Listing (10) provides an example of the NR-MobilityConfig information element.

Listing (10)

```
-- ASN1START
NR-MobilityConfig- ::=       SEQUENCE {
    NR-ToReleaseList-        NR-Id-List-
        OPTIONAL,   --Need ON
    NR-ToAddList-            NR-Id-List-
        OPTIONAL,   --Need ON
    associationTimer-        ENUMERATED {s10, s30,
                                        s60, s120, s240}
        OPTIONAL,   --Need OR
    successReportRequested-  ENUMERATED {true}
        OPTIONAL,   --Need OR
    ...
}
-- ASN1STOP
```

TABLE 9

NR-MobilityConfig field descriptions associationTimer
Indicates the maximum time for connection to NR before connection failure reporting is initiated.
successReportRequested
Indicates whether the UE should report successful connection to NR. Applicable to NRA and LNRIP.
NR-ToAddList
Indicates the NR identifiers to be added to the NR mobility set.
NR-ToReleaseList
Indicates the NR identifiers to be removed the NR mobility set.

Measurement information elements are also described herein. One measurement information element is an AllowedMeasBandwidth information element. The IE MeasObjectToAddModList concerns a list of measurement objects to add or modify. Listing (11) provides an example of the MeasObjectToAddModList information element.

Listing (11)

```
-- ASN1START
MeasObjectToAddModList ::=          SEQUENCE (SIZE
(1..maxObjectId)) OF MeasObjectToAddMod
MeasObjectToAddModListExt- ::=      SEQUENCE (SIZE
(1..maxObjectId)) OF MeasObjectToAddModExt-
MeasObjectToAddModList-v9e0 ::=     SEQUENCE (SIZE
(1..maxObjectId)) OF MeasObjectToAddMod-v9e0
MeasObjectToAddMod ::= SEQUENCE {
    measObjectId            MeasObjectId,
    measObject              CHOICE {
        measObjectEUTRA         MeasObjectEUTRA,
        measObjectUTRA          MeasObjectUTRA,
        measObjectGERAN         MeasObjectGERAN,
        measObjectCDMA2000      MeasObjectCDMA2000,
        ...,
        measObjectNR-           MeasObjectNR-
    }
}
```

Listing (11) -continued

```
MeasObjectToAddModExt- ::=SEQUENCE {
    measObjectId-           MeasObjectId-v1310,
    measObject-             CHOICE {
        measObjectEUTRA-        MeasObjectEUTRA,
        measObjectUTRA-         MeasObjectUTRA,
        measObjectGERAN-        MeasObjectGERAN,
        measObjectCDMA2000-     MeasObjectCDMA2000,
        ...,
        measObjectNR-v1320      MeasObjectNR-
    }
}
MeasObjectToAddMod-v9e0 ::=    SEQUENCE {
    measObjectEUTRA-v9e0        MeasObjectEUTRA-v9e0
        OPTIONAL -- Cond eutra
}
-- ASN1STOP
```

TABLE 10

| Conditional presence | Explanation |
| --- | --- |
| eutra | The field is optional present, need OR, if for the corresponding entry in MeasObjectToAddModList or MeasObjectToAddModListExt- field measObject is set to measObjectEUTRA and its sub-field carrierFreq is set to maxEARFCN. Otherwise the field is not present and the UE shall delete any existing value for this field. |

The IE MeasObjectNR specifies information applicable for inter-Radio Access Technology (inter-RAT) NR measurements. Listing (12) provides an example of the MeasObjectNR information element.

Listing (12)

```
-- ASN1START
MeasObjectNR- ::= SEQUENCE {
    carrierFreq-                CHOICE {
        bandIndicatorListNR- SEQUENCE (SIZE (1..maxNR-Bands-)) OF
NR-BandIndicator-,
        carrierInfoListNR-   SEQUENCE (SIZE (1..maxNR-CarrierInfo-
)) OF NR-CarrierInfo-
    }       OPTIONAL,   -- Need ON
    NR-ToAddModList-            NR-Id-List-
        OPTIONAL,   -- Need ON
    NR-ToRemoveList-            NR-Id-List-
        OPTIONAL,   -- Need ON
    ...
}
NR-BandIndicator- ::= ENUMERATED {band2dot4, band5, spare6,
spare5, spare4, spare3, spare2, spare1, ...}
-- ASN1STOP
```

TABLE 11

MeasObjectNR field descriptions bandIndicatorListNR
Includes the list of NR bands where the value band xdoty indicates the xyGhz band; the value band z indicates the z Ghz band.
carrierInfoListNR
Includes the list of NR carrier information for the measurement object.
NR-ToAddModList
Includes the list of NR identifiers to be added to the measurement configuration.
NR-ToRemoveList
Includes the list of NR identifiers to be removed from the measurement configuration.

The IE MeasResults covers measured results for intra-frequency, inter-frequency and inter-RAT mobility. Listing (13) provides an example of the MeasResults information element.

Listing (13)

```
-- ASN1START
MeasResults ::=                         SEQUENCE {
    measId                              MeasId,
    measResultPCell                     SEQUENCE {
        rsrpResult                      RSRP-Range,
        rsrqResult                      RSRQ-Range
    },
    measResultNeighCells                CHOICE {
        measResultListEUTRA             MeasResultListEUTRA,
        measResultListUTRA              MeasResultListUTRA,
        measResultListGERAN             MeasResultListGERAN,
        measResultsCDMA2000             MeasResultsCDMA2000,
        ...
    }                                   OPTIONAL,
    ...,
    [[ measResultForECID-r9             MeasResultForECID-r9
                                        OPTIONAL
    ]],
    [[ locationInfo-r10                 LocationInfo-r10
                                        OPTIONAL,
       measResultServFreqList-r10       MeasResultServFreqList-r10
                                        OPTIONAL
    ]],
    [[ measId-v1250                     MeasId-v1250
                                        OPTIONAL,
       measResultPCell-v1250            RSRQ-Range-v1250
                                        OPTIONAL,
       measResultCSI-RS-List-           MeasResultCSI-RS-List-
                                        OPTIONAL
    ]],
    [[ measResultForRSSI-               MeasResultForRSSI-
                                        OPTIONAL,
       measResultServFreqListExt-       MeasResultServFreqListExt-
                                        OPTIONAL,
       measResultSSTD-                  MeasResultSSTD-
                                        OPTIONAL,
       measResultPCell-v1310            SEQUENCE {
           rs-sinr-Result-              RS-SINR-Range-
       }                                OPTIONAL,
       ul-PDCP-DelayResultList-         UL-PDCP-DelayResultList-
       measResultListNR-                MeasResultListNR-
                                        OPTIONAL
    ]]
}
MeasResultListEUTRA ::=                 SEQUENCE (SIZE (1..maxCellReport)) OF MeasResultEUTRA
MeasResultEUTRA ::= SEQUENCE {
    physCellId                          PhysCellId,
    cgi-Info                            SEQUENCE {
        cellGlobalId                    CellGlobalIdEUTRA,
        trackingAreaCode                TrackingAreaCode,
        plmn-IdentityList               PLMN-IdentityList2
                                        OPTIONAL
    }                                   OPTIONAL,
    measResult                          SEQUENCE {
        rsrpResult                      RSRP-Range
                                        OPTIONAL,
        rsrgResult                      RSRQ-Range
                                        OPTIONAL,
        ...,
        [[ additionalSI-Info-r9         AdditionalSI-Info-r9
                                        OPTIONAL
        ]],
        [[ primaryPLMN-Suitable-        ENUMERATED {true}
                                        OPTIONAL,
           measResult-v1250             RSRQ-Range-v1250
                                        OPTIONAL
        ]],
        [[ rs-sinr-Result-              RS-SINR-Range-
                                        OPTIONAL,
           cgi-Info-v1310               SEQUENCE {
               freqBandIndicator-       FreqBandIndicator-
                                        OPTIONAL,
               multiBandInfoList-       MultiBandInfoList-
                                        OPTIONAL,
               freqBandIndicatorPriority- ENUMERATED {true}
                                        OPTIONAL
           }                            OPTIONAL
        ]]
    }
}
MeasResultServFreqList-r10 ::=          SEQUENCE (SIZE (1..maxServCell-r10)) OF MeasResultServFreq-r10
MeasResultServFreqListExt- ::=          SEQUENCE (SIZE (1..maxServCell-)) OF MeasResultServFreq-
MeasResultServFreq-r10 ::=              SEQUENCE {
    servFreqId-r10                      ServCellIndex-r10,
    measResultSCell-r10                 SEQUENCE {
        rsrpResultSCell-r10             RSRP-Range,
        rsrqResultSCell-r10             RSRQ-Range
    }                                   OPTIONAL,
    measResultBestNeighCell-r10         SEQUENCE {
        physCellId-r10                  PhysCellId,
        rsrpResultNCell-r10             RSRP-Range,
        rsrqResultNCell-r10             RSRQ-Range
    }                                   OPTIONAL,
    ...,
    [[ measResultSCell-v1250            RSRQ-Range-v1250
                                        OPTIONAL,
       measResultBestNeighCell-v1250    RSRQ-Range-v1250
                                        OPTIONAL
    ]],
    [[ measResultSCell-v1310            SEQUENCE {
           rs-sinr-Result-              RS-SINR-Range-
       }                                OPTIONAL,
       measResultBestNeighCell-v1310    SEQUENCE {
           rs-sinr-Result-              RS-SINR-Range-
       }                                OPTIONAL
    ]]
}
MeasResultServFreq- ::=                 SEQUENCE {
    servFreqId-                         ServCellIndex-,
    measResultSCell-                    SEQUENCE {
        rsrpResultSCell-                RSRP-Range,
        rsrqResultSCell-                RSRQ-Range-,
        rs-sinr-Result-                 RS-SINR-Range-
                                        OPTIONAL
    }                                   OPTIONAL,
    measResultBestNeighCell-            SEQUENCE {
        physCellId-                     PhysCellId,
        rsrpResultNCell-                RSRP-Range,
        rsrqResultNCell-                RSRQ-Range-,
        rs-sinr-Result-                 RS-SINR-Range-
                                        OPTIONAL
    }                                   OPTIONAL,
    ...
}
MeasResultCSI-RS-List- ::=              SEQUENCE (SIZE (1..maxCellReport)) OF MeasResultCSI-RS-
MeasResultCSI-RS- ::=                   SEQUENCE {
    measCSI-RS-Id-                      MeasCSI-RS-Id-,
    csi-RSRP-Result-                    CSI-RSRP-Range-,
    ...
}
MeasResultListUTRA ::=                  SEQUENCE (SIZE (1..maxCellReport)) OF MeasResultUTRA
MeasResultUTRA ::=  SEQUENCE {
    physCellId                          CHOICE {
        fdd                             PhysCellIdUTRA-FDD,
        tdd                             PhysCellIdUTRA-TDD
    },
    cgi-Info                            SEQUENCE {
        cellGlobalId                    CellGlobalIdUTRA,
        locationAreaCode                BIT STRING (SIZE (16))
                                        OPTIONAL,
        routingAreaCode                 BIT STRING (SIZE (8))
                                        OPTIONAL,
```

Listing (13)

```
            plmn-IdentityList            PLMN-IdentityList2
                OPTIONAL
        }                                OPTIONAL,
        measResult                       SEQUENCE {
            utra-RSCP                    INTEGER (-5..91)
                OPTIONAL,
            utra-EcN0                    INTEGER (0..49)
                OPTIONAL,
            ...,
            [[ additionalSI-Info-r9      AdditionalSI-Info-r9
                OPTIONAL
            ]],
            [[ primaryPLMN-Suitable-     ENUMERATED {true}
                OPTIONAL
            ]]
        }
    }
    MeasResultListGERAN ::=              SEQUENCE (SIZE
    (1..maxCellReport)) OF MeasResultGERAN
    MeasResultGERAN ::= SEQUENCE {
        carrierFreq                      CarrierFreqGERAN,
        physCellId                       PhysCellIdGERAN,
        cgi-Info                         SEQUENCE {
            cellGlobalId                 CellGlobalIdGERAN,
            routingAreaCode              BIT STRING (SIZE (8))
                OPTIONAL
        }
            OPTIONAL,
        measResult                       SEQUENCE {
            rssi                         INTEGER (0..63),
            ...
        }
    }
    MeasResultsCDMA2000 ::=              SEQUENCE {
        preRegistrationStatusHRPD        BOOLEAN,
        measResultListCDMA2000           MeasResultListCDMA2000
    }
    MeasResultListCDMA2000 ::=           SEQUENCE (SIZE
    (1..maxCellReport)) OF MeasResultCDMA2000
    MeasResultCDMA2000 ::= SEQUENCE {
        physCellId                       PhysCellIdCDMA2000,
        cgi-Info                         CellGlobalIdCDMA2000
            OPTIONAL,
        measResult                       SEQUENCE {
            pilotPnPhase                 INTEGER (0..32767)
                OPTIONAL,
            pilotStrength                INTEGER (0..63),
            ...
        }
    }
    MeasResultListNR- ::=                SEQUENCE (SIZE (1..
    maxCellReport)) OF MeasResultNR-
    MeasResultNR- ::= SEQUENCE {
        NR-Identifiers-                  NR-Identifiers-,
        carrierInfoNR-                   NR-CarrierInfo-
            OPTIONAL,
        bandNR-                          NR-BandIndicator-
            OPTIONAL,
        rssiNR-                          NR-RSSI-Range-,
        availableAdmissionCapacityNR-    INTEGER (0..31250)
            OPTIONAL,
        backhaulDL-BandwidthNR-          NR-backhaulRate-
            OPTIONAL,
        backhaulUL-BandwidthNR-          NR-backhaulRate-
            OPTIONAL,
        channelUtilizationNR-            INTEGER (0..255)
            OPTIONAL,
        stationCountNR-                  INTEGER (0..65535)
            OPTIONAL,
        connectedNR-                     ENUMERATED {true}
            OPTIONAL,
        ...
    }
    MeasResultForECID-r9 ::=             SEQUENCE {
        ue-RxTxTimeDiffResult-r9         INTEGER (0..4095),
        currentSFN-r9                    BIT STRING (SIZE (10))
    }
```

Listing (13)

```
    PLMN-IdentityList2 ::=               SEQUENCE (SIZE (1..5)) OF
    PLMN-Identity
    AdditionalSI-Info-r9 ::=             SEQUENCE {
        csg-MemberStatus-r9              ENUMERATED {member}
            OPTIONAL,
        csg-Identity-r9                  CSG-Identity
            OPTIONAL
    }
    MeasResultForRSSI- ::=               SEQUENCE {
        rssi-Result-                     RSSI-Range-,
        channelOccupancy-                INTEGER (0..100),
        ...
    }
    UL-PDCP-DelayResultList- ::=         SEQUENCE (SIZE (1..maxQCI-))
    OF UL-PDCP-DelayResult-
    UL-PDCP-DelayResult- ::=             SEQUENCE {
        qci-Id-                          ENUMERATED {qci1, qci2, qci3,
                                             qci4, spare4, spare3, spare2,
                                             spare1},
        excessDelay-                     INTEGER (0..31),
        ...
    }
    -- ASN1STOP
```

TABLE 12

MeasResults field descriptions availableAdmissionCapacityNR
Indicates the available admission capacity of NR as defined in xxx
backhaulDL-BandwidthNR
Indicates the backhaul available downlink bandwidth of NR.
backhaulUL-BandwidthNR
Indicates the backhaul available uplink bandwidth of NR.
bandNR
Indicates the NR band.
carrierInfoNR
Indicates the NR channel information.
channelOccupancy
Indicates the percentage of samples when the Received
Signal Strength Indicator (RSSI) was above the configured
channelOccupancyThreshold for the associated reportConfig.
channelUtilizationNR
Indicates NR channel utilization as defined in xxxxx
connectedNR
Indicates whether the UE is connected to the NR for which
the measurement results are applicable.
csg-MemberStatus
Indicates whether or not the UE is a member of the
Closed Subscriber Group (CSG) of the neighbor cell.
currentSFN
Indicates the current system frame number when receiving the
UE Rx-Tx time difference measurement results from lower layer.
excessDelay
Indicates excess queueing delay ratio in UL, according to excess
delay ratio measurement report mapping table, as
defined in TS 36.314 [71, Table 4.2.1.1.1-1]
locationAreaCode
A fixed length code identifying the location area within a PLMN,
as defined in TS 23.003 [27].
measId
Identifies the measurement identity for which the reporting is
being performed. If the measId-v1250 is included, the measId
(i.e. without a suffix) is ignored by eNB.
measResult Measured result of an E-UTRA cell;
Measured result of a UTRA cell;
Measured result of a GERAN cell or frequency;
Measured result of a CDMA2000 cell;
Measured result of an NR;
Measured result of UE Rx-Tx time difference;
Measured result of UE SFN, radio frame and subframe timing
difference; or Measured result of RSSI and channel occupancy.
measResultCSI-RS-List

TABLE 12-continued

MeasResults field descriptions

Measured results of the CSI-reference signal (CSI-RS) resources in discovery signals measurement.
measResultListCDMA2000
List of measured results for the maximum number of reported best cells for a CDMA2000 measurement identity.
measResultListEUTRA
List of measured results for the maximum number of reported best cells for an E-UTRA measurement identity.
measResultListGERAN
List of measured results for the maximum number of reported best cells or frequencies for a GERAN measurement identity.
measResultListUTRA
List of measured results for the maximum number of reported best cells for a UTRA measurement identity.
measResultListNR
List of measured results for the maximum number of reported best NR outside the NR mobility set and connected NR, if any, for an NR measurement identity.
measResultPCell
Measured result of the PCell.
measResultsCDMA2000
Contains the CDMA2000 HRPD pre-registration status and the list of CDMA2000 measurements.
MeasResultServFreqList
Measured results of the serving frequencies: the measurement result of each SCell, if any, and of the best neighboring cell on each serving frequency.
pilotPnPhase
Indicates the arrival time of a CDMA2000 pilot, measured relative to the UE's time reference in units of PN chips, see C.S0005 [25]. This information is used in either SRVCC handover or enhanced 1xRTT Circuit Switched (CS) fallback procedure to CDMA2000 1xRTT.
pilotStrength
CDMA2000 Pilot Strength, the ratio of pilot power to total power in the signal bandwidth of a CDMA2000
Forward Channel. See C.S0005 [25] for CDMA2000 1xRTT and C.S0024 [26] for CDMA2000 HRPD.
plmn-IdentityList
The list of PLMN Identity read from broadcast information when the multiple PLMN Identities are broadcast.
preRegistrationStatusHRPD
Set to TRUE if the UE is currently pre-registered with CDMA2000 HRPD. Otherwise set to FALSE. This can be ignored by the eNB for CDMA2000 1xRTT.
qci-Id
Indicates Quality of Service (QoS) Class Identifier value for which excessDelay is provided, according to TS 36.314 [71].
routingAreaCode
The Radio Admission Control (RAC) identity read from broadcast information, as defined in TS 23.003 [27].
rsrpResult
Measured RSRP result of an E-UTRA cell.
The rsrpResult is only reported if configured by the eNB.
rsrqResult
Measured RSRQ result of an E-UTRA cell.
The rsrqResult is only reported if configured by the eNB.
rssi
GERAN Carrier RSSI. RXLEV is mapped to a value between 0 and 63, TS 45.008 [28]. When mapping the RXLEV value to the RSSI bit string, the first/leftmost bit of the bit string contains the most significant bit.
rssi-Result
Measured RSSI result in dBm.
rs-sinr-Result
Measured RS-Signal to Interference plus Noise Ratio (RS-SINR) result of an E-UTRA cell.
The rs-sinr-Result is only reported if configured by the eNB.
rssiNR
Measured NR RSSI result in dBm.
stationCountNR
Indicates the total number stations currently associated with this NR as defined in xxxx].
ue-RxTxTimeDiffResult
UE Rx-Tx time difference measurement result of the PCell, provided by lower layers. According to UE Rx-Tx time difference report mapping in TS 36.133 [16].

TABLE 12-continued

MeasResults field descriptions utra-EcN0
According to CPICH_Ec/No in TS 25.133 [29] for FDD.
Fourteen spare values. The field is not present for TDD.
utra-RSCP
According to CPICH_RSCP in TS 25.133 [29] for FDD
and P-CCPCH RSCP in TS 25.123 [30] for
TDD. Thirty-one spare values.
NR-Identifiers
Indicates the NR parameters used for identification of the NR for which the measurement results are applicable.

The IE MeasResultSSTD consists of SFN, radio frame and subframe boundary difference between the PCell and the PSCell as specified in TS 36.214 [48] and TS 36.133 [16]. Listing (14) provides an example of the MeasResultSSTD information element.

Listing (14)

```
-- ASN1START
MeasResultSSTD- ::=                SEQUENCE {
    sfn-OffsetResult-              INTEGER (0..1023),
    frameBoundaryOffsetResult-     INTEGER (-4..5),
    subframeBoundaryOffsetResult-  INTEGER (0..63)
}
-- ASN1STOP
```

TABLE 13

MeasResultSSTD field descriptions sfn-OffsetResult
Indicates the SFN difference between the PCell and the PSCell as an integer value according to TS 36.214 [48].
frameBoundaryOffsetResult
Indicates the frame boundary difference between the PCell and the PSCell as an integer value according to TS 36.214 [48].
subframeBoundaryOffsetResult
Indicates the subframe boundary difference between the PCell and the PSCell as an integer value according to the mapping table in TS 36.133 [16].

The IE QuantityConfig specifies the measurement quantities and layer 3 filtering coefficients for E-UTRA and inter-RAT measurements. Listing (15) provides an example of the QuantityConfig information element.

Listing (15)

```
-- ASN1START
QuantityConfig ::=              SEQUENCE {
    quantityConfigEUTRA          QuantityConfigEUTRA
        OPTIONAL, -- Need ON
    quantityConfigUTRA           QuantityConfigUTRA
        OPTIONAL, -- Need ON
    quantityConfigGERAN          QuantityConfigGERAN
        OPTIONAL, -- Need ON
    quantityConfigCDMA2000       QuantityConfigCDMA2000
        OPTIONAL, -- Need ON
    ...,
    [[ quantityConfigUTRA-v1020  QuantityConfigUTRA-v1020
        OPTIONAL -- Need ON
    ]],
    [[ quantityConfigEUTRA-v1250 QuantityConfigEUTRA-v1250
        OPTIONAL -- Need ON
    ]],
    [[ quantityConfigEUTRA-v1310 QuantityConfigEUTRA-v1310
        OPTIONAL, -- Need ON
    quantityConfigNR-            QuantityConfigNR-
        OPTIONAL -- Need ON
    ]]
}
```

Listing (15)

```
QuantityConfigEUTRA ::=            SEQUENCE {
    filterCoefficientRSRP              FilterCoefficient
        DEFAULT fc4,
    filterCoefficientRSRQ              FilterCoefficient
        DEFAULT fc4
}
QuantityConfigEUTRA-v1250 ::=      SEQUENCE {
    filterCoefficientCSI-RSRP-         FilterCoefficient
        OPTIONAL   -- Need OR
}
QuantityConfigEUTRA-v1310 ::=      SEQUENCE {
    filterCoefficientRS-SINR-          FilterCoefficient
        DEFAULT fc4
}
QuantityConfigUTRA ::=             SEQUENCE {
    measQuantityUTRA-FDD               ENUMERATED {cpich-RSCP,
                                                   cpich-EcN0},
    measQuantityUTRA-TDD               ENUMERATED {pccpch-RSCP},
    filterCoefficient                  FilterCoefficient
        DEFAULT fc4
}
QuantityConfigUTRA-v1020 ::=       SEQUENCE {
    filterCoefficient2-FDD-r10         FilterCoefficient
        DEFAULT fc4
}
QuantityConfigGERAN ::=            SEQUENCE {
    measQuantityGERAN                  ENUMERATED {rssi},
    filterCoefficient                  FilterCoefficient
        DEFAULT fc2
}
QuantityConfigCDMA2000 ::=         SEQUENCE {
    measQuantityCDMA2000               ENUMERATED {pilotStrength,
pilotPnPhaseAndPilotStrength}
}
QuantityConfigNR- ::=              SEQUENCE {
    measQuantityNR-                    ENUMERATED {rssiNR},
    filterCoefficient-                 FilterCoefficient
        DEFAULT fc4
}
-- ASN1STOP
```

TABLE 14

QuantityConfig field descriptions filterCoefficient2-FDD
Specifies the filtering coefficient used for the UTRAN FDD measurement quantity, which is not included in measQuantityUTRA-FDD, when reportQuantityUTRA-FDD is present in ReportConfigInterRAT.
filterCoefficientCSI-RSRP
Specifies the filtering coefficient used for CSI-RSRP.
filterCoefficientRSRP
Specifies the filtering coefficient used for RSRP.
filterCoefficientRSRQ
Specifies the filtering coefficient used for RSRQ.
filterCoefficientRS-SINR
Specifies the filtering coefficient used for RS-SINR.
measQuantityCDMA2000
Measurement quantity used for CDMA2000 measurements. pilotPnPhaseAndPilotStrength is only applicable for MeasObjectCDMA2000 of cdma2000-Type = type1XRTT.
measQuantityGERAN
Measurement quantity used for GERAN measurements.
measQuantityUTRA
Measurement quantity used for UTRA measurements.
measQuantityNR
Measurement quantity used for NR measurements.
quantityConfigCDMA2000
Specifies quantity configurations for CDMA2000 measurements.
quantityConfigEUTRA
Specifies filter configurations for E-UTRA measurements.
quantityConfigGERAN
Specifies quantity and filter configurations for GERAN measurements.
quantityConfigUTRA TABLE 14-continued QuantityConfig field descriptions Specifies quantity and filter configurations for UTRA measurements. Field quantityConfigUTRA-v1020 is applicable only when reportQuantityUTRA-FDD is configured.
quantityConfigNR
Specifies quantity and filter configurations for NR measurements.

The IE ReportConfigInterRAT specifies criteria for triggering of an inter-RAT measurement reporting event. Listing (16) provides an example of the ReportConfigInterRAT information element.

The inter-RAT measurement reporting events for UTRAN, GERAN and CDMA2000 are labelled BN with N equal to 1, 2 and so on. The inter-RAT measurement reporting events for NR are labelled WN with N equal to 1, 2 and so on.

Event B1: Neighbor becomes better than absolute threshold;

Event B2: PCell becomes worse than absolute threshold1 AND Neighbor becomes better than another absolute threshold2.

Event N1: NR becomes better than a threshold;

Event N2: All NR inside NR mobility set become worse than a threshold1 and an NR outside NR mobility set becomes better than a threshold2;

Event N3: All NR inside NR mobility set become worse than a threshold.

The b1 and b2 event thresholds for CDMA2000 are the CDMA2000 pilot detection thresholds are expressed as an unsigned binary number equal to $[-2 \times 10 \log 10\ E_c/I_o]$ in units of 0.5 dB, see C.S0005 [25] for details.

Listing (16)

```
-- ASN1START
ReportConfigInterRAT ::=        SEQUENCE {
    triggerType                     CHOICE {
        event                           SEQUENCE {
            eventId                         CHOICE {
                eventB1                         SEQUENCE {
                    b1-Threshold                    CHOICE {
                        b1-ThresholdUTRA                ThresholdUTRA,
                        b1-ThresholdGERAN               ThresholdGERAN,
                        b1-ThresholdCDMA2000            Threshold-
                                                        CDMA2000
                    }
                },
                eventB2                         SEQUENCE {
                    b2-Threshold1                   ThresholdEUTRA,
                    b2-Threshold2                   CHOICE {
                        b2-Threshold2UTRA               ThresholdUTRA,
                        b2-Threshold2GERAN
ThresholdGERAN,
                        b2-Threshold2CDMA2000
ThresholdCDMA2000
                    }
                },
                ...,
                eventN1-                        SEQUENCE {
                    N1-Threshold-                   NR-RSSI-Range-
                },
                eventN2-                        SEQUENCE {
                    N2-Threshold1-                  NR-RSSI-Range-,
                    N2-Threshold2-                  NR-RSSI-Range-
                },
                eventN3-                        SEQUENCE {
                    N3-Threshold-                   NR-RSSI-Range-
                }
            },
```

-continued

Listing (16)

```
      hysteresis                        Hysteresis,
      timeToTrigger                     TimeToTrigger
    },
    periodical                          SEQUENCE {
      purpose                             ENUMERATED {
                                            reportStrongestCells,
                                            reportStrongestCellsForSON,
                                            reportCGI}
    }
  },
  maxReportCells                        INTEGER (1..maxCellReport),
  reportInterval                        ReportInterval,
  reportAmount                          ENUMERATED {r1, r2, r4, r8,
                                          r16, r32, r64, infinity},
  . . . ,
  [[ si-RequestForHO-r9                 ENUMERATED {setup}
     OPTIONAL -- Cond reportCGI
  ]],
  [[ reportQuantityUTRA-FDD-r10         ENUMERATED {both}
     OPTIONAL -- Need OR
  ]],
  [[ includeLocationInfo-               BOOLEAN
       OPTIONAL -- Need ON
  ]],
  [[ b2-Threshold1-v1250                CHOICE {
       release                            NULL,
       setup                              RSRQ-Range-v1250
     } OPTIONAL    -- Need ON
  ]],
  [[ reportQuantityNR-                  ReportQuantityNR-
       OPTIONAL -- Need ON
  ]]
}
ThresholdUTRA ::=                       CHOICE{
  utra-RSCP                               INTEGER (-5..91),
  utra-EcN0                               INTEGER (0..49)
}
ThresholdGERAN ::=                      INTEGER (0..63)
ThresholdCDMA2000 ::=                   INTEGER (0..63)
ReportQuantityNR- ::=       SEQUENCE {
  bandRequestNR-                        ENUMERATED {true}
    OPTIONAL, -- Need OR
  carrierInfoRequestNR-                 ENUMERATED {true}
    OPTIONAL, -- Need OR
  availableAdmissionCapacityRequestNR-  ENUMERATED {true}
    OPTIONAL, -- Need ON
  backhaulDL-BandwidthRequestNR-        ENUMERATED {true}
    OPTIONAL, -- Need OR
  backhaulUL-BandwidthRequestNR-        ENUMERATED {true}
    OPTIONAL, -- Need OR
  channelUtilizationRequestNR-          ENUMERATED {true}
    OPTIONAL, -- Need OR
  stationCountRequestNR-                ENUMERATED {true}
    OPTIONAL , -- Need OR
  . . .
}
-- ASN1STOP
```

TABLE 15

ReportConfigInterRAT field descriptions availableAdmissionCapacityRequestNR
The value true indicates that the UE shall include, if available, NR Available Admission Capacity in measurement reports.
backhaulDL-BandwidthRequestNR
The value true indicates that the UE shall include, if available, NR Backhaul Downlink Bandwidth in measurement reports.
backhaulUL-BandwidthRequestNR
The value true indicates that the UE shall include, if available, NR Backhaul Uplink Bandwidth in measurement reports.
bandRequestNR
The value true indicates that the UE shall include NR band in measurement reports.

TABLE 15-continued

ReportConfigInterRAT field descriptions bN-ThresholdM
Threshold to be used in inter RAT measurement report triggering condition for event number bN. If multiple thresholds are defined for event number bN, the thresholds are differentiated by M.
carrierInfoRequestNR
The value true indicates that the UE shall include, if available, NR Carrier Information in measurement reports.
channelUtilizationRequest-NR
The value true indicates that the UE shall include, if available, NR Channel Utilization in measurement reports.
eventId
Choice of inter-RAT event triggered reporting criteria.
maxReportCells
Max number of cells, excluding the serving cell, to include in the measurement report. In case purpose is set to reportStrongestCellsForSON only value 1 applies. For inter-RAT NR, it is the maximum number of NRs to include in the measurement report.
availableAdmissionCapacityRequestNR
The value true indicates that the UE shall include, if available, NR Available Admission Capacity in measurement reports.
backhaulDL-BandwidthRequestNR
The value true indicates that the UE shall include, if available, NR Backhaul Downlink Bandwidth in measurement reports.
backhaulUL-BandwidthRequestNR
The value true indicates that the UE shall include, if available, NR Backhaul Uplink Bandwidth in measurement reports.
bandRequestNR
The value true indicates that the UE shall include NR band in measurement reports.
Purpose
reportStrongestCellsForSON applies only in case reportConfig is linked to a measObject set to measObjectUTRA or measObjectCDMA2000.
reportAmount
Number of measurement reports applicable for triggerType event as well as for triggerType periodical. In case purpose is set to reportCGI or reportStrongestCellsForSON only value 1 applies.
reportQuantityUTRA-FDD
The quantities to be included in the UTRA measurement report. The value both means that both the cpich Received Signal Code Power (RSCP) and cpich EcN0 quantities are to be included in the measurement report.
si-RequestForHO
The field applies to the reportCGI functionality, and when the field is included, the UE is allowed to use autonomous gaps in acquiring system information from the neighbor cell, applies a different value for T321, and includes different fields in the measurement report.
availableAdmissionCapacityRequestNR
The value true indicates that the UE shall include, if available, NR Available Admission Capacity in measurement reports.
backhaulDL-BandwidthRequestNR
The value true indicates that the UE shall include, if available, NR Backhaul Downlink Bandwidth in measurement reports.
backhaulUL-BandwidthRequestNR
The value true indicates that the UE shall include, if available, NR Backhaul Uplink Bandwidth in measurement reports.
bandRequestNR
The value true indicates that the UE shall include NR band in measurement reports.
stationCountRequestNR
The value true indicates that the UE shall include, if available, NR Station Count in measurement reports.
b1-ThresholdGERAN, b2-Threshold2GERAN
The actual value is field value - 110 dBm.
b1-ThresholdUTRA, b2-Threshold2UTRA utra-RSCP corresponds to CPICH_RSCP in TS 25.133 [29] for FDD and P-CCPCH_RSCP in TS 25.123 [30] for TDD. utra-EcN0 corresponds to CPICH_Ec/No in TS 25.133 [29] for FDD, and is not applicable for TDD.
For utra-RSCP: The actual value is field value - 115 dBm.
For utra-EcN0: The actual value is (field value - 49)/2 dB.

TABLE 15-continued

ReportConfigInterRAT field descriptions timeToTrigger
Time during which specific criteria for the event needs to be met in order to trigger a measurement report.

TABLE 16

| Conditional presence | Explanation |
|---|---|
| reportCGI | The field is optional, need OR, in case purpose is included and set to reportCGI; otherwise the field is not present and the UE shall delete any existing value for this field. |

The IE NR-Carrierinfo is used to identify the NR frequency band information. Listing (17) provides an example of the NR-Carrierinfo information element.

Listing (17)

```
-- ASN1START
NR-CarrierInfo- ::=      SEQUENCE {
    operatingClass-      INTEGER (0..255)
        OPTIONAL,        -- Need ON
    countryCode-         ENUMERATED {unitedStates, europe, japan, global, ... }
        OPTIONAL,        -- Need ON
    channelNumbers-      NR-ChannelList-
        OPTIONAL,        -- Need ON
    ...
}
NR-ChannelList- ::= SEQUENCE (SIZE (1..maxNR-Channels-)) OF NR-Channel-
NR-Channel- ::=     INTEGER(0..255)
-- ASN1STOP
```

TABLE 17

NR-CarrierInfo field descriptions channelNumbers
Indicates the NR channels.
countryCode
Indicates the country code of NR
operatingClass
Indicates the Operating Class of NR The IE NR-RSSI-Range specifies the value range used in NR RSSI measurements and thresholds. Integer value for NR RSSI measurements. Listing (18) provides an example of the NR-RSSI-Range information element.

Listing (18)

```
-- ASN1START
NR-RSSI-Range- ::=       INTEGER(0..141)
-- ASN1STOP
```

The IE NR-Status indicates the current status of NR connection. Listing (19) provides an example of the NR-Status information element.

Listing (19)

```
-- ASN1START
NR-Status- ::=       ENUMERATED {successfulAssociation,
    failureNRRadioLink, failureNRUnavailable, failureTimeout}
-- ASN1STOP
```

The IE RAT-Type is used to indicate the radio access technology (RAT), including E-UTRA, of the requested/transferred UE capabilities. Listing (20) provides an example of the RAT-Type information element.

Listing (20)

```
-- ASN1START
RAT-Type ::=         ENUMERATED {
                     eutra, utra, geran-cs, geran-ps, cdma2000-
                     1XRTT, 5GNR, spare3, spare2, spare1, ...}
-- ASN1STOP
```

The IE UE-EUTRA-Capability is used to convey the E-UTRA UE Radio Access Capability Parameters, see TS 36.306 [5], and the Feature Group Indicators for mandatory features (defined in Annexes B.1 and C.1) to the network. The IE UE-EUTRA-Capability is transferred in E-UTRA or in another RAT.

NOTE 0: For (UE capability specific) guidelines on the use of keyword OPTIONAL, see Annex A.3.5. Listing (21) provides an example of the UE-EUTRA-Capability information element.

TABLE 18

| UE-EUTRA-Capability field descriptions | FDD/TDD diff |
|---|---|
| accessStratumRelease<br>Set to rel13 in this version of the specification. | — |
| additionalRx-Tx-PerformanceReq<br>Indicates whether the UE supports the additional Rx and Tx performance requirement for a given band combination as specified in TS 36.101 [42]. | — |
| alternativeTBS-Indices<br>Indicates whether the UE supports alternative Transport Block Size (TBS) indices for $I_{TBS}$ 26 and 33 as specified in TS 36.213 [23]. | — |
| alternativeTimeToTrigger<br>Indicates whether the UE supports alternativeTimeToTrigger. | No |
| aperiodicCSI-Reporting<br>Indicates whether the UE supports aperiodic CSI reporting with 3 bits of the CSI request field size as specified in TS 36.213 [23, 7.2.1] and/or aperiodic CSI reporting mode 1-0 and mode 1-1 as specified in TS 36.213 [23, 7.2.1]. The first bit is set to "1" if the UE supports the aperiodic CSI | No |

TABLE 18-continued

| UE-EUTRA-Capability field descriptions | FDD/TDD diff |
|---|---|
| reporting with 3 bits of the CSI request field size. The second bit is set to "1" if the UE supports the aperiodic CSI reporting mode 1-0 and mode 1-1. | |
| bandCombinationListEUTRA<br>One entry corresponding to each supported band combination listed in the same order as in supportedBandCombination. | — |
| BandCombinationParameters-v1090<br>If included, the UE shall include the same number of entries, and listed in the same order, as in BandCombinationParameters-r10. | — |
| BandCombinationParameters-v1130<br>The field is applicable to each supported CA bandwidth class combination (i.e. CA configuration in TS 36.101 [42, Section 5.6A.1]) indicated in the corresponding band combination. If included, the UE shall include the same number of entries, and listed in the same order, as in BandCombinationParameters-r10. | — |
| bandEUTRA<br>E-UTRA band as defined in TS 36.101 [42]. In case the UE includes bandEUTRA-v9e0 or bandEUTRA-v1090, the UE shall set the corresponding entry of bandEUTRA (i.e. without suffix) or bandEUTRA-r10 respectively to maxFBI. | — |
| bandListEUTRA<br>One entry corresponding to each supported E-UTRA band listed in the same order as in supportedBandListEUTRA. | — |
| bandParametersUL, bandParametersDL<br>Indicates the supported parameters for the band. UE shall indicate parameters for only one CA uplink or downlink bandwidth class in a single band entry for one band combination entry. | — |
| beamformed (in MIMO-CA-ParametersPerBoBCPerTM)<br>If signaled, the field indicates for a particular transmission mode, the UE capabilities concerning beamformed Elevation Beamforming (EBF)/Full-Dimension (FD) - Multiple-Input Multiple-Output (MIMO) operation (class B) applicable for the concerned band combination. | — |
| beamformed (in MIMO-UE-ParametersPerTM)<br>Indicates for a particular transmission mode, the UE capabilities concerning beamformed EBF/FD-MIMO operation (class B) applicable for band combinations for which the concerned capabilities are not signaled. | TBD |
| benefitsFromInterruption<br>Indicates whether the UE power consumption would benefit from being allowed to cause interruptions to serving cells when performing measurements of deactivated SCell carriers for measCycleSCell of less than 640 ms, as specified in TS 36.133 [16]. | No |
| ce-ModeA, ce-ModeB<br>Indicates whether the UE supports operation in CE mode A and/or B, as specified in TS 36.211 [21] and TS 36.213 [23]. | — |
| CA-BandwidthClass<br>The CA bandwidth class supported by the UE as defined in TS 36.101 [42, Table 5.6A-1].<br>The UE explicitly includes all the supported CA bandwidth class combinations in the band combination signalling. Support for one CA bandwidth class does not implicitly indicate support for another CA bandwidth class. | — |
| cdma2000-NW-Sharing<br>Indicates whether the UE supports network sharing for CDMA2000. | — |
| channelMeasRestriction<br>Indicates for a particular transmission mode whether the UE supports channel measurement restriction. | TBD |
| codebook-HARQ-ACK<br>Indicates whether the UE supports determining HARQ ACK codebook size based on the Downlink Assignment Index (DAI)-based solution and/or the number of configured CCs. The first bit is set to "1" if the UE supports the DAI-based codebook size determination. The second bit is set to "1" if the UE supports the codebook determination based on the number of configured CCs. | No |
| commMultipleTx<br>Indicates whether the UE supports multiple transmissions of sidelink communication to different destinations in one SC period. If commMultipleTx-r-13 is set to supported then the UE support 8 transmitting sidelink processes. | — |
| commSimultaneousTx<br>Indicates whether the UE supports simultaneous transmission of EUTRA and sidelink communication (on different carriers) in all bands for which the UE indicated sidelink support in a band combination (using commSupportedBandsPerBC). | — |
| commSupportedBands<br>Indicates the bands on which the UE supports sidelink communication, by an independent list of bands i.e. separate from the list of supported E UTRA band, as indicated in supportedBandListEUTRA. | — |

TABLE 18-continued

| UE-EUTRA-Capability field descriptions | FDD/ TDD diff |
|---|---|
| commSupportedBandsPerBC<br>Indicates, for a particular band combination, the bands on which the UE supports simultaneous reception of EUTRA and sidelink communication. If the UE indicates support simultaneous transmission (using commSimultaneousTx), it also indicates, for a particular band combination, the bands on which the UE supports simultaneous transmission of EUTRA and sidelink communication. The first bit refers to the first band included in commSupportedBands, with value 1 indicating sidelink is supported. | — |
| configN (in MIMO-CA-ParametersPerBoBCPerTM)<br>If signaled, the field indicates for a particular transmission mode whether the UE supports non-precoded EBF/FD-MIMO (class A) related configuration N for the concerned band combination. | — |
| configN (in MIMO-UE-ParametersPerTM)<br>Indicates for a particular transmission mode whether the UE supports non-precoded EBF/FD-MIMO (class A) related configuration N for band combinations for which the concerned capabilities are not signaled. | TBD |
| crossCarrierScheduling | Yes |
| crossCarrierScheduling-B5C<br>Indicates whether the UE supports cross carrier scheduling beyond 5 DL CCs. | No |
| crossCarrierSchedulingLAA-DL<br>Indicates whether the UE supports cross-carrier scheduling from a licensed carrier for license-assisted access (LAA) cell(s) for downlink. This field can be included only if downlinkLAA is included. | — |
| crs-DiscoverySignalsMeas<br>Indicates whether the UE supports CRS based discovery signals measurement, and PDSCH/enhanced PDCCH (EPDCCH) RE mapping with zero power CSI-RS configured for discovery signals. | FFS |
| crs-InterfHandl<br>Indicates whether the UE supports CRS interference handling. | No |
| crs-InterfMitigationTM10<br>The field defines whether the UE supports CRS interference mitigation in transmission mode 10. | — |
| csi-RS-DiscoverySignalsMeas<br>Indicates whether the UE supports CSI-RS based discovery signals measurement. If this field is included, the UE shall also include crs-DiscoverySignalsMeas. | FFS |
| csi-RS-DRS-RRM-MeasurementsLAA<br>Indicates whether the UE supports performing RRM measurements on LAA cell(s) based on CSI-RS-based discovery reference signal (DRS). This field can be included only if downlinkLAA is included. | — |
| csi-RS-EnhancementsTDD<br>Indicates for a particular transmission mode whether the UE supports CSI-RS enhancements applicable for TDD. | No |
| csi-SubframeSet<br>Indicates whether the UE supports REL-12 DL CSI subframe set configuration, REL-12 DL CSI subframe set dependent CSI measurement/feedback, configuration of up to 2 CSI-Interference Measurement (CSI-IM) resources for a CSI process with no more than 4 CSI-IM resources for all CSI processes of one frequency if the UE supports tm10, configuration of two ZP-CSI-RS for tm1 to tm9, PDSCH RE mapping with two ZP-CSI-RS configurations, and EPDCCH RE mapping with two ZP-CSI-RS configurations if the UE supports EPDCCH. This field is only applicable for UEs supporting TDD. | — |
| dc-Support<br>Including this field indicates that the UE supports synchronous dual connectivity (DC) and power control mode 1. Including this field for a band combination entry comprising of single band entry indicates that the UE supports intra-band contiguous DC. Including this field for a band combination entry comprising of two or more band entries, indicates that the UE supports DC for these bands and that the serving cells corresponding to a band entry shall belong to one cell group (i.e. MCG or SC). Including field asynchronous indicates that the UE supports asynchronous DC and power control mode 2. Including this field for a TDD/FDD band combination indicates that the UE supports TDD/FDD DC for this band combination. | — |
| deviceType<br>UE may set the value to "noBenFromBatConsumpOpt" when it does not foresee to particularly benefit from network (NW)-based battery consumption optimization. Absence of this value means that the device does benefit from NW-based battery consumption optimization. | — |
| differentFallbackSupported<br>Indicates that the UE supports different capabilities for at least one fallback case of this band combination. | — |
| discInterFreqTx<br>Indicates whether the UE support sidelink discovery announcements either a) on the primary frequency only or b) on other frequencies also, regardless | — |

TABLE 18-continued

| UE-EUTRA-Capability field descriptions | FDD/TDD diff |
|---|---|
| of the UE configuration (e.g. CA, DC). The UE may set discInterFreqTx to supported when having a separate transmitter or if it can request sidelink discovery transmission gaps. | |
| discoverySignalsInDeactSCell<br>Indicates whether the UE supports the behavior on DL signals and physical channels when SCell is deactivated and discovery signals measurement is configured as specified in TS 36.211 [21, 6.11A]. This field is included only if UE supports carrier aggregation and includes crs-DiscoverySignalsMeas. | FFS |
| discPeriodicSLSS<br>Indicates whether the UE supports periodic (i.e. not just one time before sidelink discovery announcement) Sidelink Synchronization Signal (SLSS) transmission and reception for sidelink discovery. | — |
| discScheduledResourceAlloc<br>Indicates whether the UE supports transmission of discovery announcements based on network scheduled resource allocation. | — |
| disc-UE-SelectedResourceAlloc<br>Indicates whether the UE supports transmission of discovery announcements based on UE autonomous resource selection. | — |
| disc-SLSS<br>Indicates whether the UE supports Sidelink Synchronization Signal (SLSS) transmission and reception for sidelink discovery. | — |
| discSupportedBands<br>Indicates the bands on which the UE supports sidelink discovery. One entry corresponding to each supported E UTRA band, listed in the same order as in supportedBandListEUTRA. | — |
| discSupportedProc<br>Indicates the number of processes supported by the UE for sidelink discovery. | — |
| discSysInfoReporting<br>Indicates whether the UE supports reporting of system information for inter-frequency/PLMN sidelink discovery. | — |
| dl-256QAM<br>Indicates whether the UE supports 256QAM in DL on the band. | — |
| dmrs-Enhancements (in MIMO-CA-ParametersPerBoBCPerTM)<br>If signaled, the field indicates for a particular transmission mode, that for the concerned band combination the demodulation reference signal (DMRS) enhancements are different than the value indicated by field dmrs-Enhancements in MIMO-UE-ParametersPerTM. | — |
| dmrs-Enhancements (in MIMO-UE-ParametersPerTM)<br>Indicates for a particular transmission mode whether the UE supports DMRS enhancements for the indicated transmission mode. | TBD |
| downlinkLAA<br>Presence of the field indicates that the UE supports downlink LAA operation including identification of downlink transmissions on LAA cell(s) for full downlink subframes, decoding of common downlink control signaling on LAA cell(s), CSI feedback for LAA cell(s), RRM measurements on LAA cell(s) based on CRS-based DRS. | — |
| drb-TypeSCG<br>Indicates whether the UE supports SC bearer. | — |
| drb-TypeSplit<br>Indicates whether the UE supports split bearer except for PDCP data transfer in UL. | — |
| dtm<br>Indicates whether the UE supports Dual Transfer Mode (DTM) in GERAN. | — |
| e-CSFB-1XRTT<br>Indicates whether the UE supports enhanced CS fallback to CDMA2000 1xRTT or not. | Yes |
| e-CSFB-ConcPS-Mob1XRTT<br>Indicates whether the UE supports concurrent enhanced CS fallback to CDMA2000 1xRTT and Packet Switched (PS) handover/redirection to CDMA2000 HRPD. | Yes |
| e-CSFB-dual-1XRTT<br>Indicates whether the UE supports enhanced CS fallback to CDMA2000 1xRTT for dual Rx/Tx configuration. This bit can only be set to supported if tx-Config1XRTT and rx-Config1XRTT are both set to dual. | Yes |
| e-HARQ-Pattern-FDD<br>Indicates whether the UE supports enhanced HARQ pattern for Transmission Time Interval (TTI) bundling operation for FDD. | — |
| endingDwPTS<br>Indicates whether the UE supports reception ending with a subframe occupied for a DwPTS-duration as described in TS 36.211 [21] and TS 36.213 [23]. This field can be included only if downlinkLAA is included. | — |
| Enhanced-4TxCodebook<br>Indicates whether the UE supports enhanced 4Tx codebook. | No |

TABLE 18-continued

| UE-EUTRA-Capability field descriptions | FDD/TDD diff |
|---|---|
| enhancedDualLayerTDD<br>Indicates whether the UE supports enhanced dual layer (PDSCH transmission mode 8) for TDD or not. | — |
| ePDCCH<br>Indicates whether the UE can receive Downlink Control Information (DCI) on UE specific search space on Enhanced PDCCH. | Yes |
| e-RedirectionUTRA | Yes |
| e-RedirectionUTRA-TDD<br>Indicates whether the UE supports enhanced redirection to UTRA TDD to multiple carrier frequencies both with and without using related System Information Block (SIB) provided by RRCConnectionRelease or not. | Yes |
| extendedFreqPriorities<br>Indicates whether the UE supports extended E-UTRA frequency priorities indicated by cellReselectionSubPriority field. | — |
| extendedLongDRX<br>Indicates whether the UE supports extended long discontinuous reception (DRX) cycle values of 5.12s and 10.24s in RRC_CONNECTED. | — |
| extendedMaxMeasId<br>Indicates whether the UE supports extended number of measurement identities as defined by maxMeasId-. | No |
| extendedMaxObjectId<br>Indicates whether the UE supports extended number of measurement object identities as defined by maxObjectId-. | No |
| extended-RLC-LI-Field<br>Indicates whether the UE supports 15 bit RLC length indicator. | — |
| extendedRLC-SN-SO-Field<br>Indicates whether the UE supports 16 bits of RLC sequence number and segmentation offset. | — |
| extendedRSRQ-LowerRange<br>Indicates whether the UE supports the extended RSRQ lower value range from −34 dB to −19.5 dB in measurement configuration and reporting as specified in TS 36.133 [16]. | No |
| fdd-HARQ-TimingTDD<br>Indicates whether UE supports FDD HARQ timing for TDD SCell when configured with TDD PCell. | — |
| featureGroupIndicators, featureGroupIndRel9Add, featureGroupIndRel10<br>The definitions of the bits in the bit string are described in Annex B.1 (for featureGroupIndicators and featureGroupIndRel9Add) and in Annex C.1.(for featureGroupIndRel10) | Yes |
| fourLayerTM3-TM4<br>Indicates whether the UE supports 4-layer spatial multiplexing for TM3 and TM4. | — |
| fourLayerTM3-TM4-perCC<br>Indicates whether the UE supports 4-layer spatial multiplexing for TM3 and TM4 for the component carrier. | — |
| freqBandPriorityAdjustment<br>Indicates whether the UE supports the prioritization of frequency bands in multiBandInfoList over the band in freqBandIndicator as defined by freqBandIndicatorPriority-. | — |
| freqBandRetrieval<br>Indicates whether the UE supports reception of requestedFrequencyBands. | — |
| halfDuplex<br>If halfDuplex is set to true, only half duplex operation is supported for the band, otherwise full duplex operation is supported. | — |
| incMonEUTRA<br>Indicates whether the UE supports increased number of E-UTRA carrier monitoring in RRC_IDLE and RRC_CONNECTED, as specified in TS 36.133 [16]. | No |
| incMonUTRA<br>Indicates whether the UE supports increased number of UTRA carrier monitoring in RRC_IDLE and RRC_CONNECTED, as specified in TS 36.133 [16]. | No |
| inDeviceCoexInd<br>Indicates whether the UE supports in-device coexistence indication as well as autonomous denial functionality. | Yes |
| inDeviceCoexInd-UL-CA<br>Indicates whether the UE supports UL CA related in-device coexistence indication. This field can be included only if inDeviceCoexInd is included. The UE supports inDeviceCoexInd-UL-CA in the same duplexing modes as it supports inDeviceCoexInd. | — |
| interBandTDD-CA-WithDifferentConfig<br>Indicates whether the UE supports inter-band TDD carrier aggregation with different UL/DL configuration combinations. The first bit indicates UE supports the configuration combination of SCell DL subframes are a subset of PCell and PSCell by SIB1 configuration and the configuration combination of SCell DL subframes are a superset of PCell and PSCell by | — |

TABLE 18-continued

| UE-EUTRA-Capability field descriptions | FDD/TDD diff |
|---|---|
| SIB1 configuration; the second bit indicates UE supports the configuration combination of SCell DL subframes are neither superset nor subset of PCell and PSCell by SIB1 configuration. This field is included only if UE supports inter-band TDD carrier aggregation. | |
| interferenceMeasRestriction | TBD |
| Indicates whether the UE supports interference measurement restriction. | |
| interFreqBandList | — |
| One entry corresponding to each supported E-UTRA band listed in the same order as in supportedBandListEUTRA. | |
| interFreqNeedForGaps | — |
| Indicates need for measurement gaps when operating on the E-UTRA band given by the entry in bandListEUTRA or on the E-UTRA band combination given by the entry in bandCombinationListEUTRA and measuring on the E-UTRA band given by the entry in interFreqBandList. | |
| interFreqProximityIndication | — |
| Indicates whether the UE supports proximity indication for inter-frequency E-UTRAN CSG member cells. | |
| interFreqRSTD-Measurement | Yes |
| Indicates whether the UE supports inter-frequency RSTD measurements for OTDOA positioning [54]. | |
| interFreqSI-AcquisitionForHO | Yes |
| Indicates whether the UE supports, upon configuration of si-RequestForHO by the network, acquisition and reporting of relevant information using autonomous gaps by reading the System Information (SI) from a neighboring inter-frequency cell. | |
| interRAT-BandList | — |
| One entry corresponding to each supported band of another RAT listed in the same order as in the interRAT-Parameters. | |
| interRAT-NeedForGaps | — |
| Indicates need for DL measurement gaps when operating on the E-UTRA band given by the entry in bandListEUTRA or on the E-UTRA band combination given by the entry in bandCombinationListEUTRA and measuring on the inter-RAT band given by the entry in the interRAT-BandList. | |
| interRAT-ParametersNR | — |
| Indicates whether the UE supports NR measurements configured by MeasObjectNR with corresponding quantity and report configuration in the supported NR bands. | |
| interRAT-PS-HO-ToGERAN | Yes |
| Indicates whether the UE supports inter-RAT PS handover to GERAN or not. | |
| intraBandContiguousCC-InfoList | — |
| Indicates, per serving carrier of which the corresponding bandwidth class includes multiple serving carriers (i.e. bandwidth class B, C, D and so on), the maximum number of supported layers for spatial multiplexing in DL and the maximum number of CSI processes supported. The number of entries is equal to the number of component carriers in the corresponding bandwidth class. The UE shall support the setting indicated in each entry of the list regardless of the order of entries in the list. The UE shall include the field only if it supports 4-layer spatial multiplexing in transmission mode3/4 for a subset of component carriers in the corresponding bandwidth class, or if the maximum number of supported layers for at least one component carrier is higher than supportedMIMO-CapabilityDL-r10 in the corresponding bandwidth class, or if the number of CSI processes for at least one component carrier is higher than supportedCSI-Proc- in the corresponding band. | |
| intraFreqA3-CE-ModeA | — |
| Indicates whether the UE when operating in CE Mode A supports eventA3 for intra-frequency neighboring cells. | |
| intraFreqA3-CE-ModeB | — |
| Indicates whether the UE when operating in CE Mode B supports eventA3 for intra-frequency neighboring cells. | |
| intraFreq-CE-NeedForGaps | |
| Indicates need for measurement gaps when operating in CE on the E-UTRA band given by the entry in supportedBandListEUTRA. | |
| intraFreqHO-CE-ModeA | — |
| Indicates whether the UE when operating in CE Mode A supports intra-frequency handover. | |
| intraFreqHO-CE-ModeB | — |
| Indicates whether the UE when operating in CE Mode B supports intra-frequency handover. | |
| intraFreqProximityIndication | — |
| Indicates whether the UE supports proximity indication for intra-frequency E-UTRAN CSG member cells. | |
| intraFreqSI-AcquisitionForHO | Yes |
| Indicates whether the UE supports, upon configuration of si-RequestForHO by the network, acquisition and reporting of relevant information using | |

TABLE 18-continued

| UE-EUTRA-Capability field descriptions | FDD/ TDD diff |
|---|---|
| autonomous gaps by reading the SI from a neighboring intra-frequency cell. | |
| k-Max (in MIMO-CA-ParametersPerBoBCPerTM) If signaled, the field indicates for a particular transmission mode the maximum number of non-zero power (NZP) CSI RS resource configurations supported within a CSI process applicable for the concerned band combination. | — |
| k-Max (in MIMO-UE-ParametersPerTM) Indicates for a particular transmission mode the maximum number of NZP CSI RS resource configurations supported within a CSI process applicable for band combinations for which the concerned capabilities are not signaled. | TBD |
| loggedMBSFNMeasurements Indicates whether the UE supports logged measurements for Multimedia Broadcast Single Frequency Network (MBSFN). A UE indicating support for logged measurements for MBSFN shall also indicate support for logged measurements in Idle mode. | — |
| loggedMeasurementsIdle Indicates whether the UE supports logged measurements in Idle mode. | — |
| logicalChannelSR-ProhibitTimer Indicates whether the UE supports the logicalChannelSR-ProhibitTimer as defined in TS 36.321 [6]. | — |
| longDRX-Command Indicates whether the UE supports Long DRX Command MAC Control Element. | — |
| NRA Indicates whether the UE supports LTE-NR Aggregation (NRA). | — |
| NRA-BufferSize Indicates whether the UE supports the layer 2 buffer sizes for "with support for split bearers" for NRA. | — |
| NRA-SplitBearer Indicates whether the UE supports the split NRA bearer. | — |
| LNRIP Indicates whether the UE supports LTE/NR Radio Level Integration with IPsec Tunnel (LNRIP). | — |
| maximumCCsRetrieval Indicates whether UE supports reception of requestedMaxCCsDL and requestedMaxCCsUL. | — |
| maxNumberDecoding Indicates the maximum number of blind decodes in UE-specific search space per UE in one subframe for CA with more than 5 CCs as defined in TS 36.213 [23] which is supported by the UE. The number of blind decodes supported by the UE is the field value * 32. Only values 5 to 32 can be used in this version of the specification. | No |
| maxNumberROHC-ContextSessions Set to the maximum number of concurrently active robust header compression (ROHC) contexts supported by the UE, excluding context sessions that leave all headers uncompressed. cs2 corresponds with 2 (context sessions), cs4 corresponds with 4 and so on. The network ignores this field if the UE supports none of the ROHC profiles in supportedROHC-Profiles. | — |
| maxNumberUpdatedCSI-Proc Indicates the maximum number of CSI processes to be updated across CCs. | No |
| mbms-AsyncDC Indicates whether the UE in RRC_CONNECTED supports Multimedia Broadcast and Multicast Service (MBMS) reception via Media Resource Broker (MRB) on a frequency indicated in an MBMSInterestIndication message, where (according to supportedBandCombination) the carriers that are or can be configured as serving cells in the MCG and the SC are not synchronized. If this field is included, the UE shall also include mbms-SCell and mbms-NonServingCell. | TBD |
| mbms-NonServingCell Indicates whether the UE in RRC_CONNECTED supports MBMS reception via MRB on a frequency indicated in an MBMSInterestIndication message, where (according to supportedBandCombination and to network synchronization properties) a serving cell may be additionally configured. If this field is included, the UE shall also include the mbms-SCell field. | Yes |
| mbms-SCell Indicates whether the UE in RRC_CONNECTED supports MBMS reception via MRB on a frequency indicated in an MBMSInterestIndication message, when an SCell is configured on that frequency (regardless of whether the SCell is activated or deactivated). | Yes |
| mfbi-UTRA It indicates if the UE supports the signaling requirements of multiple radio frequency bands in a UTRA FDD cell, as defined in TS 25.307 [65]. | — |
| MIMO-BeamformedCapabilityList A list of pairs of {k-Max, n-MaxList} values with the $n^{th}$ entry indicating | — |

TABLE 18-continued

| UE-EUTRA-Capability field descriptions | FDD/TDD diff |
|---|---|
| the values that the UE supports for each CSI process in case n CSI processes would be configured. | |
| MIMO-CapabilityDL<br>The number of supported layers for spatial multiplexing in DL. The field may be absent for category 0 and category 1 UE in which case the number of supported layers is 1. | — |
| MIMO-CapabilityUL<br>The number of supported layers for spatial multiplexing in UL. Absence of the field means that the number of supported layers is 1. | — |
| MIMO-CA-ParametersPerBoBC<br>A set of MIMO parameters provided per band of a band combination. In case a subfield is absent, the concerned capabilities are the same as indicated at the per UE level (i.e. by MIMO-UE-ParametersPerTM). | — |
| modifiedMPR-Behavior<br>Field encoded as a bit map, where at least one bit N is set to "1" if UE supports modified Maximum Power Reduction (MPR)/A-MPR behavior N, see TS 36.101 [42]. All remaining bits of the field are set to "0". The leading/leftmost bit (bit 0) corresponds to modified MPR/A-MPR behavior 0, the next bit corresponds to modified MPR/A-MPR behavior 1 and so on.<br>Absence of this field means that UE does not support any modified MPR/A-MPR behavior. | — |
| multiACK-CSIreporting<br>Indicates whether the UE supports multi-cell HARQ ACK and periodic CSI reporting and SR on PUCCH format 3. | Yes |
| multiBandInfoReport<br>Indicates whether the UE supports the acquisition and reporting of multi band information for reportCGI. | — |
| multiClusterPUSCH-WithinCC | Yes |
| multiNS-Pmax<br>Indicates whether the UE supports the mechanisms defined for cells broadcasting NS-PmaxList. | — |
| multipleTimingAdvance<br>Indicates whether the UE supports multiple timing advances for each band combination listed in supportedBandCombination. If the band combination comprised of more than one band entry (i.e., inter-band or intra-band non-contiguous band combination), the field indicates that the same or different timing advances on different band entries are supported. If the band combination comprised of one band entry (i.e., intra-band contiguous band combination), the field indicates that the same or different timing advances across component carriers of the band entry are supported. | — |
| naics-Capability-List<br>Indicates that UE supports NAICS, i.e. receiving assistance information from serving cell and using it to cancel or suppress interference of neighboring cell(s) for at least one band combination. If not present, UE does not support NAICS for any band combination. The field numberOfNAICS-CapableCC indicates the number of component carriers where the NAICS processing is supported and the field numberOfAggregatedPRB indicates the maximum aggregated bandwidth across these of component carriers (expressed as a number of PRBs) with the restriction that NAICS is only supported over the full carrier bandwidth. The UE shall indicate the combination of {numberOfNAICS-CapableCC, numberOfNAICS-CapableCC} for every supported numberOfNAICS-CapableCC, e.g. if a UE supports {x CC, y PRBs} and {x-n CC, y-m PRBs} where n>=1 and m>=0, the UE shall indicate both.<br>For numberOfNAICS-CapableCC = 1, UE signals one value for numberOfAggregatedPRB from the range {50, 75, 100};<br>For numberOfNAICS-CapableCC = 2, UE signals one value for numberOfAggregatedPRB from the range {50, 75, 100, 125, 150, 175, 200};<br>For numberOfNAICS-CapableCC = 3, UE signals one value for numberOfAggregatedPRB from the range {50, 75, 100, 125, 150, 175, 200, 225, 250, 275, 300};<br>For numberOfNAICS-CapableCC = 4, UE signals one value for numberOfAggregatedPRB from the range {50, 100, 150, 200, 250, 300, 350, 400};<br>For numberOfNAICS-CapableCC = 5, UE signals one value for numberOfAggregatedPRB from the range {50, 100, 150, 200, 250, 300, 350, 400, 450, 500}. | — |
| n-MaxList (in MIMO-UE-ParametersPerTM)<br>Indicates for a particular transmission mode the maximum number of NZP CSI RS ports supported within a CSI process applicable for band combinations for which the concerned capabilities are not signaled. For k-Max values exceeding 1, the UE shall include the field and signal k-Max minus 1 bits. The first bit indicates n-Max2, with value 0 indicating 8 and value 1 indicating 16. The second bit indicates n-Max3, with value 0 indicating 8 and value 1 indicating 16. The third bit indicates n-Max4, with | TBD |

TABLE 18-continued

| UE-EUTRA-Capability field descriptions | FDD/ TDD diff |
|---|---|
| value 0 indicating 8 and value 1 indicating 32. The fourth bit indicates n-Max5, with value 0 indicating 16 and value 1 indicating 32. The fifth bit indicates n-Max6, with value 0 indicating 16 and value 1 indicating 32. The sixt bit indicates n-Max7, with value 0 indicating 16 and value 1 indicating 32. The seventh bit indicates n-Max8, with value 0 indicating 16 and value 1 indicating 64. | |
| n-MaxList (in MIMO-CA-ParametersPerBoBCPerTM)  If signaled, the field indicates for a particular transmission mode the maximum number of NZP CSI RS ports supported within a CSI process applicable for band the concerned combination. Further details are as indicated for n-MaxList in MIMO-UE-ParametersPerTM. | — |
| NonContiguousUL-RA-WithinCC-List  One entry corresponding to each supported E-UTRA band listed in the same order as in supportedBandListEUTRA. | No |
| nonPrecoded (in MIMO-UE-ParametersPerTM)  Indicates for a particular transmission mode the UE capabilities concerning non-precoded EBF/FD-MIMO operation (class A) for band combinations for which the concerned capabilities are not signaled. | TBD |
| nonPrecoded (in MIMO-CA-ParametersPerBoBCPerTM)  If signaled, the field indicates for a particular transmission mode, the UE capabilities concerning non-precoded EBF/FD-MIMO operation (class A) applicable for the concerned band combination. | — |
| noResourceRestrictionForTTIBundling  Indicate whether the UE supports TTI bundling operation without resource allocation restriction. | — |
| otdoa-UE-Assisted  Indicates whether the UE supports UE-assisted OTDOA positioning [54]. | Yes |
| pdcch-CandidateReductions  Indicates whether the UE supports PDCCH candidate reduction on UE specific search space as specified in TS 36.213 [23, 9.1.1]. | No |
| pdcp-SN-Extension  Indicates whether the UE supports 15 bit length of PDCP sequence number. | — |
| pdcp-SN-Extension-18bits  Indicates whether the UE supports 18 bit length of PDCP sequence number. | — |
| pdcp-TransferSplitUL  Indicates whether the UE supports PDCP data transfer split in UL for the drb-TypeSplit as specified in TS 36.323 [8]. | — |
| pdsch-CollisionHandling  Indicates whether the UE supports PDSCH collision handling as specified in TS 36.213 [23]. | — |
| phy-TDD-ReConfig-FDD-PCell  Indicates whether the UE supports TDD UL/DL reconfiguration for TDD serving cell(s) via monitoring PDCCH with eIMTA-NRTI on a FDD PCell, and HARQ feedback according to UL and DL HARQ reference configurations. This bit can only be set to supported only if the UE supports FDD PCell and phy-TDD-ReConfig-TDD-PCell is set to supported. | — |
| phy-TDD-ReConfig-TDD-PCell  Indicates whether the UE supports TDD UL/DL reconfiguration for TDD serving cell(s) via monitoring PDCCH with eIMTA-NRTI on a TDD PCell, and HARQ feedback according to UL and DL HARQ reference configurations, and PUCCH format 3. | — |
| pmi-Disabling | Yes |
| powerPrefInd  Indicates whether the UE supports power preference indication. | No |
| pucch-Format4  Indicates whether the UE supports PUCCH format 4. | Yes |
| pucch-Format5  Indicates whether the UE supports PUCCH format 5. | Yes |
| pucch-SCell  Indicates whether the UE supports PUCCH on SCell. | No |
| pusch-FeedbackMode  Indicates whether the UE supports PUSCH feedback mode 3-2. | No |
| pusch-SRS-PowerControl-SubframeSet  Indicates whether the UE supports subframe set dependent UL power control for PUSCH and SRS. This field is only applicable for UEs supporting TDD. | — |
| rach-Report  Indicates whether the UE supports delivery of rachReport. | — |
| NRCLNI  Indicates whether the UE supports NRCLNI, i.e. reception of NRCLNI-Configuration. The UE which supports NRCLNI shall also indicate support of interRAT-ParametersNR-. The UE which supports NRCLNI and NR-IW-RAN-Rules shall also support applying NR identifiers received in | — |

TABLE 18-continued

| UE-EUTRA-Capability field descriptions | FDD/TDD diff |
|---|---|
| NRCLNI-Configuration for the access network selection and traffic steering rules when in RRC_IDLE. | |
| reducedIntNonContComb Indicates whether the UE supports receiving requestReducedIntNonContComb that requests the UE to exclude supported intra-band non-contiguous CA band combinations other than included in capability signaling as specified in TS 36.306 [5, 4.3.5.21]. | — |
| reducedIntNonContCombRequested Indicates that the UE excluded supported intra-band non-contiguous CA band combinations other than included in capability signaling as specified in TS 36.306 [5, 4.3.5.21]. | — |
| requestedBands Indicates the frequency bands requested by E-UTRAN. | — |
| requestedCCsDL, requestedCCsUL Indicates the maximum number of CCs requested by E-UTRAN. | — |
| rsrqMeasWideband Indicates whether the UE can perform RSRQ measurements with wider bandwidth. | Yes |
| rsrq-OnAllSymbols Indicates whether the UE can perform RSRQ measurement on all Orthogonal Frequency Division Multiplexing (OFDM) symbols and also support the extended RSRQ upper value range from −3 dB to 2.5 dB in measurement configuration and reporting as specified in TS 36.133 [16]. | No |
| rs-SINR-Meas Indicates whether the UE can perform RS-SINR measurements in RRC_CONNECTED as specified in TS 36.214 [48]. | — |
| rssi-AndChannelOccupancyReporting Indicates whether the UE supports performing measurements and reporting of RSSI and channel occupancy. This field can be included only if downlinkLAA is included. | — |
| scptm-AsyncDC Indicates whether the UE in RRC_CONNECTED supports MBMS reception via SC-MRB on a frequency indicated in an MBMSInterestIndication message, where (according to supportedBandCombination) the carriers that are or can be configured as serving cells in the MCG and the SC are not synchronized. If this field is included, the UE shall also include scptm-SCell and scptm-NonServingCell. | Yes |
| scptm-NonServingCell Indicates whether the UE in RRC_CONNECTED supports MBMS reception via SC-MRB on a frequency indicated in an MBMSInterestIndication message, where (according to supportedBandCombination and to network synchronization properties) a serving cell may be additionally configured. If this field is included, the UE shall also include the scptm-SCell field. | Yes |
| scptm-Parameters Presence of the field indicates that the UE supports SC-PTM reception as specified in TS 36.306 [5]. | Yes |
| scptm-SCell Indicates whether the UE in RRC_CONNECTED supports MBMS reception via SC-MRB on a frequency indicated in an MBMSInterestIndication message, when an SCell is configured on that frequency (regardless of whether the SCell is activated or deactivated). | Yes |
| scptm-ParallelReception Indicates whether the UE in RRC_CONNECTED supports parallel reception in the same subframe of downlink shared channel (DL-SCH) transport blocks transmitted using C-NRTI/Semi-Persistent Scheduling C-NRTI and using SC-NRTI/G-NRTI as specified in TS 36.306 [5]. | Yes |
| secondSlotStartingPosition Indicates whether the UE supports reception of subframes with second slot starting position as described in TS 36.211 [21] and TS 36.213 [23]. This field can be included only if downlinkLAA is included. | — |
| simultaneousPUCCH-PUSCH | Yes |
| simultaneousRx-Tx Indicates whether the UE supports simultaneous reception and transmission on different bands for each band combination listed in supportedBandCombination. This field is only applicable for inter-band TDD band combinations. A UE indicating support of simultaneousRx-Tx and dc-Support- shall support different UL/DL configurations between PCell and PSCell. | — |
| skipFallbackCombinations Indicates whether UE supports receiving reception of skipFallbackCombinations that requests UE to exclude fallback band combinations from capability signaling. | — |
| skipFallbackCombRequested Indicates whether requestSkipFallbackCombinations is requested by E-UTRAN. | — |

TABLE 18-continued

| UE-EUTRA-Capability field descriptions | FDD/ TDD diff |
|---|---|
| skipMonitoringDCI-Format0-1A<br>Indicates whether UE supports blind decoding reduction on UE specific search space by not monitoring DCI Format 0 and 1A as specified in TS 36.213 [23, 9.1.1]. | No |
| spatialBundling-HARQ-ACK<br>Indicates whether UE supports HARQ-ACK spatial bundling on PUCCH or PUSCH as specified in TS 36.213 [23, 7.3.1 and 7.3.2]. | No |
| srs-Enhancements<br>Indicates whether the UE supports SRS enhancements. | TBD |
| srs-EnhancementsTDD<br>Indicates whether the UE supports TDD specific SRS enhancements. | No |
| srvcc-FromUTRA-FDD-ToGERAN<br>Indicates whether UE supports SRVCC handover from UTRA FDD PS HS to GERAN CS. | — |
| srvcc-FromUTRA-FDD-ToUTRA-FDD<br>Indicates whether UE supports SRVCC handover from UTRA FDD PS HS to UTRA FDD CS. | — |
| srvcc-FromUTRA-TDD128-ToGERAN<br>Indicates whether UE supports SRVCC handover from UTRA TDD 1.28 Mcps PS HS to GERAN CS. | — |
| srvcc-FromUTRA-TDD128-ToUTRA-TDD128<br>Indicates whether UE supports SRVCC handover from UTRA TDD 1.28 Mcps PS HS to UTRA TDD 1.28 Mcps CS. | — |
| ss-CCH-InterfHandl<br>Indicates whether the UE supports synchronization signal and common channel interference handling. | Yes |
| standaloneGNSS-Location<br>Indicates whether the UE is equipped with a standalone Global Navigation Satellite System (GNSS) receiver that may be used to provide detailed location information in RRC measurement report and logged measurements. | — |
| supportedBandCombination<br>Includes the supported CA band combinations, if any, and may include all the supported non-CA bands. | — |
| supportedBandCombinationAdd<br>Includes additional supported CA band combinations in case maximum number of CA band combinations of supportedBandCombination is exceeded. | — |
| SupportedBandCombinationAdd-v11d0, SupportedBandCombinationAdd-v1250, SupportedBandCombinationAdd-v1270, SupportedBandCombinationAdd-v1320<br>If included, the UE shall include the same number of entries, and listed in the same order, as in SupportedBandCombinationAdd-. | — |
| SupportedBandCombinationExt, SupportedBandCombination-v1090, SupportedBandCombination-v10i0, SupportedBandCombination-v1130, SupportedBandCombination-v1250, SupportedBandCombination-v1270, SupportedBandCombination-v1320<br>If included, the UE shall include the same number of entries, and listed in the same order, as in supportedBandCombination-r10. | — |
| supportedBandCombinationReduced<br>Includes the supported CA band combinations, and may include the fallback CA combinations specified in TS 36.101 [42, 4.3A]. This field also indicates whether the UE supports reception of requestReducedFormat. | — |
| SupportedBandCombinationReduced-v1320<br>If included, the UE shall include the same number of entries, and listed in the same order, as in supportedBandCombinationReduced-. | — |
| SupportedBandGERAN<br>GERAN band as defined in TS 45.005 [20]. | No |
| SupportedBandList1XRTT<br>One entry corresponding to each supported CDMA2000 1xRTT band class. | — |
| SupportedBandListEUTRA<br>Includes the supported E-UTRA bands. This field shall include all bands which are indicated in BandCombinationParameters. | — |
| SupportedBandListEUTRA-v9e0, SupportedBandListEUTRA-v1250, SupportedBandListEUTRA-v1310, SupportedBandListEUTRA-v1320<br>If included, the UE shall include the same number of entries, and listed in the same order, as in supportedBandListEUTRA (i.e. without suffix). | — |
| SupportedBandListGERAN | No |
| SupportedBandListHRPD<br>One entry corresponding to each supported CDMA2000 HRPD band class. | — |
| supportedBandListNR<br>Indicates the supported NR bands by the UE. | — |
| SupportedBandUTRA-FDD<br>UTRA band as defined in TS 25.101 [17]. | — |

TABLE 18-continued

| UE-EUTRA-Capability field descriptions | FDD/TDD diff |
|---|---|
| SupportedBandUTRA-TDD128<br>UTRA band as defined in TS 25.102 [18].<br>SupportedBandUTRA-TDD384<br>UTRA band as defined in TS 25.102 [18].<br>SupportedBandUTRA-TDD768<br>UTRA band as defined in TS 25.102 [18].<br>supportedBandwidthCombinationSet<br>The supportedBandwidthCombinationSet indicated for a band combination<br>is applicable to all bandwidth classes indicated by the UE in this band<br>combination.<br>Field encoded as a bit map, where bit N is set to "1" if UE support<br>Bandwidth Combination Set N for this band combination, see 36.101 [42].<br>The leading/leftmost bit (bit 0) corresponds to the Bandwidth<br>Combination Set 0, the next bit corresponds to the Bandwidth Combination<br>Set 1 and so on. The UE shall neither include the field for a non-CA band<br>combination, nor for a CA band combination for which the UE only<br>supports Bandwidth Combination Set 0.<br>supportedCellGrouping<br>This field indicates for which mapping of serving cells to cell groups (i.e.<br>MCG or SC) the UE supports asynchronous DC. This field is only present<br>for a band combination with more than two but less than six band entries<br>where the UE supports asynchronous DC. If this field is not present but<br>asynchronous operation is supported, the UE supports all possible<br>mappings of serving cells to cell groups for the band combination. The<br>bitmap size is selected based on the number of entries in the combinations,<br>i.e., in case of three entries, the bitmap corresponding to threeEntries is<br>selected and so on.<br>A bit in the bit string set to 1 indicates that the UE supports asynchronous<br>DC for the cell grouping option represented by the concerned bit position.<br>Each bit position represents a different cell grouping option, as illustrated<br>by a table, see NOTE 5. A cell grouping option is represented by a number<br>of bits, each representing a particular band entry in the band combination<br>with the left-most bit referring to the band listed first in the band<br>combination, etc. Value 0 indicates that the carriers of the corresponding<br>band entry are mapped to a first cell group, while value 1 indicates that the<br>carriers of the corresponding band entry are mapped to a second cell group.<br>It is noted that the mapping table does not include entries with all bits set<br>to the same value (0 or 1) as this does not represent a DC scenario (i.e.<br>indicating that the UE supports that all carriers of the corresponding band<br>entry are in one cell group).<br>supportedCSI-Proc<br>Indicates the maximum number of CSI processes supported on a<br>component carrier within a band. Value n1 corresponds to 1 CSI process,<br>value n3 corresponds to 3 CSI processes, and value n4 corresponds to 4<br>CSI processes. If this field is included, the UE shall include the same<br>number of entries listed in the same order as in BandParameters. If the UE<br>supports at least 1 CSI process on any component carrier, then the UE shall<br>include this field in all bands in all band combinations.<br>supportedNAICS-2CRS-AP<br>If included, the UE supports NAICS for the band combination. The UE<br>shall include a bitmap of the same length, and in the same order, as in<br>naics-Capability-List, to indicate 2 CRS AP NAICS capability of the band<br>combination. The first/leftmost bit points to the first entry of naics-<br>Capability-List, the second bit points to the second entry of naics-<br>Capability-List, and so on.<br>For band combinations with a single component carrier, UE is only<br>allowed to indicate {numberOfNAICS-CapableCC,<br>numberOfAggregatedPRB} = {1, 100} if NAICS is supported.<br>supportRohcContextContinue<br>Indicates whether the UE supports ROHC context continuation operation<br>where the UE does not reset the current ROHC context upon handover.<br>tdd-SpecialSubframe<br>Indicates whether the UE supports TDD special subframe defined in TS<br>36.211 [21].<br>tdd-FDD-CA-PCellDuplex<br>The presence of this field indicates that the UE supports TDD/FDD CA in<br>any supported band combination including at least one FDD band with<br>bandParametersUL and at least one TDD band with bandParametersUL.<br>The first bit is set to "1" if UE supports the TDD PCell. The second bit is<br>set to "1" if UE supports FDD PCell. This field is included only if the UE<br>supports band combination including at least one FDD band with<br>bandParametersUL and at least one TDD band with bandParametersUL. If<br>this field is included, the UE shall set at least one of the bits as "1". If this<br>field is included with DC, then it is applicable within a CG, and the<br>presence of this field indicates the capability of the UE to support<br>TDD/FDD CA with at least one FDD band and at least one TDD band in | —<br><br>—<br><br>—<br><br>—<br><br><br><br><br><br><br><br><br>—<br><br><br><br><br><br><br><br><br><br><br><br><br><br><br><br><br>—<br><br><br><br><br><br>—<br><br><br><br><br><br><br><br>—<br><br><br>No<br><br>— |

TABLE 18-continued

| UE-EUTRA-Capability field descriptions | FDD/TDD diff |
|---|---|
| the same CG, with the value indicating the support for TDD/FDD PCell (PSCell). | |
| timerT312 | No |
| Indicates whether the UE supports T312. | |
| tm5-FDD | — |
| Indicates whether the UE supports the PDSCH transmission mode 5 in FDD. | |
| tm5-TDD | — |
| Indicates whether the UE supports the PDSCH transmission mode 5 in TDD. | |
| tm9-LAA | — |
| Indicates whether the UE supports tm9 operation on LAA cell(s). This field can be included only if downlinkLAA is included. | |
| tm9-With-8Tx-FDD | No |
| tm10-LAA | — |
| Indicates whether the UE supports tm10 operation on LAA cell(s). This field can be included only if downlinkLAA is included. | |
| twoAntennaPortsForPUCCH | No |
| txDiv-PUCCH1b-ChSelect | Yes |
| Indicates whether the UE supports transmit diversity for PUCCH format 1b with channel selection. | |
| uci-PUSCH-Ext | No |
| Indicates whether the UE supports an extension of Uplink Control Information (UCI) delivering more than 22 HARQ-ACK bits on PUSCH as specified in TS 36.212 [22, 5.2.2.6] and TS 36.213 [23, 8.6.3]. | |
| ue-Category | — |
| UE category as defined in TS 36.306 [5]. Set to values 1 to 12 in this version of the specification. | |
| ue-CategoryDL | — |
| UE DL category as defined in TS 36.306 [5]. For ASN.1 compatibility, a UE indicating DL category 0 or m1 shall also indicate any of the categories (1..5) in ue-Category (without suffix), which is ignored by the eNB. The field ue-CategoryDL is set to values m1, 0, 6, 7, 9 to 17 in this version of the specification. | |
| ue-CategoryUL | — |
| UE UL category as defined in TS 36.306 [5]. The field ue-CategoryUL is set to values m1, 0, 3, 5, 7, 8, 13 or 14 in this version of the specification. | |
| ue-PowerClass-N, ue-PowerClass-5 | — |
| Indicates whether the UE supports UE power class 1, 2, 4 or 5 in the E-UTRA band, see TS 36.101 [42]. UE includes either ue-PowerClass-N or ue-PowerClass-5. If neither ue-PowerClass-N nor ue-PowerClass-5 is included, UE supports the default UE power class in the E-UTRA band, see TS 36.101 [42]. | |
| ue-Rx-TxTimeDiffMeasurements | No |
| Indicates whether the UE supports Rx-Tx time difference measurements. | |
| ue-SpecificRefSigsSupported | No |
| ue-SSTD-Meas | — |
| Indicates whether the UE supports SSTD measurements between the PCell and the PSCell as specified in TS 36.214 [48] and TS 36.133 [16]. | |
| ue-TxAntennaSelectionSupported | Yes |
| TRUE indicates that the UE is capable of supporting UE transmit antenna selection as described in TS 36.213 [23, 8.7]. | |
| ul-CoMP | No |
| Indicates whether the UE supports UL Coordinated Multi-Point operation. | |
| utran-ProximityIndication | — |
| Indicates whether the UE supports proximity indication for UTRAN CSG member cells. | |
| ul-64QAM | — |
| Indicates whether the UE supports 64QAM in UL on the band. This field is only present when the field ue-CategoryUL is set to 5, 8, 13 or 14. If the field is present for one band, the field shall be present for all bands including downlink only bands. | |
| ul-PDCP-Delay | — |
| Indicates whether the UE supports UL PDCP Packet Delay per QCI measurement as specified in TS 36.314 [71]. | |
| utran-SI-AcquisitionForHO | Yes |
| Indicates whether the UE supports, upon configuration of si-RequestForHO by the network, acquisition and reporting of relevant information using autonomous gaps by reading the SI from a neighboring UMTS cell. | |
| voiceOverPS-HS-UTRA-FDD | — |
| Indicates whether UE supports IMS voice according to GSMA IR.58 profile in UTRA FDD. | |
| voiceOverPS-HS-UTRA-TDD128 | — |
| Indicates whether UE supports IMS voice in UTRA TDD 1.28 Mcps. | |
| whiteCellList | — |
| Indicates whether the UE supports EUTRA white cell listing to limit the set of cells applicable for measurements. | |

TABLE 18-continued

| UE-EUTRA-Capability field descriptions | FDD/TDD diff |
|---|---|
| NR-IW-RAN-Rules<br>Indicates whether the UE supports RAN-based NR interworking based on access network selection and traffic steering rules. | — |
| NR-IW-ANDSF-Policies<br>Indicates whether the UE supports RAN-based NR interworking based on ANDSF policies. | — |

NOTE 1: The IE UE-EUTRA-Capability does not include AS security capability information, since these are the same as the security capabilities that are signaled by Non-Access Stratum (NAS). Consequently AS need not provide "man-in-the-middle" protection for the security capabilities.

NOTE 2: The column FDD/TDD diff indicates if the UE is allowed to signal, as part of the additional capabilities for an XDD mode i.e. within UE-EUTRA-CapabilityAddXDD-Mode-xNM, a different value compared to the value signaled elsewhere within UE-EUTRA-Capability (i.e. the common value, supported for both XDD modes). A '-' is used to indicate that it is not possible to signal different values (used for fields for which the field description is provided for other reasons). Annex E specifies for which TDD and FDD serving cells a UE supporting TDD/FDD CA shall support a capability for which it indicates support within the capability signaling.

NOTE 3: All the combinations of CA-MIMO-ParametersUL and CA-MIMO-ParametersDL for one band and across all the bands in each BandCombinationParameters are supported by the UE and have the same measurement gap requirement (i.e. the same BandInfoEUTRA applies). The BandCombinationParameters for the same band combination can be included more than once.

NOTE 4: UE CA and measurement capabilities indicate the combinations of frequencies that can be configured as serving frequencies.

NOTE 5: The grouping of the cells to the first and second cell group, as indicated by supportedCellGrouping, is shown in the table below. The leading/leftmost bit of supportedCellGrouping corresponds to the Bit String Position RRC multiplicity and type constraint values are also described. Multiplicity and type constraint definitions are provided in the information element of Listing (22).

Listing (22)

```
-- ASN1START
maxACDC-Cat-              INTEGER ::= 16 -- Maximum number of ACDC
   categories (per PLMN)
maxAvailNarrowBands-      INTEGER ::= 16 -- Maximum number of
   narrowbands
maxBandComb-r10           INTEGER ::= 128 -- Maximum number of band
   combinations.
maxBandComb-              INTEGER ::= 256 -- Maximum number of
   additional band combinations.
maxBandComb-              INTEGER ::= 384 -- Maximum number of band
   combinations in Rel-13
maxBands                  INTEGER ::= 64 -- Maximum number of bands
   listed in EUTRA UE caps
maxBandwidthClass-r10     INTEGER ::= 16 -- Maximum number of
   supported CA BW classes per band
maxBandwidthCombSet-r10   INTEGER ::= 32 -- Maximum number of
   bandwidth combination sets per supported band combination
maxCDMA-BandClass         INTEGER ::= 32 -- Maximum value of the CDMA
   band classes
maxCE-Level-              INTEGER ::= 4 -- Maximum number of CE
   levels
maxCellBlack              INTEGER ::= 16 -- Maximum number of
   blacklisted physical cell identity ranges listed in SIB
   type 4 and 5
maxCellHistory-           INTEGER ::= 16 -- Maximum number of visited
   EUTRA cells reported
maxCellInfoGERAN-r9       INTEGER ::= 32 -- Maximum number of GERAN
   cells for which system information can be provided as
   redirection assistance
maxCellInfoUTRA-r9        INTEGER ::= 16 -- Maximum number of UTRA
   cells for which system information can be provided as
   redirection assistance
maxCombIDC-               INTEGER ::= 128 -- Maximum number of
   reported UL CA combinations
maxCSI-IM-                INTEGER ::= 3 -- Maximum number of CSI-IM
   configurations (per carrier frequency)
maxCSI-IM-                INTEGER ::= 4 -- Maximum number of CSI-IM
   configurations (per carrier frequency)
minCSI-IM-                INTEGER ::= 5 -- Minimum number of CSI IM
   configurations from which REL-13 extension is used
maxCSI-IM-                INTEGER ::= 24 -- Maximum number of CSI-IM
   configurations (per carrier frequency)
```

| Listing (22) |
| --- |

```
maxCSI-IM-v1310          INTEGER ::= 20 -- Maximum number of
   additional CSI-IM configurations (per carrier frequency)
maxCSI-Proc-             INTEGER ::= 4 -- Maximum number of CSI
   processes (per carrier frequency)
maxCSI-RS-NZP-           INTEGER ::= 3 -- Maximum number of CSI RS
   resource configurations using non-zero Tx power (per
   carrier frequency)
minCSI-RS-NZP-           INTEGER ::= 4 -- Minimum number of CSI RS
   resource from which REL-13 extension is used
maxCSI-RS-NZP-           INTEGER ::= 24 -- Maximum number of CSI RS
   resource configurations using non-zero Tx power (per
   carrier frequency)
maxCSI-RS-NZP-v1310      INTEGER ::= 21 -- Maximum number of
   additional CSI RS resource configurations using non-zero
   Tx power per carrier frequency)
maxCSI-RS-ZP-            INTEGER ::= 4 -- Maximum number of CSI RS
   resource configurations using zero Tx power(per carrier
   frequency)
maxCQI-ProcExt-          INTEGER ::= 3 -- Maximum number of
   additional periodic CQI configurations (per carrier
   frequency)
maxFreqUTRA-TDD-r10      INTEGER ::= 6 -- Maximum number of UTRA
   TDD carrier frequencies for which system information can
   be provided as redirection assistance
maxCellInter             INTEGER ::= 16 -- Maximum number of
   neighboring inter-frequency cells listed in SIB type 5
maxCellIntra             INTEGER ::= 16 -- Maximum number of
   neighboring intra-frequency cells listed in SIB type 4
maxCellListGERAN         INTEGER ::= 3 -- Maximum number of lists
   of GERAN cells
maxCellMeas              INTEGER ::= 32 -- Maximum number of entries
   in each of the cell lists in a measurement object
maxCellReport            INTEGER ::= 8 -- Maximum number of
   reported cells/CSI-RS resources
maxCSI-RS-Meas-          INTEGER ::= 96 -- Maximum number of
   entries in the CSI-RS listin a measurement object
maxDRB                   INTEGER ::= 11 -- Maximum number of Data
   Radio Bearers
maxDS-Duration-          INTEGER ::= 5 -- Maximum number of
   subframes in a discovery signals occasion
maxDS-ZTP-CSI-RS-INTEGER ::= 5 -- Maximum number of zero
   transmission power CSI-RS for a serving cell concerning
   discovery signals
maxEARFCN                INTEGER ::= 65535 -- Maximum value of EUTRA
   carrier frequency
maxEARFCN-Plus1          INTEGER ::= 65536 -- Lowest value extended
   EARFCN range
maxEARFCN2       INTEGER ::= 262143 -- Highest value extended
   EARFCN range
maxEPDCCH-Set-           INTEGER ::= 2 -- Maximum number of
   EPDCCH sets
maxFBI                   INTEGER ::= 64 -- Maximum value of
   fequency band indicator
maxFBI-Plus1             INTEGER ::= 65 -- Lowest value extended
   FBI range
maxFBI2                  INTEGER ::= 256 -- Highest value
   extended FBI range
maxFreq                  INTEGER ::= 8 -- Maximum number of
   carrier frequencies
maxFreqIDC-              INTEGER ::= 32 -- Maximum number of carrier
   frequencies that are affected by the IDC problems
maxFreqMBMS-             INTEGER ::= 5 -- Maximum number of carrier
   frequencies for which an MBMS capable UE may indicate an
   interest
maxGERAN-SI     INTEGER ::= 10 -- Maximum number of GERAN SI
   blocks that can be provided as part of NACC information
maxGNFG         INTEGER ::= 16 -- Maximum number of GERAN
   neighbor freq groups
maxLCG-                  INTEGER ::= 4 -- Maximum number of logical
   channel groups
maxLogMeasReport-r10     INTEGER ::= 520 -- Maximum number of
   logged measurement entries that can be reported by the UE
   in one message
maxMBSFN-Allocations INTEGER ::= 8 -- Maximum number of MBSFN
   frame allocations with different offset
maxMBSFN-Area            INTEGER ::= 8
maxMBSFN-Area-1          INTEGER ::= 7
```

| Listing (22) |
| --- |

```
maxMBMS-ServiceListPerUE-   INTEGER ::= 15 -- Maximum number of
   services which the UE can include in the MBMS interest
   indication
maxMeasId                   INTEGER ::= 32
maxMeasId-Plus1             INTEGER ::= 33
maxMeasId-                  INTEGER ::= 64
maxMultiBands               INTEGER ::= 8 -- Maximum number of
   additional frequency bands that a cell belongs to
maxNS-Pmax-r10              INTEGER ::= 8 -- Maximum number of NS and
   P-Max values per band
maxNAICS-Entries-   INTEGER ::= 8 -- Maximum number of supported
   NAICS combination(s)
maxNeighCell-               INTEGER ::= 8 -- Maximum number of
   neighboring cells in NAICS configuration (per carrier
   frequency)
maxNeighCell-SCPTM-         INTEGER ::= 8 -- Maximum number of SCPTM
   neighbor cells
maxObjectId                 INTEGER ::= 32
maxObjectId-Plus1-          INTEGER ::= 33
maxObjectId-                INTEGER ::= 64
maxP-a-PerNeighCell-        INTEGER ::= 3 -- Maximum number of power
   offsets for a neighbor cell in NAICS configuration
maxPageRec                  INTEGER ::= 16 --
maxPhysCellIdRange-r9       INTEGER ::= 4 -- Maximum number of
   physical cell identity ranges
maxPLMN-                    INTEGER ::= 6 -- Maximum number of PLMNs
maxPNOffset                 INTEGER ::= 511 -- Maximum number of
   CDMA2000 PNOffsets
maxPMCH-PerMBSFN            INTEGER ::= 15
maxQCI-                     INTEGER ::= 6 -- Maximum number of QCIs
maxRAT-Capabilities         INTEGER ::= 8 -- Maximum number of
   interworking RATs (incl EUTRA)
maxRE-MapQCL-    INTEGER ::= 4 -- Maximum number of PDSCH RE
   Mapping configurations (per carrier frequency)
maxReportConfigId           INTEGER ::= 32
maxRSTD-Freq-r10            INTEGER ::= 3 -- Maximum number of
   frequency layers for RSTD measurement
maxSAI-MBMS-                INTEGER ::= 64 -- Maximum number of MBMS
   service area identities broadcast per carrier frequency
maxSCell-r10                INTEGER ::= 4 -- Maximum number of
   SCells
maxSCell-                   INTEGER ::= 31 -- Highest value of extended
   number range of SCells
maxSC-MTCH-                 INTEGER ::= 1023 -- Maximum number of SC-
   MTCHs in one cell
maxSL-CommRxPoolNFreq-      INTEGER ::= 32 -- Maximum number of
   individual sidelink communication Rx resource pools on
   neighboring freq
maxSL-CommRxPoolPreconf-v1310 INTEGER ::= 12 -- Maximum number of
   additional preconfigured sidelink communication Rx
   resource pool entries
maxSL-TxPool-Plus1-         INTEGER ::= 5 -- First additional
   individual sidelink Tx resource pool
maxSL-TxPool-v1310          INTEGER ::= 4 -- Maximum number of
   additional sidelink Tx resource pool entries
maxSL-TxPool-               INTEGER ::= 8 -- Maximum number of
   individual sidelink Tx resource pools
maxSL-CommTxPoolPreconf-v1310 INTEGER ::= 7 -- Maximum number of
   additional preconfigured sidelink Tx resource pool entries
maxSL-Dest-                 INTEGER ::= 16 -- Maximum number of
   sidelink destinations
maxSL-DiscCells-            INTEGER ::=16 -- Maximum number of
   cells with similar sidelink configurations
maxSL-DiscPowerClass-       INTEGER ::= 3 -- Maximum number of
   sidelink power classes
maxSL-DiscRxPoolPreconf-    INTEGER ::= 16 -- Maximum number of
   preconfigured sidelink discovery Rx resource pool entries
maxSL-DiscSysInfoReportFreq-  INTEGER ::= 8 -- Maximum number of
   frequencies to include in a SidelinkUEInformation for SI
   reporting
maxSL-DiscTxPoolPreconf-    INTEGER ::= 4 -- Maximum number of
   preconfigured sidelink discovery Tx resource pool entries
maxSL-GP-                   INTEGER ::= 8 -- Maximum number of gap
   patterns that can be requested for a frequency or assigned
maxSL-Prio-                 INTEGER ::= 8 -- Maximum number of entries in
   sidelink priority list
```

Listing (22)

```
maxSL-RxPool-                 INTEGER ::= 16 -- Maximum number of
    individual sidelink Rx resource pools
maxSL-SyncConfig-             INTEGER ::= 16 -- Maximum number of
    sidelink Sync configurations
maxSL-TF-IndexPair-           INTEGER ::= 64 -- Maximum number of
    sidelink Time Freq resource index pairs
maxSL-TxPool-                 INTEGER ::= 4 -- Maximum number of
    individual sidelink Tx resource pools
maxSTAG-                      INTEGER ::= 3 -- Maximum number of STAGs
maxServCell-r10               INTEGER ::= 5 -- Maximum number of
    Serving cells
maxServCell-                  INTEGER ::= 32 -- Highest value of
    extended number range of Serving cells
maxServiceCount               INTEGER ::= 16 -- Maximum number of MBMS
    services that can be included in an MBMS counting request
    and response
maxServiceCount-1             INTEGER ::= 15
maxSessionPerPMCH             INTEGER ::= 29
maxSessionPerPMCH-1           INTEGER ::= 28
maxSIB                        INTEGER ::= 32 -- Maximum number of SIBs
maxSIB-1                      INTEGER ::= 31
maxSI-Message                 INTEGER ::= 32 -- Maximum number of SI
    messages
maxSimultaneousBands-r10      INTEGER ::= 64 -- Maximum number of
    simultaneously aggregated bands
maxSubframePatternIDC-        INTEGER ::= 8 -- Maximum number of
    subframe reservation patterns that the UE can
    simultaneously recommend to the E-UTRAN for use.
maxUTRA-FDD-Carrier           INTEGER ::= 16 -- Maximum number of UTRA
    FDD carrier frequencies
maxUTRA-TDD-Carrier           INTEGER ::= 16 -- Maximum number of UTRA
    TDD carrier frequencies
maxNR-Id-                     INTEGER :: = 16 -- Maximum number of NR
    identifiers
maxNR-Bands-                  INTEGER ::= 8 -- Maximum number of NR
    bands
maxNR-Id-                     INTEGER ::= 32 -- Maximum number of NR
    identifiers
maxNR-Channels-               INTEGER :: = 16 -- maximum number of NR
    channels used in NR-CarrierInfo
maxNR-CarrierInfo-            INTEGER ::= 8 -- Maximum number of NR
    Carrier Information
-- ASN1STOP
```

It should be noted that the value of maxDRB aligns with SA2.

UE variables are also described. It should be noted that to facilitate the specification of the UE behavioral requirements, UE variables are represented using ASN.1. Unless explicitly specified otherwise, it is however up to UE implementation how to store the variables. The optionality of the IEs in ASN.1 is used only to indicate that the values may not always be available.

This ASN.1 segment of Listing (23) is the start of the E-UTRA UE variable definitions.

Listing (23)

```
-- ASN1START
EUTRA-UE-Variables DEFINITIONS AUTOMATIC TAGS ::=
BEGIN
IMPORTS
    AbsoluteTimeInfo-r10,
    AreaConfiguration-r10,
    AreaConfiguration-v1130,
    CarrierFreqGERAN,
    CellIdentity,
    ConnEstFailReport-,
    SpeedStateScaleFactors,
    C-NRTI,
    LoggingDuration-r10,
    LoggingInterval-r10,
    LogMeasInfo-r10,
    MeasCSI-RS-Id-,
    MeasId,
    MeasId-v1250,
    MeasIdToAddModList,
    MeasIdToAddModListExt-,
    MeasIdToAddModList-v1310,
    MeasIdToAddModListExt-v1310,
    MeasObjectToAddModList,
    MeasObjectToAddModList-v9e0,
    MeasObjectToAddModListExt-,
    MeasScaleFactor-,
    MobilityStateParameters,
    NeighCellConfig,
    PhysCellId,
    PhysCellIdCDMA2000,
    PhysCellIdGERAN,
    PhysCellIdUTRA-FDD,
    PhysCellIdUTRA-TDD,
    PLMN-Identity,
    PLMN-IdentityList3-,
    QuantityConfig,
    ReportConfigToAddModList,
    RLF-Report-r9,
    TargetMBSFN-AreaList-,
    TraceReference-r10,
    VisitedCellInfoList-,
```

Listing (23)

```
        maxCellMeas,
        maxCSI-RS-Meas-,
        maxMeasId,
        maxMeasId-,
        UL-DelayConfig-,
        NR-CarrierInfo-,
        NR-Identifiers-,
        NR-Id-List-,
        NR-Status-
    FROM EUTRA-RRC-Definitions;
    -- ASN1STOP
```

The UE variable VarMeasReportList includes information about the measurements for which the triggering conditions have been met. Listing (24) provides an example of the VarMeasReportList UE variable.

Listing (24)

```
-- ASN1START
VarMeasReportList ::=        SEQUENCE (SIZE (1..maxMeasId))
OF VarMeasReport
VarMeasReportList- ::=       SEQUENCE (SIZE (1..maxMeasId-)) OF
VarMeasReport
VarMeasReport ::=            SEQUENCE {
    -- List of measurement that have been triggered
    measId                   MeasId,
    measId-v1250             MeasId-v1250
    OPTIONAL,
    cellsTriggeredList       CellsTriggeredList
    OPTIONAL,
    csi-RS-TriggeredList-    CSI-RS-TriggeredList-
    OPTIONAL,
    numberOfReportsSent      INTEGER
}
CellsTriggeredList ::=       SEQUENCE (SIZE
(1..maxCellMeas)) OF CHOICE {
    physCellIdEUTRA          PhysCellId,
    physCellIdUTRA           CHOICE {
        fdd                      PhysCellIdUTRA-FDD,
        tdd                      PhysCellIdUTRA-TDD
    },
    physCellIdGERAN          SEQUENCE {
        carrierFreq              CarrierFregGERAN,
        physCellId               PhysCellIdGERAN
    },
    physCellIdCDMA2000       PhysCellIdCDMA2000,
    NR-Identifiers-          NR-Identifiers-
}
CSI-RS-TriggeredList- ::= SEQUENCE (SIZE (1..maxCSI-RS-Meas-
)) OF MeasCSI-RS-Id-
-- ASN1STOP
```

The UE variable VarNR-MobilityConfig includes information about NR for access selection and mobility. Listing (25) provides an example of the VarNR-MobilityConfig UE variable.

Listing (25)

```
-- ASN1START
    VarNR-MobilityConfig ::=    SEQUENCE {
    NR-MobilitySet-             NR-Id-List-
    OPTIONAL,
    successReportRequested      ENUMERATED {true}
    OPTIONAL
    }
-- ASN1STOP
```

TABLE 19

VarNR-MobilityConfig field descriptions

NR-MobilitySet
Indicates the NR mobility set configured.
successReportRequested
Indicates whether the UE should report successful connection to NR. Applicable to NRA and LNRIP.

The UE variable VarNR-Status includes information about the status of NR connection for NRA. Listing (26) provides an example of the VarNR-Status UE variable.

Listing (26)

```
    -- ASN1START
    VarNR-Status- ::=           SEQUENCE {
        status-                     NR-Status-
    }
    -- ASN1STOP
```

TABLE 20

VarNR-Status field descriptions status
Indicates the connection status to NR and causes for connection failures.

Inter-node RRC messages are also described. This section specifies RRC messages that are sent either across the X2- or the S1-interface, either to or from the eNB 160. (i.e., a single 'logical channel' is used for all RRC messages transferred across network nodes). The information could originate from or be destined for another RAT. The ASN.1 segment of Listing (27) is the start of the E-UTRA inter-node Protocol Data Unit (PDU) definitions.

Listing (27)

```
-- ASN1START
EUTRA-InternodeDefinitions DEFINITIONS AUTOMATIC TAGS ::=
BEGIN
IMPORTS
    AntennaInfoCommon,
    AntennaInfoDedicated-v10i0,
    ARFCN-ValueEUTRA,
    ARFCN-ValueEUTRA-v9e0,
    ARFCN-ValueEUTRA-r9,
    CellIdentity,
    C-NRTI,
    DL-DCCH-Message,
    DRB-Identity,
    DRB-ToReleaseList,
    FregBandIndicator-,
    InDeviceCoexIndication-,
    MasterInformationBlock,
    maxBands,
    maxFreq,
    maxDRB,
    maxSCell-r10,
    maxSCell-,
    maxServCell-r10,
    maxServCell-,
    MBMSInterestIndication-,
    MeasConfig,
    MeasGapConfig,
    OtherConfig-r9,
    PhysCellId,
    P-Max,
    PowerCoordinationInfo-,
    SidelinkUEInformation-,
```

Listing (27)

```
SL-CommConfig-,
SL-DiscConfig-,
RadioResourceConfigDedicated,
NRCLNI-Configuration-,
RSRP-Range,
RSRQ-Range,
RSRQ-Range-v1250,
RS-SINR-Range-,
SCellToAddModList-r10,
SCellToAddModListExt-,
SCG-ConfigPartSCG-,
SecurityAlgorithmConfig,
SCellIndex-r10,
SCellIndex-,
SCellToReleaseList-r10,
SCellToReleaseListExt-,
ServCellIndex-r10,
ServCellIndex-,
ShortMAC-I,
MeasResultSSTD-,
SystemInformationBlockType1,
SystemInformationBlockType1-v890-IEs,
SystemInformationBlockType2,
UEAssistanceInformation-,
UECapabilityInformation,
UE-CapabilityRAT-ContainerList,
UE-RadioPagingInfo-,
NRConnectionStatusReport-,
NR-OffloadConfig-
NR-RadioResourceConfigDedicated-Containerlist:
    AntennaInfoCommon,
    AntennaInfoDedicated-v10i0,
    ARFCN-ValueEUTRA,
    ARFCN-ValueEUTRA-v9e0,
    ARFCN-ValueEUTRA-r9,
    CellIdentity,
    C-NRTI,
    DL-DCCH-Message,
    DRB-Identity,
    DRB-ToReleaseList,
    FreqBandIndicator-,
    InDeviceCoexIndication-,
    MasterInformationBlock,
    maxBands,
    maxFreq,
    maxDRB,
    maxSCell-r10,
    maxSCell-,
    maxServCell-r10,
    maxServCell-,
    MBMSInterestIndication-,
    MeasConfig,
    MeasGapConfig,
    OtherConfig-r9,
    PhysCellId,
    P-Max,
    PowerCoordinationInfo-,
    SidelinkUEInformation-,
    SL-CommConfig-,
    SL-DiscConfig-,
    RadioResourceConfigDedicated,
    NRCLNI-Configuration-,
    RSRP-Range,
    RSRQ-Range,
    RSRQ-Range-v1250,
    RS-SINR-Range-,
    SCellToAddModList-r10,
    SCellToAddModListExt-,
    SCG-ConfigPartSCG-,
    SecurityAlgorithmConfig,
    SCellIndex-r10,
    SCellIndex-,
    SCellToReleaseList-r10,
    SCellToReleaseListExt-,
    ServCellIndex-r10,
    ServCellIndex-,
    ShortMAC-I,
```

Listing (27)

```
    MeasResultSSTD-,
    SystemInformationBlockType1,
    SystemInformationBlockType1-v890-IEs,
    SystemInformationBlockType2,
    UEAssistanceInformation-,
    UECapabilityInformation,
    UE-CapabilityRAT-ContainerList,
    UE-RadioPagingInfo-,
,
FROM EUTRA-RRC-Definitions;
-- ASN1STOP
```

Inter-node RRC information element definitions are also described. The AS-Config IE contains information about RRC configuration information in the source eNB 160, which can be utilized by a target eNB 160 to determine the need to change the RRC configuration during the handover preparation phase. The information can also be used after the handover is successfully performed or during the RRC connection re-establishment. Listing (28) provides an example of the AS-Config information element.

Listing (28)

```
-- ASN1START
AS-Config ::=          SEQUENCE {
    sourceMeasConfig              MeasConfig,
    sourceRadioResourceConfig
    RadioResourceConfigDedicated,
    sourceSecurityAlgorithmConfig    SecurityAlgorithmConfig,
    sourceUE-Identity                C-NRTI,
    sourceMasterInformationBlock    MasterInformationBlock,
    sourceSystemInformationBlockType1
    SystemInformationBlockType1(WITH COMPONENTS
                                  {..., nonCriticalExtension
ABSENT}),
    sourceSystemInformationBlockType2
    SystemInformationBlockType2,
    antennaInfoCommon             AntennaInfoCommon,
    sourceDl-CarrierFreq           ARFCN-ValueEUTRA,
    ...,
    [[ sourceSystemInformationBlockType1Ext   OCTET STRING
(CONTAINING
                             SystemInformationBlockType1-v890-IEs)
    OPTIONAL,
        sourceOtherConfig-r9     OtherConfig-r9
-- sourceOtherConfig-r9 should have been optional. A target eNB
compliant with this transfer
-- syntax should support receiving an AS-Config not including
this extension addition group
-- e.g. from a legacy source eNB
    ]],
    [[ sourceSCellConfigList-r10    SCellToAddModList-r10
        OPTIONAL
    ]],
    [[ sourceConfigSCG-           SCG-Config-     OPTIONAL
    ]]
}
AS-Config-v9e0 ::=          SEQUENCE {
    sourceDl-CarrierFreq-v9e0      ARFCN-ValueEUTRA-v9e0
}
AS-Config-v10j0 ::=         SEQUENCE {
    antennaInfoDedicatedPCell-v10i0    AntennaInfoDedicated-v10i0
        OPTIONAL
}
AS-Config-v1250 ::=         SEQUENCE {
    sourceNR-OffloadConfig-          NR-OffloadConfig-
        OPTIONAL,
    sourceSL-CommConfig-             SL-CommConfig-
        OPTIONAL,
    sourceSL-DiscConfig-             SL-DiscConfig-
        OPTIONAL
}
```

Listing (28)

```
AS-Config-v1320 ::=           SEQUENCE {
    sourceSCellConfigList-        SCellToAddModListExt-
        OPTIONAL,
    sourceNRCLNI-Configuration-   NRCLNI-Configuration-
        OPTIONAL
}
-- ASN1STOP
```

It should be noted that the AS-Config re-uses information elements primarily created to cover the radio interface signaling requirements. Consequently, the information elements may include some parameters that are not relevant for the target eNB 160 (e.g., the SFN as included in the MasterInformationBlock).

TABLE 20

AS-Config field descriptions antennaInfoCommon
This field provides information about the number of antenna ports in the source PCell.
sourceDL-CarrierFreq
Provides the parameter Downlink EUTRA Absolute radio-frequency channel number (EARFCN) in the source PCell, see TS 36.101 [42].
If the source eNB provides AS-Config-v9e0, it sets sourceDl-CarrierFreq (i.e. without suffix) to maxEARFCN.
sourceOtherConfig
Provides other configuration in the source PCell.
sourceMasterInformationBlock
MasterInformationBlock transmitted in the source PCell.
sourceMeasConfig
Measurement configuration in the source cell. The measurement configuration for all measurements existing in the source eNB when handover is triggered shall be included. See 10.5.
sourceNRCLNI-Configuration
NRCLNI Configuration in the source PCell.
sourceSL-CommConfig
This field covers the sidelink communication configuration.
sourceSL-DiscConfig
This field covers the sidelink discovery configuration.
sourceRadioResourceConfig
Radio configuration in the source PCell. The radio resource configuration for all radio bearers existing in the source PCell when handover is triggered shall be included. See 10.5.
sourceSCellConfigList
Radio resource configuration (common and dedicated) of the SCells configured in the source eNB.
sourceSecurityAlgorithmConfig
This field provides the AS integrity protection (SRBs) and AS ciphering (SRBs and DRBs) algorithm configuration used in the source PCell.
sourceSystemInformationBlockType1
SystemInformationBlockType1 transmitted in the source PCell.
sourceSystemInformationBlockType2
SystemInformationBlockType2 transmitted in the source PCell.

The IE AS-Context is used to transfer local E-UTRAN context required by the target eNB 160. Listing (29) provides an example of the AS-Context information element.

Listing (29)

```
-- ASN1START
AS-Context ::=                SEQUENCE {
    reestablishmentInfo           ReestablishmentInfo
        OPTIONAL -- Cond HO
}
AS-Context-v1130 ::=          SEQUENCE {
    idc-Indication-               OCTET STRING (CONTAINING
                                      InDeviceCoexIndication-)
        OPTIONAL, -- Cond HO2
    mbmsInterestIndication-       OCTET STRING (CONTAINING
                                      MBMSInterestIndication-)
        OPTIONAL, -- Cond HO2
    powerPref Indication-         OCTET STRING (CONTAINING
                                      UEAssistanceInformation-)
        OPTIONAL, -- Cond HO2
    ...,
    [[ sidelinkUEInformation-     OCTET STRING (CONTAINING
                                      SidelinkUEInformation-)
        OPTIONAL -- Cond HO2
    ]]
}
AS-Context-v1320 ::=          SEQUENCE {
    NRConnectionStatusReport-  OCTET STRING (CONTAINING
                                      NRConnectionStatusReport-)
        OPTIONAL-- Cond HO2
}
-- ASN1STOP
```

TABLE 21

AS-Context field descriptions idc-Indication
Including information used for handling the IDC problems.
reestablishmentInfo
Including information needed for the RRC connection re-establishment.

TABLE 22

| Conditional presence | Explanation |
|---|---|
| HO | The field is mandatory present in case of handover within E-UTRA; otherwise the field is not present. |
| HO2 | The field is optional present in case of handover within E-UTRA; otherwise the field is not present. |

UE capability related constraints and performance requirements are also described. Table 23 lists constraints regarding the UE capabilities that E-UTRAN is assumed to take into account. Table 24 provides RRC control procedures.

TABLE 23

| Parameter | Description | Value | NB-IoT |
|---|---|---|---|
| #DRBs | The number of DRBs that a UE shall support | 8 | (0, 1, 2) NOTE 1 |
| #RLC-AM | The number of RLC AM entities that a UE shall support | 10 | (2, 3) NOTE 1 |
| #minCellperMeasObjectEUTRA | The minimum number of neighbor cells (excluding black list cells) that a UE shall be able to store within a MeasObjectEUTRA. NOTE. | 32 | N/A |

TABLE 23-continued

| Parameter | Description | Value | NB-IoT |
|---|---|---|---|
| #minBlackCellRangesperMeasObjectEUTRA | The minimum number of blacklist cell PCI ranges that a UE shall be able to store within a MeasObjectEUTRA | 32 | N/A |
| #minCellperMeasObjectUTRA | The minimum number of neighbor cells that a UE shall be able to store within a MeasObjectUTRA. NOTE. | 32 | N/A |
| #minCellperMeasObjectGERAN | The minimum number of neighbor cells that a UE shall be able to store within a measObjectGERAN. NOTE. | 32 | N/A |
| #minCellperMeasObject5G NR | The minimum number of neighbor cells that a UE shall be able to store within a measObject5G_NR. NOTE. | 32 | N/A |
| #minCellTotal | The minimum number of neighbor cells (excluding black list cells) that UE shall be able to store in total in all measurement objects configured | 256 | N/A |

NOTE:
In case of CGI reporting, the limit regarding the cells E-UTRAN can configure includes the cell for which the UE is requested to report CGI i.e. the amount of neighbor cells that can be included is at most (# minCellperMeasObjectRAT - 1), where RAT represents EUTRA/UTRA/GERAN/CDMA2000/5G-NR respectively.
NOTE 1:
DRBs based on UE capability, #RLC-AM = #DRBs + 2.

TABLE 24

| Procedure title: | E-UTRAN -> UE | UE -> E-UTRAN | N | Notes |
|---|---|---|---|---|
| | RRC Connection Control Procedures | | | |
| RRC connection establishment | RRCConnectionSetup | RRCConnectionSetupComplete | 15 | |
| RRC connection release | RRCConnectionRelease | | NA | |
| RRC connection re-configuration (radio resource configuration) | RRCConnectionReconfiguration | RRCConnectionReconfigurationComplete | 15 | |
| RRC connection re-configuration (measurement configuration) | RRCConnectionReconfiguration | RRCConnectionReconfigurationComplete | 15 | |
| RRC connection re-configuration (intra-LTE mobility) | RRCConnectionReconfiguration | RRCConnectionReconfigurationComplete | 15 | |
| RRC connection reconfiguration (SCell addition/release) | RRCConnectionReconfiguration | RRCConnectionReconfigurationComplete | 20 | |
| RRC connection reconfiguration (SC establishment/ release, SC cell addition/ release) | RRCConnectionReconfiguration | RRCConnectionReconfigurationComplete | 20 | |
| RRC connection re-establishment | RRCConnectionReestablishment | RRCConnectionReestablishmentComplete | 15 | |
| Initial security activation | SecurityModeCommand | SecurityModeCommandComplete/ SecurityModeCommandFailure | 10 | |
| Initial security activation + RRC connection re-configuration (RB establishment) | SecurityModeCommand, RRCConnectionReconfiguration | RRCConnectionReconfigurationComplete | 20 | The two DL messages are transmitted in the same TTI |
| Paging | Paging | | NA | |
| | Inter RAT mobility | | | |
| Handover to E-UTRA | RRCConnectionReconfiguration (sent by other RAT) | RRCConnectionReconfigurationComplete | NA | The performance of this procedure is specified in [50] in case of handover from GSM and [29], [30] in case of |

TABLE 24-continued

| Procedure title: | E-UTRAN -> UE | UE -> E-UTRAN | N | Notes |
|---|---|---|---|---|
| Handover from E-UTRA | MobilityFromEUTRACommand | | NA | handover from UTRA. The performance of this procedure is specified in [16] |
| Handover from E-UTRA to CDMA2000 | HandoverFromEUTRAPreparationRequest (CDMA2000) | | NA | Used to trigger the handover preparation procedure with a CDMA2000 RAT. The performance of this procedure is specified in [16] |
| Handover from E-UTRA to 5G NR | HandoverFromEUTR to 5G NR | | NA | Used to trigger the handover preparation procedure with a 5G NR RAT. |
| Handover to E-UTRA from 5G NR | RRCConnectionReconfiguration (sent by other 5G NR RRM) | | NA | Used to trigger the handover procedure from a 5G NR RAT to EUTRAN. |
| | | Measurement procedures | | |
| Measurement Reporting | | MeasurementReport | NA | |
| | | Other procedures | | |
| UE capability transfer | UECapabilityEnquiry | UECapabilityInformation | 10 | |
| Counter check | CounterCheck | CounterCheckResponse | 10 | |
| Proximity indication | | ProximityIndication | NA | |
| UE information | UEInformationRequest | UEInformationResponse | 15 | |
| MBMS counting | MBMSCountingRequest | MBMSCountingResponse | NA | |
| MBMS interest indication | | MBMSInterestIndication | NA | |
| In-device coexistence indication | | InDeviceCoexIndication | NA | |
| UE assistance information | | UEAssistanceInformation | NA | |
| SC failure information | | SCGFailureInformation | NA | |
| Sidelink UE information | | SidelinkUEInformation | NA | |
| NR Connection Status Reporting | | NRConnectionStatusReport | NA | |

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-Acknowledgment (ACK) information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB NR module 194. The eNB NR module 194 may perform NR operations as described above.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 is a block diagram illustrating non-collocated LTE-Next Generation Radio (NR) aggregation (LNRA) overall architecture. A first eNB 260a may communicate with an Mobility Management Entity (MME) and/or Serving-Gateway (S-GW) 201 via a first S1 interface 203a. A second eNB 260b may communicate with the MME/S-GW 201 via a second S1 interface 203b.

The first eNB 260a may communicate with a first NR base station 207a via a first $X_{NR}$ interface 205a. The first eNB 260a may communicate with a second NR base station 207b via a second $X_{NR}$ interface 205b.

The second eNB 260b may communicate with the first NR base station 207a via a third $X_{NR}$ interface 205c. The second eNB 260b may communicate with the second NR base station 207b via a fourth $X_{NR}$ interface 205d. In FIG. 2, an NR base station 207 terminates the $X_{NR}$ interface 204 for NR.

FIG. 3 is a block diagram illustrating LNRA radio protocol architecture for a collocated scenario. In this implementation, LTE and NR communication may be performed at a single location that includes an LTE-eNB 360 component and an NR base station 307 component or with separate locations.

A first Packet Data Convergence Protocol (PDCP) 309a may receive an LTE bearer 309 on an S1 interface 303. The first PDCP 309a may communicate with a first Radio Link Control (RLC) 311a, which communicates with the Medium Access Control (MAC) 315 of the LTE-eNB 360.

A second PDCP 309b may receive a split NR bearer 311 on the S1 interface 303. The second PDCP 309b may communicate with a second RLC 311a, which communicates with the MAC 315 of the LTE-eNB 360. The second PDCP 309b also communicates with the NR-RLC 314 of the NR 307.

A third PDCP 309c may receive a switched NR bearer 313 on the S1 interface 303. The third PDCP 309c may communicate with the NR-RLC 314 of the NR 307. The NR-RLC 314 may communicate with an NR-MAC 317 of the NR 307.

Figure 4:
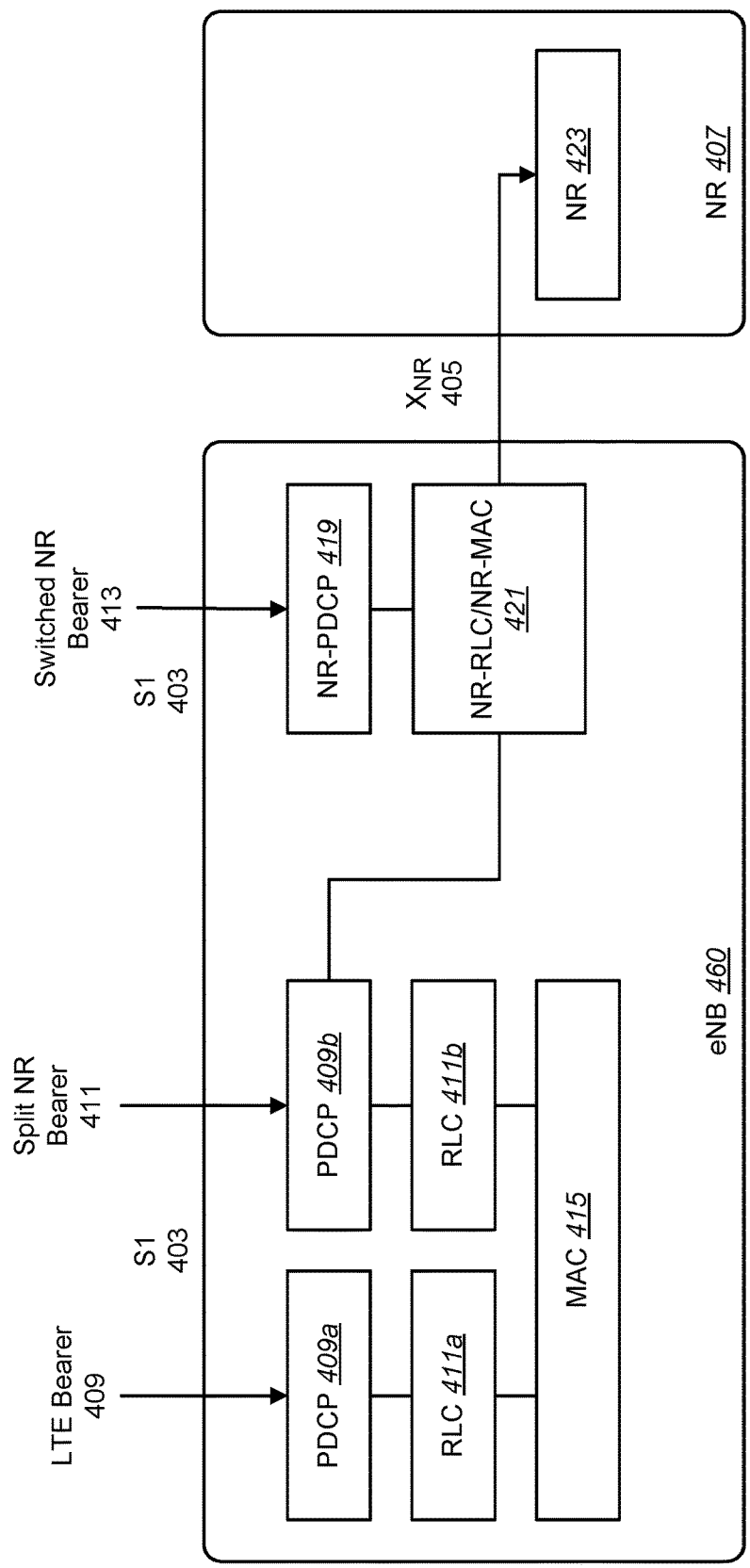
FIG. 4 is a block diagram illustrating new radio aggregation (NRA) radio protocol architecture for a collocated or non-collocated split scenario.

FIG. 4 is a block diagram illustrating NRA radio protocol architecture for a collocated or non-collocated split scenario. In this implementation, LTE communication may be performed at an eNB 460 and NR communication may be performed by an NR base station 407.

A first PDCP 409a may receive an LTE bearer 409 on an S1 interface 403. The first PDCP 409a may communicate with a first RLC 411a, which communicates with the MAC 415 of the eNB 460.

A second PDCP 409b may receive a split NR bearer 411 on the S1 interface 403. The second PDCP 409b may communicate with a second RLC 411a, which communicates with the MAC 415 of the eNB 460. The second PDCP 409b also communicates with the NR-RLC/NR-MAC 421 of the eNB 460.

An NR-PDCP 419 may receive a switched NR bearer 413 on the S1 interface 403. The NR-PDCP 419 may communicate with the NR-RLC/NR-MAC 421 of the eNB 460. The NR-RLC/NR-MAC 421 of the eNB 460 may communicate with an NR physical layer 423 of the NR 407 via an $X_{NR}$ interface 405.

Figure 5:
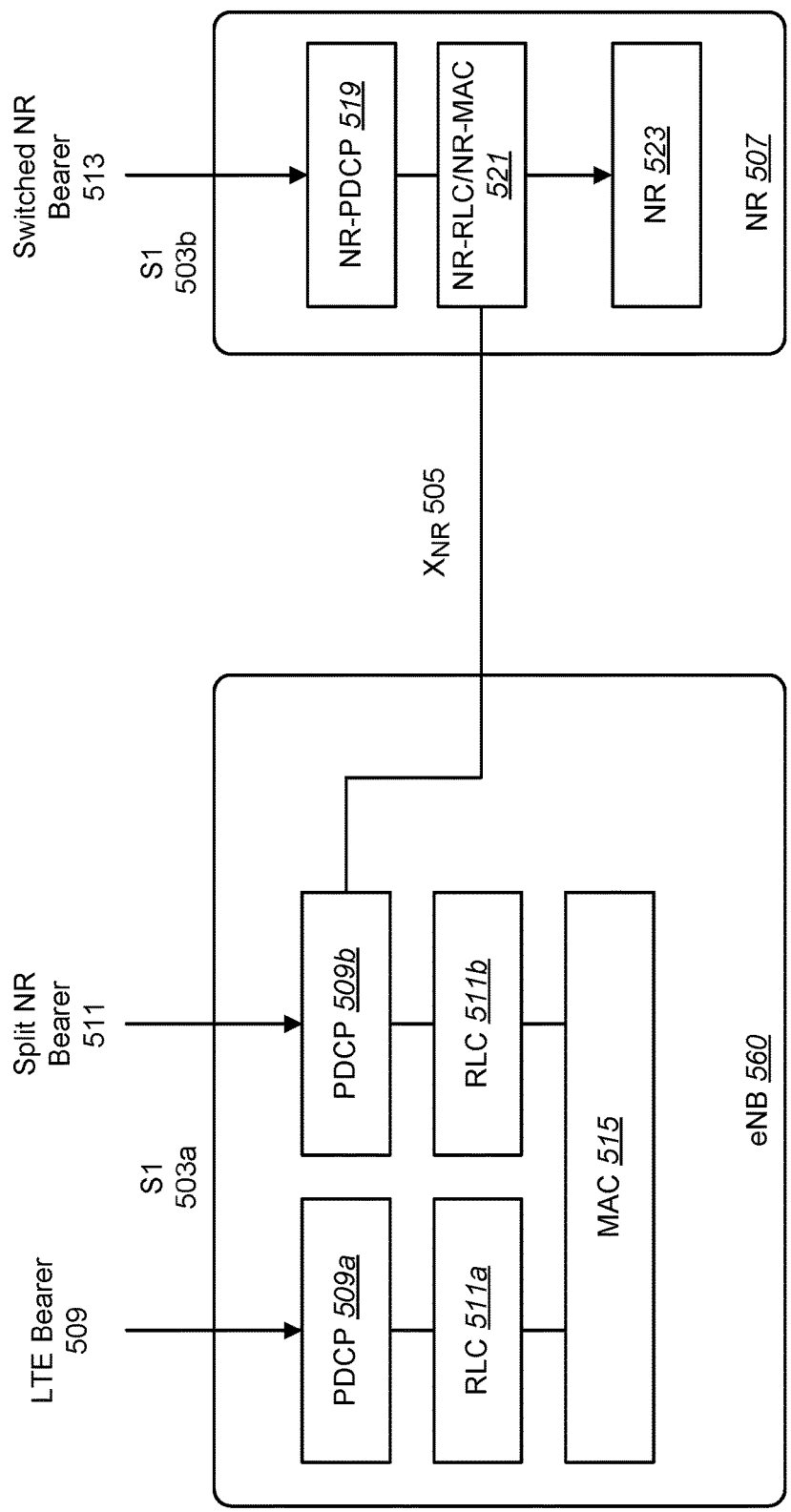
FIG. 5 is a block diagram illustrating NRA radio protocol architecture for a non-collocated scenario.
Figure 6:
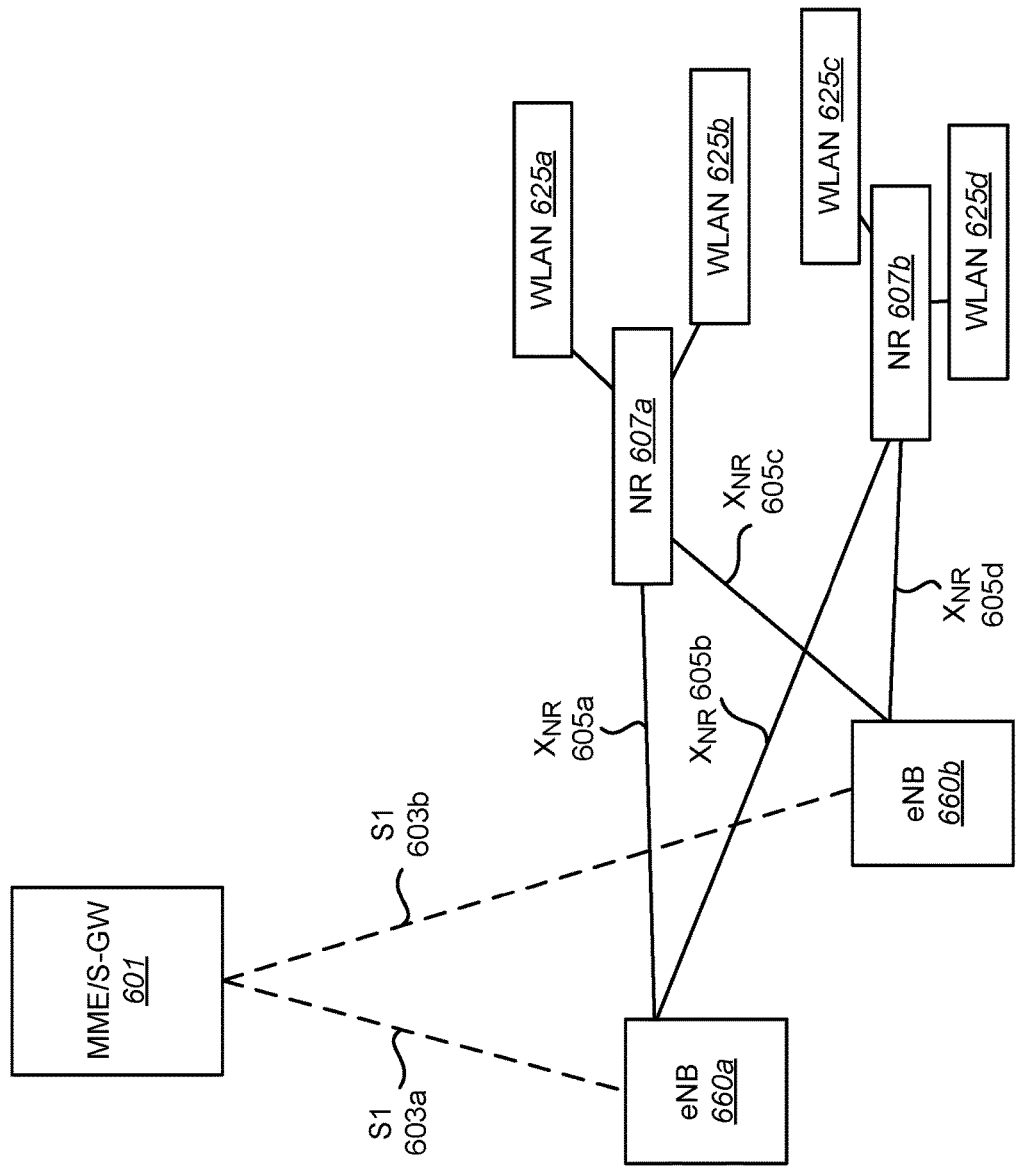
FIG. 6 is a block diagram illustrating NRA tight interworking with a wireless local area network (WLAN) for a non-collocated scenario.

FIG. 5 is a block diagram illustrating NRA radio protocol architecture for a non-collocated scenario. In this implementation, LTE communication may be performed by an eNB 560 and NR communication may be performed by an NR base station 507.

A first Packet Data Convergence Protocol (PDCP) 509a may receive an LTE bearer 509 on an S1 interface 503a. The first PDCP 509a may communicate with a first Radio Link Control (RLC) 511a, which communicates with the MAC 515 of the eNB 560.

A second PDCP 509b may receive a split NR bearer 511 on the S1 interface 503a. The second PDCP 509b may communicate with a second RLC 511a, which communicates with the MAC 515 of the eNB 560. The second PDCP 509b also communicates with the NR-RLC/NR-MAC 521 of the NR 507 via an $X_{NR}$ interface 505.

An NR-PDCP 519 of the NR 507 may receive a switched NR bearer 513 on the S1 interface 503b. The NR-PDCP 519 may communicate with the NR-RLC/NR-MAC 521 of the NR 507. The NR-RLC/NR-MAC 521 may communicate with an NR physical layer 523 of the NR 507.

FIG. 6 is a block diagram illustrating NRA tight interworking with a WLAN for a non-collocated scenario. A first eNB 660a may communicate with an MME/S-GW 601 via a first S1 interface 603a. A second eNB 660b may communicate with the MME/S-GW 601 via a second S1 interface 603b.

The first eNB 660a may communicate with a first NR base station 607a via a first $X_{NR}$ interface 605a. The first eNB 660a may communicate with a second NR base station 607b via a second $X_{NR}$ interface 605b.

The second eNB 660b may communicate with the first NR base station 607a via a third $X_{NR}$ interface 605c. The second eNB 660b may communicate with the second NR base station 607b via a fourth $X_{NR}$ interface 605d.

The first NR base station 607a is connected to a first WLAN access point 625a and a second WLAN access point 625b. The second NR base station 607b is connected to a third WLAN access point 625c and a fourth WLAN access point 625d.

FIG. 7 is a block diagram illustrating LNRA radio protocol architecture for a collocated scenario. In this implementation, LTE, NR and wireless local area network (WLAN) communication may be performed at a single location that includes an LTE-eNB 760 portion, an NR base station 707 portion and a WLAN 725 access point portion 725 or in multiple locations with various technology combinations.

A PDCP 709a may receive an LTE bearer 709 on an S1 interface 703. The first PDCP 709a may communicate with a first RLC 711a, which communicates with the MAC 715 of the LTE-eNB 760.

A second PDCP 709b may receive a split NR bearer 711 on the S1 interface 703. The second PDCP 709b may communicate with a second RLC 711a, which communicates with the MAC 715 of the LTE-eNB 760. The second PDCP 709b also communicates with the NR-RLC 714 of the NR 707.

A third PDCP 709c may receive a switched NR bearer 713 on the S1 interface 703. The third PDCP 709c may communicate with the NR-RLC 714 of the NR 707. The NR-RLC 714 may communicate with an NR-MAC 717 of the NR 707. The third PDCP 709c may also communicate with a Lightweight Access Point Protocol (LWAPP) 729 of the WLAN 725.

A fourth PDCP 709d may receive a switched WLAN bearer 727 on the S1 interface 703. The fourth PDCP 709d may communicate with the LWAPP 729. The LWAPP 729 may communicate with the WLAN physical layer 731.

FIG. 8 is a block diagram illustrating NRA radio protocol architecture for a collocated or non-collocated split scenario. In this implementation, LTE communication may be performed at an eNB 860 and NR communication may be performed by an NR base station 807.

A first PDCP 809a may receive an LTE bearer 809 on an S1 interface 803. The first PDCP 809a may communicate with a first RLC 811a, which communicates with the MAC 815 of the eNB 860.

A second PDCP 809b may receive a split NR bearer 811 on the S1 interface 803. The second PDCP 809b may communicate with a second RLC 811a, which communicates with the MAC 815 of the eNB 860. The second PDCP 809b also communicates with the NR-RLC/NR-MAC 821 of the eNB 860.

An NR-PDCP 819 may receive a switched NR bearer 813 on the S1 interface 803. The NR-PDCP 819 may communicate with the NR-RLC/NR-MAC 821 of the eNB 860. The NR-RLC/NR-MAC 821 of the eNB 860 may communicate with an NR physical layer 823 of the NR 807 via an $X_{NR}$ interface 805. The NR-PDCP 819 may communicate with an LWAPP 829 of the eNB 860. The LWAPP 829 of the eNB 860 may communicate with a WLAN-AP physical layer 833 on the WLAN 825.

FIG. 9 is a block diagram illustrating NRA radio protocol architecture for a non-collocated scenario. In this implementation, LTE communication may be performed by an eNB 960, NR communication may be performed by an NR base station 907 and WLAN communication may be performed by a WLAN access point 925.

A first Packet Data Convergence Protocol (PDCP) 909a of the eNB 960 may receive an LTE bearer 909 on an S1 interface 903a. The first PDCP 909a may communicate with a first Radio Link Control (RLC) 911a, which communicates with the MAC 915 of the eNB 960.

A second PDCP 909b may receive a split NR bearer 911 on the S1 interface 903a. The second PDCP 909b may communicate with a second RLC 911a, which communicates with the MAC 915 of the eNB 960. The second PDCP 909b also communicates with the NR-RLC/NR-MAC 921 of the NR 907 via an $X_{NR}$ interface 905.

An NR-PDCP 919 of the NR 907 may receive a switched NR bearer 913 on an S1 interface 903b. The NR-PDCP 919 may communicate with the NR-RLC/NR-MAC 921 of the NR 907. The NR-PDCP 819 may also communicate with an LWAPP 929 of the WLAN 925. The NR-RLC/NR-MAC 921 may communicate with an NR physical layer 923 of the NR 907.

A PDCP 909c of the WLAN 925 may receive a switched WLAN bearer 927 on an S1 interface 903c. The PDCP 909c may communicate with the LWAPP 929. The LWAPP 929 may communicate with the WLAN physical layer 831 on the WLAN 825

FIG. 10 is a block diagram illustrating user plane (U-Plane) connectivity of an eNB 1060 and an NR base station 1007 for NRA. The eNB 1060 may connect to the S-GW 1035 via an S1 user plane (S1-U) interface 1037. The eNB 1060 may connect to the NR 1007 via an $X_{NR}$ user plane ($X_{NR}$-U) interface 1039.

FIG. 11 is a block diagram illustrating U-Plane connectivity of an eNB 1160, an NR base station 1107, and WLAN 1125. The eNB 1160 may connect to the S-GW 1135 via an S1-U interface 1137. The eNB 1160 may connect to the NR 1107 via an $X_{NR}$-U interface 1139. The eNB 1160 may connect to the WLAN 1125 via an $X_W$ user plane ($X_W$-U) interface 1141. The NR 1107 may communicate with the WLAN 1125.

FIG. 12 is a block diagram illustrating one configuration of U-Plane direct connectivity of an eNB 1260, an NR base station 1207, and WLAN 1225. The eNB 1260 may connect to the S-GW 1235 via a first S1-U interface 1237a. The eNB 1260 may connect to the NR 1207 via an $X_{NR}$-U interface 1239.

The NR 1207 may connect to the S-GW 1235 via a second S1-U interface 1237b. The NR 1207 may communicate with the WLAN 1225.

FIG. 13 is a block diagram illustrating another configuration of U-Plane direct connectivity of an eNB 1360, an NR base station 1307, and WLAN 1325. The eNB 1360 may connect to the S-GW 1335 via a first S1-U interface 1337a. The eNB 1360 may connect to the NR 1307 via an $X_{NR}$-U interface 1339. The eNB 1360 may connect to the WLAN 1325 via an $X_W$-U interface 1341.

The NR 1307 may connect to the S-GW 1335 via a second S1-U interface 1337b. The NR 1307 may communicate with the WLAN 1325. The WLAN 1325 may communicate with the S-GW 1335 via a third S1-U interface 1337c.

FIG. 14 is a block diagram illustrating control plane (C-Plane) connectivity of an eNB 1460, an NR base station 1407, and WLAN 1425 for NRA. The eNB 1460 may connect to a mobility management entity (MME) 1443 via an S1-MME interface 1445. The eNB 1460 may connect to the NR 1407 via an $X_{NR}$-C interface 1449. The eNB 1460 may connect to the WLAN 1425 via an $X_W$-C interface 1447.

FIG. 15 is a sequence diagram illustrating an NR addition procedure. In FIG. 15, there is a single RRM located at the eNB. In this case, all traffic (control plane and user plane) is via the eNB. FIG. 15 depicts a UE 1502, an eNB 1560, an NR base station (NR) 1507 and an SGW 1535.

The eNB 1560 and the NR 1507 may communicate 1501 control signaling. The UE 1502 and the eNB 1560 may also communicate 1503 control signaling.

The UE 1502 and the eNB 1560 may communicate 1505 user data. The eNB 1560 and SGW 1535 may also communicate 1508 user data.

The eNB 1560 may send 1509 a NR Addition (Add) Request to the NR 1507. The NR 1507 may send 1511 a NR Add Acknowledgement (Ack) to the eNB 1560.

The eNB 1560 may send 1513 a RRCConnectionReconfiguration message to the UE 1502. The UE 1502 may send 1515 a RRCConnectionReconfigurationComplete message to the eNB 1560. The UE 1502 may start 1517 using the NR configuration and perform User Plane Access.

The NR 1507 may send 1519 a NR Access Ack to the eNB 1560. The UE 1502 may send 1521 an NRConnectionStatusReport message to the eNB 1560.

The eNB 1560 and the SGW 1535 may communicate 1523 user data. The eNB 1560 and the NR 1507 may communicate 1525 user data. The UE 1502 and the NR 1507 may communicate user data.

FIG. 16 is a sequence diagram illustrating an NR-WLAN addition procedure. FIG. 16 depicts a UE 1602, an eNB 1660, an NR base station (NR) 1607 and a WLAN 1625. In FIG. 16, there is a single RRM located at the eNB 1660. In this case, all traffic (e.g., control plane and user plane) is via the eNB 1660.

The eNB 1660 may send 1601 an NR Add request (ReQ) (+WLAN) to the NR 1607. The NR 1607 may send 1603 a WLAN Addition Request to the WLAN 1625. The WLAN 1625 may send 1605 a WLAN Add Ack to the NR 1607. The NR 1607 may send 1608 an NR Add Ack (+WLAN) to the eNB 1660.

The eNB 1660 may send 1609 a RRCConnectionReconfiguration message to the UE 1602. The UE 1602 may send 1611 a RRCConnectionReconfigurationComplete message to the eNB 1660. The UE 1602 may start 1613 using the NR and WLAN configuration and perform NR User Plane Access and/or WLAN association.

The WLAN 1625 may send 1615 a WLAN Access Ack to the NR 1607. The NR 1607 may send 1617 an NR Access Ack to the eNB 1660. The UE 1602 may send 1619 an NRConnectionStatusReport message to the eNB 1660.

The eNB 1660 and the NR 1607 may communicate 1621 user data. The NR 1607 and the WLAN 1625 may communicate 1623 user data. The UE 1602 and the NR 1607 may communicate 1626 user data. The UE 1602 and the WLAN 1625 may communicate 1627 user data.

FIG. 17 is a sequence diagram illustrating another NR-WLAN addition procedure. FIG. 17 depicts a UE 1702, an eNB 1760, an NR base station (NR) 1707 and a WLAN 1725. In FIG. 17, there is a single RRM located at the eNB 1760. In this case, the control plane is via the NR 1707 and eNB 1760. There is a direct WLAN user plane to the eNB 1760.

The eNB 1760, the NR 1707 and the WLAN 1725 may establish 1701 an $X_{NR}$-C. The eNB 1760 may send 1703 an NR Add ReQ (+WLAN) to the NR 1707. The NR 1707 may send 1705 a WLAN Addition Request to the WLAN 1725. The WLAN 1725 may send 1708 a WLAN Add Ack to the NR 1707. The NR 1707 may send 1709 an NR Add Ack (+WLAN) to the eNB 1760.

The eNB 1760 may send 1711 an RRCConnectionReconfiguration message to the UE 1702. The UE 1702 may send 1713 an RRCConnectionReconfigurationComplete to the eNB 1760. The UE 1702 may start 1715 using the NR and WLAN configuration and perform NR User Plane Access and/or WLAN association.

The WLAN 1725 may send 1717 a WLAN Access Ack to the NR 1707. The NR 1707 may send 1719 an NR Access Ack to the eNB 1760. The UE 1702 may send 1721 an NRConnectionStatusReport message to the eNB 1760.

The eNB 1760 and the WLAN 1725 may communicate 1723 user data. The eNB 1760 and the NR 1707 may communicate 1726 user data. The UE 1702 and the WLAN 1725 may communicate 1727 user data. The UE 1702 and the NR 1707 may communicate 1729 user data.

FIG. 18 is a sequence diagram illustrating another NR-WLAN addition procedure. FIG. 18 depicts a UE 1802, an eNB 1860, an NR base station (NR) 1807, a WLAN 1825, and a SGW 1835. In FIG. 18, there is a single RRM located at the eNB 1860. In this case, the control plane is via the NR 1807 and eNB 1860. There is a direct NR user plane and WLAN user plane to the SGW 1835.

The eNB 1860, the NR 1807 and the WLAN 1825 may establish 1801 an $X_{NR}$-C interface. The eNB 1860 may send 1803 an NR Add ReQ (+WLAN) to the NR 1807. The NR 1807 may send 1805 a WLAN Addition Request to the WLAN 1825. The WLAN 1825 may send 1808 a WLAN Add Ack to the NR 1807. The NR 1807 may send 1809 an NR Add Ack (+WLAN) to the eNB 1860.

The eNB 1860 may send 1811 a RRCConnectionReconfiguration message to the UE 1802. The UE 1802 may send 1813 a RRCConnectionReconfigurationComplete to the eNB 1860. The UE 1802 may start 1815 using the NR and WLAN configuration and perform NR User Plane Access and/or WLAN association.

The WLAN 1825 and the SGW 1835 may communicate 1817 user data. The NR 1807 and the SGW 1835 may communicate 1819 user data.

The WLAN 1825 may send 1821 a WLAN Access Ack to the NR 1807. The NR 1807 may send 1823 an NR Access Ack to the eNB 1860. The UE 1802 may send 1826 an NRConnectionStatusReport message to the eNB 1860.

The UE 1802 and the WLAN 1825 may communicate 1827 user data. The UE 1802 and the NR 1807 may communicate 1829 user data.

FIG. 19 is a sequence diagram illustrating another NR-WLAN addition procedure. FIG. 19 depicts a UE 1902, an eNB 1960, an NR base station (NR) 1907, a WLAN 1925, and a SGW 1935. In FIG. 19, there is a single RRM located at the eNB 1960. In this case, the control plane is via the NR 1907 and eNB 1960. The WLAN user plane is via the NR 1907. There is a direct NR user plane to the SGW 1935.

The eNB 1960, the NR 1907 and the WLAN 1925 may establish 1901 an $X_{NR}$-C interface. The eNB 1960 may send 1903 an NR Add ReQ (+WLAN) to the NR 1907. The NR 1907 may send 1905 a WLAN Addition Request to the WLAN 1925. The WLAN 1925 may send 1908 a WLAN Add Ack to the NR 1907. The NR 1907 may send 1909 an NR Add Ack (+WLAN) to the eNB 1960.

The eNB 1960 may send 1911 a RRCConnectionReconfiguration message to the UE 1902. The UE 1902 may send 1913 a RRCConnectionReconfigurationComplete message to the eNB 1960. The UE 1902 may start 1915 using the NR and WLAN configuration and perform NR User Plane Access and/or WLAN association.

The WLAN 1925 and the NR 1907 may communicate 1917 user plane data. The NR 1907 and the SGW 1935 may communicate 1919 user plane data.

The WLAN 1925 may send 1921 a WLAN Access Ack to the NR 1907. The NR 1907 may send 1923 an NR Access Ack to the eNB 1960. The UE 1902 may send 1926 an NRConnectionStatusReport message to the eNB 1960.

The UE 1902 and the WLAN 1925 may communicate 1927 user plane data. The UE 1902 and the NR 1907 may communicate 1929 user plane data.

Figure 20A:
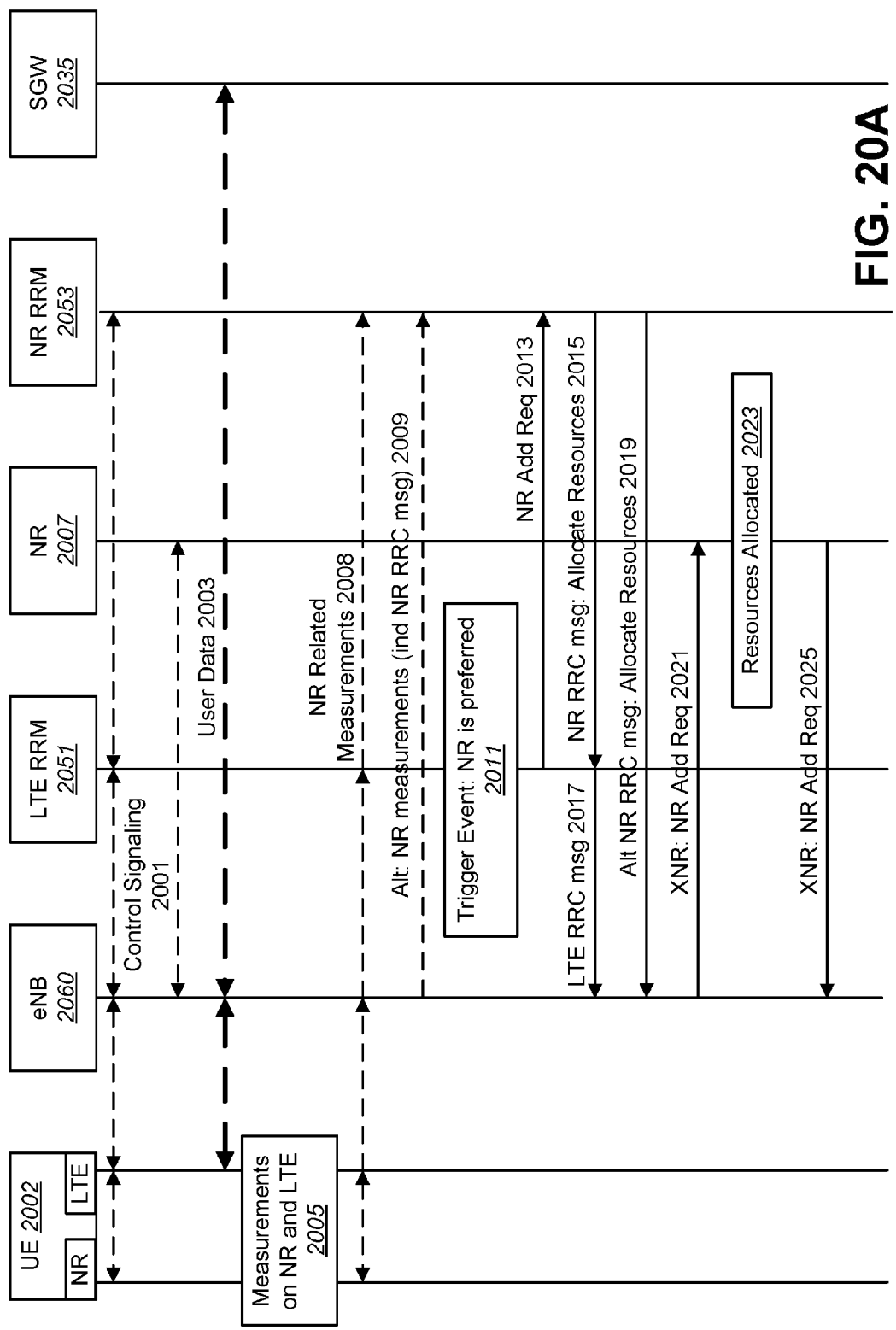

FIGS. 20A and 20B are a sequence diagram illustrating another NR addition procedure. FIGS. 20A and 20B depict a UE 2002, an eNB 2060, a LTE RRM 2051, an NR base station (NR) 2007, an NR RRM 2053, and a SGW 2035. In FIGS. 20A and 20B, there is a separate LTE RRM 2051 and NR RRM 2053. The UE 2002 includes an NR portion and an LTE portion.

The LTE and NR portions of the UE 2002, the eNB 2060, the LTE RRM 2051, and the NR RRM 2053 may communicate 2001 control signaling. The eNB 2060 and the NR 2007 may also communicate 2001 control signaling. The LTE portion of the UE 2002, the eNB 2060 and the SGW 2035 may communicate 2003 user data.

The UE 2002 may take measurements 2005 on NR and LTE. The NR and LTE portions of the UE 2002 may send 2008 the NR related measurements to the eNB 2060. The eNB 2060 may send 2008 the NR related measurements to the LTE RRM 2051, which sends the NR related measurements to the NR RRM 2053.

Alternately, the eNB 2060 may send 2009 the NR measurements to the NR RRM 2053. For example, the eNB 2060 may include the NR measurements in an NR RRC message.

The LTE RRM 2051 may have a trigger event 2011, that NR is preferred. The LTE RRM 2051 may send 2013 an NR Addition Request to the NR RRM 2053. The NR RRM 2053 may send 2015 an NR RRC message to allocate resources to the LTE RRM 2051, and the LTE RRM 2051 may send 2017 an LTE RRC message to the eNB 2060. Alternatively, the NR RRM 2053 may send 2019 an NR RRC message to the eNB 2060 to allocate resources. The eNB 2060 may send 2021 an NR Addition Request to the NR 2007 via the $X_{NR}$. The NR 2007 may allocate 2023 resources. The NR 2007 may send 2025 a NR Addition Request to the eNB 2060 via the $X_{NR}$.

Continuing in FIG. 20B, the eNB 2060 may send 2027 a LTE RRC message to the LTE RRM 2051. The LTE RRM 2051 may send 2029 an NR RRC message with an allocate response to the NR RRM 2053. Alternately, the eNB 2060 may send 2031 an NR RRC message with allocate response to the NR RRM 2053. The NR RRM 2053 may send 2033 an NR Addition Response Acknowledgement to the LTE RRM 2051.

The LTE RRM may send 2034 an RRCConnectionReconfiguration message to the LTE portion of the UE 2002. The LTE portion may communicate the RRCConnectionReconfiguration message to the NR portion of the UE 2002. The LTE portion of the UE 2002 may send 2036 an RRCConnectionReconfigurationComplete to the LTE RRM 2051.

The NR portion of the UE 2002 may send 2037 an NR Connection Establishment message to the NR 2007. The NR 2007 may send 2039 an NR Connection Establishment ACK to the NR portion of the UE 2002. The NR 2007 may send 2041 an NR Access Complete to the eNB 2060.

The NR portion of the UE 2002 may communicate a NRConnectionStatusReport to the LTE portion of the UE 2002. The LTE portion may send 2045 the NRConnectionStatusReport to the LTE RRM 2051. The LTE RRM 2051 may send 2047 an NR Steering Complete message to the NR RRM 2053. The LTE RRM 2051, the NR 2007 and the NR RRM 2053 may re-route 2049 DRB data toward an NR bearer.

The eNB 2060 and the SGW 2035 may communicate 2052 user data. The eNB 2060 and the NR 2007 may communicate 2054 user data. The NR portion of the UE 2002 and the NR 2007 may communicate 2055 user data.

Figure 21A:
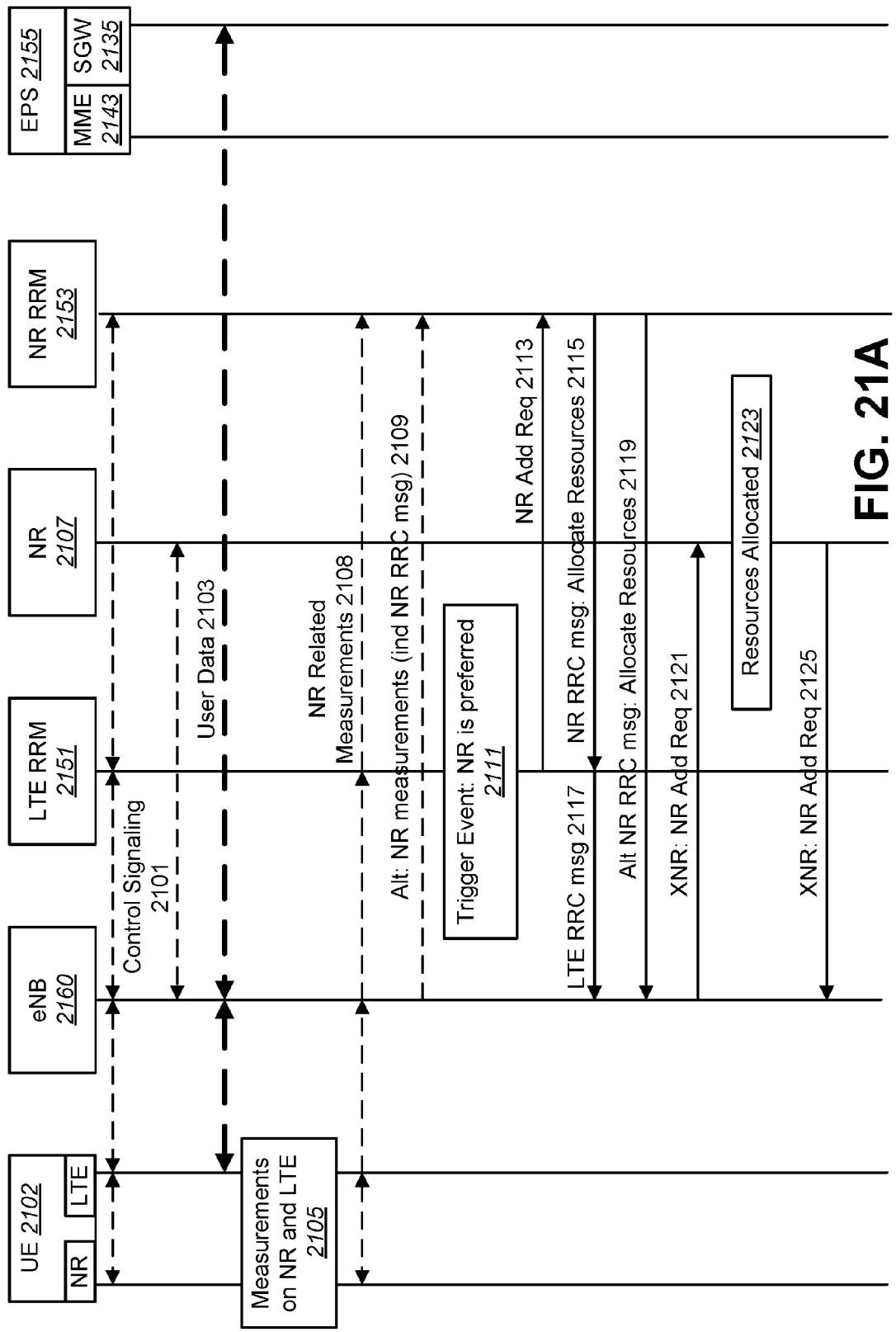
FIGS. 21A and 21B are a sequence diagram illustrating another NR addition procedure with direct tunneling.
Figure 21B:
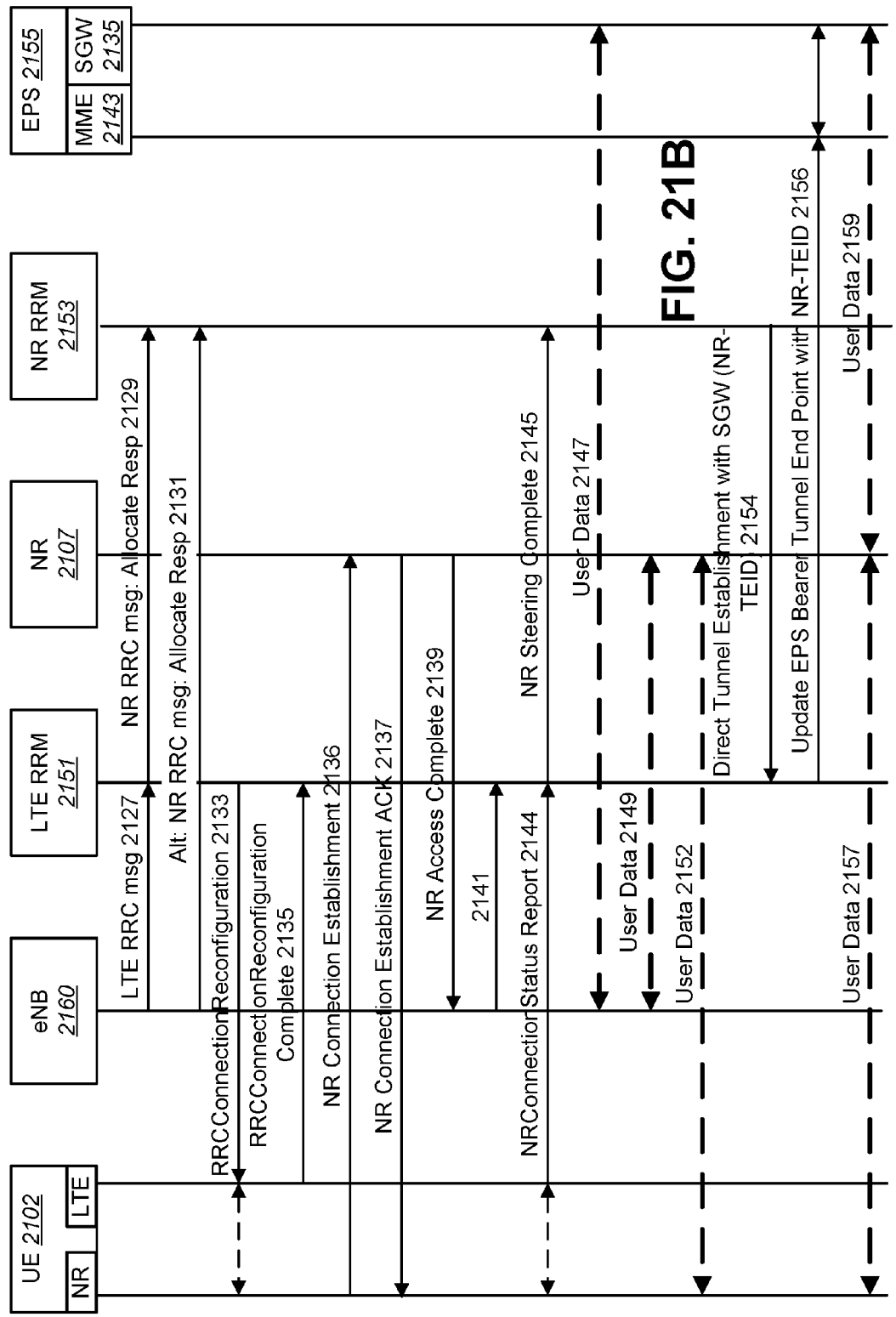

FIGS. 21A and 21B are a sequence diagram illustrating another NR addition procedure with direct tunneling. FIGS. 21A and 21B depict a UE 2102, an eNB 2160, a LTE RRM 2151, an NR base station (NR) 2107, an NR RRM 2153, and an Evolved Packet System (EPS) 2155 with MME 2143 and SGW 2135. In FIGS. 21A and 21B, there are separate LTE and NR RRMs. The same procedures can be used to perform HO, modification and/or release of DRBs with the NR.

The LTE and NR portions of the UE 2102, the eNB 2160, the LTE RRM 2151, and the NR RRM 2153 may communicate 2101 control signaling. The eNB 2160 and the NR 2107 may then communicate 2101 control signaling. The LTE portion of the UE 2102, the eNB 2160 and the SGW 2135 of the EPS 2155 may communicate 2103 user data.

The UE 2102 may take measurements 2105 on NR and LTE. The NR portion of the UE 2102 may provide NR Related Measurements to the LTE portion of the UE 2102. The eNB 2160 may send 2108 the NR related measurements to the LTE RRM 2151, which sends the NR related measurements to the NR RRM 2153.

Alternately, the eNB 2160 may send 2109 the NR measurements to the NR RRM 2153. For example, the eNB 2160 may include the NR measurements in an NR RRC message.

The LTE RRM 2151 may have a trigger event 2111, that NR is preferred. The LTE RRM 2151 may send 2113 an NR Addition Request to the NR RRM 2153. The NR RRM 2153 may send 2115 an NR RRC message to allocate resources to the LTE RRM 2151, and the LTE RRM 2151 may send 2117 an LTE RRC message to the eNB 2160. Alternatively, the NR RRM 2153 may send 2119 an NR RRC message to the eNB 2160 to allocate resources. The eNB 2160 may send 2121 an NR Addition Request to the NR 2107 via the $X_{NR}$. The NR 2107 may allocate 2123 resources. The NR 2107 may send 2125 a NR Addition Request to the eNB 2160 via the $X_{NR}$.

Continuing in FIG. 21B, the eNB 2160 may send 2127 a LTE RRC message to the LTE RRM 2151. The LTE RRM 2151 may send 2129 an NR RRC message with an allocate response to the NR RRM 2153. Alternately, the eNB 2160 may send 2131 an NR RRC message with allocate response to the NR RRM 2153.

The LTE RRM 2151 may send 2133 a RRCConnectionReconfiguration message to the LTE portion of the UE 2102. The LTE portion may communicate the RRCConnectionReconfiguration message to the NR portion of the UE 2102. The LTE portion of the UE 2102 may send 2134 a RRCConnectionReconfigurationComplete message to the LTE RRM 2151.

The NR portion of the UE 2102 may send 2136 an NR Connection Establishment message to the NR 2107. The NR 2107 may send 2137 an NR Connection Establishment ACK to the NR portion of the UE 2102.

The NR 2107 may send 2139 an NR Access Complete to the eNB 2160.

The NR portion of the UE 2102 may communicate an NRConnectionStatusReport message to the LTE portion of the UE 2102. The LTE portion of the UE 2102 may send 2144 the NRConnectionStatusReport message to the LTE RRM 2151. The LTE RRM 2151 may send 2145 an NR Steering Complete to the NR RRM 2153.

The eNB 2160 and the SGW 2135 of the EPS 2155 may communicate 2147 user data. The eNB 2160 and the NR 2107 may communicate 2149 user data. The NR portion of the UE 2102 and the NR 2107 may communicate 2152 user data.

The NR RRM 2153 may send 2154 a Direct Tunnel Establishment with SGW (NR-TEID) message to the LTE RRM 2151. The LTE RRM 2151 may send 2156 an Update EPS Bearer Tunnel End Point with NR-TEID message to the MME 2143 of the EPS 2155. The MME 2143 may communicate the Update EPS Bearer Tunnel End Point with NR-TEID message to the SGW 2135 of the EPS 2155.

The NR portion of the UE 2102 and the NR 2107 may communicate 2157 user data. The NR 2107 and the SGW 2135 of the EPS 2155 may communicate 2159 user data.

FIG. 22 is a sequence diagram illustrating a traffic steering from E-UTRAN to NR procedure. The eNB 2260 (e.g., eNB RRM) may send 2201 an RRCConnectionReconfiguration message to the UE 2202 indicating the UE 2202 to steer traffic from E-UTRAN to NR. The LTE UE 2202 may forward the indication to upper layers and replies 2203 with an RRCConnectionReconfigurationComplete message.

The 5G NR UE 2202 may perform 2205 NR Access and steers traffic from E-UTRAN to NR (subject to upper layer) after successful connection to NR. The UE 2202 may start using the new RAN Controlled LTE-NR Integration (RCL-NRI) configuration. If NR access failed, the UE sends 2207 an NRConnectionStatusReport message to the eNB 2260.

FIG. 23 is a sequence diagram illustrating a traffic steering from NR to E-UTRAN procedure. The eNB 2360 may send 2301 the RRCConnectionReconfiguration message to the UE 2302 indicating the UE 2302 to steer traffic from NR to E-UTRAN. The UE 2302 may forward the indication to upper layers and may reply 2303 with a RRCConnectionReconfigurationComplete message. The UE 2302 may steer 2305 traffic from NR to E-UTRAN. The UE 2302 may start using the new RCLNRI configuration.

FIG. 24 is a sequence diagram illustrating a traffic steering from NR to WLAN procedure. The NR RRM 2453 may steer 2401 a DRB xx from NR to WLAN. The LTE RRM 2451 may send 2403 the RRCConnectionReconfiguration message to the UE 2402 indicating the UE 2402 to steer traffic from NR to WLAN. The UE 2402 may forward the indication to upper layers and may reply 2405 to the LTE RRM 2451 with a RRCConnectionReconfigurationComplete message. The LTE RRM 2451 may indicate 2407 to the NR RRM 2453 that the steer is complete.

The UE 2402 may start 2409 using the new RCLNRI configuration and performs WLAN access and steering. If WLAN access failed, the UE 2402 sends 2411 an NRConnectionStatusReport message to the LTE RRM 2451. The LTE RRM 2451 may forward 2413 the NRConnectionStatusUpdate message to the NR RRM 2453.

FIG. 25 is a sequence diagram illustrating a traffic steering from WLAN to NR procedure. The NR RRM 2553 may steer 2501 a DRB xx from WLAN to NR. The LTE RRM 2551 may send 2503 the RRCConnectionReconfiguration message to the UE 2502 indicating the UE 2502 to steer traffic from WLAN to NR. The UE 2502 may forward the indication to upper layers and may reply 2505 to the LTE RRM 2551 with a RRCConnectionReconfigurationComplete message. The LTE RRM 2551 may indicate 2507 to the NR RRM 2553 that the steer is complete.

The UE 2502 may start 2509 using the new RCLNRI configuration and performs steering. If NR access failed, the UE sends 2511 NRConnectionStatusReport message to the LTE RRM 2551. The LTE RRM 2551 may forward 2513 the NRConnectionStatusUpdate message to the NR RRM 2553.

Figure 26:
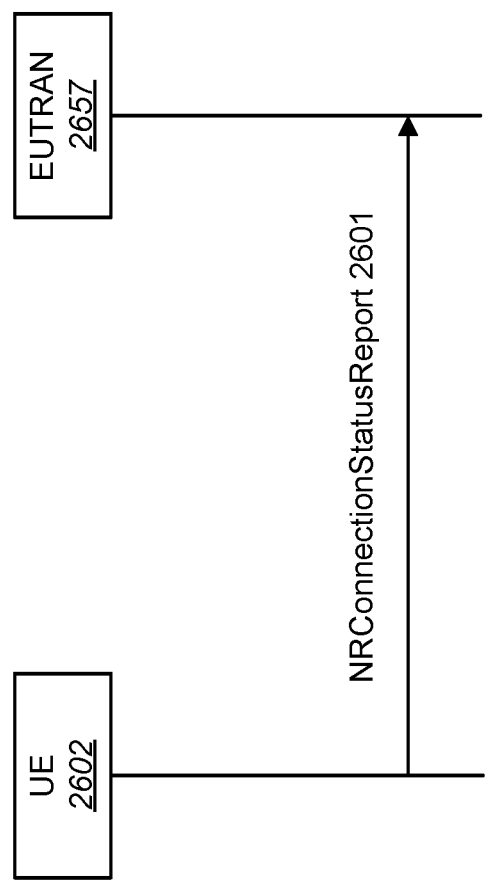
FIG. 26 is a sequence diagram illustrating an NR connection status reporting procedure.

FIG. 26 is a sequence diagram illustrating an NR connection status reporting procedure. The UE 2602 may send 2601 an NRConnectionStatusReport message to the E-UTRAN 2657 (e.g., eNB 160). The purpose of this procedure is to inform E-UTRAN about the status of NR connection for NRA, RAN Controlled LTE-NR Integration (RCNRI), or LTE-NR Radio Level Integration (LNRIP).

Figure 27:
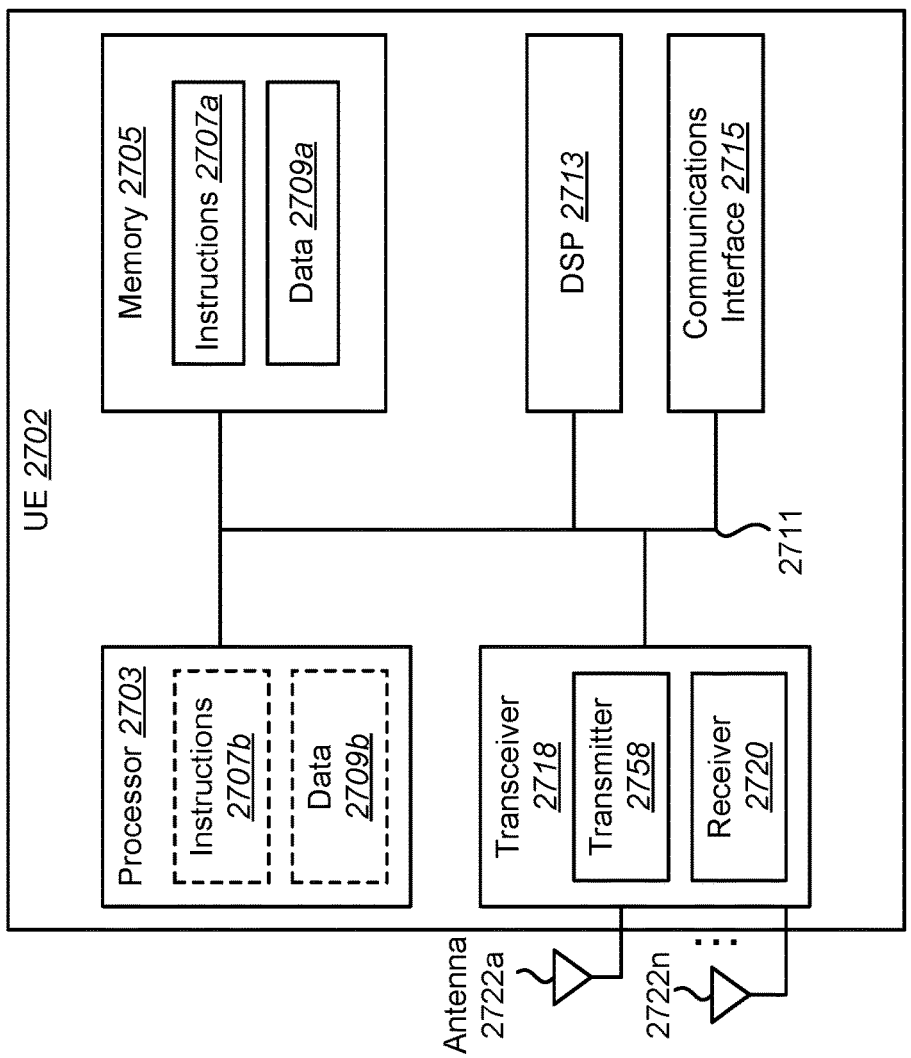
FIG. 27 illustrates various components that may be utilized in a UE.

FIG. 27 illustrates various components that may be utilized in a UE 2702. The UE 2702 described in connection with FIG. 27 may be implemented in accordance with the UE 102 described in connection with FIG. 1. The UE 2702 includes a processor 2703 that controls operation of the UE 2702. The processor 2703 may also be referred to as a central processing unit (CPU). Memory 2705, which may include read-only memory (ROM), random access memory (RAM), a combination of the two or any type of device that may store information, provides instructions 2707a and data 2709a to the processor 2703. A portion of the memory 2705 may also include non-volatile random access memory (NVRAM). Instructions 2707b and data 2709b may also reside in the processor 2703. Instructions 2707b and/or data 2709b loaded into the processor 2703 may also include instructions 2707a and/or data 2709a from memory 2705 that were loaded for execution or processing by the processor 2703. The instructions 2707b may be executed by the processor 2703 to implement one or more of the methods described above.

The UE 2702 may also include a housing that contains one or more transmitters 2758 and one or more receivers 2720 to allow transmission and reception of data. The transmitter(s) 2758 and receiver(s) 2720 may be combined into one or more transceivers 2718. One or more antennas 2722a-n are attached to the housing and electrically coupled to the transceiver 2718.

The various components of the UE 2702 are coupled together by a bus system 2711, which may include a power bus, a control signal bus and a status signal bus, in addition to a data bus. However, for the sake of clarity, the various buses are illustrated in FIG. 27 as the bus system 2711. The UE 2702 may also include a digital signal processor (DSP) 2713 for use in processing signals. The UE 2702 may also include a communications interface 2715 that provides user access to the functions of the UE 2702. The UE 2702 illustrated in FIG. 27 is a functional block diagram rather than a listing of specific components.

Figure 28:
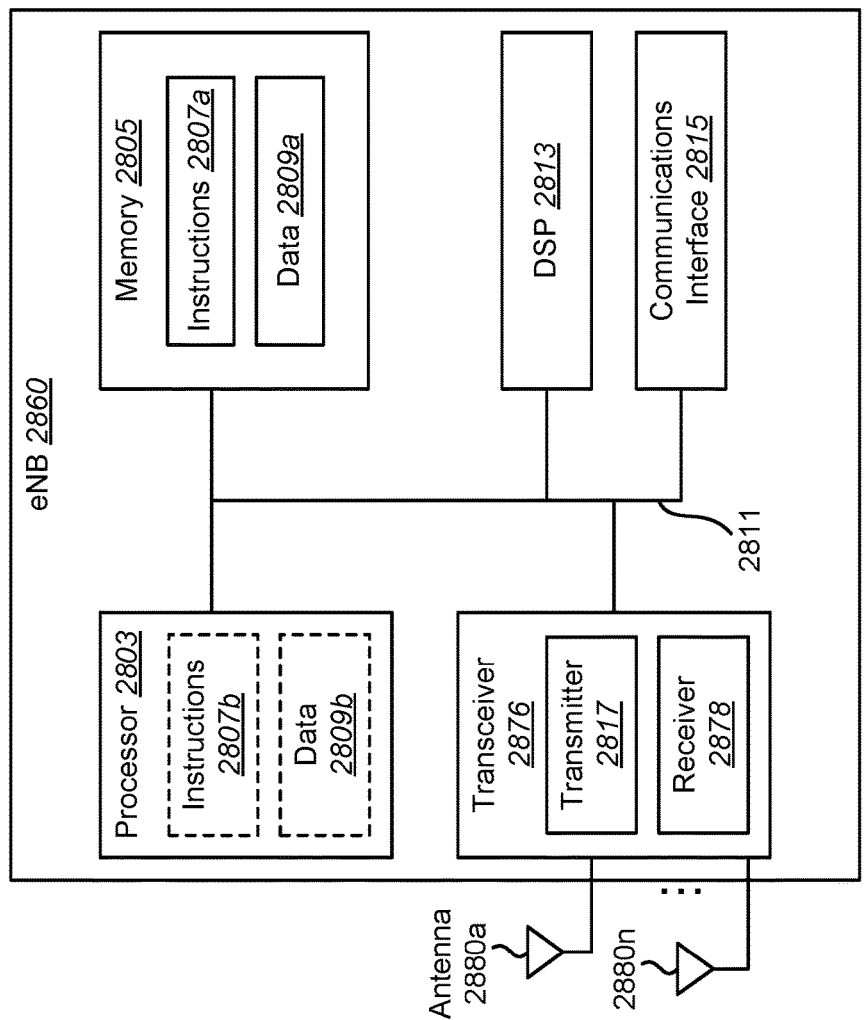
FIG. 28 illustrates various components that may be utilized in an eNB.

FIG. 28 illustrates various components that may be utilized in an eNB 2860. The eNB 2860 described in connection with FIG. 28 may be implemented in accordance with the eNB 160 described in connection with FIG. 1. The eNB 2860 includes a processor 2803 that controls operation of the eNB 2860. The processor 2803 may also be referred to as a central processing unit (CPU). Memory 2805, which may include read-only memory (ROM), random access memory (RAM), a combination of the two or any type of device that may store information, provides instructions 2807a and data 2809a to the processor 2803. A portion of the memory 2805 may also include non-volatile random access memory (NVRAM). Instructions 2807b and data 2809b may also reside in the processor 2803. Instructions 2807b and/or data 2809b loaded into the processor 2803 may also include instructions 2807a and/or data 2809a from memory 2805 that were loaded for execution or processing by the processor 2803. The instructions 2807b may be executed by the processor 2803 to implement one or more of the methods described above.

The eNB 2860 may also include a housing that contains one or more transmitters 2817 and one or more receivers 2878 to allow transmission and reception of data. The transmitter(s) 2817 and receiver(s) 2878 may be combined into one or more transceivers 2876. One or more antennas 2880a-n are attached to the housing and electrically coupled to the transceiver 2876.

The various components of the eNB 2860 are coupled together by a bus system 2811, which may include a power bus, a control signal bus and a status signal bus, in addition to a data bus. However, for the sake of clarity, the various buses are illustrated in FIG. 28 as the bus system 2811. The eNB 2860 may also include a digital signal processor (DSP) 2813 for use in processing signals. The eNB 2860 may also include a communications interface 2815 that provides user access to the functions of the eNB 2860. The eNB 2860 illustrated in FIG. 28 is a functional block diagram rather than a listing of specific components.

Figure 29:
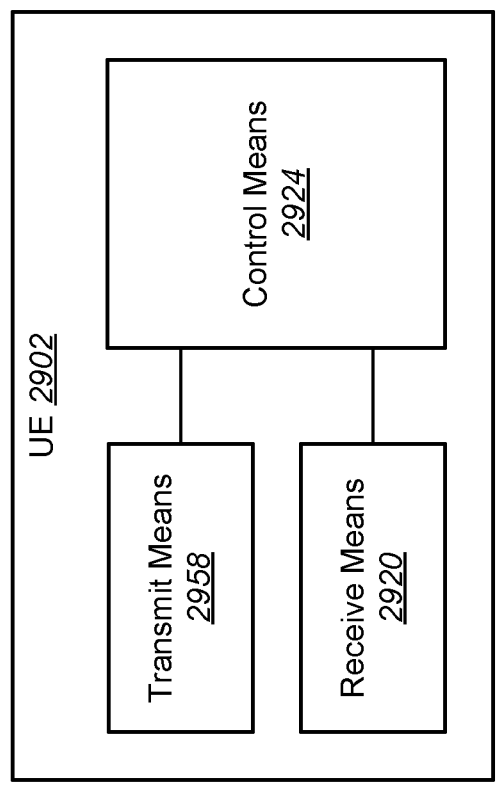
FIG. 29 is a block diagram illustrating one implementation of a UE in which systems and methods for NR operation may be implemented.

FIG. 29 is a block diagram illustrating one implementation of a UE 2902 in which systems and methods for NR operation may be implemented. The UE 2902 includes transmit means 2958, receive means 2920 and control means 2924. The transmit means 2958, receive means 2920 and control means 2924 may be configured to perform one or more of the functions described in connection with FIG. 1 above. FIG. 27 above illustrates one example of a concrete apparatus structure of FIG. 29. Other various structures may be implemented to realize one or more of the functions of FIG. 1. For example, a DSP may be realized by software.

Figure 30:
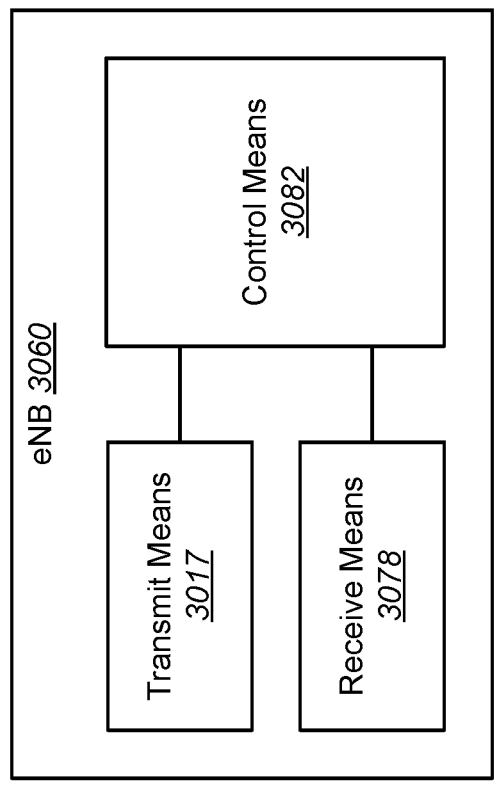
FIG. 30 is a block diagram illustrating one implementation of an eNB in which systems and methods for NR operation may be implemented.

FIG. 30 is a block diagram illustrating one implementation of an eNB 3060 in which systems and methods for NR operation may be implemented. The eNB 3060 includes transmit means 3017, receive means 3078 and control means 3082. The transmit means 3017, receive means 3078 and control means 3082 may be configured to perform one or more of the functions described in connection with FIG. 1 above. FIG. 28 above illustrates one example of a concrete apparatus structure of FIG. 30. Other various structures may be implemented to realize one or more of the functions of FIG. 1. For example, a DSP may be realized by software.

Figure 31:
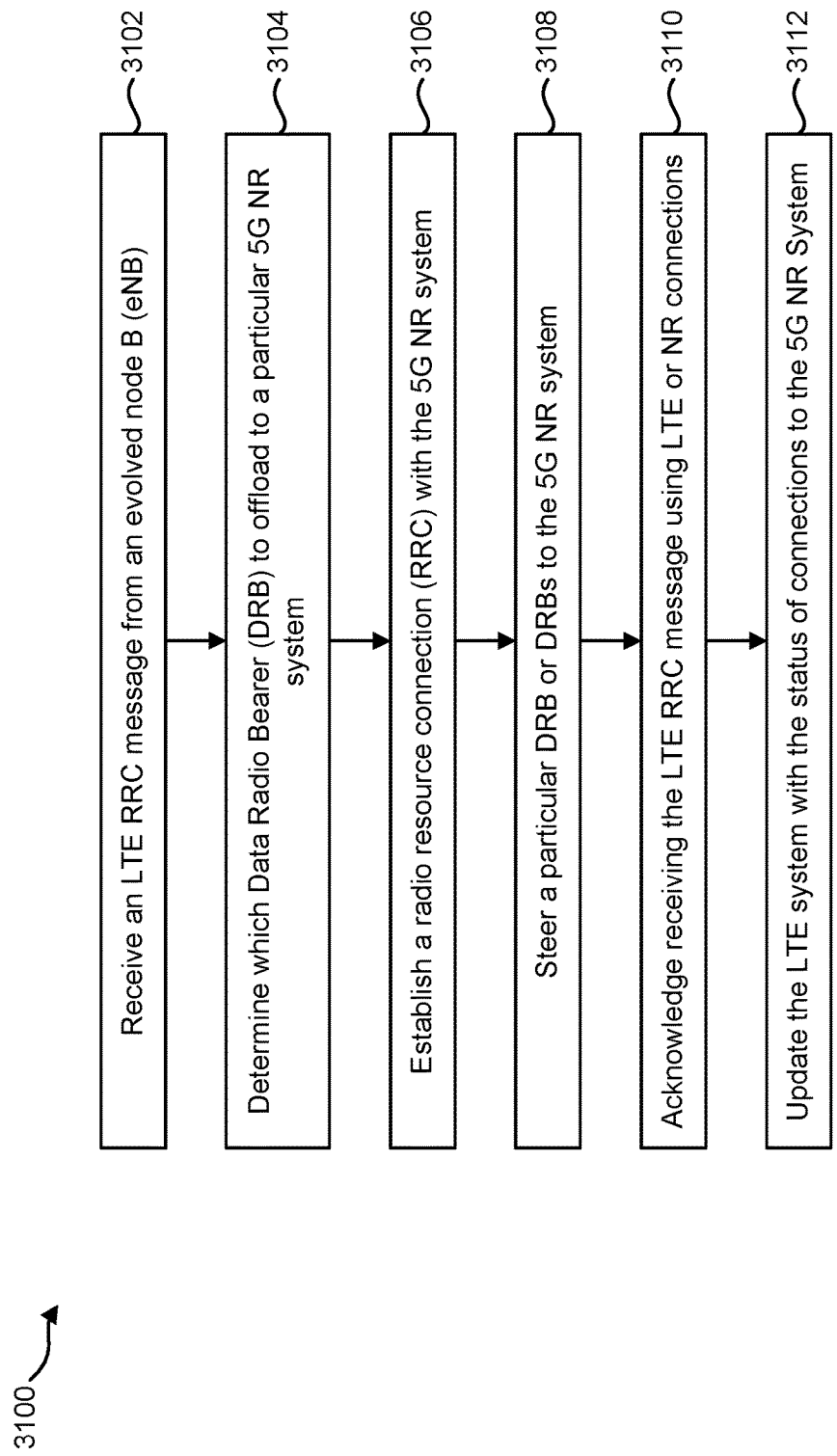
FIG. 31 is a flow diagram illustrating a method by a UE.

FIG. 31 is a flow diagram illustrating a method 3100 by a UE 102. The UE 102 may be a multi-mode capable LTE-5G new radio (NR) UE configured to receive LTE RRC messages.

The UE 102 may receive 3102 an LTE RRC message from an evolved node B (eNB). The UE 102 may determine 3104 which Data Radio Bearer (DRB) to offload to a particular 5G NR system. The UE 102 may establish 3106 a radio resource connection (RRC) with the 5G NR system. The UE 102 may steer 3108 a particular DRB or DRBs to the 5G NR system. The UE 102 may acknowledge 3110 receiving the LTE RRC message using LTE or NR connections. The UE 102 may update 3112 the LTE system with the status of connections to the 5G NR system.

Figure 32:
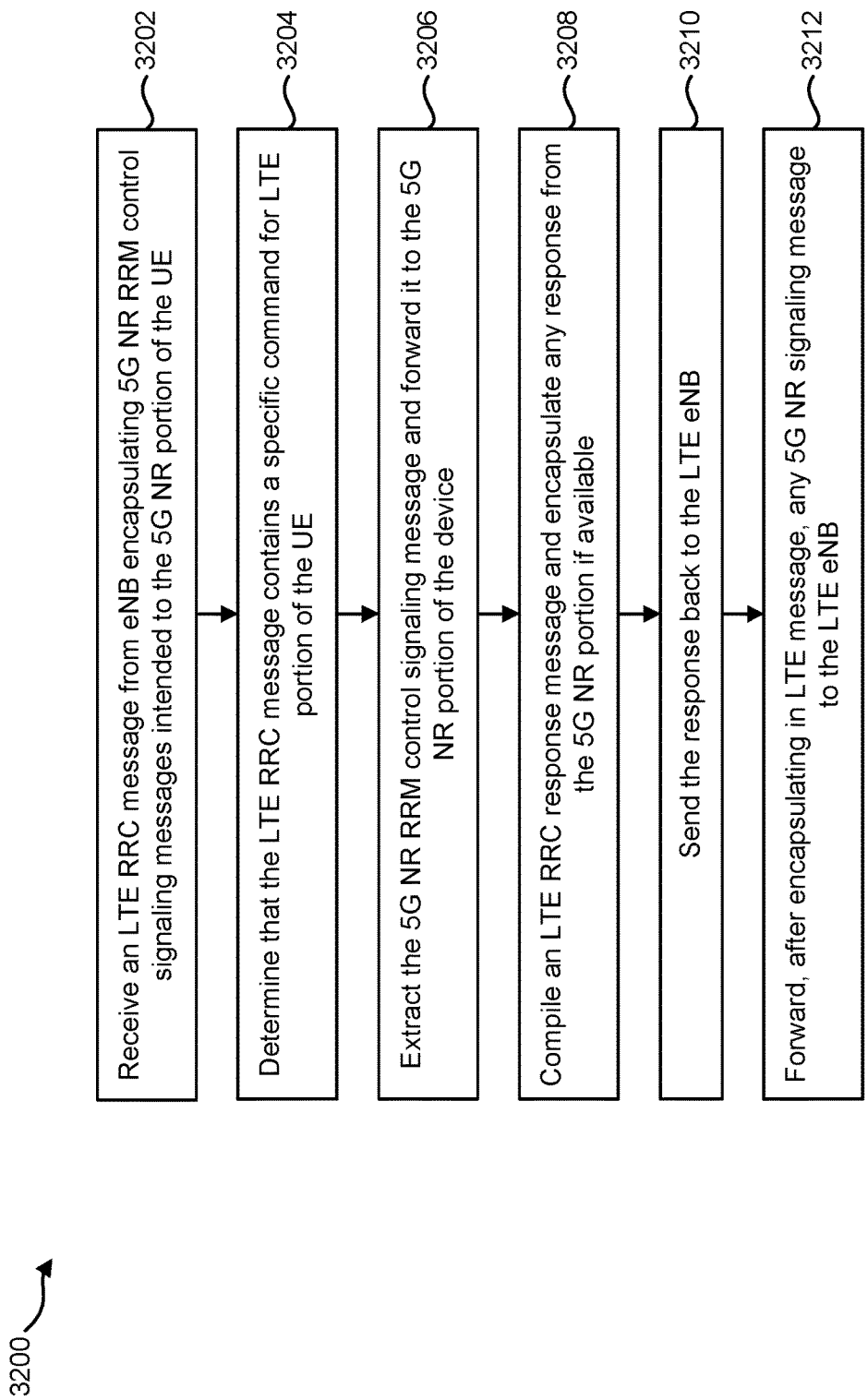
FIG. 32 is a flow diagram illustrating another method by a UE.

FIG. 32 is a flow diagram illustrating another method 3200 by a UE 102. The UE 102 may be a multi-mode capable LTE-5G NR UE configured to receive and transmit LTE RRC messages.

The UE 102 may receive 3202 an LTE RRC message from an eNB 160 encapsulating 5G NR RRM control signaling messages intended to the 5G NR portion of the UE, using separate NR-Signaling Radio Bearer (SRB) or LTE-SRB (SRB-3). The UE 102 may determine 3204 that the LTE RRC message contains a specific command for the LTE portion of the UE 102. The UE 102 may extract 3206 the 5G NR RRM control signaling message and forward it to the 5G NR portion of the device. The UE 102 may compile 3208 an LTE RRC response message and encapsulate any response from the 5G NR portion if available using direct forwarding on a separate NR-SRB, or by adding the NR response to specific NR containers within existing LTE RRC messages and sending them over LTE-SRB (SRB3). The UE 102 may send 3210 the response back to the LTE eNB 160. The UE 102 may forward 3212, after encapsulating in an LTE message, any 5G NR signaling message to the LTE eNB 160 or send it directly via NR-SRB.

Figure 33:
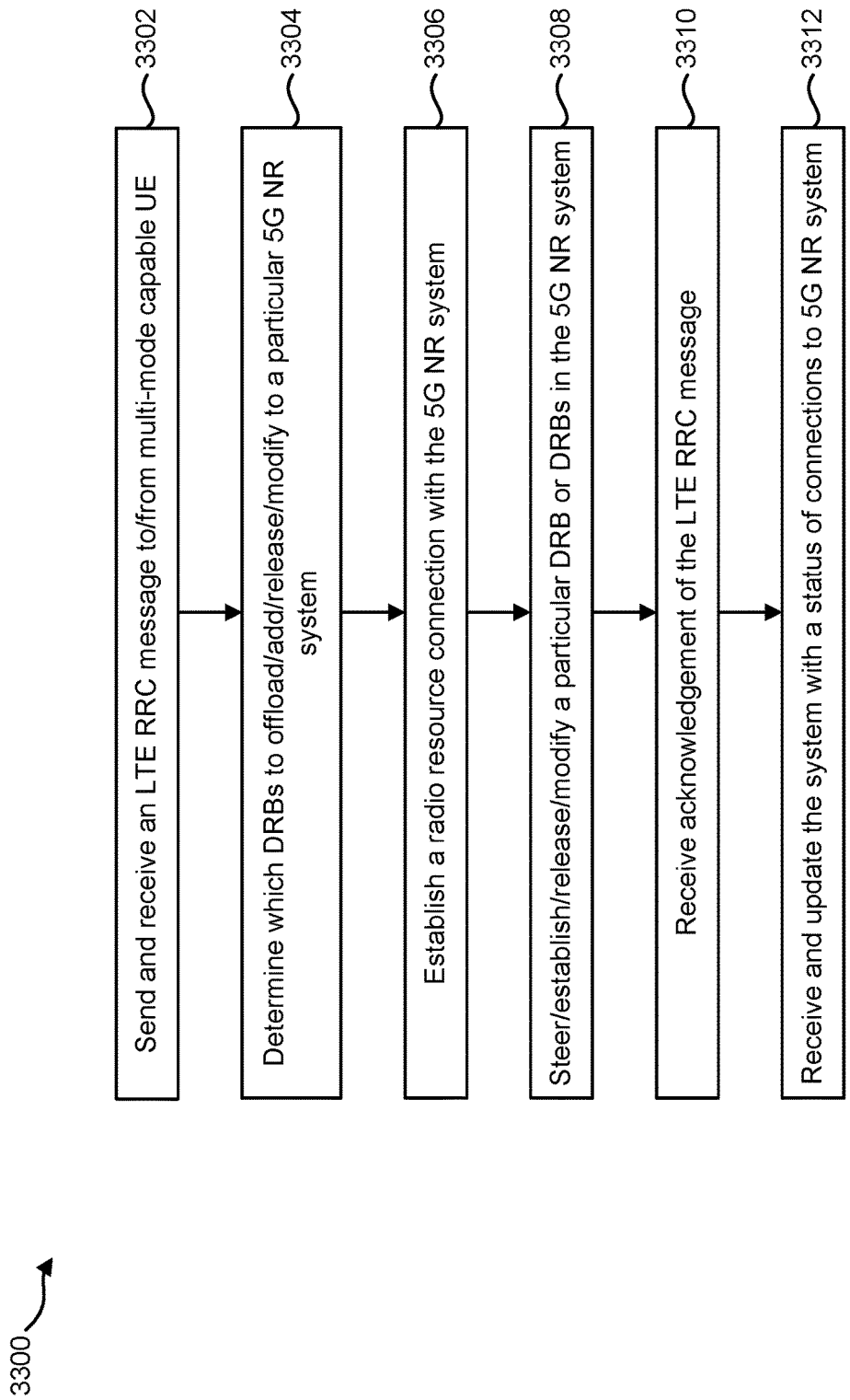
FIG. 33 is a flow diagram illustrating a method by an eNB.

FIG. 33 is a flow diagram illustrating a method 3200 by an eNB 160. The eNB 160 may be a multi-mode capable LTE-5G NR Base Station (eNB) comprising a single RRM capable of controlling multiple radio technologies including LTE and 5G NR.

The eNB 160 may send and receive 3302 an LTE RRC message to/from multi-mode capable UE 102. The eNB 160 may determine 3304 which DRBs to offload/add/release and/or modify to a particular 5G NR system. The eNB 160 may establish 3306 a radio resource connection with the 5G NR system. The eNB 160 may steer/establish/release and/or modify 3308 a particular DRB or DRBs in the 5G NR system. The eNB 160 may receive 3310 acknowledgement of the LTE RRC message. The eNB 160 may receive 3312 and update the system with a status of connections to 5G NR system.

Figure 34:
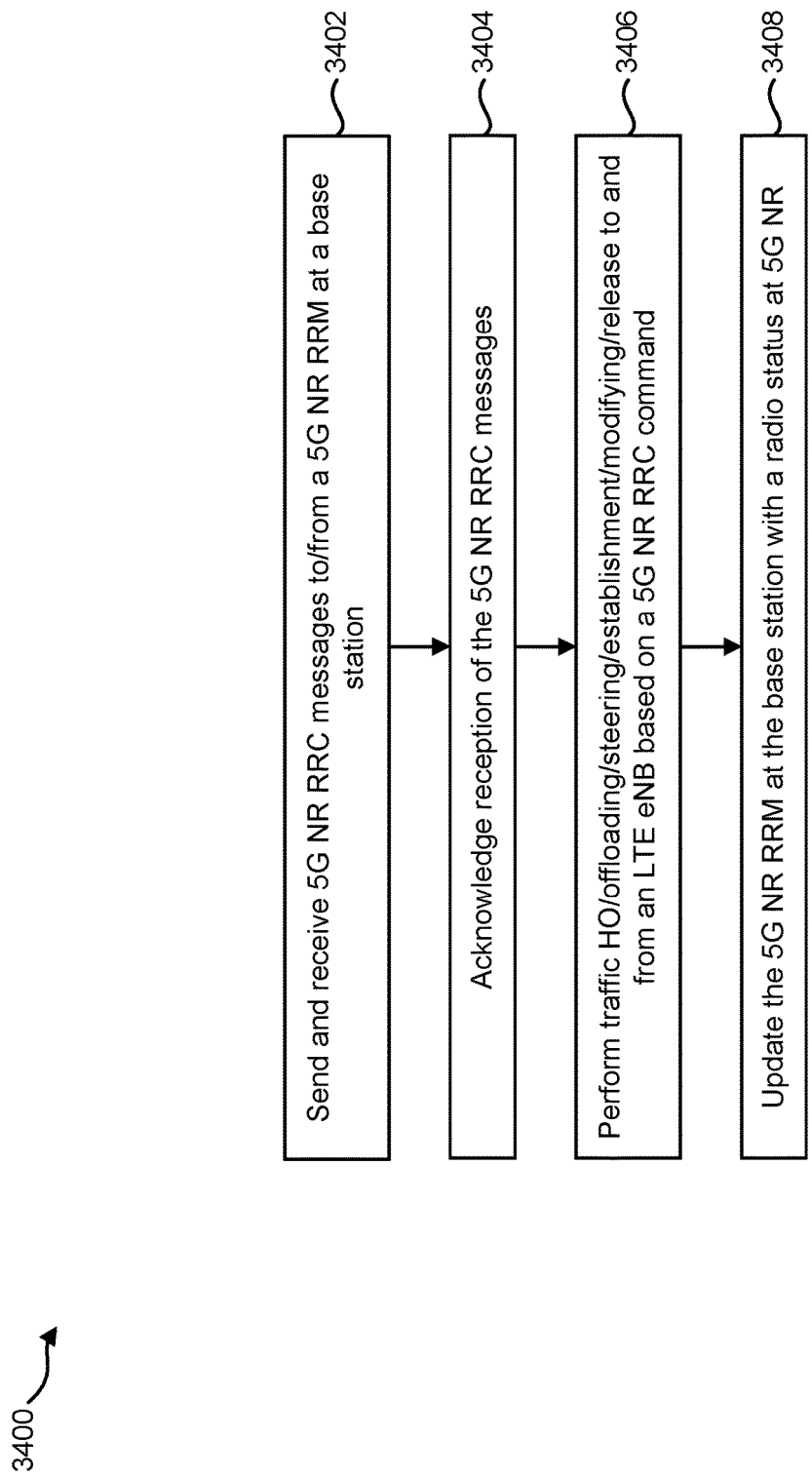
FIG. 34 is a flow diagram illustrating a method by a UE.

FIG. 34 is a flow diagram illustrating a method 3400 by a UE 102. The UE 102 may be a multi-mode capable LTE-5G NR UE. The UE 102 may include two independent RRMs. One RRM may be an LTE RRM and a second RRM may be a 5G NR RRM.

The UE 102 may send and receive 3402 5G NR RRC messages to/from a 5G NR RRM at a base station. The UE 102 may acknowledge 3404 reception of the 5G NR RRC messages. The UE 102 may perform 3406 traffic HO/offloading/steering/establishment/modifying and/or release to and from an LTE eNB 160 based on a 5G NR RRC command. The UE 102 may update 3408 the 5G NR RRM at the base station with a radio status at 5G NR. The 5G RRM control signaling may be encapsulated in an LTE RRC message for transportation over the LTE air interface. Alternatively, it can be transmitted directly over a dedicated NR-SRB.

Figure 35:
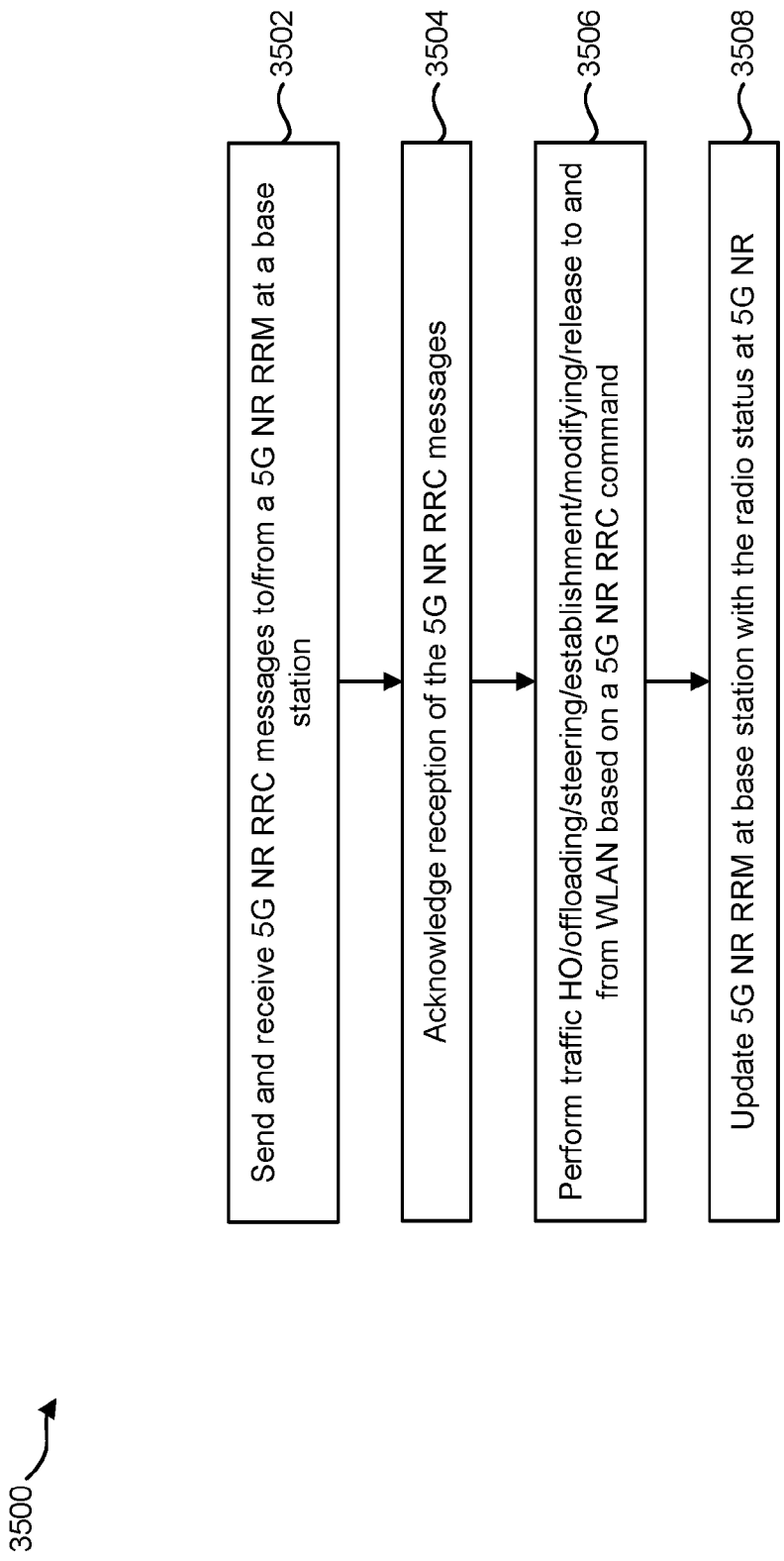
FIG. 35 is a flow diagram illustrating another method by a UE.

FIG. 35 is a flow diagram illustrating another method 3500 by a UE 102. The UE 102 may be a multi-mode capable LTE-5G NR UE. The UE 102 may include two independent RRMs. One RRM may be an LTE RRM and a second RRM may be a 5G NR RRM.

The UE 102 may send and receive 3502 5G NR RRC messages to/from a 5G NR RRM at a base station. The UE 102 may acknowledge 3504 reception of the 5G NR RRC messages. The UE 102 may perform 3506 traffic HO/offloading/steering/establishment/modifying and/or release to and from WLAN based on a 5G NR RRC command. The UE 102 may update 3508 the 5G NR RRM at the base station with a radio status at 5G NR.

Figure 36:
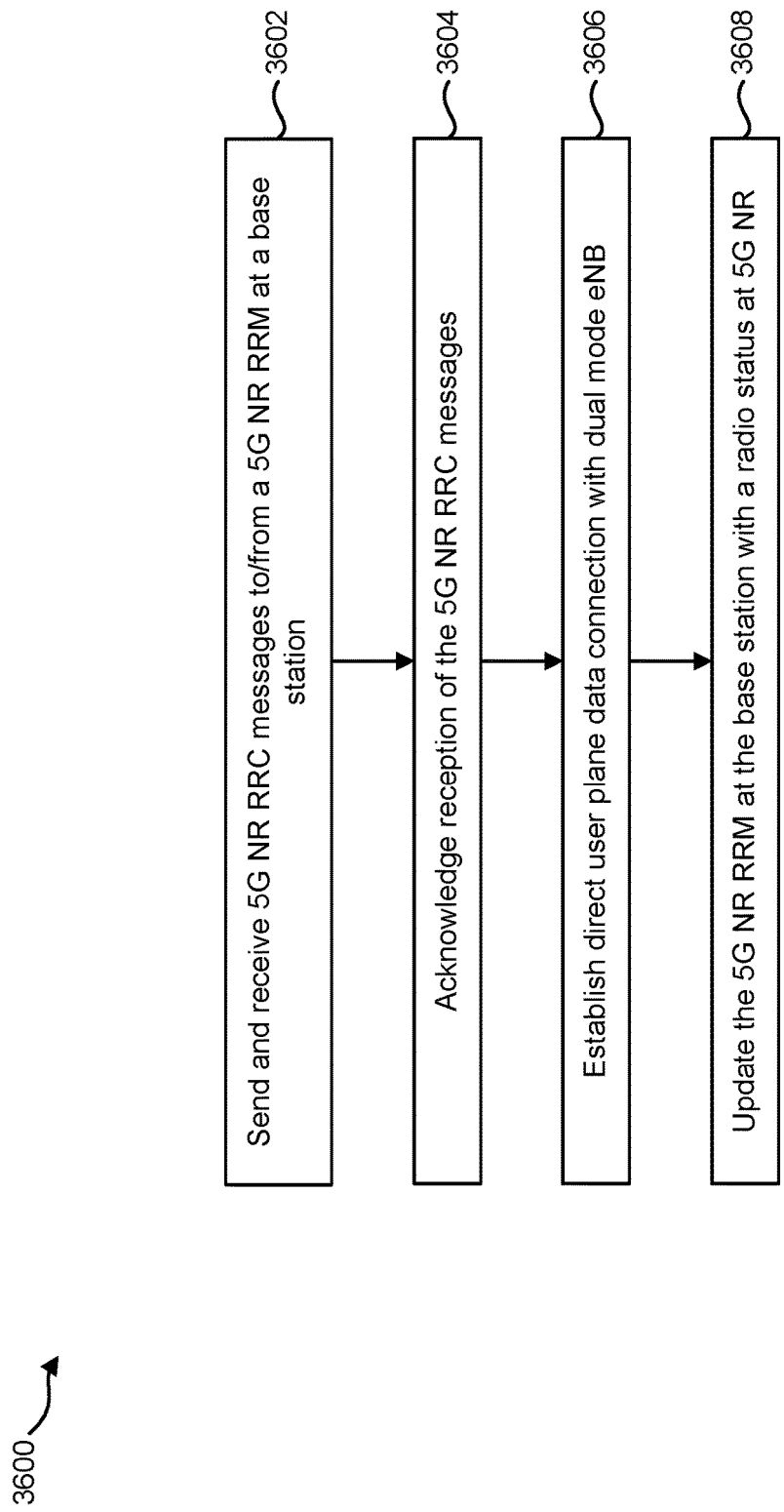
FIG. 36 is a flow diagram illustrating another method by a UE.

In an approach, the 5G RRM control signaling may be encapsulated in an LTE RRC message for transportation over the LTE air interface. In another approach, the 5G RRM control signaling may be sent using 5G NR RRC message for transportation over a dedicated 5G NR-Signaling Radio Bearer (SRB) over an LTE air interface. In yet another approach, the 5G RRM control signaling may be sent using 5G NR RRC message for transportation over a dedicated 5G NR-SRB over an NR air interface FIG. 36 is a flow diagram illustrating another method 3600 by a UE 102. The UE 102 may be a multi-mode capable LTE-5G NR UE. The UE 102 may include two independent RRMs. One RRM may be an LTE RRM and a second RRM may be a 5G NR RRM.

The UE 102 may send and receive 3602 5G NR RRC messages to/from a 5G NR RRM at a base station. The UE 102 may acknowledge 3604 reception of the 5G NR RRC messages. The UE 102 may establish 3606 a direct user plane data connection with a dual mode eNB. The UE 102 may update 3608 the 5G NR RRM at the base station with a radio status at the 5G NR.

Figure 37:
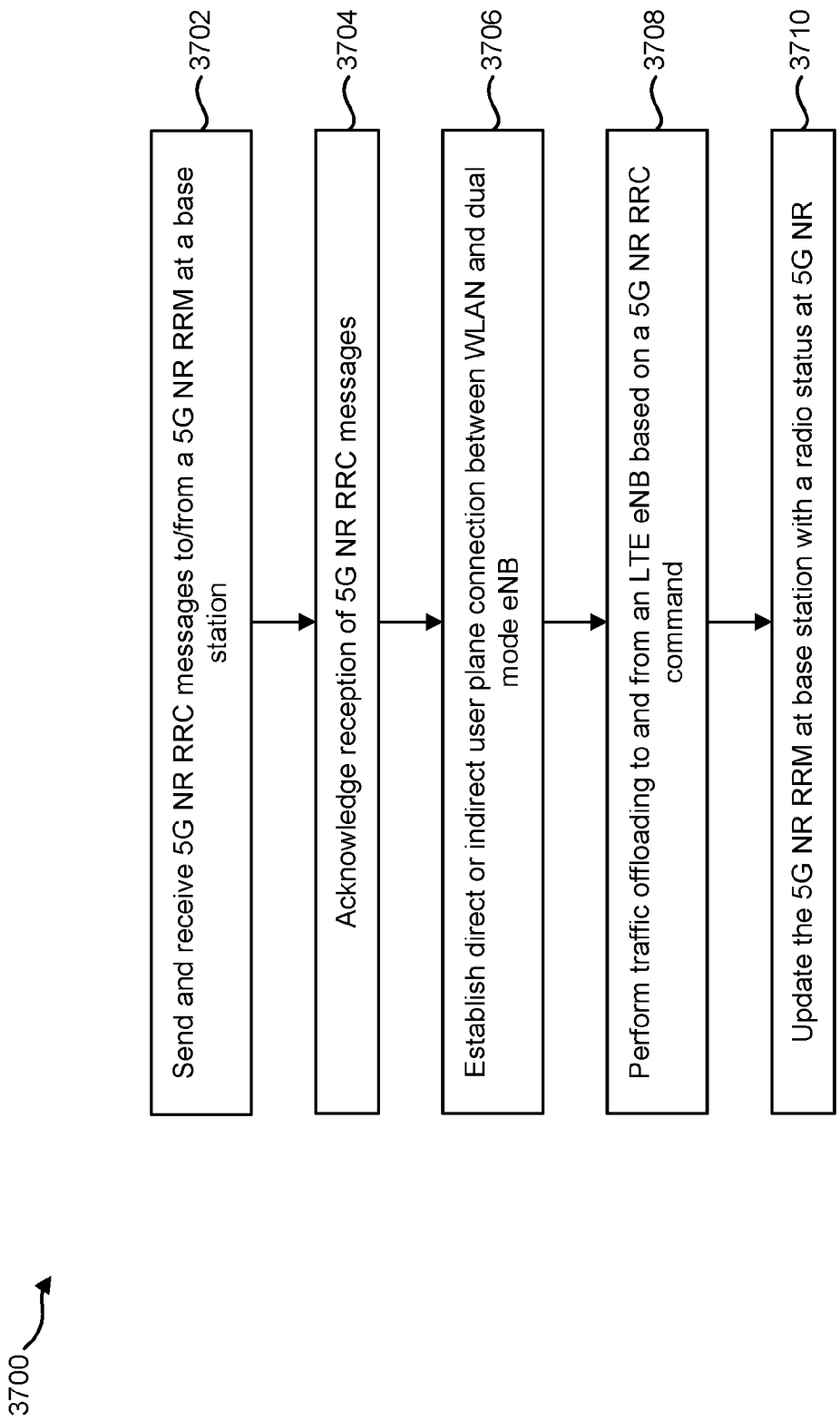
FIG. 37 is a flow diagram illustrating another method by a UE.

FIG. 37 is a flow diagram illustrating another method 3700 by a UE 102. The UE 102 may be a multi-mode capable LTE-5G NR UE. The UE 102 may include two independent RRMs. One RRM may be an LTE RRM and a second RRM may be a 5G NR RRM.

The UE 102 may send and receive 3702 5G NR RRC messages to/from a 5G NR RRM at a base station. The UE 102 may acknowledge 3704 reception of 5G NR RRC messages. The UE 102 may establish 3706 a direct or indirect user plane connection between WLAN and a dual mode eNB. The UE 102 may perform 3708 traffic offloading to and from an LTE eNB based on a 5G NR RRC command. The UE 102 may update 3710 the 5G NR RRM at the base station with a radio status at the 5G NR.

Figure 38:
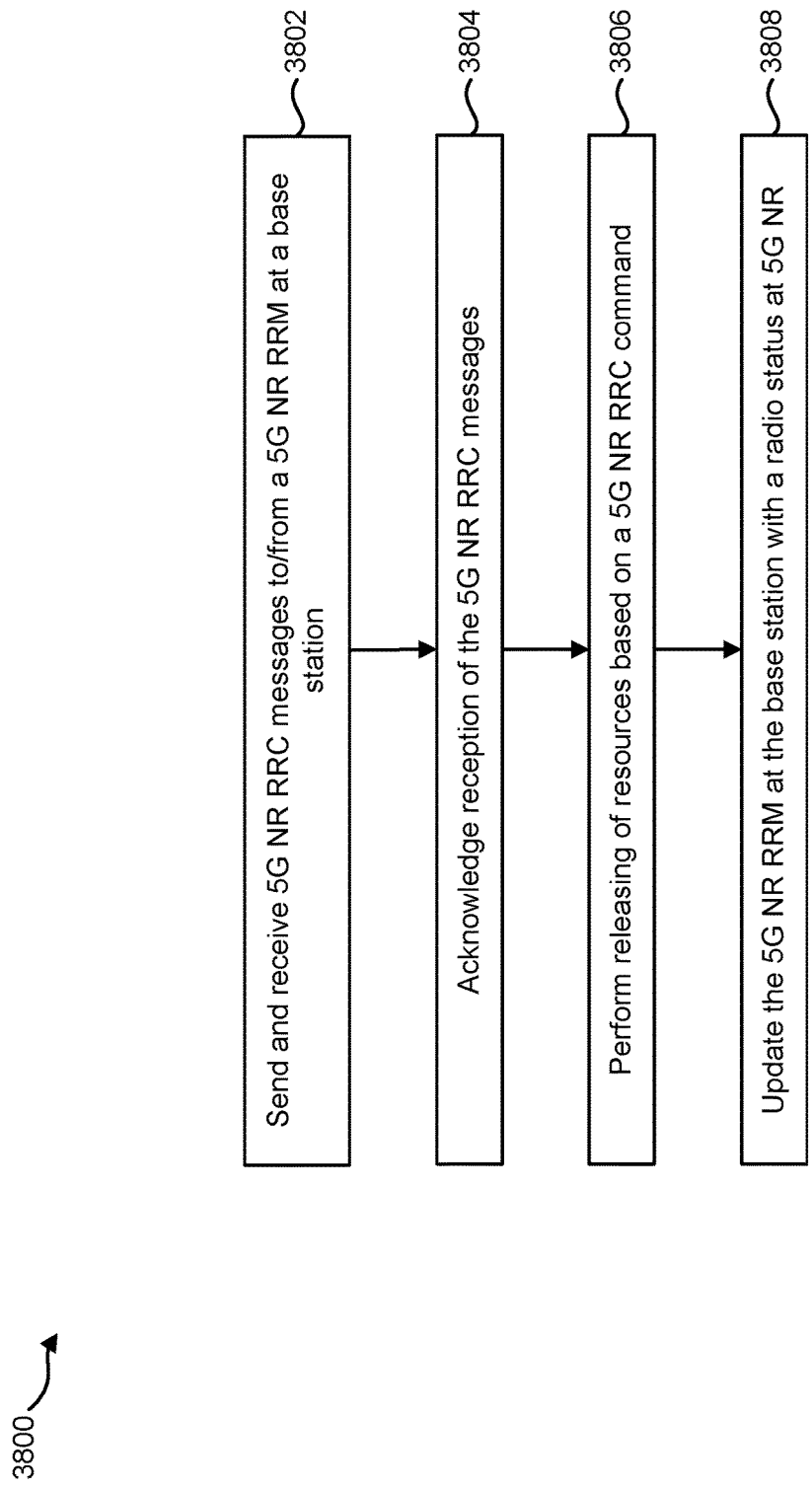
FIG. 38 is a flow diagram illustrating another method by a UE.

FIG. 38 is a flow diagram illustrating another method 3800 by a UE 102. The UE 102 may be a multi-mode capable LTE-5G NR UE. The UE 102 may include two independent RRMs. One RRM may be an LTE RRM and a second RRM may be a 5G NR RRM.

The UE 102 may send and receive 3802 5G NR RRC messages to/from a 5G NR RRM at a base station. The UE 102 may acknowledge 3804 reception of the 5G NR RRC messages. The UE 102 may perform 3806 releasing of resources based on a 5G NR RRC command. The UE 102 may update 3808 the 5G NR RRM at the base station with a radio status at the 5G NR.

Figure 39:
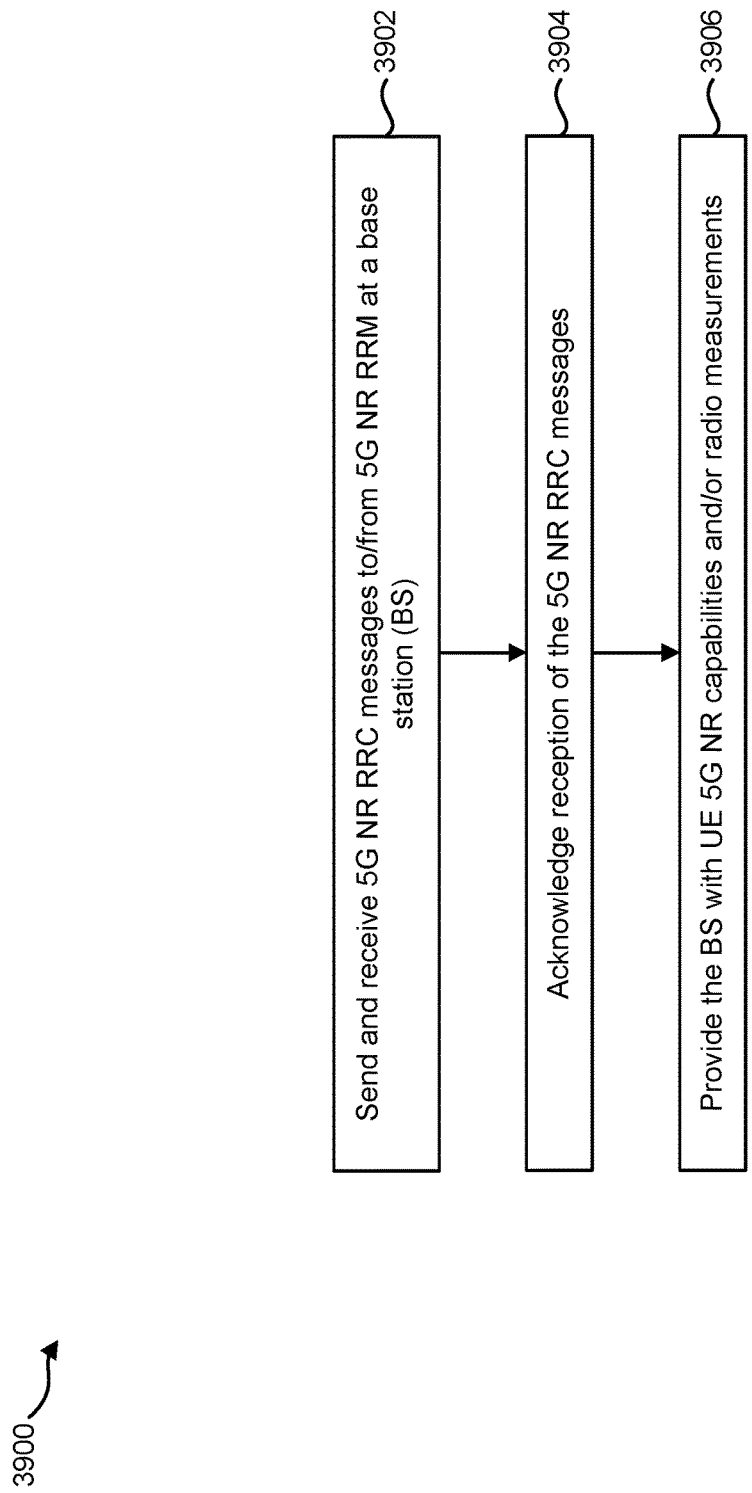
FIG. 39 is a flow diagram illustrating another method by a UE.

FIG. 39 is a flow diagram illustrating another method 3900 by a UE 102. The UE 102 may be a multi-mode capable LTE-5G NR UE. The UE 102 may include two independent RRMs. One RRM may be an LTE RRM and a second RRM may be a 5G NR RRM.

The UE 102 may send and receive 3902 5G NR RRC message to/from 5G NR RRM at a base station (BS). The UE 102 may acknowledge 3904 reception of the 5G NR RRC messages. The UE 102 may provide 3906 the BS with UE 5G NR capabilities and/or radio measurements.

Figure 40:
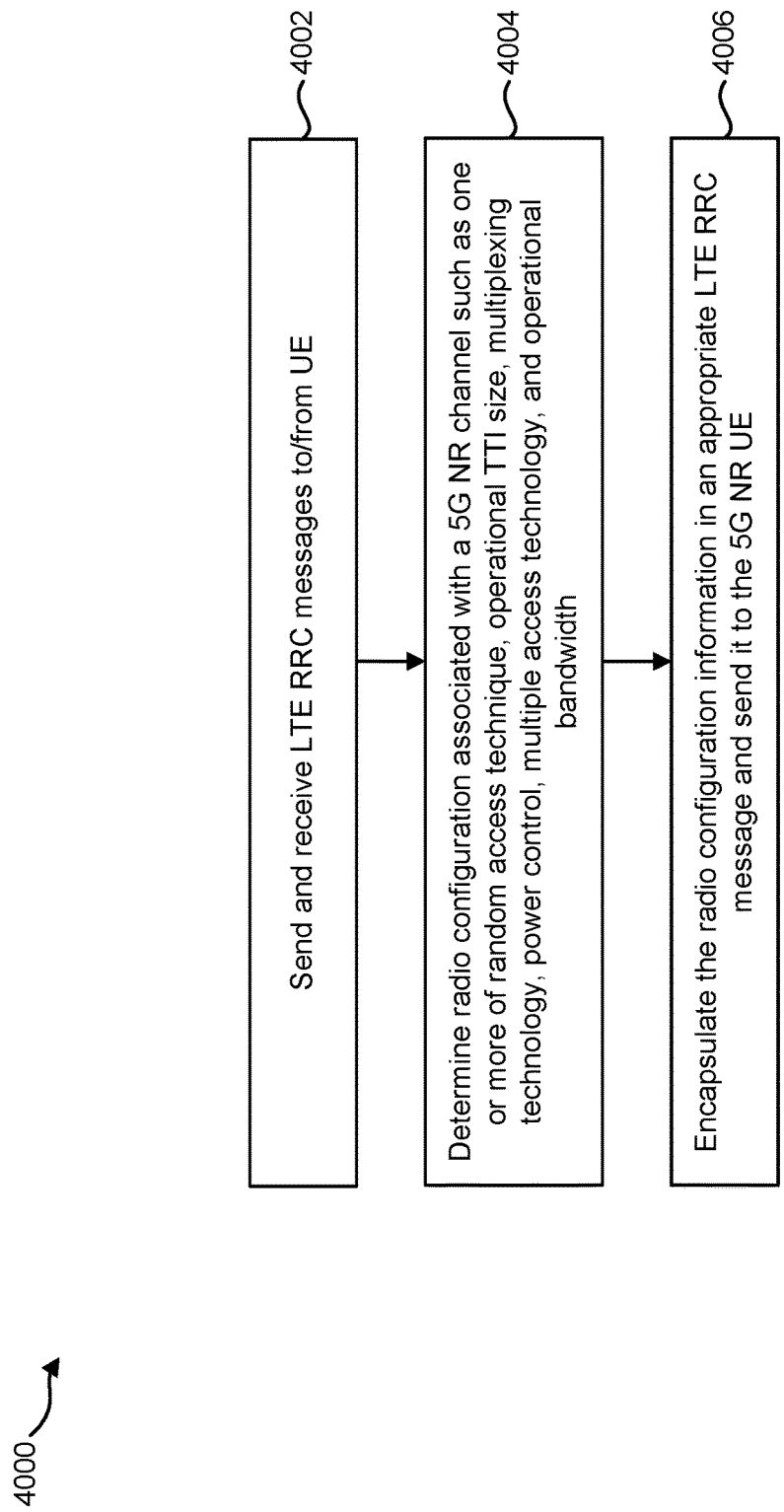
FIG. 40 is a flow diagram illustrating a method by an eNB.

FIG. 40 is a flow diagram illustrating a method 4000 by an eNB 160. The eNB 160 may be a multi-mode capable LTE-5G NR Base Station (eNB) comprising a single RRM capable of controlling multiple radio technologies including LTE and 5G NR.

The eNB 160 may send and receive 4002 LTE RRC message to/from a UE 102. The eNB 160 may determine 4004 a radio configuration associated with a 5G NR channel such as one or more of random access technique, operational TTI size, multiplexing technology, power control, multiple access technology, and operational bandwidth. The eNB 160 may encapsulate 4006 the radio configuration information in an appropriate LTE RRC message and send it to the 5G NR UE 102 or send it over dedicated NR-SRB.

Figure 41:
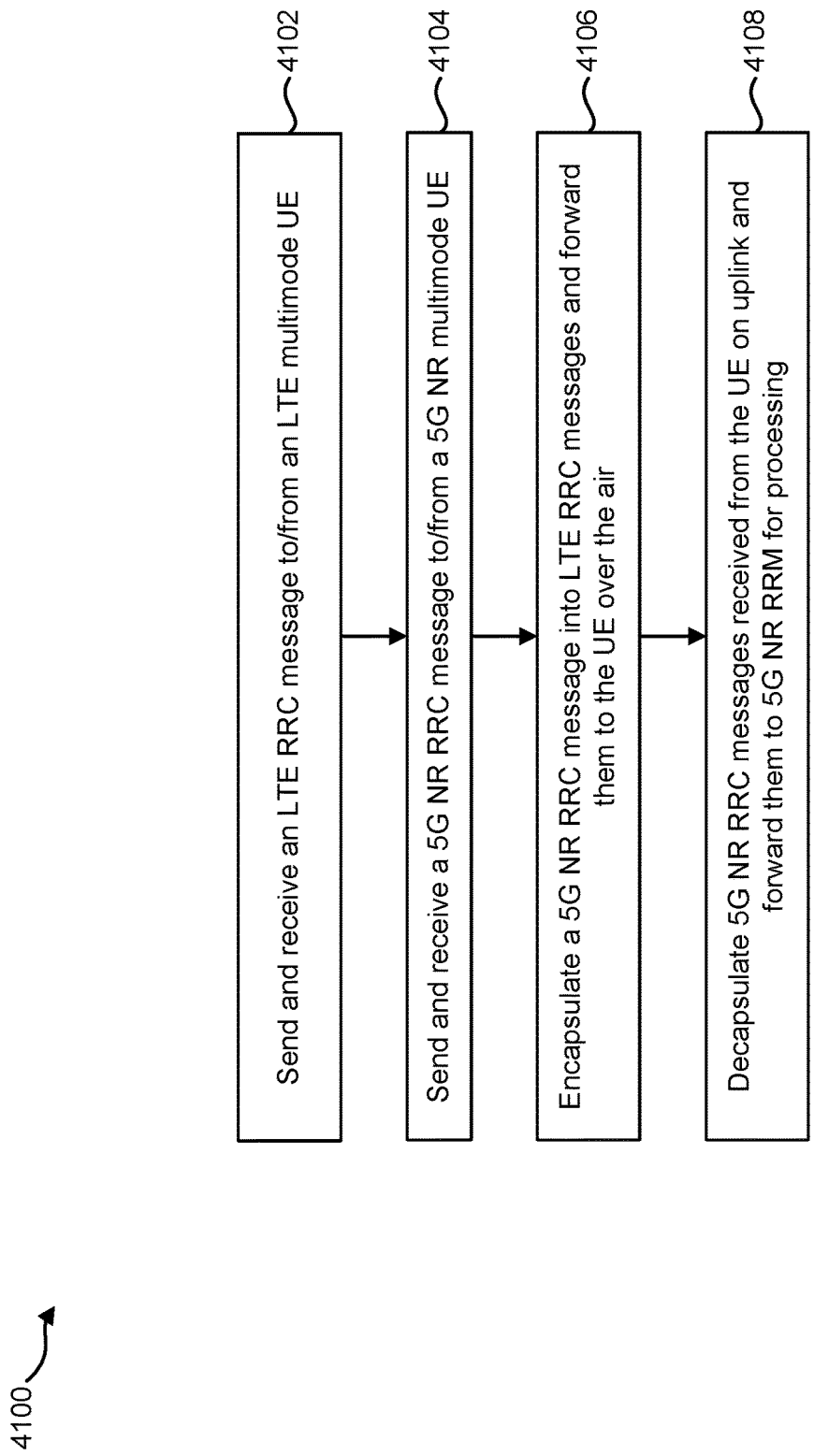
FIG. 41 is a flow diagram illustrating another method by an eNB.

FIG. 41 is a flow diagram illustrating another method 4100 by an eNB 160. The eNB 160 may be a multi-mode capable LTE-5G NR Base Station (eNB) comprising two independent RRMs, one being LTE RRM and a second being 5G NR RRM.

The eNB 160 may send and receive 4102 an LTE RRC message to/from an LTE multimode UE 102. The eNB 160 may send and receive 4104 a 5G NR RRC message to/from a 5G NR multimode UE 102. The eNB 160 may encapsulate 4106 a 5G NR RRC message into LTE RRC messages and forward them to the UE 102 over the air or send it directly over dedicated NR-SRB. The eNB 160 may decapsulate 4108 5G NR RRC messages received from the UE 102 on the uplink and/or forward them to the 5G NR RRM for processing.

Figure 42:
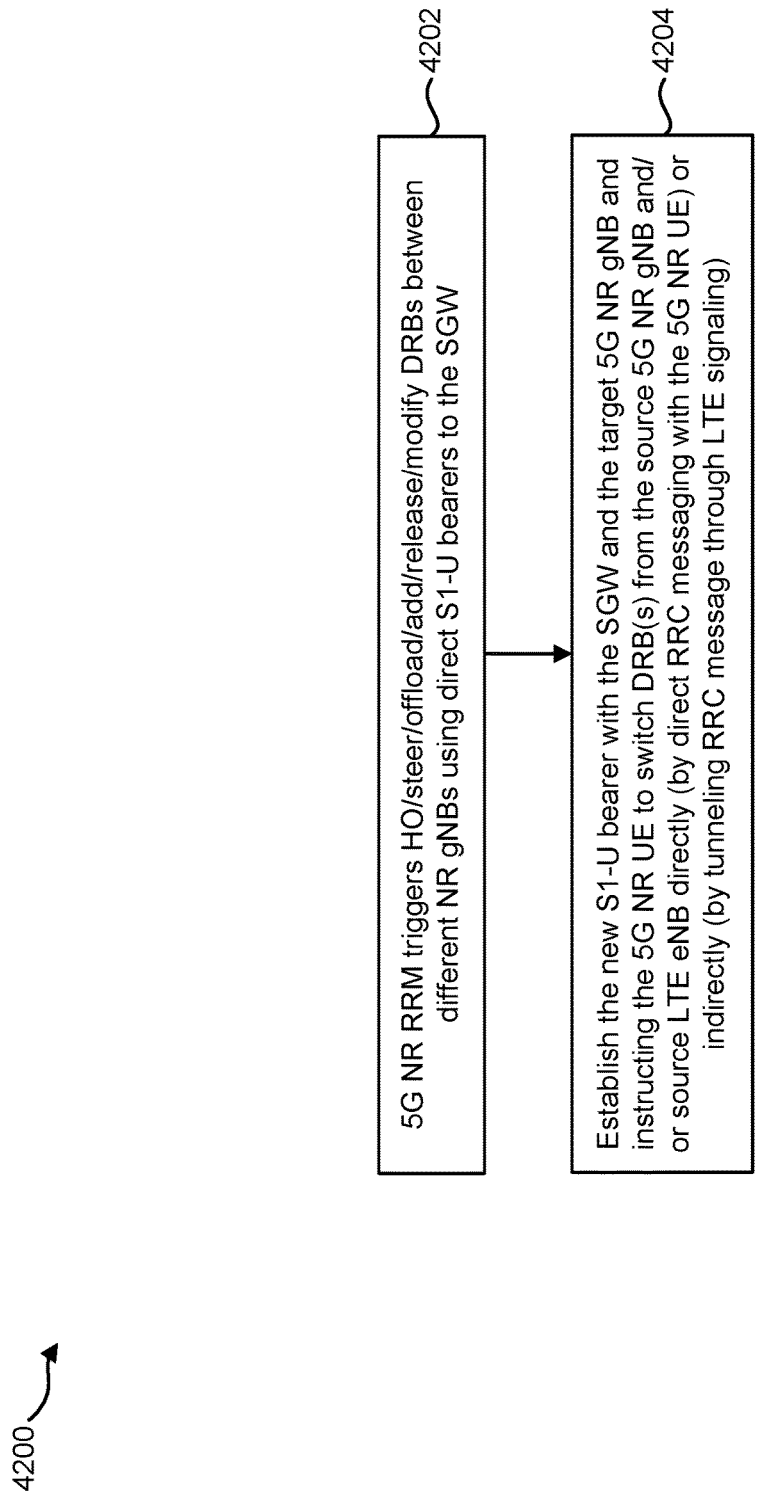
FIG. 42 is a flow diagram illustrating another method by an eNB.

FIG. 42 is a flow diagram illustrating another method 4200 by an eNB 160. The eNB 160 may be a multi-mode capable LTE-5G NR Base Station (eNB) comprising two independent RRMs, one being an LTE RRM and a second being a 5G NR RRM.

In step 4202, 5G NR RRM triggers HO/steer/offload/add/release/modify DRBs between different NR gNBs using direct S1-U bearers to the SGW. The eNB 160 may establish 4204 the new S1-U bearer with the SGW and the target 5G NR gNB and instruct the 5G NR UE to switch DRB(s) from the source 5G NR gNB and/or source LTE eNB directly (e.g., by direct RRC messaging with the 5G NR UE) or indirectly (e.g., by tunneling RRC message through LTE signaling).

Figure 43:
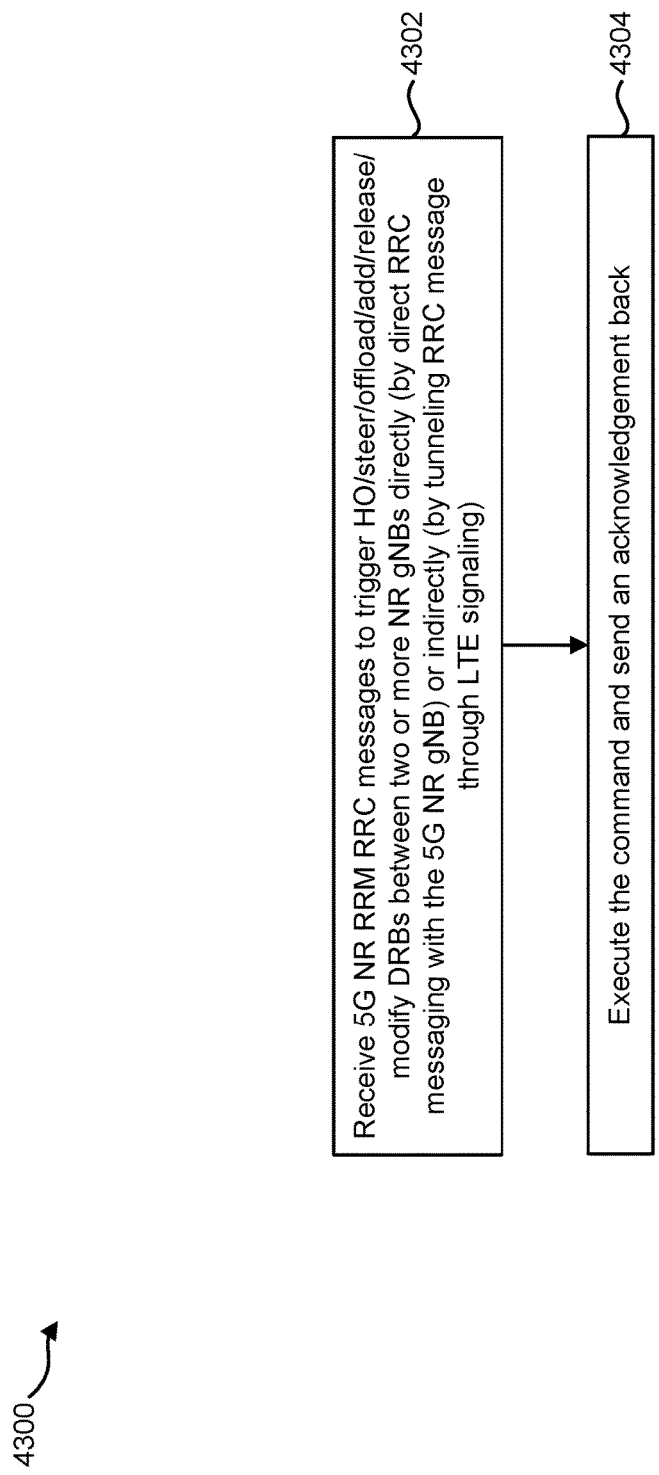
FIG. 43 is a flow diagram illustrating another method by a UE.

FIG. 43 is a flow diagram illustrating another method 4300 by a UE 102. The UE 102 may be a multi-mode capable LTE-5G NR UE. The UE 102 may include two independent RRMs. One RRM may be an LTE RRM and a second RRM may be a 5G NR RRM.

The UE 102 may receive 4302 5G NR RRM RRC messages to trigger HO/steer/offload/add/release/modify DRBs between two or more NR gNBs directly (e.g., by direct RRC messaging with the 5G NR gNB) or indirectly (e.g., by tunneling RRC message through LTE signaling). The UE 102 may execute 4304 the command and may send an acknowledgement back.

Figure 44:
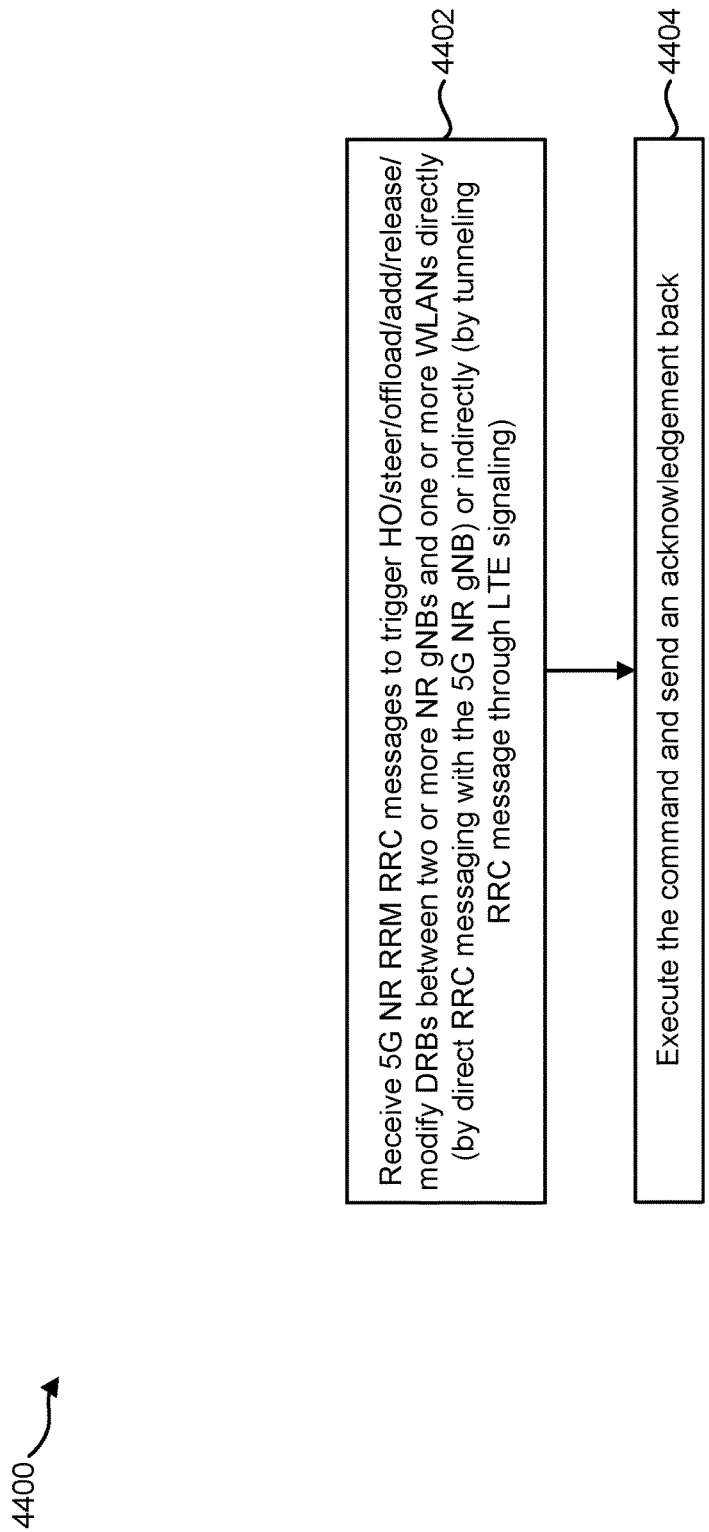
FIG. 44 is a flow diagram illustrating another method by a UE.

FIG. 44 is a flow diagram illustrating another method 4400 by a UE 102. The UE 102 may be a multi-mode capable LTE-5G NR UE. The UE 102 may include two independent RRMs. One RRM may be an LTE RRM and a second RRM may be a 5G NR RRM.

The UE 102 may receive 4402 5G NR RRM RRC messages to trigger HO/steer/offload/add/release/modify DRBs between two or more NR gNBs and one or more WLANs directly (e.g., by direct RRC messaging with the 5G NR gNB) or indirectly (e.g., by tunneling RRC message through LTE signaling). The UE 102 may execute 4404 the command and send an acknowledgement back.

Figure 45:
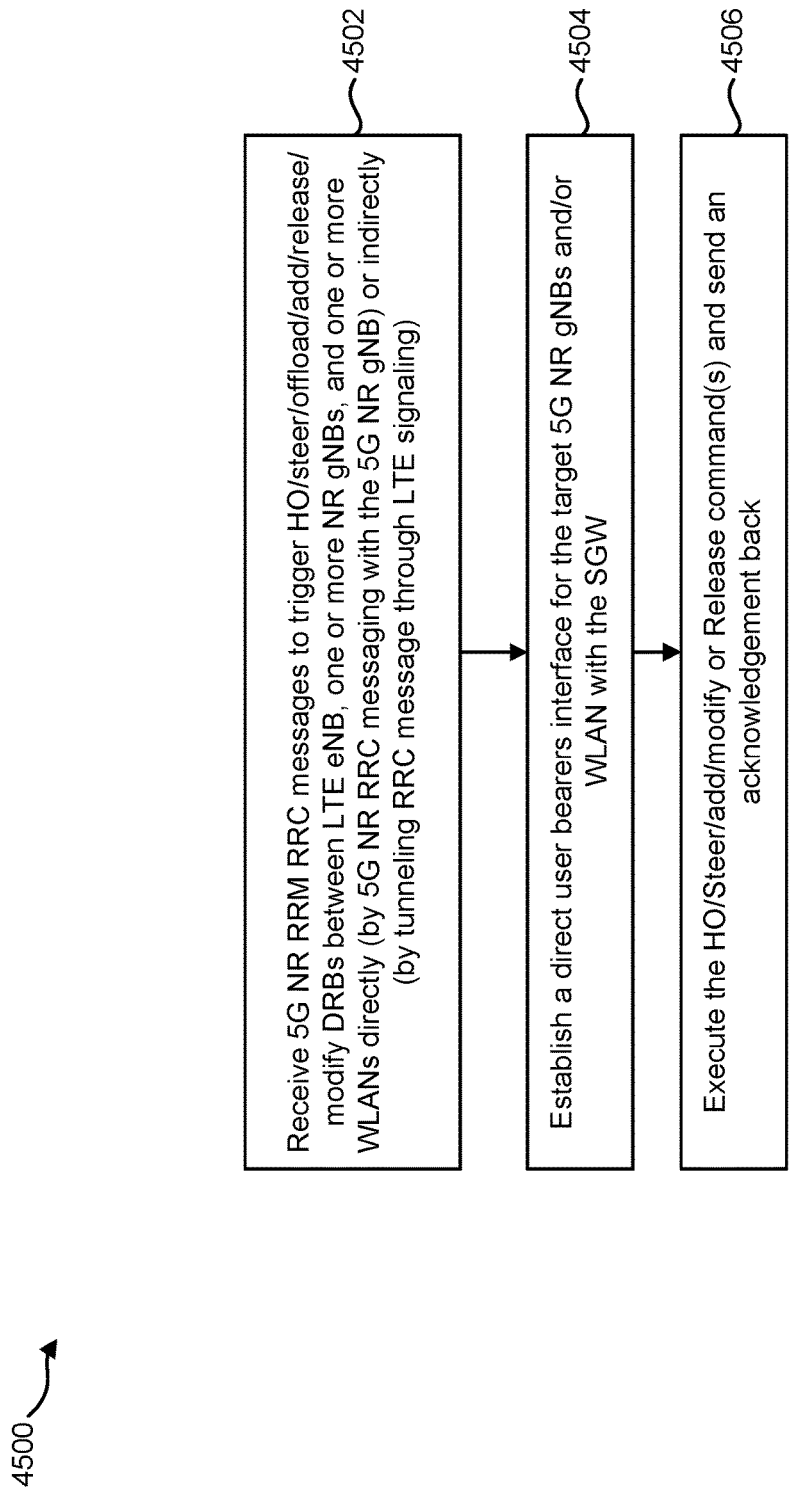
FIG. 45 is a flow diagram illustrating another method by a UE.

FIG. 45 is a flow diagram illustrating another method 4500 by a UE 102. The UE 102 may be a multi-mode capable LTE-5G NR UE. The UE 102 may include two independent RRMs. One RRM may be an LTE RRM and a second RRM may be a 5G NR RRM.

The UE 102 may receive 4502 5G NR RRM RRC messages to trigger HO/steer/offload/add/release/modify DRBs between LTE eNB, one or more NR gNBs, and one or more WLANs directly (e.g., by 5G NR RRC messaging with the 5G NR gNB) or indirectly (e.g., by tunneling RRC message through LTE signaling). These radio access technologies may belong to same or different SGWs. The UE 102 may establish 4504 a direct User bearers interface for the target 5G NR gNBs and/or WLAN with the SGW. The UE 102 may execute 4506 the HO/Steer/add/modify or Release command(s) and may send an acknowledgement back.

Figure 46:
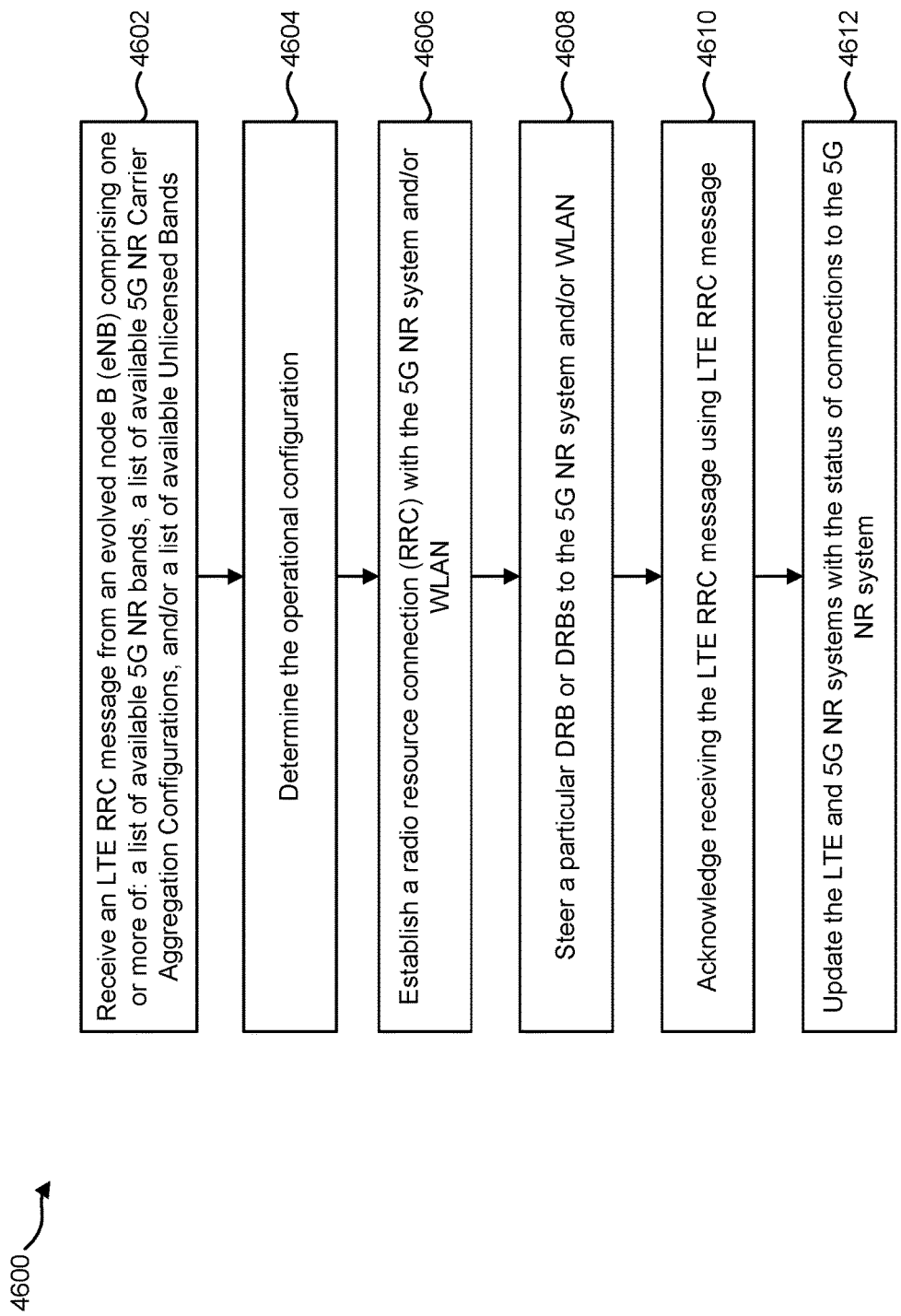
FIG. 46 is a flow diagram illustrating another method by a UE.

FIG. 46 is a flow diagram illustrating another method 4600 by a UE 102. The UE 102 may be a multi-mode capable LTE-5G NR UE. The UE 102 may be configured to receive LTE RRC messages.

The UE 102 may receive 4602 an LTE RRC message from an eNB comprising of one or more of: a list of available 5G NR bands, a list of available 5G NR Carrier Aggregation Configurations, and/or a list of available Unlicensed Bands. The UE 102 may determine 4604 the operational configuration. The UE 102 may establish 4606 a radio resource connection (RRC) with the 5G NR system and or WLAN. The UE 102 may steer 4608 a particular DRB or DRBs to the 5G NR system and/or WLAN. The UE 102 may acknowledge 4610 receiving the LTE RRC message using LTE RRC message. The UE 102 may update 4612 the LTE and 5G NR systems with the status of connections to the 5G NR system.

Figure 47:
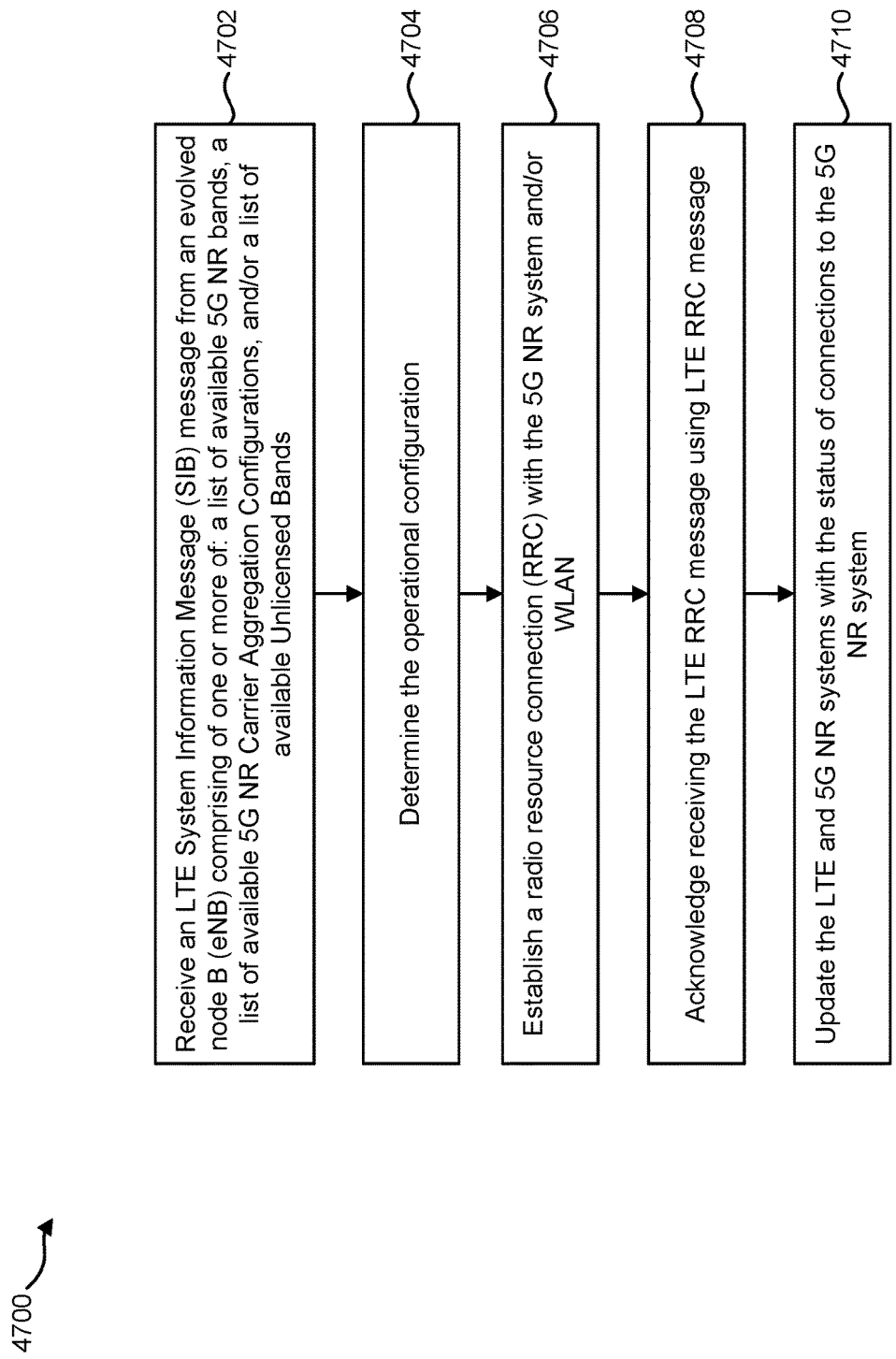
FIG. 47 is a flow diagram illustrating another method by a UE

FIG. 47 is a flow diagram illustrating another method 4700 by a UE 102. The UE 102 may be a multi-mode capable LTE-5G NR UE. The UE 102 may be configured to receive LTE RRC messages.

The UE 102 may receive 4702 an LTE System Information Message (SIB) message from an eNB comprising of one or more of: a list of available 5G NR bands, a list of available 5G NR Carrier Aggregation Configurations, and/or a list of available Unlicensed Bands. The UE 102 may The UE 102 may determine 4704 the operational configuration. The UE 102 may establish 4706 a radio resource connection (RRC) with the 5G NR system and or WLAN. The UE 102 may acknowledge 4708 receiving the LTE RRC message using LTE RRC message. The UE 102 may update 4710 the LTE and 5G NR systems with the status of connections to the 5G NR system.

Figure 48:
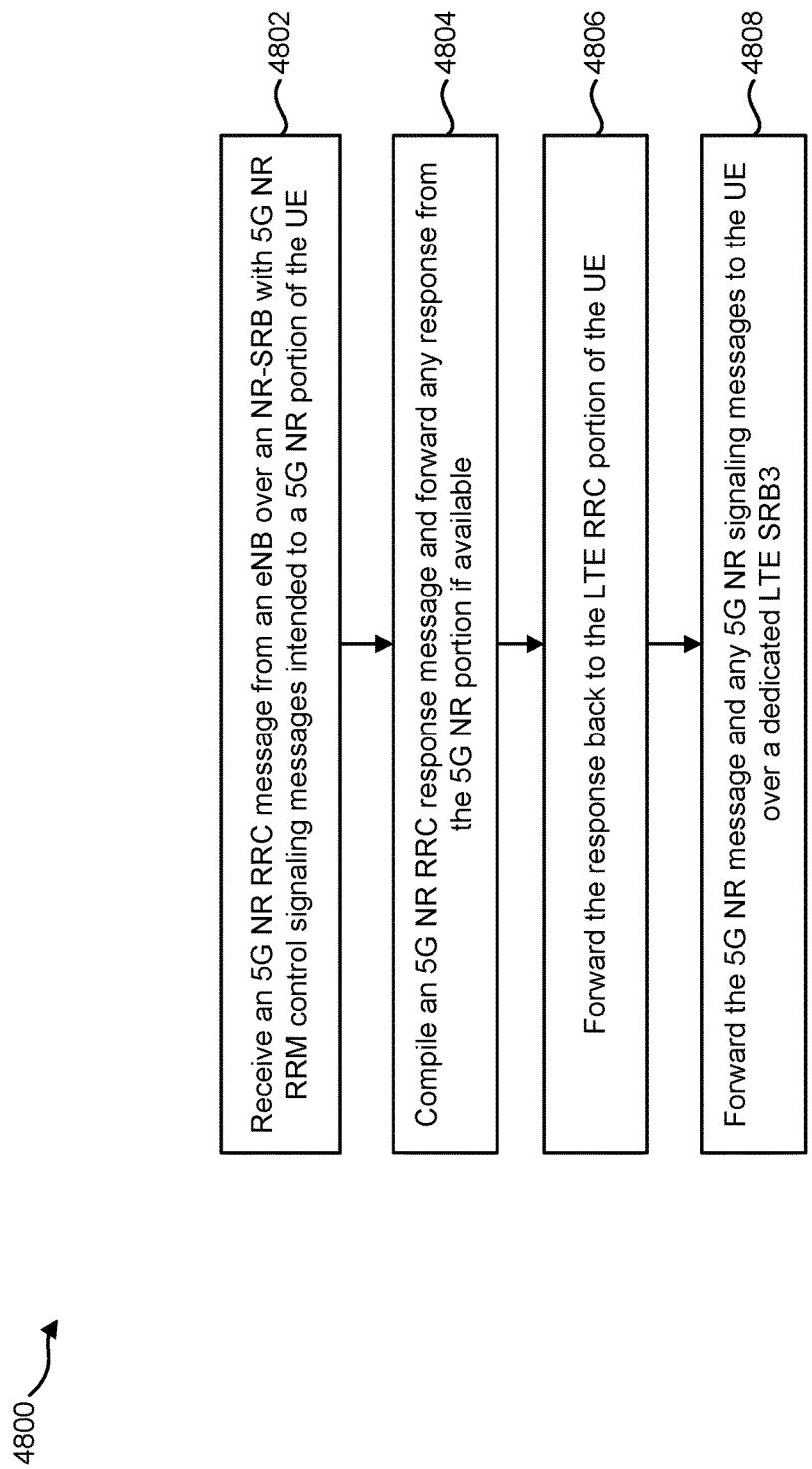
FIG. 48 is a flow diagram illustrating another method by a UE.

FIG. 48 is a flow diagram illustrating another method 4800 by a UE 102. The UE 102 may be a multi-mode capable LTE-5G NR UE. The UE 102 may be configured to receive LTE RRC messages.

The UE 102 may receive 4802 an 5G NR RRC message from an evolved node B (eNB) over an NR-Signaling Radio Bearer (SRB) with 5G NR Radio Resource Management (RRM) control signaling messages intended to a 5G NR portion of the UE 102. In step 4804, the UE 102 may compile a 5G NR RRC response message and forward any response from the 5G NR portion if available. The UE 102 may forward 4806 the response back to the LTE RRC portion of the UE 102. The UE 102 may forward 4808 the 5G NR message and any 5G NR signaling messages to the UE 102 over a dedicated LTE SRB3.

Figure 49:
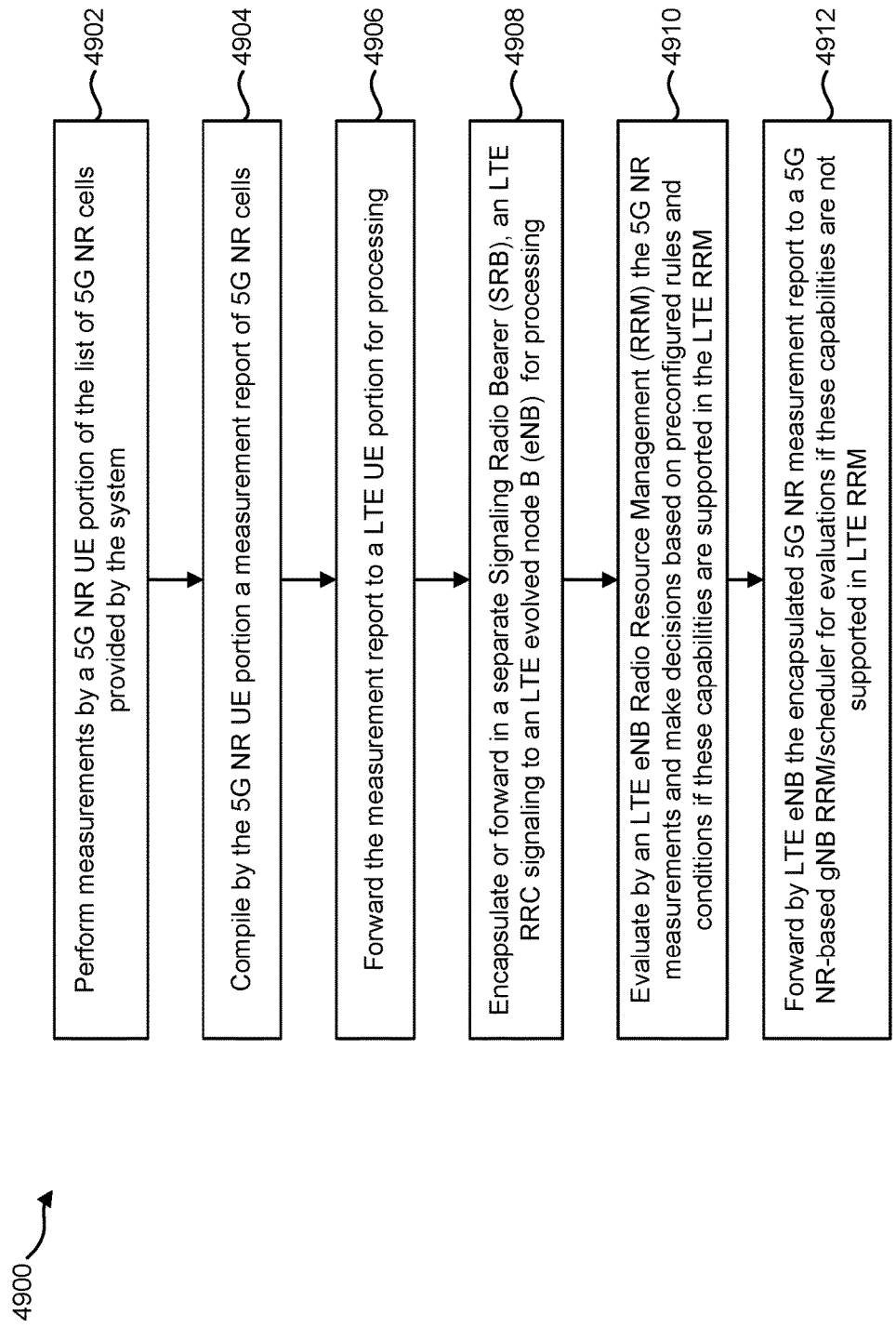
FIG. 49 is a flow diagram illustrating another method by a UE.

FIG. 49 is a flow diagram illustrating another method 4900 by a UE 102. The UE 102 may be a multi-mode capable LTE-5G NR UE. The UE 102 may be configured to receive LTE RRC messages.

The UE 102 may perform 4902 measurements by a 5G NR UE portion of the list of 5G NR cells provided by the system. The UE 102 may compile 4904 by the 5G NR UE portion a measurement report of 5G NR cells. The UE 102 may forward 4906 the measurement report to a LTE UE portion for processing. In step 4908, the UE 102 may encapsulate or forward in a separate Signaling Radio Bearer (SRB), an LTE RRC signaling to an LTE evolved node B (eNB) for processing. The UE 102 may evaluate 4910 by an LTE eNB Radio Resource Management (RRM) the 5G NR measurements and make decisions based on preconfigured rules and conditions if these capabilities are supported in the LTE RRM. The UE 102 may forward 4912 by LTE eNB the encapsulated 5G NR measurement report to a 5G NR-based gNB RRM/scheduler for evaluations if these capabilities are not supported in LTE RRM. The 5G NR-based gNB RRM evaluates the measurement report provided by the 5G NR UE, and the 5G NR-based RRM returns decisions (e.g, HO, steer, split) based on its evaluation of the measurement reports, to the LTE eNB RRM.

Figure 50:
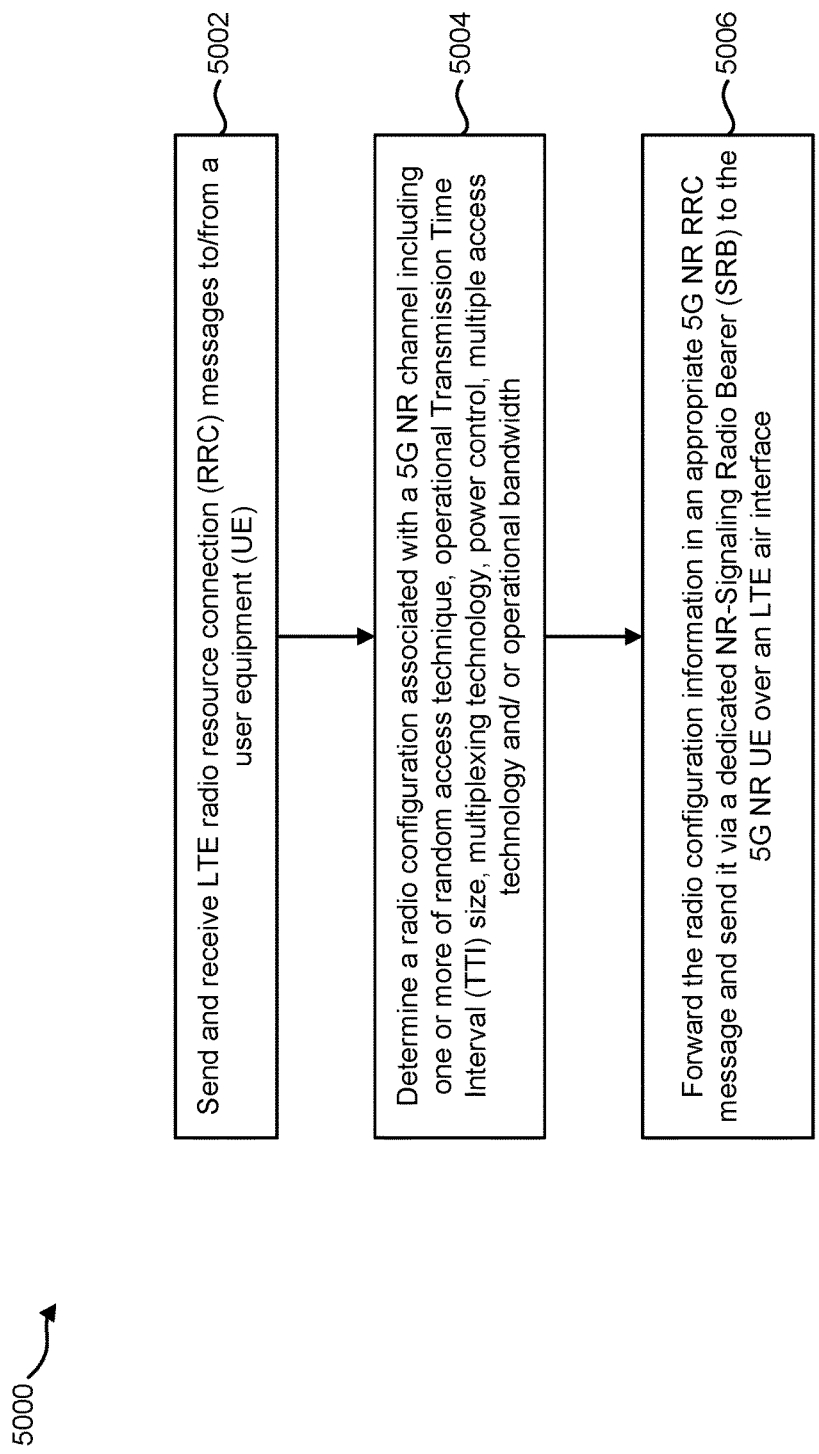
FIG. 50 is a flow diagram illustrating another method by an eNB.

FIG. 50 is a flow diagram illustrating another method 5000 by an eNB 160. The eNB 160 may be a multi-mode capable LTE-5G NR eNB that includes a single RRM capable of controlling multiple radio technologies including LTE and 5G NR.

In step 5002, the eNB 160 may send and receive LTE radio resource connection (RRC) messages to/from a user equipment (UE). The eNB 160 may determine 5004 a radio configuration associated with a 5G NR channel including one or more of random access technique, operational Transmission Time Interval (TTI) size, multiplexing technology, power control, multiple access technology, and/or operational bandwidth. In step 5006, the eNB 160 may forward the radio configuration information in an appropriate 5G NR RRC message and send it via a dedicated NR-Signaling Radio Bearer (SRB) to the 5G NR UE over an LTE air interface.

Figure 51:
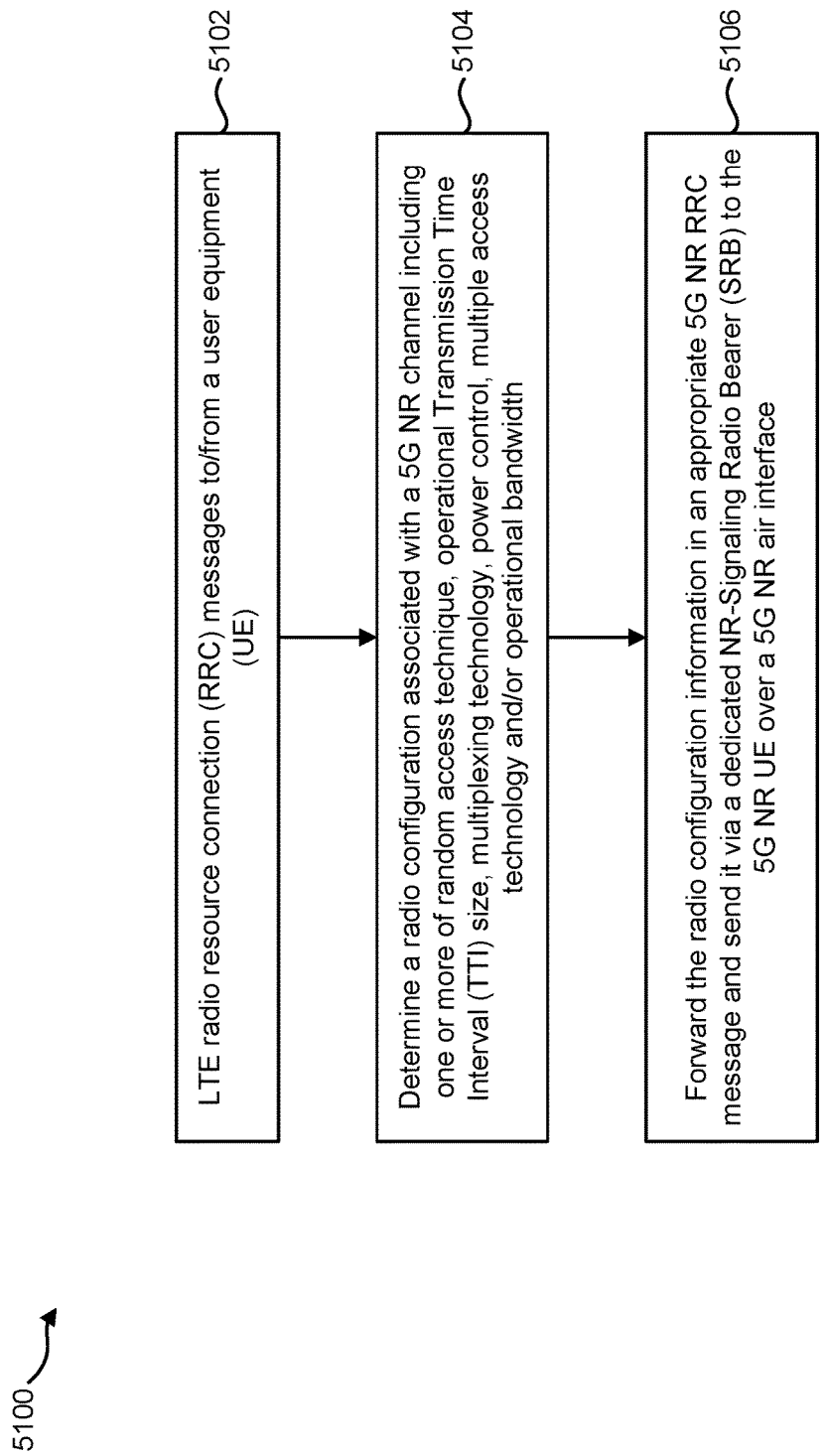
FIG. 51 is a flow diagram illustrating another method by an eNB.

FIG. 51 is a flow diagram illustrating another method 5100 by an eNB 160. The eNB 160 may be a multi-mode capable LTE-5G NR eNB that includes a single RRM capable of controlling multiple radio technologies including LTE and 5G NR.

The eNB 160 may send and receive 5102 LTE radio resource connection (RRC) messages to/from a user equipment (UE). The eNB 160 may determine 5104 a radio configuration associated with a 5G NR channel including one or more of random access technique, operational Transmission Time Interval (TTI) size, multiplexing technology, power control, multiple access technology and/or operational bandwidth. The eNB 160 may forward 5106 the radio configuration information in an appropriate 5G NR RRC message and send it via a dedicated NR-Signaling Radio Bearer (SRB) to the 5G NR UE over a 5G NR air interface.

Figure 52:
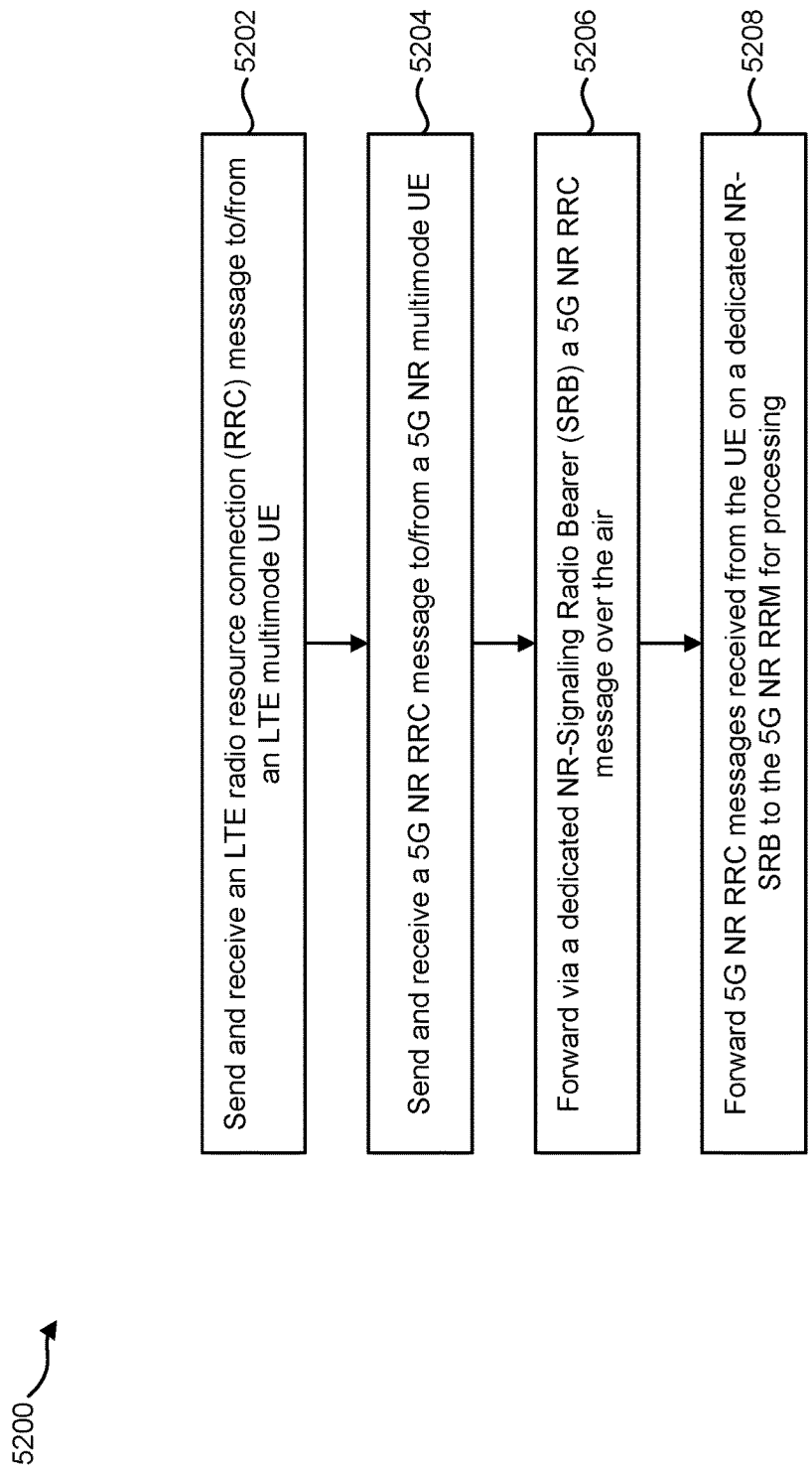
FIG. 52 is a flow diagram illustrating another method by an eNB.

FIG. 52 is a flow diagram illustrating another method 5200 by an eNB 160. The eNB 160 may be a multi-mode capable LTE-5G NR eNB that includes two independent RRMs. One RRM may be an LTE RRM and a second RRM may be a 5G NR RRM.

In step 5202, the eNB 160 may send and receive an LTE radio resource connection (RRC) message to/from an LTE multimode UE. In step 5204, the eNB 160 may send and receive a 5G NR RRC message to/from a 5G NR multimode UE. The eNB 160 may forward 5206 via a dedicated NR-Signaling Radio Bearer (SRB) a 5G NR RRC message over the air. The eNB 160 may forward 5208 5G NR RRC messages received from the UE on a dedicated NR-SRB to the 5G NR RRM for processing.

Figure 53:
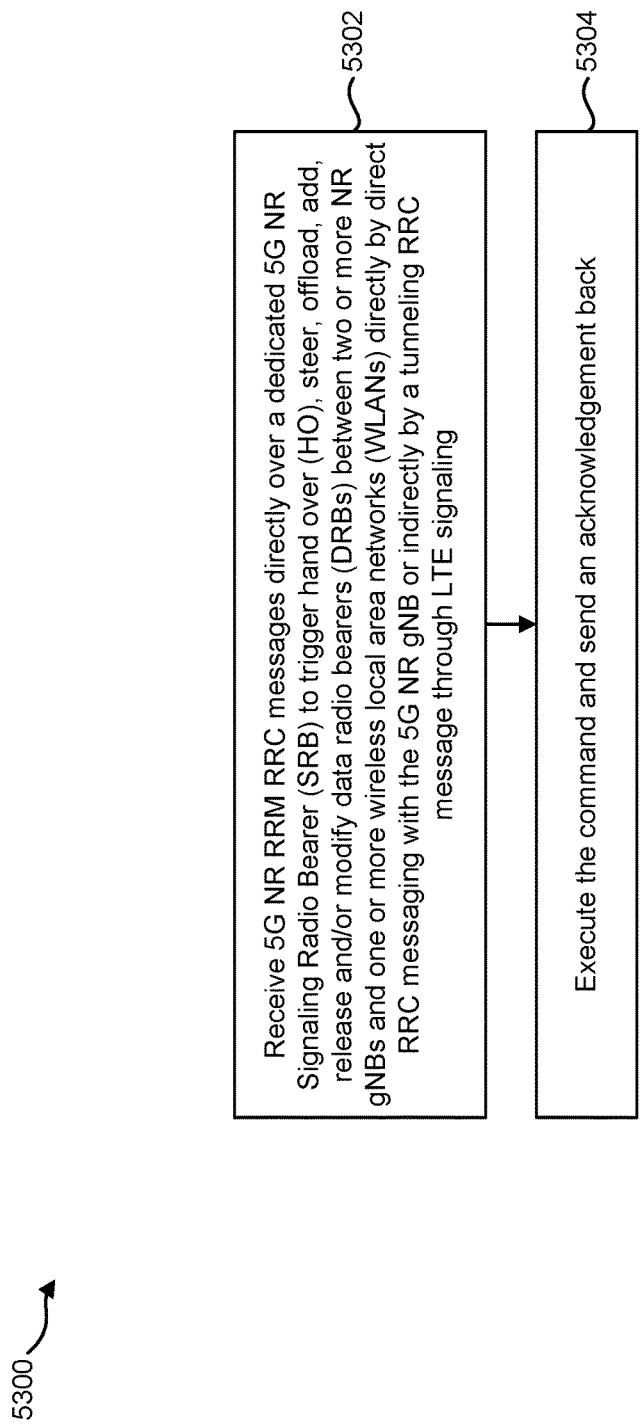
FIG. 53 is a flow diagram illustrating another method by a UE.

FIG. 53 is a flow diagram illustrating another method 5300 by a UE 102. The UE 102 may be a multi-mode capable LTE-5G NR UE that includes two independent RRMs. One RRM may be an LTE RRM and a second RRM may be a 5G NR RRM.

The UE 102 may receive 5302 5G NR RRM RRC messages directly over a dedicated 5G NR Signaling Radio Bearer (SRB) to trigger hand over (HO), steer, offload, add, release and/or modify data radio bearers (DRBs) between two or more NR gNBs and one or more wireless local area networks (WLANs) directly by direct RRC messaging with the 5G NR gNB or indirectly by a tunneling RRC message through LTE signaling. The UE 102 may execute 5304 the command and send an acknowledgement back.

Figure 54:
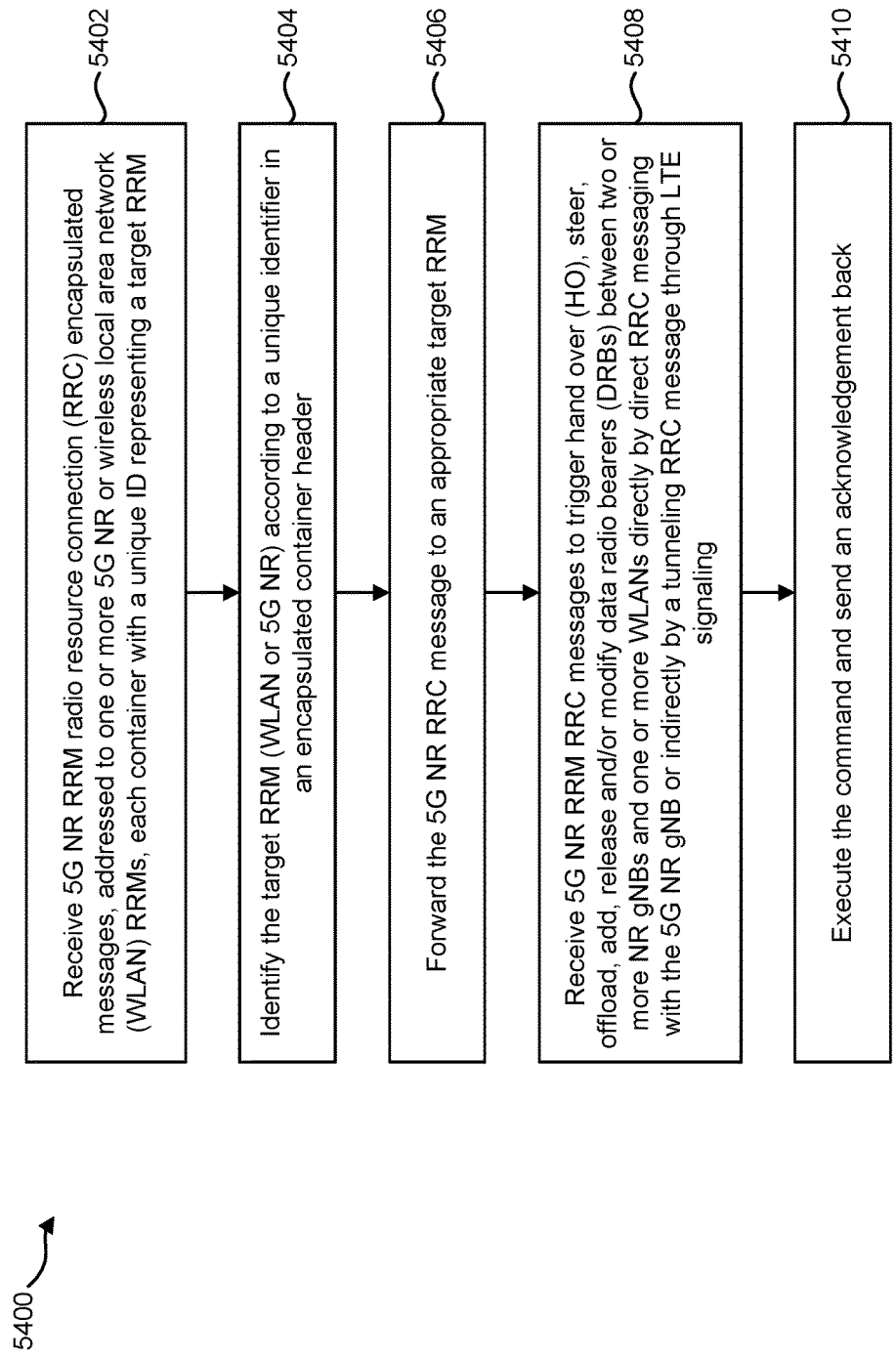
FIG. 54 is a flow diagram illustrating another method by a UE.

FIG. 54 is a flow diagram illustrating another method 5400 by a UE 102. The UE 102 may be a multi-mode capable LTE-5G NR UE that includes two independent RRMs. One RRM may be an LTE RRM and a second RRM may be a 5G NR RRM.

The UE 102 may receive 5402 5G NR RRM radio resource connection (RRC) encapsulated messages, addressed to one or more 5G NR or wireless local area network (WLAN) RRMs, each container with a unique ID representing a target RRM. The UE 102 may identify 5404 the target RRM (WLAN or 5G NR) according to a unique identifier in an encapsulated container header. The UE 102 may forward 5406 the 5G NR RRC message to an appropriate target RRM. The UE 102 may receive 5408 5G NR RRM RRC messages to trigger hand over (HO), steer, offload, add, release and/or modify data radio bearers (DRBs) between two or more NR gNBs and one or more WLANs directly by direct RRC messaging with the 5G NR gNB or indirectly by a tunneling RRC message through LTE signaling. The UE 102 may execute 5410 the command and send an acknowledgement back.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
   a processor; and
   a memory in electronic communication with the processor, wherein instructions stored in the memory are executable to:
   receive an RRCConnectionReconfiguration message from an E-UTRA evolved node B (eNB), wherein the RRCConnectionReconfiguration message is received over an LTE air interface, the RRCConnectionReconfiguration message comprises information elements (IEs) indicating a new radio (NR) configuration information, and the NR configuration information indicates an identity of an NR-Signaling Radio Bearer (SRB) for NR RRC message;
   perform, according to the NR configuration information, addition of the NR-SRB for NR RRC message over an NR air interface which is different from the LTE air interface;
   send information indicating a failure type as NR Radio Link failure.

2. The UE of claim 1, wherein the information indicating the failure type is sent to the E-UTRA eNB.

3. A method performed by a user equipment (UE), comprising:
   receiving an RRCConnectionReconfiguration message from an E-UTRA evolved node B (eNB), wherein the RRCConnectionReconfiguration message is received over an LTE air interface, the RRCConnectionReconfiguration message comprises information elements (IEs) indicating a new radio (NR) configuration information, and the NR configuration information indicates an identity of an NR-Signaling Radio Bearer (SRB) for NR RRC message;
   performing, according to the NR configuration information, addition of the NR-SRB for NR RRC message over an NR air interface which is different from the LTE air interface; and
   sending information indicating a failure type as NR Radio Link failure.

4. An E-UTRA evolved node B (eNB), comprising:
   a processor; and
   a memory in electronic communication with the processor, wherein instructions stored in the memory are executable to:
   send an RRCConnectionReconfiguration message to a user equipment (UE), wherein the RRCConnectionReconfiguration message is received over an LTE air interface of the UE, and the RRCConnectionReconfiguration message comprises information elements (IEs) indicating a new radio (NR) configuration information which indicates an identity of an NR-Signaling Radio Bearer (SRB) for NR RRC message and which is used to cause the UE to perform addition of the NR-SRB for NR RRC message over an NR air interface of the UE which is different from the LTE air interface; and
   receive, from the UE, information indicating a failure type as NR Radio Link failure.

5. A method performed by an E-UTRA evolved node B (eNB), comprising:
   sending an RRCConnectionReconfiguration message to a user equipment (UE), wherein the RRCConnectionReconfiguration message is received over an LTE air interface of the UE, and the RRCConnectionReconfiguration message comprises information elements (IEs) indicating a new radio (NR) configuration information which indicates an identity of an NR-Signaling Radio Bearer (SRB) for NR RRC message and which is used to cause the UE to perform addition of the NR-SRB for NR RRC message over an NR air interface of the UE which is different from the LTE air interface; and
   receiving, from the UE, information indicating a failure type as NR Radio Link failure.

* * * * *